US012801828B2

(12) United States Patent
Nothman et al.

(10) Patent No.: US 12,801,828 B2
(45) Date of Patent: Nov. 17, 2026

(54) SYSTEMS AND METHODS FOR PROCESSING NEW DECK FORMAT DESIGNS

(71) Applicant: Canva Pty Ltd, Surry Hills (AU)

(72) Inventors: Joel Nothman, Dover Heights (AU); Sam Luke Fancourt Parkinson, Surry Hills (AU); Gökhan Yildirim, Hartfield (AU)

(73) Assignee: Canva Pty Ltd, Surry Hills (AU)

( * ) Notice: Subject to any disclaimer, the term of this patent is extended or adjusted under 35 U.S.C. 154(b) by 0 days.

(21) Appl. No.: 19/054,873

(22) Filed: Feb. 16, 2025

(65) Prior Publication Data

US 2025/0200266 A1 Jun. 19, 2025

Related U.S. Application Data

(63) Continuation of application No. 18/786,527, filed on Jul. 28, 2024.

(30) Foreign Application Priority Data

Jul. 31, 2023 (AU) ................................ 2023210538

(51) Int. Cl.
*G06F 40/106* (2020.01)
*G06F 40/186* (2020.01)

(52) U.S. Cl.
CPC .......... *G06F 40/106* (2020.01); *G06F 40/186* (2020.01)

(58) Field of Classification Search
None
See application file for complete search history.

(56) References Cited

U.S. PATENT DOCUMENTS 5,499,366 A 3/1996 Rosenberg et al.
5,528,743 A 6/1996 Tou et al.
(Continued)

FOREIGN PATENT DOCUMENTS

AU 2020230268 A1 1/2021
AU 2020230268 B2 * 9/2021 ............ G06T 11/60
(Continued)

OTHER PUBLICATIONS

Bajaj, G. Picture Fills for Slide Backgrounds in PowerPoint 2016 for Windows, INDEZINE, published May 5, 2016, pp. 1-8.
(Continued)

*Primary Examiner* — Henry Orr
(74) *Attorney, Agent, or Firm* — GrowIP Law Group LLC

(57) ABSTRACT

Described herein is a computer implemented method for generating a new deck format design based on a source design. The method includes: processing the source design to generate source design analysis data, the source design analysis data defining a first candidate page, the first candidate page associated with a first set of source objects; analysing a first template to determine if the first template design matches the source design, wherein analysing the first template design is based on the source design analysis data and first template design analysis data; determining that the first template matches the source design; generating a first new deck descriptor, the first new deck descriptor being in respect of the first template and including first content map data, the first content map data mapping a first source object from the set of source objects to a first destination object from the first set of destination objects; and generating the new deck format design based on the source design and the first new deck descriptor.

19 Claims, 30 Drawing Sheets

(56) References Cited

U.S. PATENT DOCUMENTS

| | | | | |
|---|---|---|---|---|
| 7,249,318 | B1 | 7/2007 | Corell et al. | |
| 7,383,499 | B2 | 6/2008 | Kraft et al. | |
| 7,421,652 | B2 | 9/2008 | Yuan et al. | |
| 7,500,194 | B2 | 3/2009 | Collins et al. | |
| 7,617,449 | B2 * | 11/2009 | Carlson | G06F 40/186 715/255 |
| 7,619,773 | B2 | 11/2009 | Haikin et al. | |
| 7,673,227 | B2 | 3/2010 | Kotler et al. | |
| 8,078,955 | B1 | 12/2011 | Gupta | |
| 9,639,504 | B2 * | 5/2017 | Rosner | G06F 40/186 |
| 10,311,060 | B2 | 6/2019 | Mulligan et al. | |
| 10,460,023 | B1 * | 10/2019 | Shriver | G06F 40/106 |
| 10,621,428 | B1 | 4/2020 | Cai et al. | |
| 11,151,313 | B2 * | 10/2021 | Chua | G06F 16/93 |
| 11,182,136 | B1 | 11/2021 | Xie et al. | |
| 11,200,715 | B1 | 12/2021 | Takuma et al. | |
| 11,354,490 | B1 * | 6/2022 | Shriver | G06F 40/166 |
| 11,423,207 | B1 | 8/2022 | Li | |
| 11,481,550 | B2 * | 10/2022 | Sivaji | G06F 16/345 |
| 11,537,991 | B2 | 12/2022 | Morad et al. | |
| 11,947,893 | B1 | 4/2024 | Seth | |
| 2004/0006742 | A1 | 1/2004 | Slocombe | |
| 2004/0210818 | A1 | 10/2004 | Jones et al. | |
| 2005/0171758 | A1 | 8/2005 | Palmquist | |
| 2005/0237321 | A1 | 10/2005 | Young et al. | |
| 2006/0069677 | A1 | 3/2006 | Tanigawa et al. | |
| 2006/0072131 | A1 | 4/2006 | Haikin et al. | |
| 2006/0150092 | A1 | 7/2006 | Atkins | |
| 2006/0259858 | A1 | 11/2006 | Collins et al. | |
| 2006/0259860 | A1 | 11/2006 | Kobashi | |
| 2006/0282779 | A1 | 12/2006 | Collins et al. | |
| 2007/0050712 | A1 | 3/2007 | Hull et al. | |
| 2007/0076260 | A1 | 4/2007 | Upton | |
| 2007/0097148 | A1 | 5/2007 | Tanaka | |
| 2007/0236761 | A1 | 10/2007 | Sloan | |
| 2008/0155422 | A1 | 6/2008 | Manico et al. | |
| 2009/0087094 | A1 | 4/2009 | Deryagin et al. | |
| 2009/0276378 | A1 | 11/2009 | Boguraev et al. | |
| 2010/0241951 | A1 | 9/2010 | Vandervort et al. | |
| 2010/0318942 | A1 | 12/2010 | Banyasad et al. | |
| 2010/0325535 | A1 | 12/2010 | Reddy | |
| 2010/0333003 | A1 | 12/2010 | Zurmuehl et al. | |
| 2011/0058193 | A1 | 3/2011 | Shiraishi | |
| 2011/0128298 | A1 | 6/2011 | Tsuchida | |
| 2011/0276874 | A1 | 11/2011 | Dejean | |
| 2012/0105911 | A1 | 5/2012 | Belbin | |
| 2013/0106913 | A1 | 5/2013 | Edmiston et al. | |
| 2013/0155088 | A1 | 6/2013 | Wang et al. | |
| 2013/0191389 | A1 | 7/2013 | Lazarevic et al. | |
| 2014/0149926 | A1 | 5/2014 | Min | |
| 2014/0215301 | A1 | 7/2014 | Stone et al. | |
| 2014/0298166 | A1 | 10/2014 | Kuranoshita | |
| 2015/0040048 | A1 | 2/2015 | George et al. | |
| 2015/0058462 | A1 | 2/2015 | Tafel | |
| 2015/0074516 | A1 | 3/2015 | Ben-Aharon et al. | |
| 2015/0154164 | A1 | 6/2015 | Goldstein et al. | |
| 2015/0199422 | A1 | 7/2015 | Gaydaenko et al. | |
| 2015/0227504 | A1 | 8/2015 | Zhang et al. | |
| 2015/0301711 | A1 | 10/2015 | Abumov | |
| 2015/0310124 | A1 | 10/2015 | Ben-Aharon et al. | |
| 2015/0348227 | A1 | 12/2015 | Saito et al. | |
| 2016/0078006 | A1 | 3/2016 | Straub et al. | |
| 2016/0103854 | A1 | 4/2016 | Nauerz et al. | |
| 2016/0110082 | A1 | 4/2016 | Zhang et al. | |
| 2016/0357711 | A1 | 12/2016 | Zoon et al. | |
| 2017/0024361 | A1 | 1/2017 | Shaw et al. | |
| 2017/0024362 | A1 | 1/2017 | Borders | |
| 2017/0124055 | A1 | 5/2017 | Radakovitz et al. | |
| 2017/0315979 | A1 | 11/2017 | Boucher et al. | |
| 2018/0114059 | A1 | 4/2018 | Ric et al. | |
| 2018/0246871 | A1 | 8/2018 | McNabb | |
| 2018/0300297 | A1 | 10/2018 | da Silva et al. | |
| 2019/0108201 | A1 | 4/2019 | Abrahami et al. | |
| 2020/0019583 | A1 | 1/2020 | Halfond et al. | |
| 2020/0097536 | A1 | 3/2020 | Bedi et al. | |
| 2020/0134255 | A1 | 4/2020 | Nocedal et al. | |
| 2020/0210518 | A1 | 7/2020 | Manna | |
| 2020/0279014 | A1 | 9/2020 | Lenzner | |
| 2020/0311185 | A1 | 10/2020 | Agrawal | |
| 2021/0133389 | A1 | 5/2021 | Bischoff et al. | |
| 2021/0200937 | A1 | 7/2021 | Wheaton et al. | |
| 2021/0383106 | A1 | 12/2021 | Maggio et al. | |
| 2022/0108065 | A1 * | 4/2022 | Eshghi | G06F 16/164 |
| 2022/0147702 | A1 | 5/2022 | Li et al. | |
| 2022/0156448 | A1 | 5/2022 | Juhl et al. | |
| 2022/0215606 | A1 | 7/2022 | Radford et al. | |
| 2022/0269713 | A1 * | 8/2022 | Wang | G06N 3/09 |
| 2022/0277136 | A1 | 9/2022 | Shekhar et al. | |
| 2023/0161945 | A1 | 5/2023 | Vadapandeshwara et al. | |
| 2023/0315242 | A1 | 10/2023 | Rajasankar et al. | |
| 2024/0019976 | A1 | 1/2024 | Rajasankar et al. | |
| 2024/0020488 | A1 | 1/2024 | Erving | |
| 2024/0119230 | A1 | 4/2024 | Khanna et al. | |
| 2024/0257420 | A1 | 8/2024 | Yang et al. | |
| 2025/0078368 | A1 | 3/2025 | Radford et al. | |

FOREIGN PATENT DOCUMENTS

| | | | | |
|---|---|---|---|---|
| AU | 2021273643 | A1 | 6/2023 | |
| AU | 2022271398 | A1 | 6/2023 | |
| CN | 1648848 | A | 8/2005 | |
| CN | 1648849 | A | 8/2005 | |
| CN | 1744027 | A | 3/2006 | |
| CN | 100399332 | C | 7/2008 | |
| CN | 100458780 | C | 2/2009 | |
| CN | 106664463 | A | 5/2017 | |
| CN | 106815184 | A | 6/2017 | |
| CN | 107850978 | A | 3/2018 | |
| CN | 108351745 | A | 7/2018 | |
| CN | 110221790 | A | 9/2019 | |
| CN | 111914805 | A | 11/2020 | |
| CN | 113297859 | A | 8/2021 | |
| CN | 108073680 | B * | 6/2022 | G06N 20/00 |
| CN | 116644727 | A | 8/2023 | |
| CN | 116738952 | A | 9/2023 | |
| EP | 0431638 | A2 | 6/1991 | |
| EP | 1524606 | A2 | 4/2005 | |
| EP | 1600862 | A2 * | 11/2005 | G06F 40/186 |
| EP | 2477124 | A1 | 7/2012 | |
| EP | 3940589 | A1 | 1/2022 | |
| JP | 2005135397 | A | 5/2005 | |
| JP | 2005216180 | A | 8/2005 | |
| JP | 2005216182 | A | 8/2005 | |
| JP | 2006048539 | A | 2/2006 | |
| JP | 2008282399 | A * | 11/2008 | G06F 40/186 |
| JP | 006742850 | B2 | 8/2020 | |
| WO | 2004109557 | A1 | 12/2004 | |
| WO | 2005073872 | A2 | 8/2005 | |
| WO | 2015036962 | A1 | 3/2015 | |
| WO | 2015121805 | A1 | 8/2015 | |
| WO | 2018175032 | A1 | 9/2018 | |

OTHER PUBLICATIONS

Dejean, H., el. al., ‘Structuring Documents According to Their Table of Contents’, Proceedings of the 2005 ACM Symposium on Document Engineering, Nov. 2005, pp. 2-9, DOI: 10.1145/1096601.1096605.

Goferman, S. et al., Puzzle-like collage, EuroGraphics 2010 (vol. 29, No. 2), Blackwell Publishing, published 2010, pp. 459-468.

Hailpern, J., et. al., ‘Pagination: It’s what you say, not how long it takes to say it’ [retrieved from the Internet Sep. 26, 2023], Apr. 11, 2014, pp. 1-11.

Mittelbach, F., ‘A general LuaTex framework for globally optimized pagination’, Computational Intelligence, vol. 35, issue 2, May 2019, pp. 242-284, DOI: https://doi.org/10.1111/coin.12165.

Optimized XY-Cut for Determining a Page Reading Order by Jean-Luc Meunier, Xerox Research Centre Europe, 6, chemin de Maupertuis F-38240 Meylan (Jan. 2005), pp. 1-6.

Thomas et al, Automated Power Point Generation using Natural Language Processing Techniques, IEEE, pp. 500-505 (Year: 2023).

(56) References Cited

OTHER PUBLICATIONS

Manjiang Ding et al., "Designs and Implements the electronic Signature System of Open Fixed-layout Document format documents," Sep. 15, 2023, International Conference on Computer Applications Technology, pp. 179-183 (Year: 2023).
Yi Luo et al., "Application of Digital Content Management System Based on Data Warehouse and Data Mining Technology," Nov. 1, 2012, International Conference on Computational Intelligence and Communication Networks, pp. 988-992 (Year: 2012).
Marco Beck et al., Recognize—Annotate—and Visualize Parallel Content Structures in XML Documents, Sep. 1, 2021, IEEE Joint Conference on Digital Libraries, pp. 258-261 (Year: 2021).
Takashi Hirano et al., Text and Layout Information Extraction from Document Files of Various Formats Based on the Analysis of Page Description Language, Sep. 1, 2007, International Conference on Document Analysis and Recognition, pp. 1-5 (Year : 2007).

* cited by examiner

SYSTEMS AND METHODS FOR PROCESSING NEW DECK FORMAT DESIGNS

CROSS-REFERENCE TO RELATED APPLICATIONS

This application is a Continuation Application of U.S. Non-Provisional application Ser. No. 18/786,527, filed on Jul. 28, 2024, that claims priority to Australian Patent Application No. 2023210538, filed on Jul. 31, 2023, which are each hereby incorporated by reference in their entirety.

TECHNICAL FIELD

The present disclosure is directed to various systems and methods for processing designs.

BACKGROUND

Computer applications for creating and working with designs exist. Some such applications may provide users with the ability to create designs in different formats.

As one example, an application may provide functionality for a user to create what will be referred to as document-format designs—e.g. designs that store content and associated metadata in a word-processing document type format. As another example, an application may provide functionality for a user to create what will be referred to as deck-format designs—e.g. designs that store content and associated metadata in a slide deck type format.

In some situations, a user may wish to use a design they have created as the basis for generating another design. For example, a user may wish to use content prepared in an original document-format design as the basis for a deck-format design.

Background information described in this specification is background information known to the inventors. Reference to this information as background information is not an acknowledgment or suggestion that this background information is prior art or is common general knowledge to a person of ordinary skill in the art.

Figure 1:
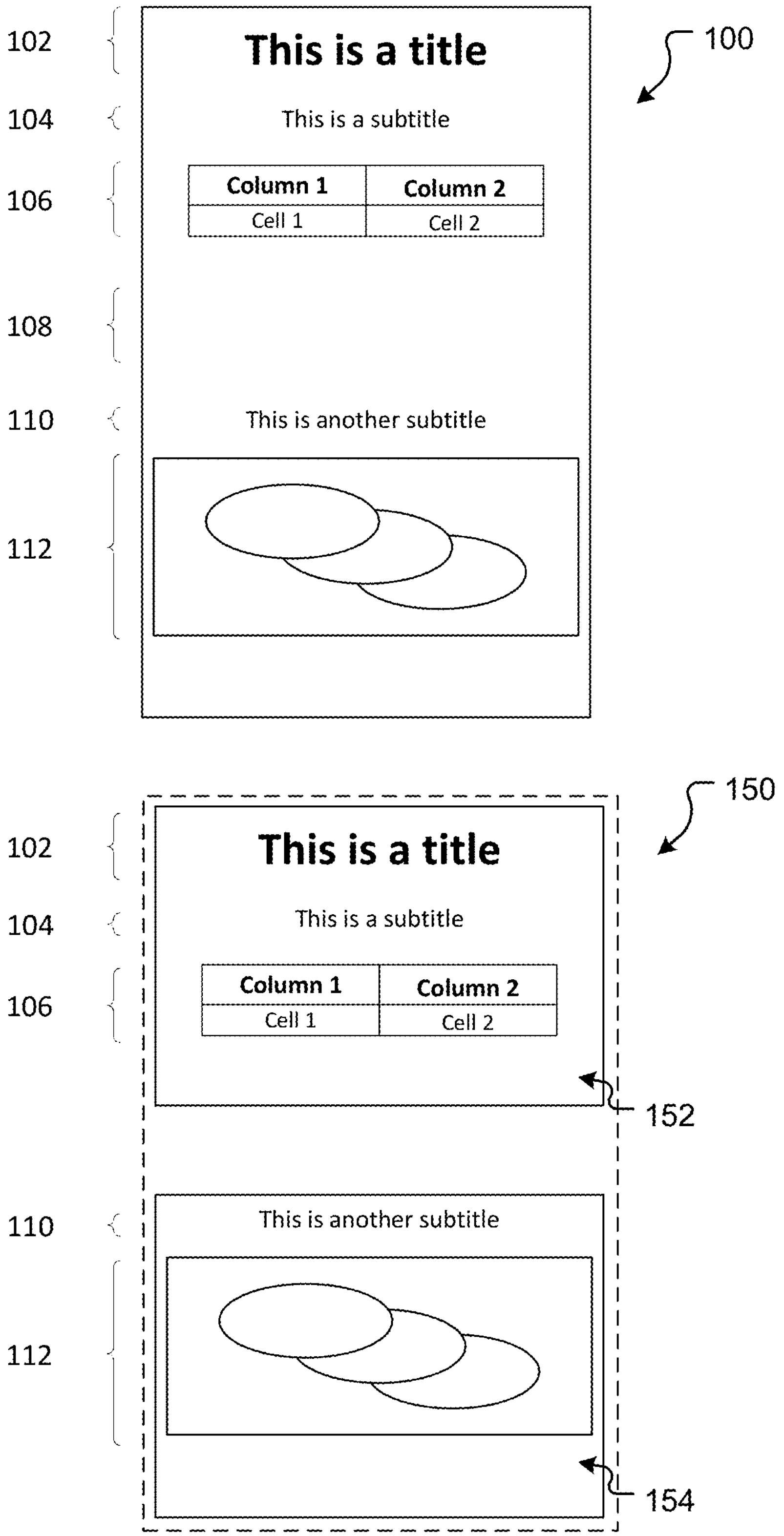
FIG. 1 depicts two example designs: a document-format design and a deck-format design.

While the description is amenable to various modifications and alternative forms, specific embodiments are shown by way of example in the drawings and are described in detail. It should be understood, however, that the drawings and detailed description are not intended to limit the invention to the particular form disclosed. The intention is to cover all modifications, equivalents, and alternatives falling within the scope of the present disclosure.

DETAILED DESCRIPTION

In the following description numerous specific details are set forth in order to provide a thorough understanding of the present invention. It will be apparent, however, that the present invention may be practiced without these specific details. In some instances, well-known structures and devices are shown in block diagram form in order to avoid unnecessary obscuring.

As discussed above, computer applications for use in creating and working with designs exist. Such applications may provide mechanisms for a user to create a design, edit the design by adding content to it, and output the design in various ways (e.g. by saving, displaying, printing, publishing, sharing, or otherwise outputting the design).

As also discussed above, an application may provide a user with the ability to create and work with designs of different formats. For example, the present disclosure described two different design formats that will be referred to as document-format designs (documents for short) and deck-format designs (decks for short). Documents and decks are described in detail below).

Certain embodiments of the present disclosure are directed to systems and methods for generating a new deck-format design based on a source document-format design.

As one example, a user may have source content in a document but want to convert that document design into a deck. For example, a user may initially prepare a document that includes an outline (or other content) for a deck. Techniques described herein operate to automatically identify a matching template design and then generate a new deck-format design that is based on the template but that includes the source content from the original document.

Other embodiments of the present disclosure are directed to systems and methods for generating a new deck-format design based on a source deck-format design.

As one example, a user may generate a source (deck-format) design but wish to change the layout of the elements in the design page(s). In this case, the techniques described herein operate to automatically identify a matching template design and then generate a new deck-format design that is based on the template but that includes the source content from the original deck.

Other embodiments of the present disclosure are directed to analysing a deck-format design to generate analysis data corresponding thereto. If the deck-format design is a destination design (e.g. a template), the analysis data may be used to match the template to a source design and/or generate a new design based on the template and a source design. If the deck-format design is a source design, the analysis data may be used to match the source design to one or more deck-format template designs and to generate one or more new designs based on the source design and the one or more matched template designs.

Other embodiments of the present disclosure are directed to analysing a document-format source design to generate analysis data corresponding thereto. The analysis data may be used to match the source design to one or more deck-format template designs and to generate one or more new designs based on the source design and the one or more matched template designs.

Other embodiments of the present disclosure are directed to processing a document-format design to generating one or more pagination candidates for that document-format design. In this context, a pagination candidate defines a set of candidate pages, with each relevant content segment of the document design being assigned to a candidate page.

Other embodiments of the present disclosure are directed to determining a deck-format design page (e.g. a template page) that matches a set of source content segments of a source design. The set of source content segments may, for example, be associated with a candidate page generated for the source design.

Other embodiments of the present disclosure are directed to determining a deck-format design (e.g. a template) that matches the content of a source design. The source design may be a deck-format design or a document-format design.

Other embodiments of the present disclosure are directed to mapping a set of source objects (that correspond to source content of a source design) to a set of destination objects (that correspond to elements of a destination deck-format design, such as a template).

Other embodiments of the present disclosure are directed to mapping a set of source fills to a set of destination fills where a number of source fills exceeds the number of destination fills.

Other embodiments of the present disclosure are directed to generating a set of design elements based on a set of source fills and a single destination element.

Other embodiments of the present disclosure are directed to generating a table based on a source table and a destination table.

Other embodiments of the present disclosure are directed to generating a chart based on a source chart and a destination chart.

Other embodiments of the present disclosure are directed to identifying and resolving undesirable element collisions. Such collisions may arise when transferring content from a source design to a destination design. This may include identifying and resolving what are referred to as undesirable partial collisions, undesirable container collisions, and/or undesirable page collisions.

Other embodiments of the present disclosure are directed to identifying and resolving intra-text hierarchy level conflicts that may arise when transferring text content from a source design to a destination design.

Other embodiments of the present disclosure are directed to identifying and resolving inter-text hierarchy level conflicts that may arise when transferring text content from a source design to a destination design.

Other embodiments of the present disclosure are directed to determining a whether a destination fill is appropriate for replacement by a partial type fill or not.

Other embodiments of the present disclosure are directed to processing input text to determine a set of text hierarchy levels defined by that input text.

Designs

The present disclosure is concerned with designs.

In the context of the present disclosure, a design includes content and has a design format. In particular, the present disclosure refers to document-format designs and deck-format designs. For ease of reference, a document-format design may be referred to as a document and a deck-format design may be referred to as a deck.

In the context of the present disclosure, a design may include various different types of content. For example, content may be fill type content that defines a fill such as a solid colour, a colour gradient, a graphic (e.g. a vector graphic), an image (e.g. a raster image), a video, or an alternative type of fill. As another example, content may be text-type content (e.g. a sequence of one or more characters). As another example, content may be chart content (e.g. a line chart, bar chart, or an alternative type of chart). Alternative content types are possible.

In the context of the present disclosure, a deck includes an ordered set of one or more explicitly defined pages. The pages of a deck may be referred to as slides. The content of a deck is defined by one or more deck elements (elements for short). Generally speaking, each element defines (or is associated with) content (e.g. text, one or more fills, a chart, a table, or other content) as well as data that defines which page of the deck the element (and, therefore, its associated content) is on, where on that page the content is positioned, and how the content is displayed.

In a deck, each element is associated with explicit position data. An element's position data includes a particular page and a particular position on that particular page that the element's content is to be displayed at. In a deck, adding a new element or removing an existing element does not generally change the position of other elements in the deck. Moreover, unless element's are grouped together (or automatic reflow operations are implemented), adjusting the position of one element will not generally cause the positions of other elements to change.

Generally speaking, decks may be appropriate for content that is predominantly visual and has relatively low amounts of text. Decks may also be appropriate where specific and precise positioning of content (independently of other content) is of particular importance. Examples of such designs may include, for example, presentation decks (also referred to as slide decks) and posters. A deck could, however, be used to display large amounts of solely text content if desired.

In the context of the present disclosure, the content of a document is defined by an ordered set of one or more document items (items for short). Generally speaking, each item defines (or is associated with) content (e.g. text, a fill, a chart, or other content) as well as data that defines how that content is displayed.

In a document, items are not generally associated with explicit position data. Instead, the position at which the content of an item is displayed is relative to any preceding items in the document's ordered set of items. Accordingly, in a document adding a new item or removing an existing item generally will change the position of other (subsequent) items in the document. To illustrate this, consider a first item that defines the text "TEXT". If a second item defining (for example) the text "PLACEHOLDER" is added to the document before the first item, the second item will (in a standard English language context) cause the text of the first item to be displayed further to the right and/or further down the page. Similarly, if the second item was then deleted from the document, this would cause the text of the first item to be shifted to the left and/or up the page.

Generally speaking, documents may be appropriate for content that includes relatively large amounts of text and/or where the independent positioning of content desirable. This may be the case where relative positioning is preferable—for example to allow for content to move (or reflow) as new content is added, content is deleted, and/or the size of the document (e.g. its width—or the size of a window in which the document is displayed) changes. Examples of such designs may include, for example, letters, descriptions, papers (and other "word-processing" type documents).

Documents may also be used, however for other purposes. For example, a user wishing to create a deck for a particular purpose may initially create a document that provides an outline of the deck.

An example document-format is described below.

Example Deck-Format Design

In order to illustrate decks, a simplified deck-format design data schema will be described by way of example. Alternative schemas are possible.

In the present example, a deck is defined by a deck record. A deck record is a set of key/value pairs (e.g. a map or dictionary) that define attributes of the deck. A deck record may define various deck attributes, such as one or more of the following:

| Example attribute | Note | E.g. |
|---|---|---|
| Deck ID | A unique identifier of the deck-format design. | "deckId": "abc123", |
| Dimensions | Default dimensions (e.g. width and height) of the pages of the deck. | "dimensions": {<br>"width": 1080,<br>"height": 1080<br>}, |
| Page data | An array of page records (described further below). | "pages": [<br>{page record 1},<br>. . . ,<br>{page record n}<br>] |

In the present example, a deck record provides various deck-level attributes. These include an identifier and default page dimensions. Additional and/or alternative deck-level attributes are possible (for example attributes such as a version identifier, a creation date, a creator, and/or other attributes).

In the present example, the deck record also includes page data—an ordered set (e.g. an array) of one or more page records. Each page record defines a page of the deck. In this example, a page record's position in the ordered set serves to identify that page and also define its position in the deck (e.g. a page at array index n appears after a page at array index n−1 and before a page at array index n+1).

In the present example, each page record is also a set of key/value pairs. Example page record attributes are as follows:

| Example attribute | Note | E.g. |
|---|---|---|
| Background | Defines a page background | "background": {background fill}, |
| Element data | Defines elements that have been added to the page | "elements": [<br>{design element record 1},<br>. . . ,<br>{design element record n}<br>] |

In this present example, each page record defines a background and element data.

The background is an optional attribute that defines any background fill for the page. A background fill may, for example, be a solid colour, a colour gradient, an image, or an alternative fill. In other implementations, a page background may be defined as an element of the design page (e.g. as the first element of the page's elements array discussed below) rather than a page-level attribute.

The element data of a page record is an ordered set (e.g. an array) of design element records. Each design element record defines an element that has been added to the page. Accordingly, in the present example the page record in which a design element record appears defines the particular page that element belongs to. Furthermore, in this example, a design element record's position in a page's element array serves to identify that element and defines its depth (or z-index) on the page. For example, an element at array index n is positioned above an element at array index n−1 and below an element at array index n+1. Element depth becomes relevant where non-transparent elements (or non-transparent portions of elements) overlap one another in the x/y plane. Element depth may be alternatively handled, however, for example, by storing depth as an explicit element attribute.

Generally speaking, an element defines content that has been added to a page of a deck—e.g. by copying/importing content from one or more libraries (e.g. libraries of images, animations, videos, etc.); by drawing/creating using one or more design tools (e.g. a text tool, a line tool, a rectangle tool, an ellipse tool, a curve tool, a freehand tool, and/or other design tools); or by otherwise adding content to a deck page.

In the present example, different element types are provided. The actual element types provided—and the attributes required or available to define those elements-will depend on implementation. In the present example, however, text, shape, table, chart, and group type elements are provided. These element types are described below.

All element types include position data that defines an element's position on the page the element belongs to. In the present example, an element's position is defined by an (x,y) coordinate pair.

In the present examples, a Cartesian coordinate system is used in which the origin of a page (i.e. x=y, y=0) is at the top-left: i.e. x coordinates increase from left to right, and y coordinates increase from top to bottom. In this coordinate system, the (x,y) coordinate pair defining an element's position defines the top left corner of the element prior to any rotation that may be associated with/applied to the element.

All element types also include size data that defines an element's size. In the present example, an element's size is defined by a width value and a height value.

An element's position and size data can be used to determine its bounding box. In the present disclosure, an element's bounding box can be defined by a set of four values: a top or minY coordinate (e.g. the element's y position); a left or minX coordinate (e.g. the element's x position); a bottom or maxY coordinate (e.g. the element's height); and a right or maxX coordinate (e.g. the element's width). For example, if an element's position data defines an (originX, originY) coordinate pair and its size data defines a width and a height, the bounding box values may be calculated (in the context of the coordinate system described above) as:

$$\min X = \text{origin}X;$$

$$\max X = \text{origin } Y + \text{width};$$

$$\min Y = \text{origin } Y;$$

$$\max Y = \text{origin } Y + \text{height}.$$

In the present disclosure, the bounding boxes of shape, chart, and table type elements correspond to the extents of the element's visible content. For text elements, however, the bounding box may not necessarily correspond to the extents of the text content. In particular, the text content of a text element may expand beyond the element's bounding box (or not occupy the entirety of the element's bounding box). For text elements, an additional text-width attribute may be defined which defines the width at which text will wrap and, therefore, a text content mask. For text elements, the text-width attribute may be less then, equal to, or greater than the element's size.width attribute, and as a consequence the content mask of a text element may extend beyond the text element's bounding box (as determined by its size and position attributes). In other implementations, a separate text-width attribute need not be used—in which case a text element's size.width attribute is used to determine the text-width attribute (e.g. text-width=size.width, or text-width=size-width−a text margin value).

All element types also include rotation data that defines an element's rotation. In the present example, an element's rotation is defined by a rotation value that defines a number of degrees that the element is rotate (e.g. 0=no rotation). In the present embodiments, any rotation applied to an element is about a centre of the element's bounding box.

In addition to attributes that define an element's position, size, and/or rotation, different element types will provide for additional attributes that define the content that the element is used to display. The following provides an example of such attributes.

In the present example, a text element is used to display text content and may include (or be associated with):

- Content data which, for a text element, is text data defining the text content itself (e.g. a set of one or more characters). Text characters may include control characters—e.g. defined character sequences (such as "\n" indicating a line break).
- Format data which, for a text element, is text format data that defines how the text characters are to be displayed. Text format data may include data such as font type, font colour, font style, font size, and/or other format data. Text format data include block level format data which applies to the text of an entire element and/or inline format data which applies to specific characters of spans of characters of the text content. Format data may also include list attributes which describe whether the element's text is arranged in a list of items or not (and, if so, may also define particular list markers—e.g. bullet points, consecutively increasing numbers, or other markers).
- Text alignment data which defines alignment of text in a bounding box. Text alignment data may include vertical alignment data (e.g. top, middle, bottom) and/or horizontal alignment data (e.g. left, centre, right). In the present embodiments, a text element's vertical alignment data defines the direction(s) in which text added to a text element expands (or shrinks) as new lines of text are added or removed. For example: when text is added to a top aligned text element the text expands downwardly; when text is added to a bottom aligned text element the text expands upwardly; when text is added to a middle aligned text element the text expands evenly upwardly and downwardly.
- Position, size, and rotation data as described above.

In certain embodiments, a text element may also include (or be associated with) text hierarchy level data that defines a hierarchy level (or levels) for the text characters. Text hierarchy levels are described further below.

In the present example, a shape element is used to display a fill and may include (or be associated with):

- Content data which, for a shape element, is fill data defining the fill content itself. Fill content may, for example, be a solid colour, a colour gradient, a graphic (e.g. a vector graphic), an image (e.g. a raster image), a video, or an alternative fill.
- Path data that defines a shape path, e.g. an external path or frame for the shape. The path data may, for example, define a geometric shape (e.g. a rectangle, square, triangle, circle, ellipse, or other geometric shape) or an arbitrary closed path (e.g. a hand-drawn path). In the present embodiments, any transparency of a shape's content overrides the path, in the sense that the path acts to mask the media's existing mask.

Fill role data. For example a value indicating whether the fill content is what will be referred to a complete fill or a partial fill. In the present disclosure, a complete fill is a fill that does not include any transparent (or cut-out) regions while a partial fill is a fill that does include one or more transparent (or cut-out) regions.

Position, size, and rotation data as described above.

Certain shape elements may have additional attributes depending on the type of fill the shape element accommodates and/or other factors. By way of example, some or all shape elements may also include one or more of:

Scaling data that defines whether a shape's fill stretches in a vertical direction, stretches in a horizontal direction, or scales uniformly in both directions.

Content size/position/rotation data that define the size/position/rotation of the shape's fill within the shape's bounding box (i.e. separate to the size/position/rotation of the shape element as a whole). This can effect cropping.

Key colour data which describes a set of key colours of the shape. E.g. for certain images and animated images a set of key colours are defined which can then be used if the shape needs to be recoloured. In certain implementations, key colour data is stored for vector graphic images and animated images.

Fill arrangement data. In certain implementations, a single shape element may provide an arrangement of multiple fills. In this case the multi-fill shape element may include fill arrangement data that defines how the multiples fills are arranged (e.g. as a grid or the like). In the present disclosure, if a shape element defines multiple fills each fill is processed as a distinct shape element. In this case the size and position attributes of each shape element are based on the parent (multi-fill) shape element's size and position attributes and the fill arrangement data. Other attributes (e.g. rotation and transparency) are inherited from the parent.

Trim data. For example, for a shape that includes a video fill, trim data may define a start time and/or end time for the playback of that fill.

In the present example, a table element is used to display a table and may include (or be associated with):

Table structure data which defines a structure of the table. The table structure data may, for example, define a number of columns and a number of rows. The table structure data may also define specific column and/or row attributes (e.g. column widths and/or row heights, expressed as either absolute values or as a proportion of the table's total width/height), or may omit such data (in which case column widths and row heights may be automatically determined based on the table's content).

Content data which, for a table element, is cell data defining the content of each table cell. The cell data for a given cell may be text data (describing text content, as described above) or fill data (describing fill content, as described above).

Format data. The format data for a table element may include cell format data which describes a cell format of each table cell. Cell format may include attributes such as background colour, font family, font weight, text colour, text decoration (e.g. underline), text style (e.g. italics), and/or other cell format attributes. The format data for a table may also include structural format data defining, for example, table and cell borders (e.g. line weight, line colour, line style).

Position, size, and rotation data as described above.

In the present example, a chart element is used to display a chart and may include (or be associated with):

Content data which, for a chart element, is chart data defining one or more data series that are to be presented in the chart.

Chart type data defining a chart type that is to be used to display the one or more data series (e.g. a line chart, bar chart, pie chart, or an alternative form of chart).

Format data. Chart format data may include, for example, a set of data series formats (and data associating each data series format with a data series of the chart). A data series format may define, for example, a data series colour, a data series fill pattern, and/or other format attributes. Chart format data may also include text format data in respect of chart labels or other text.

Position, size, and rotation data as described above.

In the present example, a group element is used to group other elements together and may include (or be associated with):

Content data which, for a group element, is a set of one or more design element records each of which defines a member element of the group.

Position, size, and rotation data as described above. In the present embodiments, the position of an element that is a member of a group is treated as being relative to the position/size/rotation of the member element's parent element. To illustrate this, consider a group element (G1) that has a position of (10,10) and includes a member element (M1) that also has a position of (10,10). In this case, the final position of element M1 on a page will be (20,20) (i.e. element M1's position of (10,10) is a position within group element G1 and relative to the position of element G1). If the group element G1 was then moved to position (30, 40), the new position of member element M1 would be (40,50) (again, relative to the parent element's position).

Element groups may be handled in different ways. For example, each design element record may include a group identifier attribute that includes a value that indicates a particular element group that the element belongs to (if any). In this case, of one element of a particular group is resized or repositioned, any other elements that belong to that same group are also resized/repositioned to maintain their relative size/position in the group.

Additional and/or alternative element types to those described above may be provided. Further, a given element type may include attributes defining additional or alterative features of the element.

As can be seen from the above example, each element of a deck is associated with a particular page of the deck and includes at least position data that determines where on a deck page (in two-dimensional space) the element—and, therefore, the content associated with the element—is to be positioned. Moreover, with the exception of elements that are part of an element group (and are therefore associated with a parent element), an element's two-dimensional (e.g. x,y) position on its page is independent to any other element's that are added to that page (or the deck in general). That is, an element's two-dimensional position is not changed by adding additional elements to, or removing other elements from, the deck. If a new element is added on top of or underneath an existing element this may (depending on opacity settings) change the appearance of or occlude the existing element, however this does not change the page on which existing element appears or the existing element's position on that page.

Example Document-Format Design

In order to illustrate document-format designs (documents), an example document-format will be described. Alternative document-formats are, however, possible.

In the present example, a document is defined by a document record. A document record includes an ordered sequence (such as an array or other ordered set) of content data. In the present example, this will be referred to as an ordered sequence of document element records (or elements). While document element records are in some respects similar to design element records they are not the same. To avoid potential confusion, document element records may be referred to as item records (or items for short) (and document elements as defined by those records may be referred to as items). E.g.:

docContent: [{item record 1}, {item record 2}, . . . {item record n}]

Generally speaking, an item defines content that has been added to a document. Different item types may be provided for different types of content that are able to be added to a document. The types of items available will depend on the system in question and the types of content that are permitted in a document. In the present embodiments, and by way of example, text, shape, table, and chart item types are provided.

[In the present example, a text item is used to display text content. A text item (which may be referred to as a text block) generally defines a vertically delineated block of text (e.g. a paragraph, a list item, or an alternatively delimitated block of text). A text item may include (or be associated with):

- Text data. This may be similar to (or the same as) text element text format data as described above.
- Text format data. This may be similar to (or the same as) text element text format data as described above.

A text item may also include (or be associated with) text hierarchy level data that defines a hierarchy level (or levels) for the text characters. Text hierarchy levels are described further below.

In the present example, a shape item is used to display a fill and may include (or be associated with):

- Content data. This may be similar to (or the same as) shape element content data as described above. In the present embodiments a shape item is limited to defining a single fill. In other embodiments, a shape item may define multiple fills (though other modifications to the processing described below may be necessary to allow for this).
- Path data. This may be similar to (or the same as) shape element path data as described above.
- Fill role data. This may be similar to (or the same as) shape element fill role data as described above.

In the present example, a table item is used to display a table and may include (or be associated with):

- Table data. This may be similar to (or the same as) table element table data as described above.
- Cell data. This may be similar to (or the same as) table element cell data as described above.

In the present example, a chart item is used to display a chart and may include (or be associated with):

- Chart data. This may be similar to (or the same as) chart element chart data as described above.
- Chart type data. This may be similar to (or the same as) chart element chart type data as described above.
- Chart format data. This may be similar to (or the same as) chart element chart format as described above.

In the present example, a group item is used to group other items together and may include (or be associated with):

- A set of one or more additional item records that define the items of the group.

In a document-format design, non-text items (e.g. shape, table, chart, and group type items in the present example) may be referred to as block items. Text items may also be referred to as block items if they are split at block boundaries (e.g. if each text item defines a vertically delineated block of text as described above). In addition to the block item attributes described above, block items may also include one or more additional attributes such as:

| Item attribute | Note |
|---|---|
| flow | A value indicating content flow-e.g. block (default) or inline. Similar to the CSS display property. |
| width | A defined width at which the element is rendered. Similar to the CSS width property. |
| max_width | An upper bound on the computed width. Similar to the CSS max-width property. |
| min_width | A lower bound on the computed width. Similar to the CSS min-width property. |
| height | A defined height at which the element is rendered. Similar to the CSS height property. |
| max_height | An upper bound on the computed height. Similar to the CSS max-height property. |
| min_height | A lower bound on the computed height. Similar to the CSS min-height property. |
| margin | Values indicating margins. May take absolute values (e.g. {top, right, bottom, left}) or a value indicating margins should be automatically calculated to horizontally center the element. |

In the present examples, each item defined in a document's sequence of document element (or item) records is to be rendered in the same manner as a block-level element in an HTML rendering. Accordingly, and analogous to HTML block layout, an item inherits the width of its container unless it is explicitly overridden or bounded.

As can be seen, in a document the two-dimensional position of the content associated with a given item (and the page on which that content appears) depends on any preceding items (i.e. those that are before the particular item in the items array) and the particular item's attributes (e.g. flow, width height, and/or margin values). Moreover, the position of particular item's content—and/or the page on which the content appears—can vary depending on what other items are added to or removed from the document. Furthermore, in the present embodiments document items are not associated with explicit position data (e.g. (x,y) coordinates or other explicit two-dimensional position data) in the same way that deck elements are.

In addition to content data, a document record may include document metadata. Such metadata may, for example, be similar to or the same as the deck-level attributes of a deck as described above (and include attributes such as a document identifier, document creator, document creation date and the like).

Example Designs

In order to illustrate the deck and document-formats described above, FIG. 1 provides an example document 100 and an example deck 150.

Document 100 includes the following content:

- text 102 that includes the typographic characters "This is a title", bold, centred, Calibri 18 point font (which is assigned or determined to be text hierarchy level 1);

text 104 that includes the typographic characters "This is a subtitle", centred, Calibri 10 point font (which is assigned or determined to be text hierarchy level 2);

a table 106 with two columns and two rows, centred;

additional content 108 that is not shown (this may, for example, be line breaks or other content that causes the vertical space between content 106 and 110);

text 110 that includes the typographic characters "This is a another subtitle", left justified, Calibri 10 point font (which is assigned or determined to be text hierarchy level 2); image 112, centred.

A simplified items array that defines the content of document 100 may be as follows:

```
docContent: [{item record re text item 102}, {item record re text item 104}, {item record re table
item 106}, {item record re text item 108}, {item record re text item 110}, {item record re shape
item 112}]
```

Deck 150 includes the similar content to document 100 (as indicated by use of the same reference numerals) with the exception that it does not include additional content 108 and the content is positioned on two separate pages 152 and 154. A simplified pages array that defines the content of deck 150 may be as follows:

```
pages: [
        //page record for page 152
        {elements: [{design element record re table element 106}, {design element record re text
        element 102}, {design element record re text element 104},]},
        //page record for page 154
        {elements: [{design element record re shape element 112}, {design element record re
        text element 110}]}
]
```

Relevantly, each design element record will include explicit position data (e.g. an (x,y) coordinate pair) that defines the position of the element on the deck page in question.

Text Hierarchy Levels

Certain operations and methods described herein make use of text hierarchy levels.

A text hierarchy level provides a measure of the significance of text content. Continuing with the examples above, the text content of a deck includes characters defined by (or associated with) the text elements of that deck, while the text content of a document includes characters defined by (or associated with) text type items of that document.

Text hierarchy levels may be represented in various ways. In the present embodiments, a numeric hierarchy is used with lower values indicating text of greater significance. E.g. level 1 text may correspond to a title, level 2 text to a sub-title, etc.

Text hierarchy levels may be determined in various ways.

In some embodiments, text hierarchy levels may be explicitly defined for any text. For example, when a user is adding text to a deck or a document they may explicitly set or apply a hierarchy level to that text (and if no hierarchy level is set then a default hierarchy level may be assigned).

In alternative embodiments, text hierarchy levels may be automatically determined by processing a given document or deck. Generally speaking, this may involve extracting the text content from a document or deck and analysing the text to determine different text hierarchy levels based on certain format attributes and/or text position information.

A method for analysing text to determine a set of text hierarchy levels is described with reference to FIG. 33.

Example Design Platform

Figure 2:
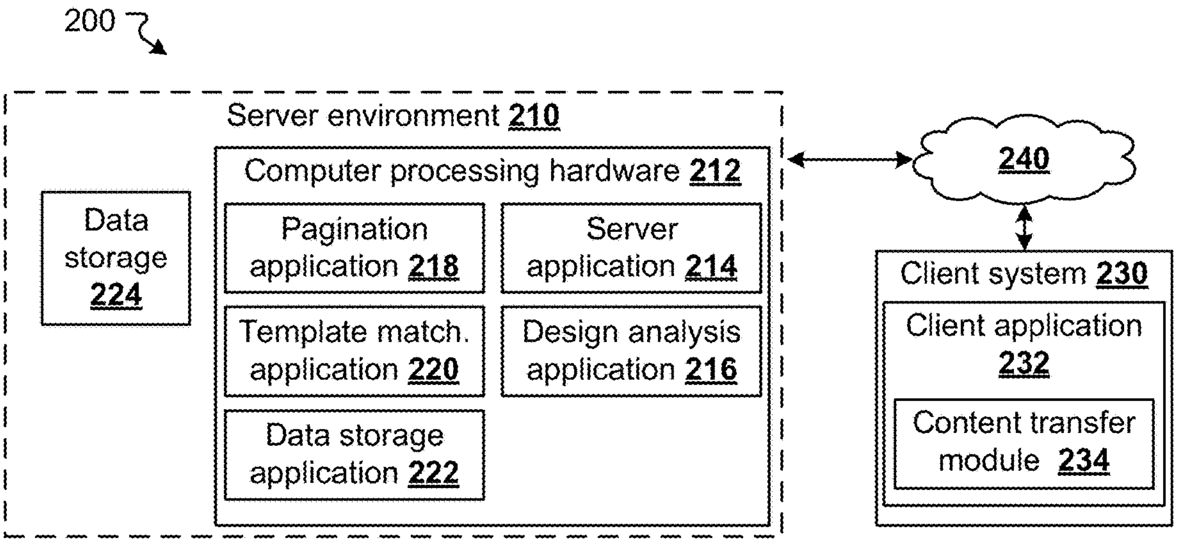
FIG. 2 is a block diagram of a networked environment in which embodiments of the present disclosure may be performed.

The features of the present disclosure are described in the context of a design platform. In the described embodiments, this platform includes server-side and client-side applications which operate to perform the various techniques described herein. One example of such a platform will be described with reference to networked environment 200 of FIG. 2.

Networked environment 200 includes a server environment 210 and a client system 230 which communicate via one or more communications networks 140 (e.g. the Internet).

Generally speaking, the server environment 210 includes computer processing hardware 212 (discussed below) on which applications that provide server-side functionality to client applications (such as client application 232 described below) execute. In the present example, server environment 210 includes a server application 214, a design analysis application 216, a pagination application 218, a template matching application 220, and a data storage application 222.

In the present embodiment, the server application 214 executes to provide a client application endpoint that is accessible over communications network 140. For example, where server application 214 serves web browser client applications the server application 214 will be a web server which receives and responds (for example) to HTTP requests. Where server application 214 serves native client applications, server application 214 will be an application server configured to receive, process, and respond to specifically defined API calls received from those client applications. The server environment 210 may include one or more web server applications and/or one or more application server applications allowing it to interact with both web and native client applications.

In the present example, server application 214 (and or other applications of server environment 210) facilitate various functions related to creating and editing documents and designs. This may include, for example, document and design creation, editing, storage, searching, retrieval, publication, and viewing. The server application 214 (and/or other applications) may also facilitate additional functions that are typical of server systems—for example user account creation and management, user authentication, and/or other server side functions.

The functions performed by the design analysis application 216, pagination application 218, and template matching application 220 are described in detail below.

In the present example, the data storage application 222 operates to receive and process requests to persistently store and to retrieve data that is relevant to the operations performed and/or services provided by the server environment 210. Such requests may be received from the server application 214, other server environment applications, and/or (in some instances) directly from client applications such as 232. Data relevant to the operations performed/services provided by the server environment 210 may include, for example, user account data, user document and design data (e.g. document and deck records defining documents and designs that have been created by users), template design data (e.g. deck records defining template designs), media data (e.g. data in respect of stock media such as pictures and videos that users may add to designs), and/or other data relevant to the operation of the server environment 210.

The data storage application 222 may, for example, be a relational database management application or an alternative application for storing and retrieving data from data storage 224. Data storage 224 may be any appropriate data storage device (or set of devices), for example one or more non transitory computer readable storage devices such as hard disks, solid state drives, tape drives, or alternative computer readable storage devices.

In server environment 210, server application 214 persistently stores data to data storage device 224 via the data storage application 222. In alternative implementations, however, the server application 214 may be configured to directly interact with data storage devices such as 224 to store and retrieve data (in which case a separate data storage application may not be needed). Furthermore, while a single data storage application 222 is described, server environment 210 may include multiple data storage applications. For example one data storage application 222 may be used for user account data, another for user document and design data, another for design template data and so forth. In this case, each data storage application may interface with one or more shared data storage devices and/or one or more dedicated data storage devices, and each data storage application may receive/respond to requests from various server-side and/or client-side applications (including, for example server application 214).

As noted, the server environment 210 applications run on (or are executed by) computer processing hardware 212. Computer processing hardware 212 includes one or more computer processing systems. The precise number and nature of those systems will depend on the architecture of the server environment 210.

For example, in one implementation each server environment application may run on its own dedicated computer processing system. In another implementation, two or more server environment applications may run on a common/shared computer processing system. In a further implementation, server environment 210 is a scalable environment in which application instances (and the computer processing hardware 212—i.e. the specific computer processing systems required to run those instances) are commissioned and decommissioned according to demand—e.g. in a public or private cloud-type system. In this case, server environment 210 may simultaneously run multiple instances of each application (on one or multiple computer processing systems) as required by client demand. Where server environment 210 is a scalable system it will include additional applications to those illustrated and described. As one example, the server environment 210 may include a load balancing application which operates to determine demand, direct client traffic to the appropriate server application instance 214 (where multiple server applications 214 have been commissioned), trigger the commissioning of additional server environment applications (and/or computer processing systems to run those applications) if required to meet the current demand, and/or trigger the decommissioning of server environment applications (and computer processing systems) if they are not functioning correctly and/or are not required for current demand.

Communication between the applications and computer processing systems of the server environment 210 may be by any appropriate means, for example direct communication or networked communication over one or more local area networks, wide area networks, and/or public networks (with a secure logical overlay, such as a VPN, if required).

Client system 230 hosts a client application 232 which, when executed by the client system 230, configures the client system 232 to provide client-side functionality/interact with server environment 210 (or, more specifically, the server application 214 and/or other applications provided by the server environment 210). Via the client application 232, and as discussed in detail below, a user can access the various techniques described herein. Client application 232 may also provide a user with access to additional design and document related operations, such as creating, editing, saving, publishing, sharing, and/or other design and document related operations.

Via the client application 232, a user can perform various operations such as creating, editing, saving, retrieving/accessing, publishing, and sharing documents and designs. Such operations may be performed solely by client application 232, or may involve the client application 232 communicating with the server environment 210 for processing to be performed there (e.g. by the server application 214).

The client application 232 may be a general web browser application which accesses the server application 214 via an appropriate uniform resource locator (URL) and communicates with the server application 214 via general world-wide-web protocols (e.g. http, https, ftp). Alternatively, the client application 232 may be a native application programmed to communicate with server application 214 using defined application programming interface (API) calls and responses.

A given client system such as 230 may have more than one client application 232 installed and executing thereon. For example, a client system 230 may have a (or multiple) general web browser application(s) and a native client application.

In the present embodiments, client application 232 includes a content transfer module 234, the operations of which will be described further below. The content transfer module may, for example, be a native part of the client application 232 or an add-on/plug-in/extension to client application 232. In alternative embodiments, the functionality performed by the content transfer module 234 may be performed by a separate application (running either on client system 230 or at the server environment 210).

In the environment of FIG. 1, and the embodiments described below, various processing is described as being performed by different applications and modules thereof—e.g. the server application 214, the design analysis application 216, the pagination application 218, the template matching application 220, the data storage application 222, the client application 232, and the content transfer module 234. It will be appreciated, however, that in most cases the processing that is described could be performed by alternative applications or modules, and that such applications or modules may run either at a client system such as 230 or at a server environment such as 210. As one example, the techniques described herein may be provided as part of a stand-alone application in which case all processing and data storage may be performed by a single computer processing system (which is configured by one or more applications or modules).

As noted, the techniques and operations described herein are performed by one or more computer processing systems.

By way of example, client system 230 may be any computer processing system which is configured (or configurable) by hardware and/or software—e.g. client application 232—to offer client-side functionality. A client system 230 may be a desktop computer, laptop computer, tablet computing device, mobile/smart phone, or other appropriate computer processing system.

Similarly, the applications of server environment 210 are also executed by one or more computer processing systems. Server environment computer processing systems will typically be server systems, though again may be any appropriate computer processing systems.

Figure 3:
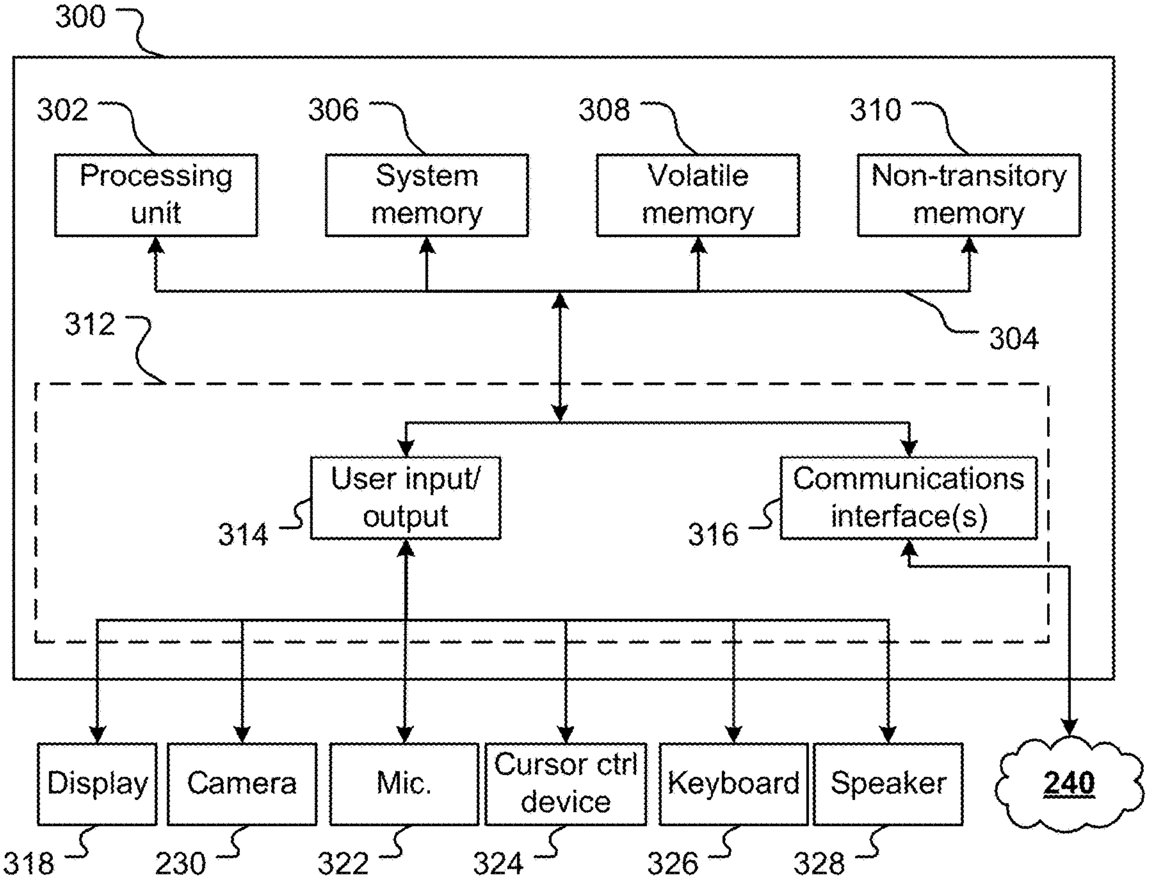
FIG. 3 is a block diagram of a computer processing system.

FIG. 3 provides a block diagram of a computer processing system 300 configurable to implement embodiments and/or features described herein. System 300 is a general purpose computer processing system. It will be appreciated that FIG. 3 does not illustrate all functional or physical components of a computer processing system. For example, no power supply or power supply interface has been depicted, however system 300 will either carry a power supply or be configured for connection to a power supply (or both). It will also be appreciated that the particular type of computer processing system will determine the appropriate hardware and architecture, and alternative computer processing systems suitable for implementing features of the present disclosure may have additional, alternative, or fewer components than those depicted.

Computer processing system 300 includes at least one processing unit 302. The processing unit 302 may be a single computer processing device (e.g. a central processing unit, graphics processing unit, or other computational device), or may include a plurality of computer processing devices. In some instances, where a computer processing system 300 is described as performing an operation or function all processing required to perform that operation or function will be performed by processing unit 302. In other instances, processing required to perform that operation or function may also be performed by remote processing devices accessible to and useable (either in a shared or dedicated manner) by system 300.

Through a communications bus 304 the processing unit 302 is in data communication with a one or more machine readable storage (memory) devices which store computer readable instructions and/or data which are executed by the processing unit 302 to control operation of the processing system 300. In this example system 300 includes a system memory 306 (e.g. a BIOS), volatile memory 308 (e.g. random access memory such as one or more DRAM modules), and non-transitory memory 310 (e.g. one or more hard disk or solid state drives).

System 300 also includes one or more interfaces, indicated generally by 312, via which system 300 interfaces with various devices and/or networks. Generally speaking, other devices may be integral with system 300, or may be separate. Where a device is separate from system 300, connection between the device and system 300 may be via wired or wireless hardware and communication protocols, and may be a direct or an indirect (e.g. networked) connection.

Generally speaking, and depending on the particular system in question, devices to which system 300 connects-whether by wired or wireless means-include one or more input devices to allow data to be input into/received by system 300 and one or more output device to allow data to be output by system 300. Example devices are described below, however it will be appreciated that not all computer processing systems will include all mentioned devices, and that additional and alternative devices to those mentioned may well be used.

For example, system 300 may include or connect to one or more input devices by which information/data is input into (received by) system 300. Such input devices may include keyboard, mouse, trackpad, microphone, accelerometer, proximity sensor, GPS, and/or other input devices. System 300 may also include or connect to one or more output devices controlled by system 300 to output information. Such output devices may include devices such as a display (e.g. a LCD, LED, touch screen, or other display device), speaker, vibration module, LEDs/other lights, and/or other output devices. System 300 may also include or connect to devices which may act as both input and output devices, for example memory devices (hard drives, solid state drives, disk drives, and/or other memory devices) which system 300 can read data from and/or write data to, and touch screen displays which can both display (output) data and receive touch signals (input).

By way of example, where system 300 is a client system such as 230 it may include a display 318 (which may be a touch screen display), a camera device 320, a microphone device 322 (which may be integrated with the camera device), a cursor control device 324 (e.g. a mouse, trackpad, or other cursor control device), a keyboard 326, and a speaker device 328.

System 300 also includes one or more communications interfaces 316 for communication with a network, such as network 140 of environment 200 (and/or a local network within the server environment 210). Via the communications interface(s) 316, system 300 can communicate data to and receive data from networked systems and/or devices.

System 300 may be any suitable computer processing system, for example, a server computer system, a desktop computer, a laptop computer, a netbook computer, a tablet computing device, a mobile/smart phone, a personal digital assistant, or an alternative computer processing system.

System 300 stores or has access to computer applications (also referred to as software or programs)—i.e. computer readable instructions and data which, when executed by the processing unit 302, configure system 300 to receive, process, and output data. Instructions and data can be stored on non-transitory machine readable medium such as 310 accessible to system 300. Instructions and data may be transmitted to/received by system 300 via a data signal in a transmission channel enabled (for example) by a wired or wireless network connection over an interface such as communications interface 316.

Typically, one application accessible to system 300 will be an operating system application. In addition, system 300 will store or have access to applications which, when executed by the processing unit 302, configure system 300 to perform various computer-implemented processing operations described herein. For example, and referring to the networked environment of FIG. 2 above, server environment 210 includes one or more systems which run a server application 214, a design analysis application 216, a pagination application 218, a template matching application 220, and a data storage application 222. Similarly, client system 230 runs a client application 232.

Example Design User Interfaces

In the present disclosure, client application 232 configures the client system 230 to provide user interface (UI). Generally speaking, the UI allows a user to create, edit, and output designs. The UI also allows a user to access and cause other functionality described herein to be performed.

Figure 4:
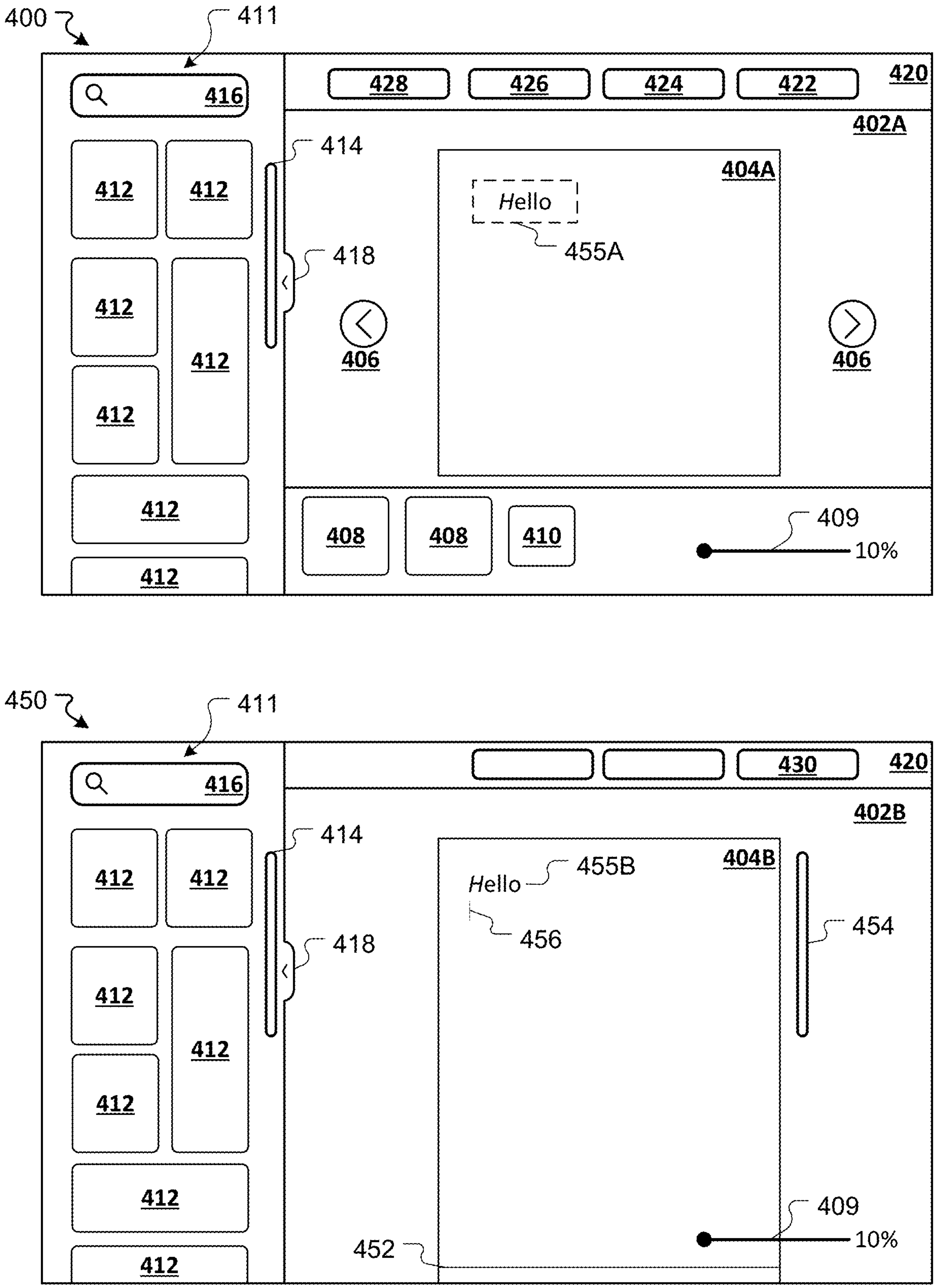
FIG. 4 depicts example graphical user interfaces.

To illustrate the types of features that client application 232 may provide, FIG. 4 provides two example user interfaces: UI 400 and UI 450. UI 400 and 450 are similar, however UI 400 provides an example UI for creating/viewing a deck-format design while UI 450 provides an example UI for creating/viewing a document-format design.

UI 400 includes a preview area 402A which is used to display a page 404A of the deck being edited/viewed. Page 404A includes a text element 455A with the text "Hello". A bounding box of text element 455A is also displayed. An element's bounding box may be temporarily displayed on selection of the element. In this example, UI 400 further includes: next and previous page controls 406 (which, where next/previous pages exist, can be used to display a next or previous page); page previews 408 (which, where multiple pages exist, provide previews of those pages); an add page control 410 (which can be activated by a user to cause a new page to be added to the deck).

UI 450 includes a preview area 402B which is used to display a document 404B (or part thereof). Document 404B includes a text item 455B with the text "Hello/n". A bounding box of the text element is also displayed (which may be displayed on the text element 455A being selected). In this example, a horizontal line 452 is displayed on the preview 404B to indicate a page break and a scroll control 454 is provided to allow a user to scroll through the document. In addition a cursor 456 is displayed which indicates a current position in the document.

UI 400 and UI 450 of the present examples both include a zoom control 409 which a user can interact with to zoom into/out of the design currently displayed on the canvas 404.

UI 400 and UI 450 of the present examples also include an asset preview area 411. Asset preview area 411 displays previews 412 of assets that are available to users to assist in creating a design. Asset preview area 411 also includes a search control 416 via which a user can submit search data (e.g. a string of characters) to search for particular assets. Previews 412 of the search results returned are then displayed in the asset preview area 411. In this example, a hide preview area control 418 is provided which can be activated to hide the asset preview area 411 (serving to enlarge the design preview area 402).

Depending on implementation, the previews 412 displayed in asset preview area 411 (and the assets corresponding to those previews) may be accessed from various locations. For example, the search functionality invoked by search control 416 may cause client application 142 to search for assets that are stored in locally accessible memory of the system 230 on which client application 232 executes (e.g. non-transitory memory such as 310 or other locally accessible memory), assets that are stored at a remote server (and accessed via a server application running thereon), and/or assets stored on other locally or remotely accessible devices.

Different types of assets may be made available, for example media items, design templates, design styles (e.g. defined sets of colours, font types, and/or other assets/asset parameters), and/or other assets that a user may use when creating a design or document. For example, a preview 412 may be of a media item (e.g. a raster graphic, a vector graphic, a video, or an alternative element) and a user may add that media item to the design being edited by dragging and dropping the preview 412 onto the page 404.

Where a user adds content to a deck page 404A by dragging an asset preview 412 and dropping it on the page, application 232 will create a new element for the content and add that element to the relevant page array (e.g. by appending it to the array). In this case application 232 may determine the position of the design element based on the actual drop point and generate position data to capture this (e.g. an (x,y) coordinate pair corresponding to—or based on—the drop point).

Where a user adds content to a document page 404B by dragging an asset preview 412 and dropping it on the page 404B, application 232 will create a new item for the content and add that item to the document's content array. In certain implementations, application 232 will be configured to automatically add the dropped item at the location of the cursor 456. For example, if the cursor was positioned at the end of the existing document content (as depicted in UI 450), application 232 would add the new item to the end of the document's content array. Alternatively, if the cursor was positioned before the 'H' character in UI 450, application 232 would insert the new item into the document's content array before the item defining the characters "Hello/n". Inserting the new item may then cause the "Hello/n" characters to move—e.g. down the page.

Content may be added to a design in other ways. In this example, the preview area 411 displays a scroll control 414 allowing a user to scroll through previews 412. Scroll control 414 may be hidden when user focus is not in the preview area 411.

GUI 400 also includes an additional controls area 420 which, in this example, is used to display additional controls. The additional controls 420 may include permanent controls (e.g. controls such as save, download, print, share, publish, and/or other controls that are frequently used/widely applicable and that client application 232 is configured to permanently display); user configurable controls (which a user can select to add to or remove from area 420), and/or adaptive controls (which may automatically change depending, for example, on the type of content that is currently selected/being interacted with by a user). For example, if text content is currently selected, adaptive controls such as font style, type, size, position/justification, and/or other font related controls may be displayed. Alternatively, if vector graphic content is selected, adaptive controls such as fill attributes, line attributes, transparency, and/or other vector graphic related controls may be displayed.

In the present example, UI 400 includes a generate deck from deck control 422, a select fills control 424, a transfer table control 426, and a transfer chart control 427. In the present example, UI 450 includes a generate deck from document control 430. The operation of these controls will be described further below.

Once a design has been created, application 104 may provide various options for outputting that design. For example, application 104 may provide a user with one or more options such as: saving the design to local memory of client system 230 (e.g. non-transitory memory 310); saving the design to data store 224 of server environment 210; printing the design to a printer (local or networked); communicating the design to another user (e.g. by email, instant message, or other electronic communication channel); publishing the design to a social media platform or other service (e.g. by sending the design data to a third party server system using appropriate API commands to publish the design); and/or by other output means.

It will be appreciated that UI 400 and UI 450 are provided by way of example only. Alternative user interfaces, with alternative layouts and/or that provide alternative tools and functions, are possible. Furthermore, while different example user interfaces have been depicted and shown for viewing/editing a deck or a document, this need not be the case and the same user interface may be used.

Deck-Format Design Templates

Certain embodiments described herein make use of a set of deck-format destination designs. In the present disclosure, such destination designs are referred to as template designs (or templates for short). In the present embodiment, each template in the set of design templates is a deck-format design. Templates may, for example, be stored at (and accessed from) at data storage 224 (and accessed via data storage application 222).

Each template is a deck that includes one or more pages. Any existing deck may be used as a template. Typically, however, a deck will be selected as a template (by a human or automatic selection process) based on various criteria—e.g. the aesthetics of the deck, its format consistency, and/or other criteria.

As described in detail below, certain embodiments of the present disclosure involve identifying a template that matches a source design and then generating a new deck based on the source design and the template.

In order to facilitate these embodiments, a set of templates is identified and each template is analysed to generate corresponding analysis data. Generally speaking, the analysis data in respect of a template provides information in respect of the content that the template can accommodate.

Templates for inclusion in the set of templates may be identified in various ways. For example, human users may review existing decks and flag/nominate specific decks for inclusion. Alternatively, users may specifically create new decks that are designed to be used as templates. Alternatively, templates may be identified by one or more automatic processes. For example, an application may be configured to monitor the usage of decks that and if the number of times a particular deck is used exceeds a threshold value the application may automatically flag that deck as a template (or, alternatively, flag that deck as a potential template for review by a human user).

Once a deck has been identified as a template it is processed to generate corresponding analysis data, e.g. in accordance with method 500 as described below.

Method 500 may be performed in respect of a template at any appropriate time in order to establish (or add to) a set of templates for use in a deck generation process. By way of example, method 500 may be triggered based on explicit user input (e.g. a user that selects an existing deck and initiates analysis of that deck). Additionally, or alternatively, method 500 may be automatically triggered based on the occurrence of a defined trigger condition. Such conditions may include, for example: detecting that one or more decks has been flagged (by a human user or application) as a template; detecting that one or more existing templates has been modified; and/or detecting the occurrence other trigger conditions.

Deck-Format Design Analysis

Figure 5:
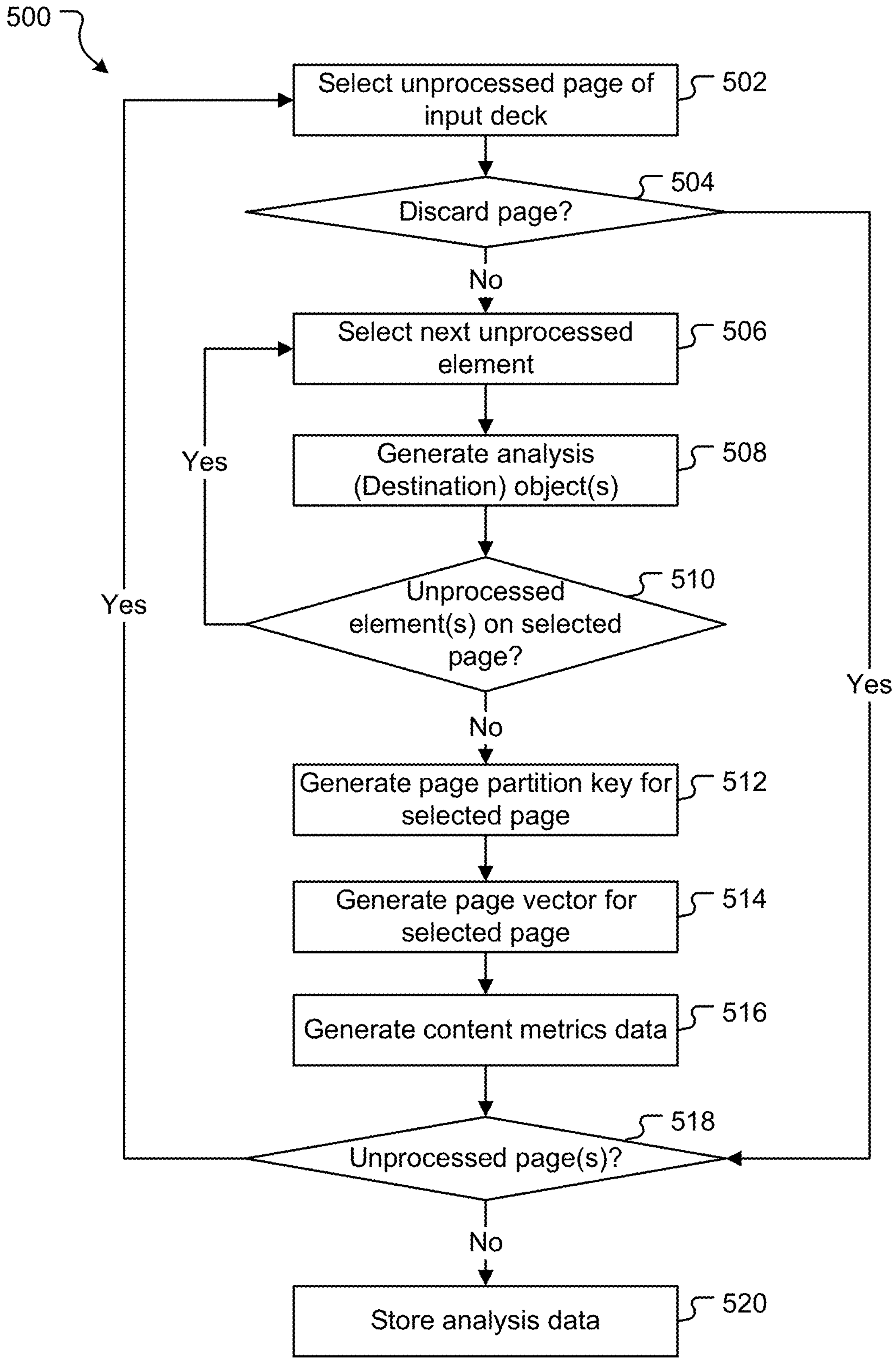
FIG. 5 is a flowchart depicting operations performed to generate analysis data corresponding to a deck-format design.

Referring to FIG. 5, a method 500 for processing a deck-format design to generate corresponding analysis data will be described.

Method 500 may be performed in respect of a destination deck-format design, such as a template design, that content is to be transferred to (for example in a document to deck generation method such as method 600 or a deck to deck generation method such as method 2800, both described below).

Method 500 may also be performed in respect of a source deck-format design that content is to be transferred from (for example in a deck to deck generation method such as method 2800 described below).

Method 500 describes processing a single deck to generate corresponding analysis data. If multiple decks are to be analysed, method 500 may be performed on each deck sequentially or in parallel.

In the present example, method 500 is described as being performed by design analysis application 216 (referred to as application 216 in this section for convenience). The processing described may, however, be performed by one or more alternative applications or modules.

Method 500 takes as input a deck-format design (or an identifier thereof) which will be referred to as the input deck. Generally speaking, the input deck will include one or more pages and each page will include one or more elements that define content positioned on that page. An example deck-format is described above.

Method 500 operates to process the elements of the input deck to generate deck analysis data. Where the input deck is a template (or destination) deck, the deck analysis data may be referred to as template analysis data. Where the input deck is a source deck, the deck analysis data may be referred to as source analysis data. The deck analysis data includes page analysis data for each page of the input deck.

In the present embodiments, and as described in detail below, the page analysis data for a particular page includes:

- A set of one or more analysis objects. Where method 500 is being performed to analyse a template (or destination) deck, the analysis objects will be referred to as destination objects. In this case, each analysis object (or destination object) generally defines a destination into which source content can be transferred. Where method 500 is being performed to analyse a source deck (e.g. a design that defines source content that is to be transferred from in a content transfer process), the analysis objects will be referred to as source objects. In this case, each analysis object (or source object) generally defines source content that is to be transferred. Each analysis object is associated with an element of the input deck (or with a deck page background) and provides information concerning that element.
- A page partition key that provides a first (and relatively general) measure of the types and amounts of content that the page can accommodate. Where the page partition key is generated in respect of a template (or destination) deck it may be referred to as a template page partition key.
- A page vector that provides a second (and more specific) measure of the types and amounts of content that the page can accommodate. Where the page vector is generated in respect of a template (or destination) deck it may be referred to as a template page vector.
- Page content metrics, which provide a third measure of the types and amounts of content that the page can accommodate. In the present embodiments page content metrics are generated only for destination decks (e.g. templates) and need not be generated for source decks.

At 502, application 216 selects an unprocessed page (e.g. a page record) of the input deck. Pages of the input design may be processed in any desired order (e.g. the order in which the pages appear in the input deck's pages array) or in parallel.

At 504, application 216 determines whether the selected page should be discarded or not. Application 216 is configured to determine that a page should be discarded if the page meets certain discard criteria. Various discard criteria may be set. By way of example, discard criteria may include one or more of: the page including greater than a threshold number of elements; the page including greater than a threshold number of elements of a particular type (e.g. greater than x shape elements); the page including a defined element type (or content type) (e.g. an element or content type that is not supported); the page including associated notes (e.g. comments not part of the page's actual content) to a designer; the page being flagged/associated with a value indicating the page should be discarded.

If application determines that the page should be discarded, processing proceeds to 518 without generating page analysis data for the page. In this case an error may be generated indicating that analysis data could not be generated for the page. Otherwise, processing proceeds to 506.

At 506, application 216 selects the next unprocessed element (e.g. design element record) of the page selected at 502. Elements of a page may be processed in any order (e.g. the order in which the element's appear in the selected page's elements array), or in parallel. If the page has a background (and this is not defined as an element of the page—e.g. it is defined as a page-level attribute), application 216 will initially select the page's background for processing (the background otherwise being treated as an element).

At 508, application 216 generates one or more analysis objects that correspond to the element selected at 502. In this context the term "object" refers to a set of data. This may, for example, be a set of key/value pairs or any other appropriate data structure or set of related data structures.

In some instances, a single element may define multiple separable content items. In this case, multiple analysis objects corresponding to that single element may be generated. As one example, a shape element may define a plurality of fills (e.g. in a grid or other arrangement). As noted above, in the present embodiment if a shape element defines a plurality of fills each separate fill is treated as a distinct shape element. Accordingly, if a shape element defines a plurality of fills an analysis object corresponding to each fill is generated.

As another example, if an element is a group element, application 216 may be configured to generate a separate analysis object corresponding to each member element of the group.

As another example, an in certain embodiments, where the input deck is a source deck application 216 may be configured to analyse each text element to determine whether the element's text content defines multiple separable text segments. If application 216 determines that a text element of a source deck does define multiple separable text segments, application 216 may generate an analysis object corresponding to each separable text segment. Application 216 may determine whether a text element defines multiple separable text segments in various ways, for example according to the processing described with reference to 808, 810, and 812 below (or similar processing).

Generating an analysis object corresponding to an element involves determining and recording values for one or more analysis object attributes. In the present embodiments, the analysis object attributes that are generated for a given analysis object depend on the type of the element that the analysis object corresponds to (and the type of content that element defines) and whether the input deck is a source deck (and, therefore, source objects are being generated) or a destination deck (and, therefore, destination objects are being generated).

In the present embodiments, analysis objects may be generated to include one or more of the analysis object attributes indicated in the following table (and described in detail thereafter).

| Destination object attribute | Source object attribute |
|---|---|
| Target identifier (destination identifier) | Target identifier (source identifier) |
| Content type | Content type |
| Receive-content | Transfer-content |
| Reading order | Reading order |
| Text hierarchy level | Text hierarchy level |
| Num. lines | Num. lines |
| Num chars | Num chars |
| Appropriate for fill roles | Fill role |
| Aspect ratio | Aspect ratio |

In the present embodiments, the target identifier attribute is generated for analysis objects corresponding to all element types.

The target identifier attribute is generated to identify the element of the input deck that the analysis object corresponds to and, if required, specific content of that element. The precise manner in which an element (and specific content thereof if required) is identified will depend on the deck data format that is used.

In the context of the deck data format described above, the target identifier attribute includes an element identifier that identifies a particular element that the analysis object corresponds to (e.g. by the index of the element in the relevant page's element array).

If a target object relates to a separable content item of a design element, the destination identifier attribute will also include data that identifies the specific separable content item of the element. For example, if a particular shape element defines a plurality of fills, the destination identifier may include an element identifier (identifying the particular shape element) and a fill identifier (e.g. a fill index or other identifier) that identifies the particular fill that the analysis object corresponds to. As another example, the target identifier for text content of a text element may in some cases include data that identifies the particular text of the element. This may, for example, include a start or first character identifier (e.g. a firstCharIndex indicating an index of the first character of the text) and a length value (e.g. character length value indicating the number of characters that the content includes).

If the element is a member of an element group, the target identifier may include a group member identifier that identifies the particular group member (e.g. the index of the element in the elements array of the parent group element).

If required, the target identifier may include a page identifier that identifies the specific page that the element belongs to (e.g. the index of the page in the input deck's pages array).

Where an analysis object is a destination object: the target identifier may be referred to as a destination identifier; the element identified may be referred to as a destination element; and any specific content identified may be referred to a destination content segment. Where an analysis object is a source object: the target identifier may be referred to as a source identifier; the element identified may be referred to as a source element; and any specific content identified may be referred to as a source content segment.

In the present embodiments, a content type attribute is generated for analysis objects corresponding to all element types.

A content type analysis object attribute is generated to identify the type of content that the analysis object corresponds to: that is, the type of content that is defined by the element that the analysis object corresponds to. In the present example, content types corresponding to the content types described above are provided—e.g. text content (for text elements), fill content (for shape elements), table content (for table elements), and chart content (for chart elements). More granular content types (or sub-content types) may be provided. For example, a shape element may be capable of accommodating different types of fills—e.g. a background fill type (indicating the content is a page background fill), a graphic fill type (indicating the fill is a vector graphic), an image fill type (indicating the fill is a raster graphic), a colour fill type (indicating the fill is a solid colour or a colour gradient), a video fill type (indicating the fill is a video), and/or other fill types. Other types may be provided depending on the content types supported by deck-format (and document-format) designs.

In the present embodiments, a receive-content or transfer-content attribute is generated for analysis objects corresponding to all content types.

If the input deck is a destination deck (e.g. a template), a receive-content attribute is generated to indicate whether or not the element that the analysis object corresponds to is an element that source content can be transferred into when a new deck is being generated. The receive-content attribute may be a Boolean (or other) variable. In the present embodiments, a receive content value of true indicates that the element can receive source content (and a value of false indicates the element cannot receive source content).

Application 216 may be configured to determine that a particular element of a destination deck is or is not to receive content based on various reception criteria.

By way of example, for a text element, application 216 may be configured to determine that a text element can receive content unless one or more of the following criteria are satisfied: the text of the element includes solely non-alphanumeric characters; the text of the element is a single character; the text of the element is a two-digit numeral. If application 216 determines that a text element satisfies any of these criteria it may determine that the text element is not to receive content and set a receive-content value indicating this (e.g. receiveContent=false).

As another example, application 216 may be configured to determine that a shape element can receive content if its fill is a media fill (e.g. a raster image or vector graphic rather than a colour or a colour gradient), a complete fill (with no transparencies, as discussed above), and either of the following is satisfied: its fill detected to contain a person (e.g. by an object detection algorithm such as YOLOv3 model or an alternative model/process); or its fill is not a page background and it has 6 or more colours in an 8-bit colour space. If a fill of a shape element does not satisfy these criteria application 216 may be configured to determine that the fill element cannot receive content.

As yet a further example, in certain embodiments, application 216 may be configured to determine that any analysis object in respect of a fill that is a partial fill cannot receive content. (In other embodiments, however, further logic may be applied to determine whether an analysis object corresponding to a partial fill can receive content or not.)

Application 216 may be configured to determine that all chart elements and all table elements can receive content and set receive-content values for analysis objects corresponding to such elements accordingly (e.g. receiveContent=true).

Other criteria for determining whether an element is to receive content may be applied.

If the input deck is a source deck, a transfer-content attribute is generated to indicate whether or not the source content of the element that the analysis object corresponds to is source content that is to be transferred when a new deck is being generated. The transfer-content attribute may be a Boolean (or other) variable. In the present embodiments, a transfer content value of true indicates that the content defined by the element is to be transferred (and a value of false indicates the content is not to be transferred).

Application 216 may be configured to determine that a particular element of a source deck defies source content that is to be transferred based on various transfer criteria. Alternatively, application 216 may be configured to determine that all source content defined by shape, text, chart, and table elements is to be transferred.

By way of example, application 216 may be configured to determine that text content of a text element is to be transferred unless it includes solely non-alphanumeric characters.

As another example, application 216 may be configured to determine that a fill defined by a shape element is to be transferred unless it (or the shape element) exceeds a defined aspect ratio. The defined aspect ratio may be set to try and capture fills that are relatively wide, which may indicate that the fill is being used as a separator. For example, if application 216 determines that a fill has an aspect ratio of greater than 10 (i.e. >10:1) it may determine that the fill is not to be transferred and set a transfer-content value indicating this (e.g. transferContent=false). By way of further example, application 216 may be configured to determine that all charts and all tables are to be transferred and set transfer-content values for source objects corresponding to such content accordingly (e.g. transferContent=true).

In alternative implementations, a receive-content or transfer-content attribute need not be used. For example, application 216 may be configured to determine that all elements of a destination deck are able to receive content and all elements of a source deck define source content that is to be transferred. As an alternative example, application 216 may be configured so that an analysis object is not generated for any destination deck element that is determined not to be able to receive content or any source deck element that is determined not to have source content that is to be transferred.

In the present embodiments, a reading order analysis object attribute is generated for all analysis objects that have a receive-content or transfer-content attribute value of true.

A reading order attribute is generated to identify a position of the element that the analysis object corresponds to in the deck page's reading order. In the present context, the reading order of a deck page's elements indicates an order in which elements would be read by a viewer of the design. For example, a reading order consistent with written English language may be left-to-right, top-to-bottom. Accordingly, a reading order of '1' may indicate the element is likely to be the first element of the deck page that would be read, and a reading order value of '5' may indicate the element is likely to be the $5^{th}$ element read.

In certain embodiments, an element's reading order is associated with the element (e.g. stored as an attribute of the element).

In other embodiments application 216 may be configured to analyse (or to cause another application to analyse) the page in question to determine the reading order of its elements. Such analysis may be performed in accordance with any appropriate method or algorithm. For example, application 216 (or an alternative application) may determine reading order in accordance with: an approach such as that described in Australian patent application 2022271398, filed on 15 Nov. 2022, titled "Systems and methods for generating webpage data for rendering a design" (or a similar approach); the approach described in the paper "Optimized XY-Cut for Determining a Page Reading Order" by Jean-Luc Meunier, Xerox Research Centre Europe, 6, chemin de Maupertuis F-38240 Meylan (January 2005) (or a similar approach); an alternative approach.

In the present embodiments, a text hierarchy level analysis object attribute is only generated for analysis objects corresponding to text elements that have a receive-content or transfer-content attribute value of true.

A text hierarchy level analysis object attribute is generated to indicate the hierarchy level of text defined by the element that the analysis object corresponds to. Text hierarchy levels are discussed above. In some instances, text elements may already be associated with a text hierarchy level. If text hierarchy levels are not available, however, application 232 may be configured to analyse the text defined by the input deck (e.g. as defined by text elements of the input deck) to determine text hierarchy levels and associate each text element (or separable text segment thereof) with a text hierarchy level. This may, for example, be done in accordance with method 3300 described below, however alternative approaches to determining text hierarchy levels may be used.

In the present embodiments, a num lines analysis object attribute is only generated for analysis objects corresponding to text elements that have a receive-content or transfer-content attribute value of true.

A num lines analysis object attribute is generated to provide a measure of the vertical size of the element that the analysis object relates to. Vertical size may be calculated and indicated in various ways—e.g. as a number of pixels, a number of lines, or in an alternative manner.

In the present embodiment, the num lines analysis object is generated to indicate a number of lines of text defined by the text content of the element that the analysis object corresponds to. In the present embodiments, application 216 is configured to calculate the num lines attribute by calculating a number of explicitly defined lines, estimating a number of wrapped lines, and adding these two values together. Application 216 calculates the number of explicitly defined lines based on line, paragraph, or other breaks included in the text that indicate a new line. Application 216 estimates the number of wrapped lines based on the size of the text element (in particular the width for horizontally oriented text), the font properties (which determine the width and height of character glyphs when the text characters are rendered), and the number of characters in a given unbroken text section (that is, a section of text that is not explicitly broken by a manual line/paragraph/other break). Application 216 may be configured to calculate the num lines attribute (or cause another application to calculate the num lines attribute) in alternative ways.

In the present embodiments, a num chars analysis object attribute is only generated for analysis objects corresponding to text elements that have a receive-content or transfer-content attribute value of true.

A num chars analysis object attribute is generated to indicate the number of characters defined by the text content of the element that the analysis object corresponds to. In the present embodiments, application 216 calculates the number of characters to be the number of characters excluding any control characters (e.g. "\n" or other defined control characters) and excluding any leading or trailing whitespace.

In the present embodiments, an appropriate for fill roles or fill role analysis object attribute is only generated for analysis objects corresponding to shape elements that have a receive-content or transfer-content attribute value of true.

If the input deck is a destination deck (e.g. a template), an appropriate for fill roles analysis object attribute is generated for destination objects corresponding to complete fills only (noting that in the present embodiment destination objects in respect of partial fills are assigned a receive content attribute value of false). The appropriate for fill roles attribute is assigned a value that indicates whether the shape element the destination object corresponds to is appropriate for replacement by: source fill that is either a partial fill (with one or more transparencies) or a complete fill (with no transparencies); or a complete fill only. Generally speaking, application 216 may be configured to determine that a particular destination fill is not appropriate for replacement by a partial source fill if replacing the destination fill with such a source fill could expose other elements (or parts of other elements) that are behind the particular destination fill. In this case, the assumption is that the (and that were not intended to be exposed). Application 216 may determine the value of the appropriate for fill roles attribute for a fill-type destination object in various ways. An example method 3200 for determining the appropriate for fill roles attribute value for a destination fill that is a complete fill is described below.

If the input deck is a source deck, a fill role analysis object attribute is generated to indicate whether the shape element's fill is a complete fill (with no transparencies) or a partial fill (with one or more transparencies).

In the present embodiments, an aspect ratio analysis object attribute is not generated for analysis objects corresponding to text elements, but is generated for analysis objects corresponding to chart, fill, and table type elements that have a receive-content or transfer-content attribute value of true.

An aspect ratio analysis object attribute is generated to indicate the aspect ratio of the content defined by the element that the analysis object corresponds to. With the example design element record schema described above, application 216 may determine the aspect ratio attribute based on the size data of the design element record—e.g. element width divided by the element height.

To further illustrate template analysis objects, and by way of example only, an example analysis object corresponding to a page background of a destination deck' page (which, in this example has been defined a page-level attribute) is as follows:

```
{
  "destinationID": {
    "pageID": 0,          // indicating the first page of the template/destination deck
    "elementID": -1       // indicating a background that is defined by a page-level attribute
  },
  "type": "BACKGROUND_FILL",
```

-continued

```
"receiveContent": false,
"appropriateForFillRoles": "complete",
"aspectRatio": 1.7777777777777777
}
```

By way of further example, an example analysis object corresponding to a source deck shape type element is as follows:

```
{
  "sourceID": {
    "pageID": 0,        // indicating the first page of the source deck
    "elementID": 0,     // indicating the first element of the page's elements array
  },
  "type": " FILL",
  "transferContent": true,
  "readingOrderIndex": 8,
  "fillRole": "complete",
  "aspectRatio": 0.5666415662650801
  }
```

By way of further example, an analysis object corresponding to a source deck's text type element is as follows:

```
{
  "sourceID": {
    "pageID": 0,            // indicating the first page of the source deck
    "elementID": 2,         // indicating the second element of the page's elements array
    "firstCharIndex": 0,    // indicating the content starts at character index 0
    "charLength": 48        // indicating the content is 48 characters long
  },
  "type": "TEXT",
  "transferContent": true,
  "readingOrderIndex": 3,
  "textHierarchyLevel": 3,
  "numLines": 1.6454545454545455,
  "numChars": 46
}
```

At 510, application 216 determines whether the currently selected page defines any unprocessed elements. If so, processing proceeds to 506 to select the next unprocessed element. If all elements on the page have been processed, processing proceeds to 512.

At 512, application 216 generates a page partition key for the currently selected page. As noted above, the page partition key provides general information on the type and amount of content that the page includes or accommodates. In the present embodiments, where the deck being analysed is a destination deck (e.g. a template) the page partition key is used when determining whether a particular page is a potential match for a particular rewrite of a source content candidate page (as described below at 1408 of method 1400). Where the deck being analysed is a source deck, the page partition key is used when determining whether the page is a potential match for a particular destination deck page (e.g. a template deck page).

In the present embodiments, application 216 generates a page's partition key to include the following partition key values: text; fills; charts; and tables. The prefix PK may be used to indicate partition key.

The PK text value indicates the deck page's text element content. In the present embodiment, the PK text value is the number of text elements the deck page has. Alternatively, the PK text value may be the number of text-type analysis objects that have been generated for the page (which, in certain implementations, may be greater than the number of text elements).

The PK fills value generally indicates the deck page's fill content. In certain implementations, the PK fill value is a value indicating the number of fills of the deck page (e.g. the number of fill type analysis objects with a receiveContent or transferContent value of true). In alternative embodiments, the PK fills value may be a Boolean (or other) value that indicates whether the page includes at least one shape element that has a corresponding fill-type analysis object with a receiveContent or transferContent value of true.

The PK charts value generally indicates the deck page's chart content. In the present embodiment, the PK charts value is a count of the number of chart type elements in the deck page (or a count of the number of chart type analysis objects generated for the deck page).

The PK tables value generally indicates the deck page's table content. In the present embodiment, the PK tables value is a count of the number of table type elements in the deck page (or a count of the number of table type analysis objects generated for the deck page).

To illustrate the above, consider a destination deck page with: three text elements; three shape elements (with receiveContent values of true); one chart; and one table. A page partition key for such a page may be as follows:

```
{
  "PK_text": 3,
  "PK_fills": 3,        // or "PK_fills": "True" if a Boolean value is used
```

-continued

```
  "PK_charts": 1;
  "PK_tables": 1
}
```

A deck page partition key may be generated to include additional and/or alternative values that can be used to generally describe the content that can a page includes or can accommodate.

At 514, application 216 generates a page vector for the currently selected page. As described above, the page vector provides more specific information (when compared to the page partition key) on the type and amount of content that the page includes or can accommodate. In the present embodiments, page vectors are used when calculating (rewrite, template page) scores (as described below at 1416 of method 1400).

In the present embodiments, application 216 generates a page's page vector to generally describe the content of the deck page: that is, the source content that is to be transferred for a source design, or the content that the deck page can accommodate for a destination design (e.g. a template). In the present example, page vector values are generated to describe the following types of page content: characters; lines; fills; charts; and tables. Each of these is described below, with the prefix PV used to indicate page vector.

In the present example, where a page vector value is being generated for a destination deck (e.g. a template), only analysis objects that have a "receive content" attribute value of true are considered. Conversely, where a page vector value is being generated for a source deck, only source objects that have a "transfer content" attribute value of true are considered.

The PV characters and PV lines values provide information on the deck page's ability to accommodate text at a given hierarchy level (for a destination deck) or the text content at a given hierarchy level that is to be transferred (for a source deck).

The PV characters values include, for each text hierarchy level, a characters value that is based on the number of text characters at that hierarchy level. In the present embodiment, the PV characters attribute is a set (e.g. an array) of six values with: the value at array indices 0 to 4 being based on the number of characters (if any) at text hierarchy levels 1 to 5 respectively; and the value at array index 5 being based on the number of characters at text hierarchy level 6 (if any)+the number of characters with a text hierarchy level of greater than 6 (if any)+the number of characters with no text hierarchy level assigned (if any).

In the context of the analysis objects described above, the characters value for a particular text hierarchy level is set to zero if there are no characters associated with that hierarchy level. Otherwise, the chars value for a particular text hierarchy level may be calculated by:

- identifying the analysis objects that include a "text hierarchy level" attribute indicating the particular hierarchy level;
- for each analysis object identified, taking the base 10 log of the num chars attribute value;
- averaging the base 10 log values.

The PV lines values include, for each text hierarchy level, a lines value that is based on the estimated number of text lines at that hierarchy level (or, more generally, the estimated vertical capacity for text lines at that hierarchy level). In the present embodiment, the PV lines attribute is a set (e.g. an array) of six values with: the value at array indices 0 to 4 being based on the number of lines of text (if any) at text hierarchy levels 1 to 5 respectively; and the value at array index 5 being based on the number of lines of text at text hierarchy level 6 (if any)+the number of lines of text with a text hierarchy level of greater than 6 (if any)+the number of lines of text with no text hierarchy level assigned (if any).

In the context of the analysis objects described above, the lines value for a particular text hierarchy level may be calculated by:

- identifying the analysis objects that include a "text hierarchy level" analysis object attribute indicating the particular hierarchy level;
- calculating the average of the num lines attributes of the identified analysis objects.

The PV fills values provide information on the deck page's ability to accommodate fill content (for a destination deck) or the fill content that is to be transferred (for a source deck). In the present embodiment, and in the context of the analysis objects described above, the PV fills values include: a minimum fill aspect ratio value; a maximum fill aspect ratio value; a complete fills value; and a partial fills value.

Application 216 may calculate the minimum and maximum fill aspect ratio values by:

- identifying each fill type analysis object that has a receive-content attribute indicating the fill is a valid destination or a transfer-content attribute indicating that the fill is to be transferred;
- for each identified analysis object, calculating the base-2 log of the analysis object's aspect ratio attribute value; and
- recording the minimum and maximum base-2 logs that are calculated (or a default value of 0). Recording the minimum and maximum base-2 logs assists in accommodating the most extreme cases.

The PV complete fills value provides information on the page's "complete" fills. In the present embodiment, the complete fills value is the proportion fill-type analysis objects that have a fill role value indicating a "complete" fill (that is, the proportion of fills that do not have any transparent regions).

The PV partial fills value provides information on the page's "partial" fills. In the present embodiment, the partial fills value is the proportion fill-type analysis objects that have a fill role value indicating a "partial" fill (that is, the proportion of fills that include one or more transparent regions).

The PV tables values provide information on the deck page's ability to accommodate table content (for a destination deck) or the table content that is to be transferred (for a source deck). In the present embodiment, the PV tables values include a minimum table aspect ratio value and a maximum table aspect ratio value. Application 216 may calculate these values by:

- identifying each table type analysis object that has a receive-content attribute indicating the table is a valid destination or a transfer-content attribute indicating that the table is to be transferred;
- for each identified analysis object, calculating the base-2 log of the analysis object's aspect ratio attribute value;
- recording the minimum and maximum base-2 log calculated (or a default value of 0).

The PV charts values provide information on the deck page's ability to accommodate chart content (for a destination deck) or the chart content that is to be transferred (for a source deck). In the present embodiment, the PV charts values include a minimum chart aspect ratio value and a maximum chart aspect ratio value. Application 216 may calculate these values by:

identifying each chart type analysis objects that that has a receive-content attribute indicating the chart is a valid destination or a transfer-content attribute indicating that the chart is to be transferred;

for each identified analysis object, calculating the base-2 log of the analysis object's aspect ratio attribute value;

recording the minimum and maximum base-2 log calculated (or a default value of 0).

In this particular embodiment, therefore, a page vector includes the following elements:

[<L1 chars value>, <L2 chars value>, <L3 chars value>, <L4 chars value>, <L5 chars value>, <L6 chars value>, <L1 lines value>, <L2 lines value>, <L3 lines value>, <L4 lines value>, <L5 lines value>, <L6 lines value>, <min fill aspect ratio value>, <max fill aspect ratio value>, <partial fills value>, <complete fills value>, <min tables aspect ratio value>, <max tables aspect ratio value>, <min charts aspect ratio value>, <max charts aspect ratio value>1

At 516, application 216 generates page content metrics data for the page. In the present embodiments, content metrics data is only generated for destination decks (e.g. templates) and is used when generating pagination data for a source document (in particular, when computing a candidate page score at 904 of pagination method 900).

In the present embodiments, the content metrics data generated for a destination deck (e.g. template) page includes the following content metric values. The prefix CM may be used to indicate content metrics.

A CM characters value that is based on the number of characters on the template page. In the present embodiment, the CM characters value is the logarithm of the total number of characters defined by the template page's text type analysis objects. The characters value may alternatively be the actual number of characters (or an alternative value based thereon).

A CM lines value that is based on the number of lines of text on the template page. In the present embodiment, the CM lines attribute is the logarithm of the total number of lines defined the template page's text type analysis objects. The lines value may alternatively be the actual number of lines (or an alternative value based thereon) or another value that provides a measure of the vertical capacity that the template page has available for text content.

A CM fills value that is based on the number of fills on the template page. In the present embodiment, the CM fills value is the number of fill type analysis objects, however an alternative value based on that number may be used.

A CM tables value that is based on the number of tables on the template page. In the present embodiment, the CM tables value is the number of table type analysis objects, however an alternative value based on that number may be used.

A CM charts value that is based on the number of charts on the template page. In the present embodiment, the CM charts value is the number of chart type analysis objects, however an alternative value based on that number may be used.

In the present embodiment, only analysis objects that have a "receive-content" attribute that is true contribute to content metric values. In addition, while the content metric values are described as being based on a deck page's analysis objects they could instead be based on the actual elements of the deck page.

At 518, application 216 determines whether there are any unprocessed pages defined by the input deck. If so, processing proceeds to 502 to select the next unprocessed page. If not, processing proceeds to 520.

At 520, application 216 may store the analysis data that has been generated for the input deck. This will typically me more appropriate where method 500 has been used to analyse a destination deck (e.g. a template) (and, therefore, the analysis data will likely be reused). The analysis data may be stored in any appropriate way. For example, the analysis data may be stored as a single data object that is associated with the relevant deck record. Alternatively, each deck page's page analysis data (which includes the set of analysis objects generated at 508, the page partition key generated at 512, the page vector generated at 514, and the content metrics if generated at 516) may be stored (or otherwise associated) with that page's page record. In this case, and continuing the example deck schema described above, the page record format may be along the following lines:

```
{
 "background": { background fill},
 "elements": [{design element record 1}, . . . , { design element record n}],
 "analysisItems": [{analysisItem 1}, . . . , { analysisItem n}],
 "partitionKey": { . . . },
 "page Vector": { . . . },
 "contentMetrics": { . . . }
}
```

Deck-Format Fallback Pages

Certain embodiments described herein make use of deck-format fallback pages (referred to as fallback pages for short) or sets of destination objects that define deck-format fallback pages.

In the present embodiments, a fallback page is an existing deck-format page that has been flagged or identified as a fallback page. Fallback pages may be specifically created to be used as fallback pages, or may be pages of existing templates that are flagged as fallback pages.

Typically, fallback pages are relatively plainly styled deck-format pages that include varying content elements. Generally speaking, a collection of fallback pages that correspond to likely partition keys and number of fills in user inputs, but which will not be conspicuous when placed amidst pages of existing templates (or are plain enough to be restyled in accordance with various template styles) may be created or assembled.

To permit identification of fallback pages, a fallback page list (or other data structure) may be maintained. Such a list may, for example, include a plurality of (template identifier, page identifier) tuples, each tuple identifying a particular page of a particular template as a fallback page.

In the present embodiment, fallback pages are analysed in the same (or a similar) way as other template pages (e.g. as described with reference to FIG. 5 above). In the present embodiment, therefore, each fallback page has associated analysis data that includes a set of destination objects, a page partition key, and a page vector.

Generating a Deck-Format Design Based on a Document-Format Design

Figure 6:
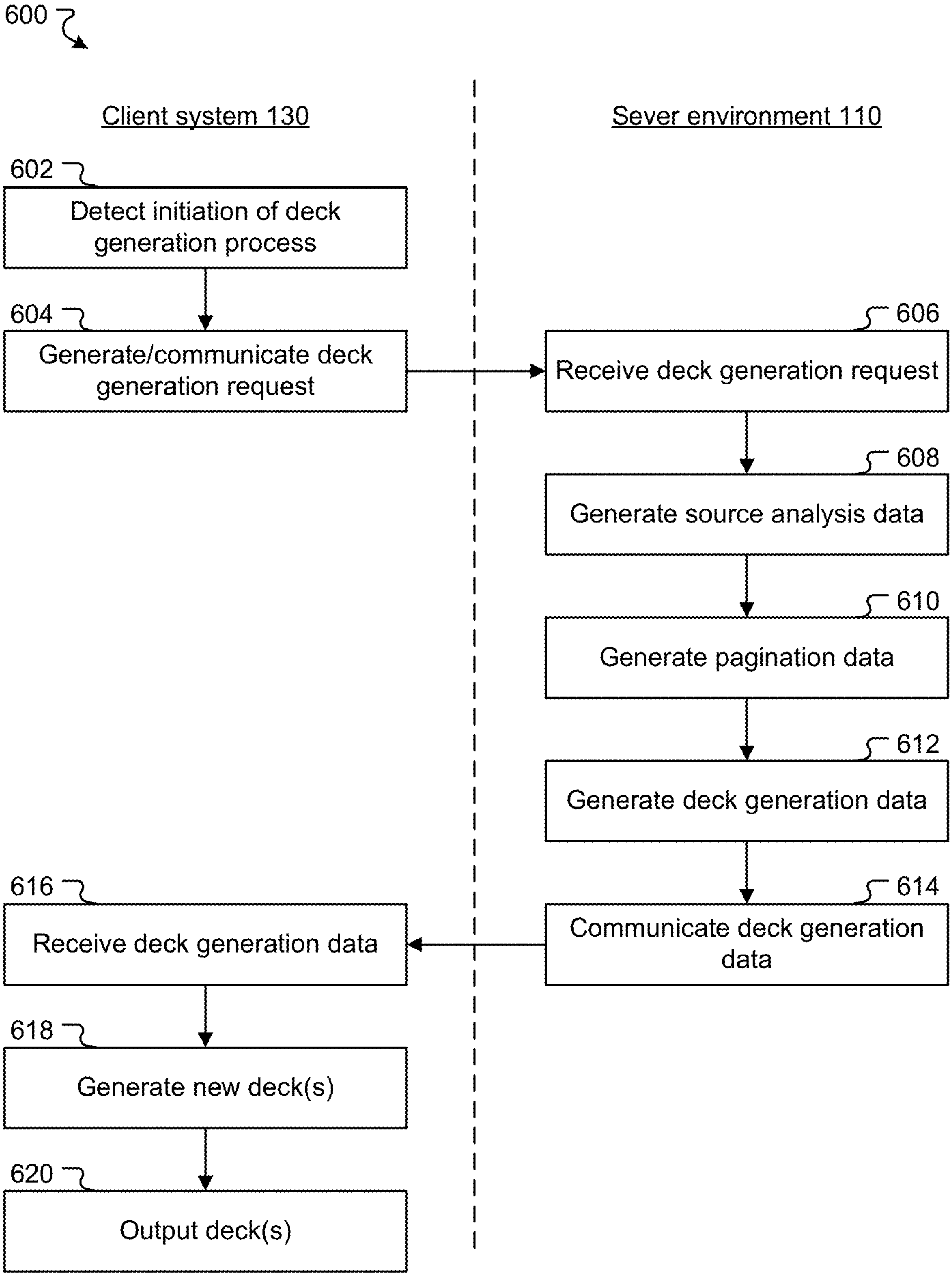
FIG. 6 is a flowchart depicting operations performed to generate a new deck-format design based on document-format source design.

Certain embodiments of the present disclosure are directed to generating a deck based on a source document. Referring to FIG. 6, a computer implemented method 600 for doing so will be described.

In FIG. 6, processing is generally indicated as being performed by (or at) either client system 230 or server environment 210. In this example, the server-side processing is described as being coordinated by server application 214 (which causes other server-side applications to perform various operations). In alternative embodiments, however, the operations of method 600 could be coordinated and/or performed by alternative applications, or could be performed by a single stand-alone application.

At 602, client application 232 detects initiation of a document to deck generation process. Initiation of the document to deck generation process is associated with a document (which will be referred to as the source document). The source document includes source content and may, for example, be defined by a document record as described above.

The document to deck generation process may be initiated in various ways.

By way of example, the document to deck generation process may be initiated on detecting user input received at client application 232. This may be user input activating a UI control such as control 430 described above. If the generate deck control 430 is activated while a document is currently open (and, for example, displayed in preview area 402) or otherwise selected, client application 232 may determine that the open document is the source document. Alternatively, on detecting activation of the generate deck control 430 client application 232 may display a search interface that allows a user to search and/or browse for, and then select, a source document.

At 604, in response to detecting initiation of the document to deck generation process, client application 232 generates a document to deck generation request and communicates this to the server environment 210 (in this example to server application 214). The document to deck generation request includes data allowing the source document to be identified—e.g. an identifier of the source document (which can be used to retrieve the source document's data) or by providing the document data itself (e.g. a document record as described above).

At 606, server application 214 receives the document to deck generation request.

At 608, source analysis data in respect of the source document is generated. Generally speaking, the source analysis data provides information in respect of the content of the source document that needs to be transferred to (or included in) any deck that is to be generated.

In the present embodiment, server application 214 passes the source document (or an identifier thereof) to the design analysis application 216 to generate the source analysis data. An example method for processing a document to generate source analysis data is described below with reference to FIG. 8. The source analysis data generated by this process includes a set of one or more analysis objects. Analysis objects in respect of a source design will be referred to as source objects as, generally speaking, they define source content that may be transferred to a destination page (e.g. a template page) in a content transfer process. Each source object corresponds to (or is associated with) source content defined by the source document and provides information concerning that source content.

At 610, pagination data in respect of the source document is generated.

In the present embodiments, server application 214 passes the source analysis data generated at 608 (or a reference thereto) to the pagination application 218 to generate the pagination data. An example method for processing source analysis data to generate pagination data is described below with reference to FIG. 9.

Generally speaking, the pagination data includes a set of one or more pagination candidates for the source document. Each pagination candidate includes a set of one or more candidate pages. Each candidate page is associated with a subset (one or more) of the source objects from the source analysis data (generated at 608) and, therefore, with the document content that the source object(s) correspond to. Accordingly, each candidate page may be considered to correspond to a page of source content. Each pagination candidate represents a complete pagination solution for the source document. That is, for a given pagination candidate each relevant source object in the source analysis data (and, therefore, all relevant source document content) is associated with at least one candidate page of that pagination candidate. Pagination data is described in detail below with reference to FIG. 9.

In the present embodiments, the pagination data that is generated defines a set number of pagination candidates.

At 612, deck generation data is generated. Generally speaking, the deck generation data includes data that can be used to generate a new deck based on relevant source content of the source document, a template, and in some cases one or more additional fallback or new deck pages.

In the present embodiments, server application 214 passes the pagination data generated at 610 (or a reference thereto) to the template matching application 220 to generate the deck generation data. An example method for processing pagination data to generate deck generation data is described below with reference to FIG. 14.

At 614, server application 214 communicates the deck generation data (generated at 612) to the client system 230 (in this example to client application 232).

At 616, client application 232 receives the deck generation data.

At 618, one or more new decks are generated. Each new deck that is generated is based on the deck generation data generated at 612 (or part thereof) and (in the present embodiments) the source analysis data (generated at 608) and the content of the source document itself.

In the present embodiments, a new deck is generated by the content transfer module 234. An example method for generating a new deck is described below with reference to FIG. 16.

At 620, client application 232 outputs at least one of the one or more decks generated at 618. Client application 232 may be configured to output a (or multiple) decks in various ways.

Figure 7:
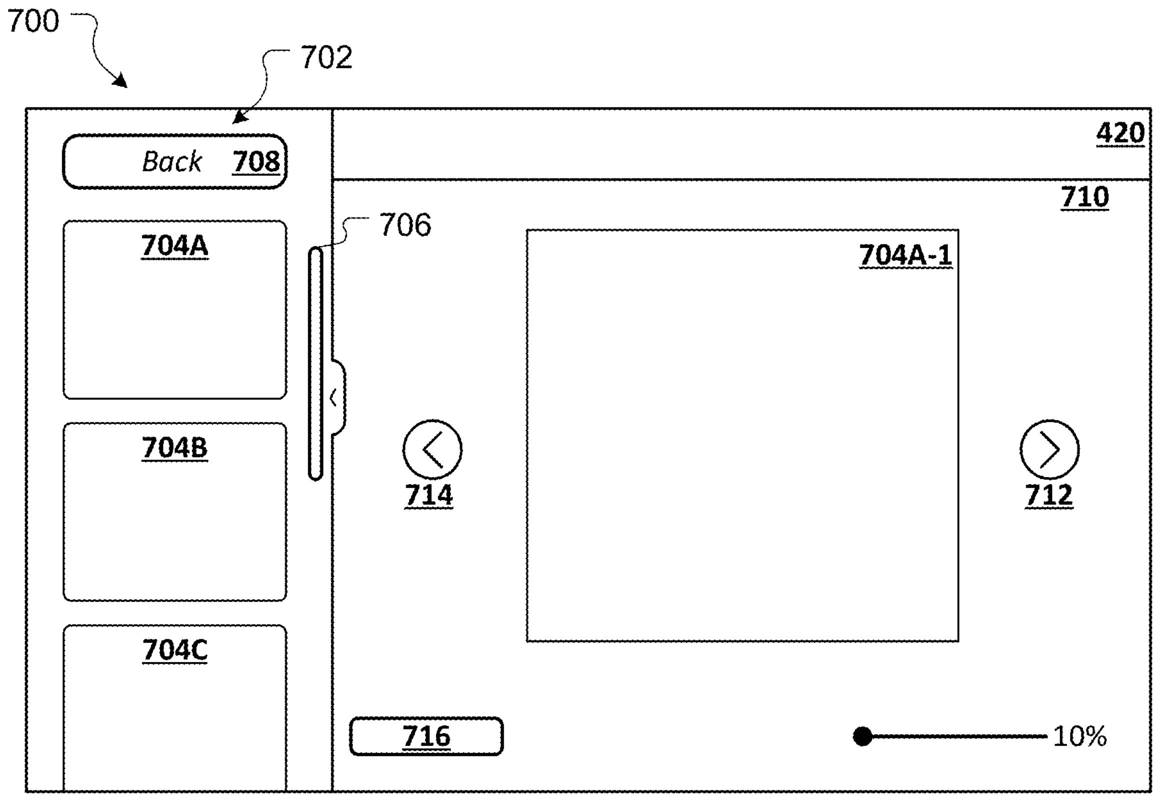
FIG. 7 depicts an example graphical user interface.

FIG. 7 provides one example user interface 700 for outputting decks generated at 618. UI 700 is similar to UI 400 and UI 450 of FIG. 4. In UI 700, however, the asset preview area 411 of user interfaces 400 and 450 has been replaced with a deck selection area 702. Deck selection area 702 includes previews 704 of new decks that have been generated. Each preview 704 may, for example, be a thumbnail of the first page of a new deck. Selection area 702 also includes a scroll control 706 (allowing a user to navigate and view further previews 704 of new decks) and a back control 708 (which closes the preview area 704 and may, for example, cause the asset preview area 411 to be redisplayed).

In response to user input selecting a particular deck preview 704, client application 232 causes that deck to be displayed. In this particular embodiment, on user input selecting a particular deck preview 704 the client application 232 displays a particular (e.g. the first) page of the selected deck in preview area 710. A user can then view the different pages of the selected deck, e.g. by interaction with next/previous page controls 712/714. In addition, a user may select a particular deck via selection control 716 which causes the selected deck to be opened in an editor UI (e.g. UI 400 described above) and allows the user to edit and save/publish (or otherwise output) the deck in the same way that any other deck is edited.

In addition, client application 232 provides controls (e.g. in region 420) that allow a user to output a selected deck in various ways. These may include controls that allow a user to: save the deck (e.g. to local memory such as 310 or remote data storage such as 224); to export the deck to a different format (e.g. an image format, a pdf format, a webpage format, or an alternative format) and save the exported deck (to local or remote storage); to publish the deck to a social media or other publication service; to share the deck (e.g. via email, instant message, or other mechanism); to print the deck; to initiate and invite participants to an online presentation using the deck; and/or to output or use the deck in other ways.

Alternative user interfaces for viewing and/or editing new decks that are generated at 618 are possible.

In some embodiments, a new deck may automatically be generated for each destination deck that is identified in the deck generation data. In alternative embodiments, client application 232 (or content transfer module 234) may be configured to initially generate only one (or a subset) of possible new decks, and only generate further decks upon receiving user input to do so. For example, a single new deck may be initially generated, and subsequent new decks only generated if a user activates a 'view next deck' user interface control (which may be displayed in a UI such as 700).

As a further alternative, application 232 (or content transfer module 234) may be configured to initially generate only a single page of each new deck and display these single pages as deck previews to a user (e.g. in a preview interface such as 702 described above). This allows a user to get a sense of the visual style of the new decks. If a user then selects a particular deck, that deck can be fully generated and displayed as described above.

Document-Format Design Analysis

Figure 8:
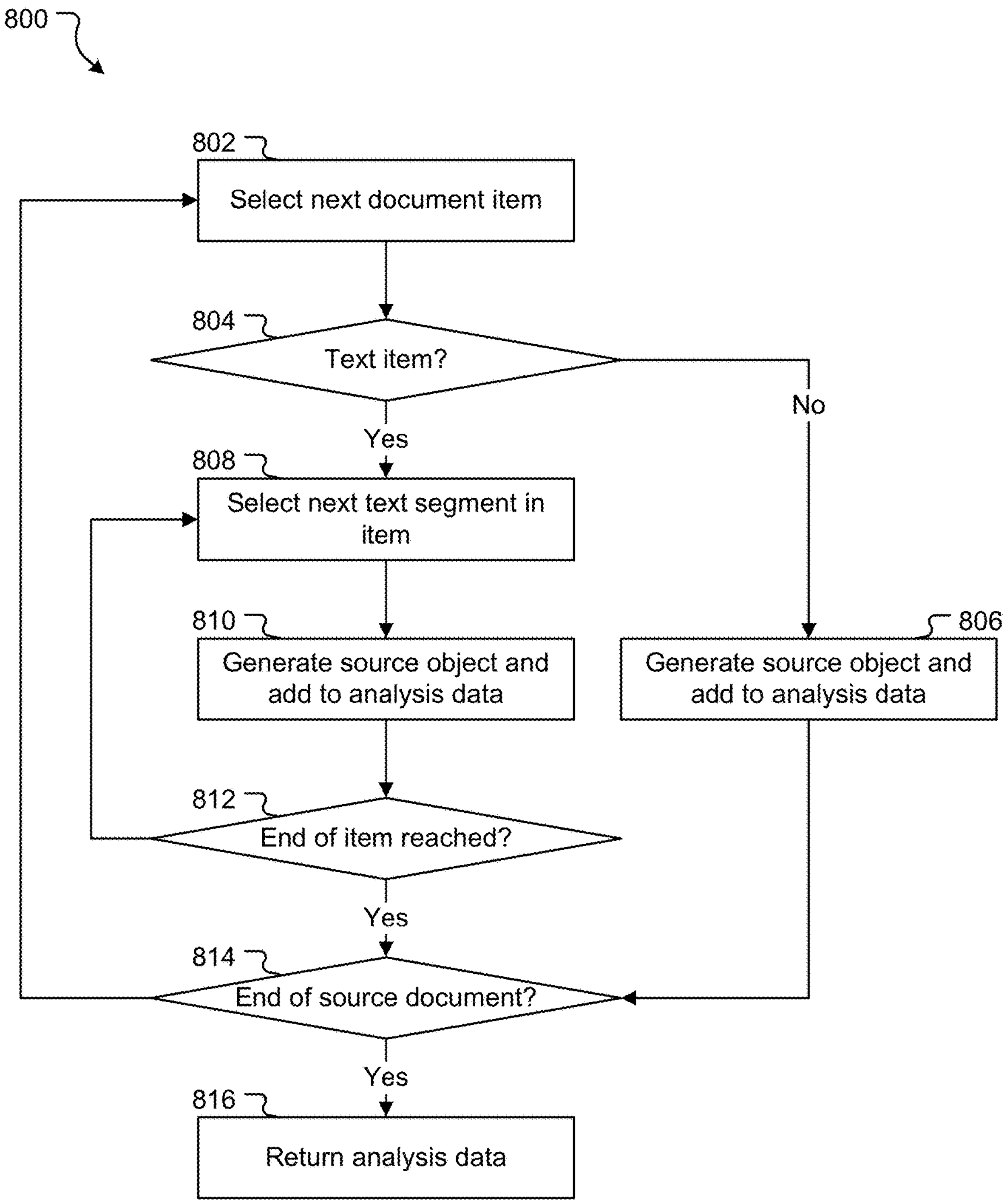
FIG. 8 is a flowchart depicting operations performed to generate source analysis data corresponding to a document-format design.

Referring to FIG. 8, a method 800 for processing a document to generate source analysis data will be described.

Method 800 may be performed as part of a deck generation process such as that described above with reference to FIG. 6 (and, for example, be initiated by server application 214 as described at 608 above).

In the present example, method 800 is described as being performed by design analysis application 216 (referred to as application 216 in this section for convenience). The processing described may, however, be performed by one or more alternative applications or modules.

Method 800 takes as input a document (or an identifier thereof) which will be referred to as the source document. An example document-format is described above. Generally speaking, however, the document-format design will define an ordered sequence of document items.

Generally speaking, method 800 operates to process the items of the source document to generate a set of source objects. Each source object corresponds to (or is associated with) what will be referred to as a source content segment (that is, part of the source content defined by the source document) and provides information concerning that source content segment. In this context the term "object" refers to a set of data. This may, for example, be a set of key/value pairs or any other appropriate data structure or set of related data structures.

At 802, application 216 selects the next document item. In the present example, the source document items are processed in order (e.g. according to the order of the items in the source document's items array).

At 804, application 216 determines if the selected item is a text type document item or a non-text document item (e.g. a block item such as a shape, chart, or table in the present examples). If the selected item is not a text item, processing proceeds to 806. If the selected item is a text item, processing proceeds to 808.

In the present embodiments, each non-text document item defines a single source content segment. In particular, a shape type document item defines a single fill, table type document item defines a single table, and a chart type document item defines a single chart. At 806, application 216 generates a source object in respect of the (non-text) document item and adds the source object to a set of source objects (e.g. by appending to a source objects array). Generating source objects is described further below. Processing then proceeds to 814.

In the present embodiments, a text document item may define one or multiple source content segments. Accordingly, at 808 application 216 selects the next content segment in the selected (text) document item. To do so, application 216 processes the characters of text in the selected item in order, selecting characters until a segment end is reached. In the present embodiments, text segments correspond to vertically delineated spans of text—e.g. paragraphs, list items, and/or other vertically delineated spans of text. Accordingly, characters are selected until a paragraph break or the like is reached (e.g. a control character such as a new line character).

At 810, application 216 generates a source object in respect of the (text) content segment selected at 808 and adds the source object to a set of source objects (e.g. by appending to a source objects array). Generating source objects is described further below. Processing then proceeds to 812.

At 812, application 216 determines whether the end of the selected text item has been reached. If so processing proceeds to 814. If the end of the selected document item has not been reached, processing proceeds to 808 to select the next text segment in the item.

To illustrate source content segments, consider the following simplified document record:

```
docContent: [
  {"type": "text", "chars":"Document heading./nFirst sub-heading/n", . . . },
  {"type": "shape", . . . },
  {"type": "text", "chars":"Second sub-heading /n", . . . }
]
```

For this example, application 216 would:

determine a first content segment to be the characters "Document heading./n" of the first (text) item in the array;

a second content segment to be the characters "First sub-heading/n" of the first (text) item in the array;

a third content segment to be the fill content defined by the second (shape) item in the array;

a fourth content segment to be the characters "Second sub-heading/n" of the third (text) item in the array;

At 814, application 216 determines whether the end of the source document has been reached (e.g. all document items have been processed). If the end of the source document has not been reached (and unprocessed content segments remain), processing proceeds to 802. Otherwise, processing proceeds to 816.

At 816, application 216 returns the source analysis data. In the present example, this is the set of one or more source objects that have been generated at 806 and 808.

Generating a source object corresponding to a content segment at 806 or 808 involves determining and recording values for one or more source object attributes (referred to as source object attributes for short). The source objects that are generated at 804 are, ultimately, used in conjunction with destination objects (which are described above at 508 of FIG. 5). To facilitate this, source objects are generated to include the same (or at least comparable) attributes as those of destination objects.

In the present embodiments, source objects are generated to include one or more of the following source object attributes:

a target identifier attribute (which, when referring to a source object, will be referred to as a source identifier);

a content type attribute;

a transfer-content attribute;

a reading order attribute;

a text hierarchy level attribute;

a num lines attribute;

a num chars attribute;

a fill role attribute;

an aspect ratio attribute.

These attributes are described further below. Additional and/or alternative source object attributes may be provided.

In the present embodiments, the source identifier attribute is generated for source objects corresponding to all content types.

The source identifier attribute is generated to identify the source content that the source object corresponds to. The precise manner in which source content is identified will depend on the document schema that is used.

In the context of the document schema described above, the source identifier attribute includes an item identifier that identifies a particular document item that the source object corresponds to (e.g. the index of the item in the document's items array).

For text content, and noting that a single text item may define multiple content segments, additional source identifier attributes may be generated to identify the specific text of the content segment. In the present embodiment these include a first character index (indicating the first character of the content segment) and a character length value (indicating the number of characters in the content segment).

In alternative implementations, instead of providing a source identifier attribute that identifies the source content that a source object corresponds to, the actual source content may be added to the source object. Depending on the size of the content defined by a content segment this may be more appropriate for text type content segments than for fills or other content types.

In the present embodiments, a content type attribute is generated for source objects corresponding to all item types.

The content type attribute is generated to identify the type of source content that the source object corresponds to (that is, the type of content defined by the content segment that the source object corresponds to). In the present example, content types that match the content (and item) types described above, and matching the destination object content types described above are provided—e.g. text, fill, table, and chart types. As described above with reference to destination objects, more granular content types (or content sub-types) may be provided—e.g. content types (or sub-types) that define different types of fills.

In the present embodiments, a transfer-content attribute is generated for source objects corresponding to all content types.

The transfer-content attribute is generated to indicate whether the source content that the source object corresponds to defines content that is to be transferred when generating a new deck. The transfer-content attribute may be a Boolean (or other) variable that takes, for example, a value of true if the content of the source object should be transferred and a value of false if not.

Application 216 may be configured to determine that a particular content segment is or is not to be transferred based on various transfer criteria.

By way of example, for a text content segment, application 216 may be configured to determine that the content is to be transferred unless it includes solely non-alphanumeric characters. E.g., if application 216 determines that a text segment does not include any alphanumeric characters it may determine that the text content segment is not to be transferred and set a transfer-content value indicating this (e.g. transferContent=false).

As another example, application 216 may be configured to determine that a fill defined by a shape item is to be transferred unless it exceeds a defined aspect ratio. The defined aspect ratio may be set to try and capture fills that are relatively wide, which may indicate that the fill is being used as a separator. For example, if application 216 determines that a fill has an aspect ratio of greater than 10 (i.e. >10:1) it may determine that the fill is not to be transferred and set a transfer-content value indicating this (e.g. transferContent=false).

Application 216 may be configured to determine that all chart content and all table content are to be transferred and set transfer-content values for source objects corresponding to such content accordingly (e.g. transferContent=true).

Other criteria for determining whether source content is to be transferred or not may be applied.

Furthermore, in alternative implementations a transfer-content attribute need not be used. For example, application 216 may be configured to determine that all source content is to be transferred. As an alternative example, application 216 may be configured so that a source object is not generated for any source content that is determined not to be able to be transferred.

In the present embodiments, a reading order attribute is generated for source objects corresponding to all types of content for which the transfer content attribute is true.

The reading order attribute is generated to identify a position of the source content that the source object corresponds to in the document's reading order. For a document, the reading order is the order of the content segment in the document record. Reading order may, therefore, be determined by application 216 setting an initial reading order value at the start of method 800 (e.g. a value of 0 or 1), recording the current reading order value at the generation of each source object (e.g. at 806 or 808), and following the generation of a source object incrementing the reading order value.

In the present embodiments, a text hierarchy level attribute is only generated for source objects corresponding to text content segments.

The text hierarchy level attribute is generated to indicate the hierarchy level of text-type source content that the source object corresponds to. Text hierarchy levels are discussed above. In some instances, text items may already be associated with a text hierarchy level. If text hierarchy levels are not available, however, application 232 may be configured to analyse the text defined by the source document (e.g. as defined by text items of the source document) to determine text hierarchy levels and associate each text item (or separable text segment thereof) with a text hierarchy level. This may, for example, be done in accordance with method 3300 described below, however alternative approaches to determining text hierarchy levels may be used.

The num lines attribute is generated to indicate a vertical distance that the text-type source content that the source object corresponds to may occupy. In the present embodiments, application 216 is configured to calculate the num lines attribute by estimating a number of wrapped lines defined by the content segment. Application 216 estimates the number of wrapped lines based on a defined line width and the number of characters in the content segment. The defined line width is selected to be comparable to a likely destination element that the text may be transferred to. Any appropriate defined line width may be used, for example a width of 80 characters or an alternative width.

In the present embodiments, a num chars attribute is only generated for source objects corresponding to text content segments.

The num chars attribute is generated to indicate the number of characters defined by the text-type source content that the source object corresponds to.

In the present embodiments, a fill role attribute is only generated for source objects corresponding to shape content segments.

The fill role attribute is generated to indicate whether the fill content that the source object corresponds to is a complete fill (with no transparencies) or a partial fill (with one or more transparencies).

In the present embodiments, an aspect ratio attribute is not generated for source objects corresponding to text content segments, but is generated for source objects corresponding to other source content types (e.g. chart, shape, and table type content segments).

The aspect ratio attribute is generated to indicate the aspect ratio of the source content that the source object corresponds to. With the example element record schema described above, application 216 may determine the aspect ratio attribute based on relevant size data—e.g. width/height.

To further illustrate source objects, and by way of example only, a source object corresponding to a text content segment defined by a first document item is as follows:

```
{
  "sourceID": {
    "itemID": 0,            // indicating the first item in the document's items array
    "firstCharIndex": 0,    // indicating the content starts at character index 0
    "charLength": 25        // indicating the content is 48 characters long
  },
  "type": "TEXT",
  "transferContent": true,
  "readingOrderIndex": 1,
  "textHierarchyLevel": 1,
  "numLines": 1,
  "numChars": 24
}
```

In the present embodiments, a num lines attribute is only generated for source objects corresponding to text content segments.

An example source object corresponding to a second text content segment defined by the first document item above is as follows:

```
{
  "sourceID": {
    "itemID": 0,             // indicating the first item in the document's items array
    "firstCharIndex": 25,    // indicating the content starts at character index 25
    "charLength": 17         // indicating the content is 17 characters long
  },
```

-continued

```
  "type": "TEXT",
  "transferContent": true,
  "readingOrderIndex": 2,
  "textHierarchyLevel": 2,
  "numLines": 1,
  "numChars": 16
}
```

By way of further example, a source object corresponding to a fill segment (corresponding to a shape-type document item) is as follows:

```
{
  "sourceID": {
    "itemID": 1,        // indicating the second
                        item in the document's items array
  },
  "type": " FILL",
  "transferContent": true,
  "readingOrderIndex": 3,
  "fillRole": "complete",
  "aspectRatio": 0.5666415662650801
}
```

Pagination Data Generation

Figure 9:
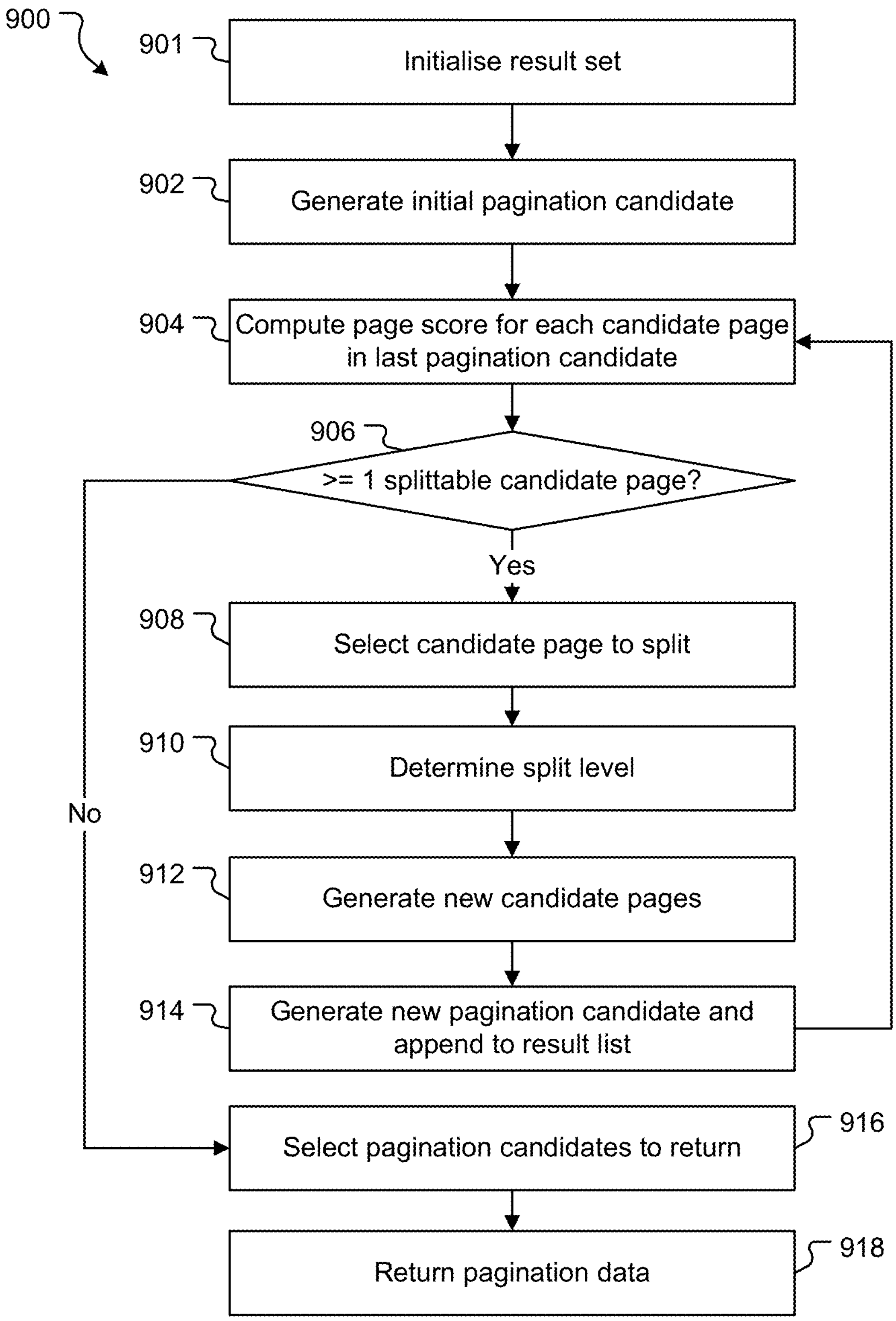
FIG. 9 is a flowchart depicting operations performed to determine pagination candidates for content of a document-format design.

Referring to FIG. 9, an example method 900 for generating pagination data for a source document will be described.

Method 900 may be performed as part of a document to deck generation method (and, for example, be initiated by server application 214 as described at 610 above).

In the present example, method 900 is described as being performed by pagination application 218 (referred to as application 218 in this section for convenience). The processing described may, however, be performed by one or more alternative applications or modules.

In the present example, method 900 takes as input source analysis data that corresponds to a source document. Generally speaking, source analysis data defines a set of one or more source objects, each source object corresponding to particular source document content (e.g. a source document content segment as described above with reference to FIG. 8). Source analysis data may, for example, be generated according to method 800 described above. In the present example, the set of source objects is initially ordered based on the order of the source content in the source document. For example, the set of source objects may be ordered based on their reading order value.

Method 900 generates and returns pagination data. In the present embodiments, the pagination data is a set (e.g. an array) of one or more pagination candidates. Each pagination candidate is a set (e.g. an array) of one or more candidate pages. Each candidate page is a set (e.g. an array) of source objects (and, as described above, each source object corresponds to particular content of the source document). Each pagination candidate represents a complete pagination solution for the source document. That is, for a given pagination candidate each relevant source object in the source analysis data (and, therefore, all relevant source document content) is associated with at least one candidate page of that pagination candidate.

Any appropriate data structure may be used for the pagination data. By way of example, pagination data may be a set (e.g. an array) of pagination candidates, with each pagination candidate being a set (e.g. an array) of candidate pages. E.g.:

```
results: [
  [{candidate page 1}],            // pagination candidate 1
  [{candidate page 1},             // pagination candidate 2
  {candidate page 2}, . . . ],
  . . .
  [{candidate page 1},             // pagination candidate n
  {candidate page 2}, . . . ],
]
```

Each candidate page may be defined by a candidate page record. The candidate page record for a given candidate page may include a set (e.g. an array) of source objects (or identifiers thereof). In the present embodiment, a candidate page record may also include a split level value and a page score (both of which are used in determining pagination candidates and are described below).

Any appropriate data structure may be used to record a candidate page. By way of example, a candidate page record may be as follows:

```
candidatePage: {
  "sourceObjects": [{source object 0}, . . . {source object n}],
  "splitLevel": −1,
  "pageScore": null
}
```

At 901, application 218 initialises a results set (e.g. a list or array or other ordered dataset). The results set is initialised as an empty set, and pagination candidates are added to it over the course of method 900.

At 902, application 218 generates an initial pagination candidate and adds this to the results set. The initial pagination candidate includes a single candidate page that includes all content of the source document (in this case represented by all source objects of the source document's analysis data). The split level value for the candidate page generated at 902 is either null or a value indicating that no split has yet been performed (e.g. −1 or an alternative value). A page score value for the initial candidate page is computed at 904.

At 904, application 218 computes a page score for the or each new candidate page in the last pagination candidate that was added to the result list. The page score for a candidate page is a measure of how well (or how poorly) the content defined by that candidate page is likely to fit a page of an available template deck. In the present embodiment each candidate page's page score is associated with the candidate page (e.g. via the "pageScore" attribute above).

Figure 10:
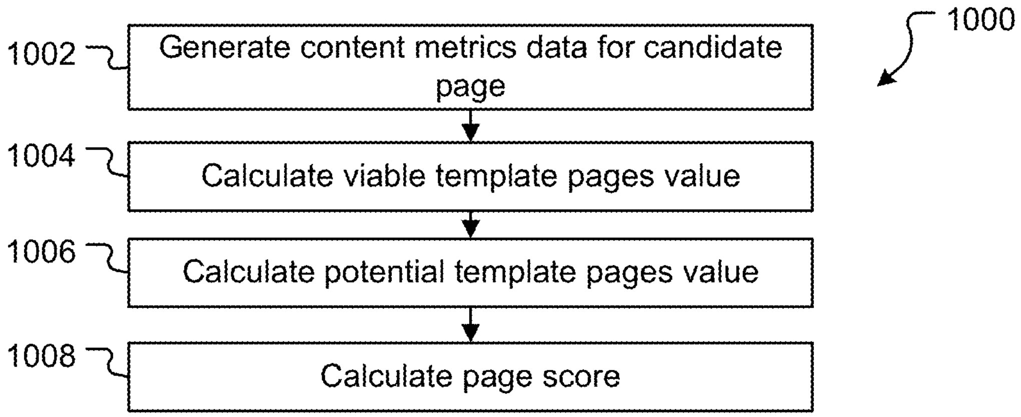
FIG. 10 is a flowchart depicting operations performed to calculate a page fit score for a candidate page of a pagination candidate.

A method 1000 for calculating a page score for a particular candidate page (at 904) is described with reference to FIG. 10.

At 1002, application 218 generates content metrics data for the candidate page. The content metrics generated for a candidate page allows for broad, content-based comparisons between the candidate page and available template pages to be performed. To this end, the content metrics generated at 1002 are generated to include the same (or at least corresponding) values as the content metric values generated for template pages (described above with reference to 516 of FIG. 5). Application may generate content metrics itself at 1002, or may generate/send a request to the design analysis application 216 to do so.

In the present embodiment, therefore, the content metrics data generated for a candidate page includes the following values. The prefix CM may be used to indicate content metric.

- A CM characters value that is based on the number of characters on the candidate page. In the present embodiment, the CM characters value is the logarithm of the total number of characters defined by the candidate page's text type source objects. The characters value may alternatively be the actual number of characters (or an alternative value based thereon).
- A CM lines value based on the number of lines of text on the candidate page. In the present embodiment, the CM lines value is the logarithm of the total number of lines defined by the candidate page's text type source objects. The lines value may alternatively be the actual number of lines (or an alternative value based thereon).
- A CM fills value based on the number of fills on the candidate page. In the present embodiment, the CM fills value is the number of fill type source objects, however an alternative value based on that number may be used.
- A CM tables value based on the number of tables on the candidate page. In the present embodiment, the CM tables value is the number of table type source objects, however an alternative value based on that number may be used.
- A CM charts value based on the number of charts on the candidate page. In the present embodiment, the CM charts value is the number of chart type source objects, however an alternative value based on that number may be used.

In the present embodiment, only source objects that have a "transfer-content" attribute that is true contribute to content metric values. In addition, while the content metric values are described as being based on a candidate page's source objects they could instead be based on the actual source content (e.g. the source document content items).

At 1004, application 218 calculates a viable template pages value for the candidate page.

The viable template pages value is based on a number of template pages that application 218 identifies to be viable for the particular candidate page. Generally speaking, application 218 determines that a particular template page is viable for a particular candidate page if the elements of the template page appear, at least at a broad level, to be capable of accommodating the content of the candidate page.

In the present embodiment, application 218 determines whether a particular template page is a viable fit for the candidate page based on the candidate page's content metrics data (generated at 1002) and the particular template page's content metrics data (which, in the present embodiment, is determined at 516 of method 500 when analysing the template page). In particular, application 218 determines that a particular template page is viable for the candidate page if the following conditions are met:

- Candidate page CM characters value<=Template page CM characters value AND
- Candidate page CM lines value<=Template page CM lines value AND
- Candidate page CM fills value<=Template page CM fills value AND
- Candidate page CM tables value<=Template page CM tables value AND
- Candidate page CM charts value<=Template page CM charts value Application 218 evaluates the candidate page against each template page in a set of template pages (which may be all available template pages or a subset thereof). Application 218 then records the number of template pages that are determined to be viable as the viable template pages value.

At 1006, application 218 calculates a potential template pages value. In the present example, the potential template pages value is calculated by determining the different types of content on the candidate page (based on the types of the candidate page's source objects) and then determining the number of template pages that include at least one element of each of those types.

To illustrate this, consider a candidate page that includes a text-type source object and a table-type source object. If there are 100,000 template pages available, and of those: 40,000 template pages include a text-type element (or a text-type template page source object corresponding to such an element); and 500 template pages include a table-type element (or a table-type template page source object corresponding to such an element), then the potential template pages value is calculated as min (40000, 500)=500.

At 1008, application 218 calculates a page score for the candidate page. In the present embodiment, the page score is calculated as the viable template pages value (calculated at 1004) divided by the potential template pages value (calculated at 1006).

Continuing with the above example, if the viable template pages value for the candidate page with a text-type source object and a chart-type source object was 300, and the potential template pages value was 500, then the page score for the candidate page would be 300/500=0.6.

Returning to 906 of FIG. 9, once a page score has been calculated for each new candidate page in the last pagination candidate, application 218 determines if the last pagination candidate in the results set defines any splittable candidate pages. If so, processing proceeds to 908. If not, processing proceeds to 916.

In the present embodiments, application 218 determines that a candidate page can be split if it includes more than one text-type source object (e.g. if it has more than one source object that corresponds to a text content segment).

At 908, application 218 selects a particular candidate page from the last pagination candidate to split. The selected candidate page will be referred to as the focal page. Application 218 determines the focal page to be the splittable candidate page from the last pagination candidate that has the lowest (or equal lowest) page score. If two splittable candidate pages have the same (equal) lowest page score, either may be selected as the focal page. For example, application 218 may select the first candidate page in the last pagination candidate with the equal lowest page score.

At 910, application 218 determines a text hierarchy level that is to be used to split the focal page. This will be referred to as the split level. Application 218 determines the split level to be the next available text hierarchy level. This is the text hierarchy level that: occurs in the focal page; and is the next highest text hierarchy level after the split level that was used to create the focal page itself. (In the present embodiments, text hierarchy level 1 is the highest, level 2 is the next highest, and so forth.)

In the present embodiment, the text hierarchy levels that occur in the candidate page are determined by reference to the text hierarchy level attributes of the candidate page's source objects. Further, the split level that was used to create the focal page itself is determined by reference to the split level attribute of the focal page. For example, if the splitLevel of the focal page was a value indicating no split level has been used (e.g. −1, indicating that the focal page is the initial candidate page that was generated), application 218 will use text hierarchy level 1 (or the next highest text hierarchy level) to split the focal page into new pages. As another example, if the splitLevel of the focal page was 3 (indicating the focal page was generated by splitting a previous candidate page using text hierarchy level 3), application 218 will use text hierarchy level 4 (or the next highest text hierarchy level) to split the focal page into new pages.

Figure 11:
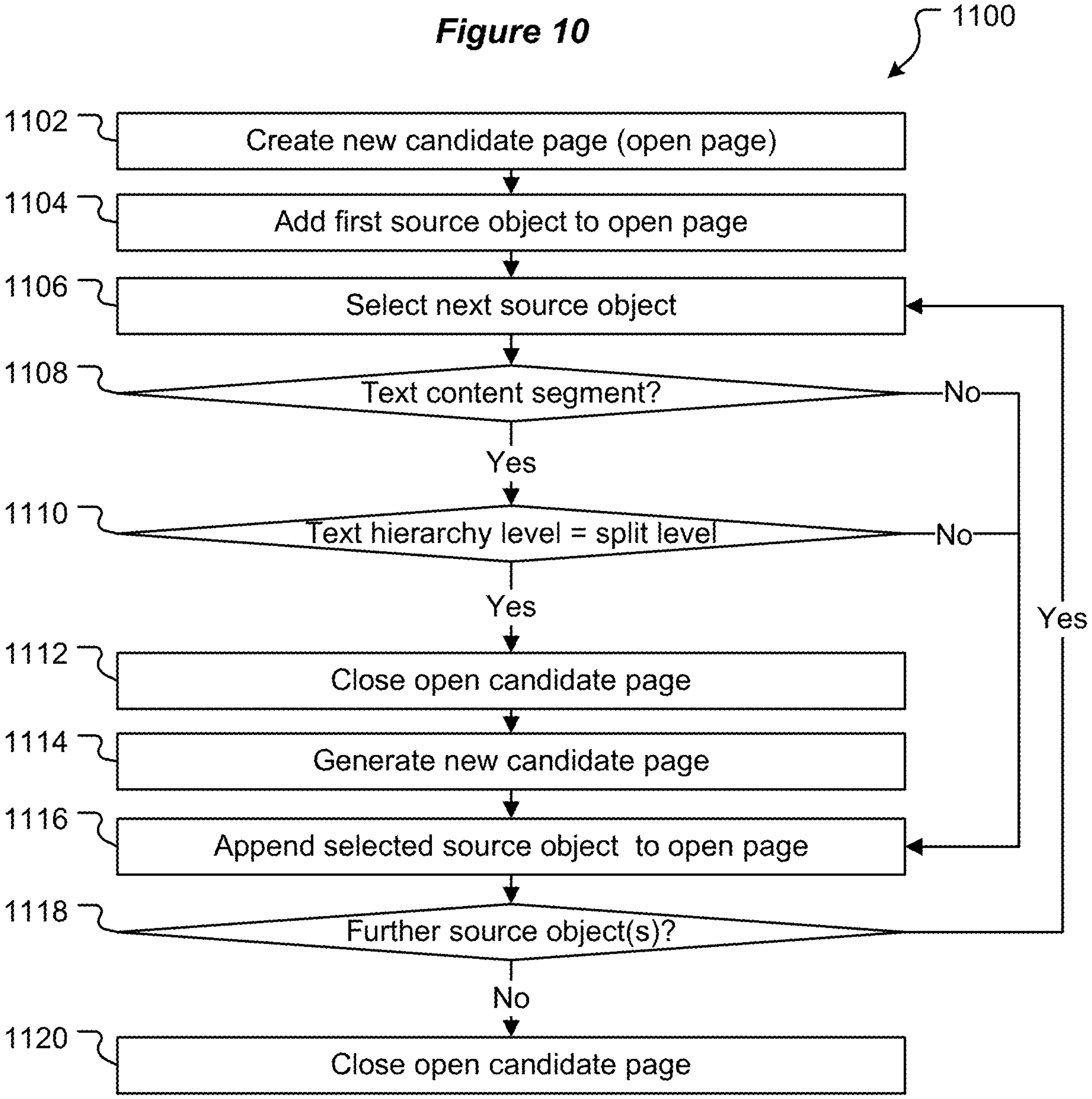
FIG. 11 is a flowchart depicting operations performed to split a selected candidate page into multiple candidate pages.

At 912, application 218 generates two or more new candidate pages. This is done by splitting the focal page identified at 908 using the split level determined at 910. Generating new candidate pages can be done in various ways. An example method 1100 for splitting a focal page at 912 is described with reference to FIG. 11.

At 1102, application 218 generates a new candidate page (this will be referred to as the open page).

At 1104, application 218 adds the first source object of the focal page to the open page. This serves to add the content segment defined by the first source object to the open page.

At 1106, application 218 selects the next source object (and, therefore, the next content segment) of the focal page. Focal page source objects are selected in order (e.g. based on the order of source objects in the focal page's source objects array).

At 1108, application 218 determines if the content segment of the selected source object is text content. In the present embodiment, this determination is based on the content type attribute of the selected source object. If the content segment is text content, processing proceeds to 1110. Otherwise processing proceeds to 1116.

At 1110, application 218 determines if the text hierarchy level of the text content of the selected source object is equal to the split level determined at 910. If so, processing proceeds to 1112. Otherwise, processing proceeds to 1116.

At 1112, application 218 has determined that the selected source object defines text content at a text hierarchy level equal to the split level. In this case, application 218 closes the currently open candidate page. On closing the open page, application 218 associates the split level with the candidate page (e.g. via a split level attribute as described above), though this can be done at any appropriate time.

At 1114, application 218 generates a new candidate page. This becomes the open page.

At 1116, application 218 adds the selected source object to the open candidate page. This serves to add the content segment defined by the selected source object to the open page.

At 1118, application 218 determines whether the focal page includes any further source objects (or, therefore, any further content segments). If so, processing proceeds to 1106 to select and process the next source object (and the next content segment defined by that source object). If all focal page source objects (and, therefore content segments) have been processed, processing proceeds to 1120.

At 1120, application 218 closes the open page (e.g. as described at 1112). Splitting the focal page is then complete.

To illustrate splitting a focal page, consider a focal candidate page with 12 source objects as indicated by the array below.

```
candidatePage: {
  "sourceObjects":
    [{S1, L1}, {S2, L2}, {S3, Ø}, {S4, L3}, {S5, L3}, {S6, Ø}, {S7, L4}, {S8, L1}, {S9,
    L2}, {S10, Ø}, {S11, L1}, {S12, L2}],
  "splitLevel": −1,
  "pageScore": 0.2
}
```

For ease of illustration, each source object in this example candidate page includes only a source identifier (indicated by the letter S) and either a text hierarchy level value (indicated by the letter T) or a Ø (indicating that the source object does not correspond to a text type content segment). In this example, therefore: source object {S1,L1} has a source identifier of "1" and a text hierarchy level hierarchy of "1"; source object {S3, Ø} has a source identifier of "3" and does not correspond to a text type content segment. If this hypothetical candidate page was identified (at 908) as the focal page, then application 218 would determine the split level (at 910) to be 1 and generate three new candidate pages at 912:

```
candidatePage: {      //the first new candidate page
  "sourceObjects": [{S1, L1}, {S2, L2}, {S3, Ø}, {S4, L3}, {S5, L3}, {S6, Ø}, {S7, L4}],
  "splitLevel": 1,
  "pageScore":
}
candidatePage: {      //the second new candidate page
  "sourceObjects": [{S8, L1}, {S9, L2}, {S10, Ø}],
  "splitLevel": 1,
  "pageScore":
}
```

-continued

```
candidatePage: {      //the third new candidate page
  "sourceObjects": [{S11, L1}, {S12, L2}],
  "splitLevel": 1,
  "pageScore":
}
```

Returning to FIG. 9, at 914, application 218 generates a new pagination candidate and adds this to the end of the results list (e.g. by appending it to the end of the result list). The new pagination candidate is generated to include all candidate pages of the previous pagination candidate (in their original order) except for the focal page. In the new pagination candidate, the focal page from the previous pagination candidate is replaced by the new candidate pages generated at 912 (in the order in which they were generated). Processing then proceeds to 904 (to compute candidate pages scores and determine if further candidate pages can be split).

At 916, application 218 has determined that the last pagination candidate that was generated does not include any splittable candidate pages. At this point application 218 selects one or more pagination candidates that are be returned.

By generating pagination candidates and adding them to the result list as described above, the pagination candidates in the result list will be naturally ordered from the most content-dense pagination candidate (the pagination candidate having the fewest candidate pages and, in this case, appearing at the start of the result list) to the least content-dense pagination candidate (the pagination candidate having the most candidate pages and, in this case, appearing at the end of the result list).

In certain embodiments, application 218 is configured to return a maximum number of pagination candidates. The maximum number of pagination candidates may be an input (along with the input source analysis data) to method 900 and determined (e.g. by server application 214) based on product requirements. Alternatively, the maximum number may be a defined number (e.g. 5, 10, or an alternative maximum number). Further alternatively, application 218 may be configured to determine a number of pagination candidates to return. For example, application 218 may be configured to return a minimum of 2 and a maximum of 60% (or an alternative percentage) of the number of pagination candidates.

Once the number of pagination candidates that are to be returned has been determined (if required), application 218 selects the specific pagination candidates that are to be returned. This may be done in various ways. In one embodiment, application 218 is configured to ignore (e.g. discard or not select) any pagination candidate that includes a candidate page with a page score of 0. This may be the case for one or more of the candidate pages that are generated early in the process. For example, in the approach described the initial pagination candidate generated at 902 includes a single candidate page with all content of the source document. In many cases, this page may give a page score of 0 (e.g. due to the entire content of the source document including too much content for any single template page). After ignoring any pagination candidates that have one or more candidate pages with a page score of 0, application 218 may select the required number of pagination candidates by evenly sampling from the remaining pagination candidates in the result list. E.g. if the result list includes x remaining pagination candidates and n pagination candidates have been requested, application 218 may generate the pagination data to include every (floor (x/n))$^{th}$ pagination candidate from the remaining pagination candidates in the result list.

In alternative embodiments, application 218 may be configured to select all pagination candidates at 916 (or may be configured to select all pagination candidates except the first and last pagination candidates).

At 918, application 218 returns the pagination candidates selected at 916 as the pagination data.

In certain embodiments, application 218 may be configured to identify text-type content segments that exceed a defined length and split those content segments. In the present examples, where content segments are associated with source objects, this is done by determining whether the num chars attribute of any source object exceeds a defined maximum number of characters. If a source object does have a content segment that exceeds the maximum number of characters, application 218 splits that source object into two or more new source objects.

The defined number of characters may be a set number, or may be periodically calculated. For example, application 218 may be configured to periodically calculate the maximum number of characters based on the template deck pages that are available. For example, application 218 may calculate the total number of characters on each template page available, then take the top xth (e.g. 99$^{th}$) percentile and use that as the maximum number of characters.

In the present embodiment, where the content segment of a source object exceeds the maximum number of characters, application 218 splits the source object (and, therefore, the content segment defined by that source object) by identifying a last defined split character (e.g. a period, an exclamation mark, or an alternative split character) before the defined maximum number of characters and then creating a new source object for the characters up to and including that split character. The new source object will take the attributes of the original source object, except the charLength attribute will change to reflect the selected characters. The new source object is then added to the set of source objects before the original source object, and the firstCharIndex and charLength of the original source object are changed (to reflect the characters that have been removed from that source object). The (now changed) original source object can then be analysed and processed in the same way, and split further if it still defines too many characters.

Where application 218 is configured to split source objects that have content segments with too many characters this may be done at any appropriate time. For example, application 218 may analyse and split all source objects at the very beginning (e.g. before 902). Alternatively, application 218 may analyse and split source objects at (or following) 912 (when new candidate pages are generated). Further alternatively, such analysis and splitting may be performed at the time of generating the source analysis data (e.g. when determining the next content segment at 802).

Figure 12:
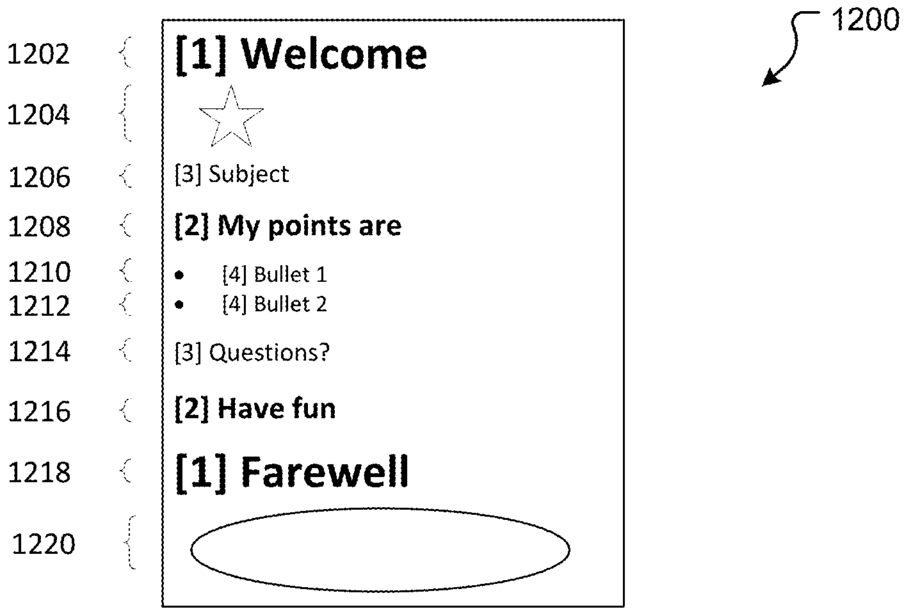
FIGS. 12 and 13 are illustrations to assist in understanding the method for determining pagination candidates described in FIG. 9.

To further illustrate pagination method 900, consider the example document 1200 shown in FIG. 12. This example document includes: two text-type content segments 1202 and 1218 which have text hierarchy level 1; two text-type content segments 1208 and 1216 which have text hierarchy level 2; two text-type content segments 1206 and 1214 which have text hierarchy level 3; two text-type content segments 1210 and 1212 which have text hierarchy level 4; and two fill-type content segments 1204 and 1220. Simplified source objects for document 1200 (in which each source object includes only the text hierarchy level of the corresponding content segment or a 'D' indicating a non-text type content segment) may be represented as follows:

[{1}, {Ø}, {3}, {2}, {4}, {4}, {3}, {2}, {1}, {Ø}]

Figure 13:
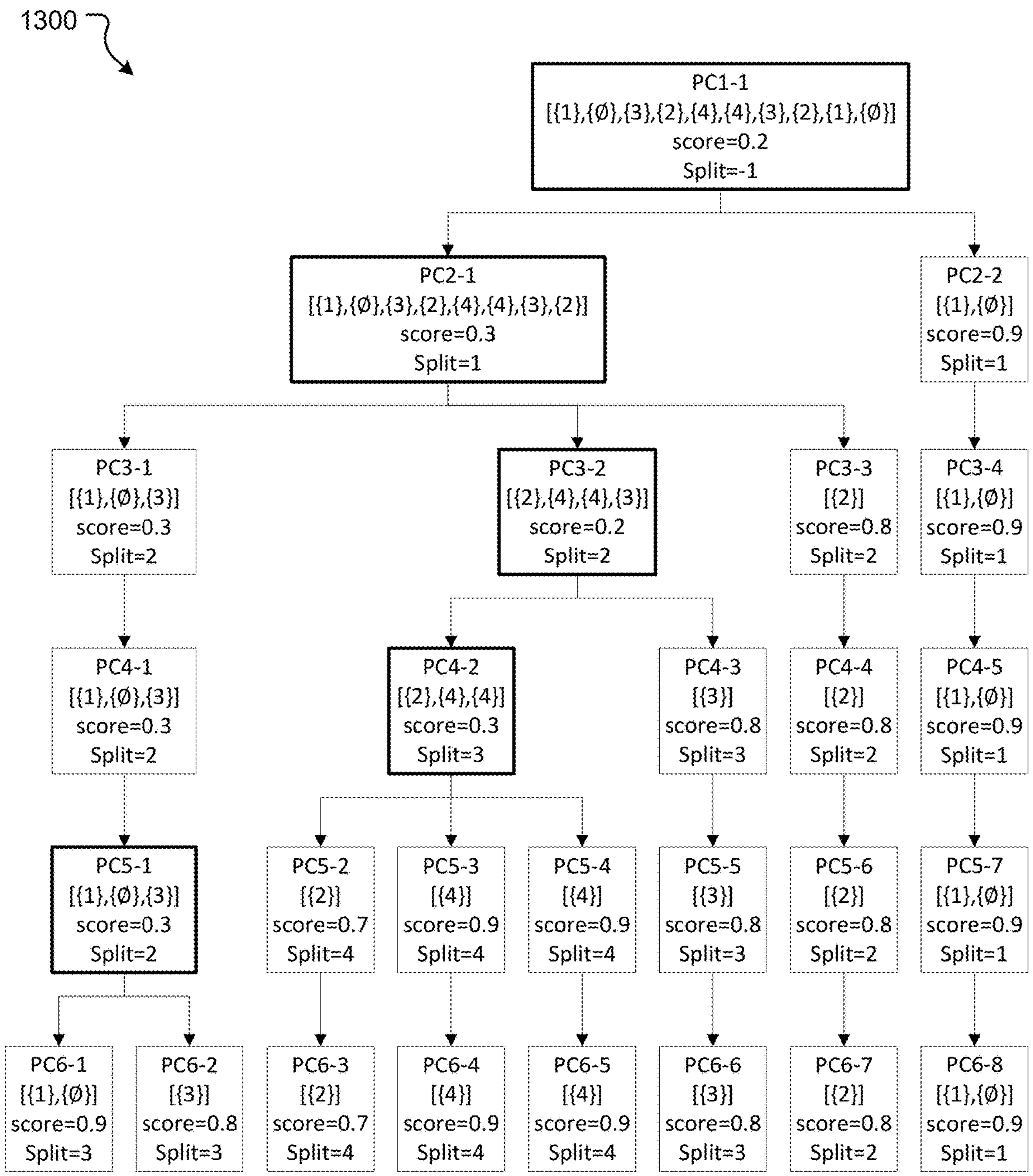

FIG. 13 provides a representation of a segment tree 1300 that corresponds to document 1200 (and, in particular, to the analysis data above). Each node of segment tree 1300 indicates a candidate page, and each row indicates a pagination candidate. Each node is labelled with text in the form "PCx-y", where PC stands for pagination candidate, x indicates the pagination candidate number, and y indicates the candidate page number. E.g. the node labelled "PC3-2" indicates candidate page 2 of pagination candidate 3. Each node further indicates the set of source objects that have been assigned to the candidate page, a hypothetical page score, and a split level.

In generating the pagination candidates for example document 1200, application 218 initially (at 902) generates the initial pagination candidate which includes a single candidate page (node PC1-1 of tree 1300).

In the first processing loop (906 to 914), a split level of 1 is determined (at 910) and a second pagination candidate is generated that includes candidate pages indicated by nodes PC2-1 and PC2-2 of tree 1300.

In the next processing loop (906 to 914): candidate page PC2-1 has the lowest page score and is identified as the focal page (at 908); a split level of 2 is determined (at 910); new candidate pages PC3-1, PC3-2, and PC3-3 of tree 1300 are generated (at 912); and new pagination candidate is generated.

Processing continues in this manner, which leads to a set of pagination candidates as follows:

```
[
  [[{1},{Ø},{3},{2},{4},{4},{3},{2},{1},{Ø}]]            // pagination candidate 1
  [[{1},{Ø},{3},{2},{4},{4},{3},{2}],[{1},{Ø}]]          // pagination candidate 2
  [[{1},{Ø},{3}], [{2},{4},{4},{3}],[{2}],[{1},{Ø}]]     // pagination candidate 3
  [[{1},{Ø},{3}],[{2},{4},{4}],[{3}],[{2}],[{1},{Ø}]]    // pagination candidate 4
  [[{1},{Ø},{3}],[{2}],[{4}],[{4}],[{3}],[{2}],[{1},{Ø}]] // pagination candidate 5
  [[{1},{Ø}],[{3}],[{2}],[{4}],[{4}],[{3}],[{2}],[{1},{Ø}]] // pagination candidate 6
]
```

Application 218 then selects specific pagination candidates to return (at 916) and returns the selected candidates as pagination data at 918. For example, pagination candidates 2, 3 and 4 may be selected.

Template Matching and Deck Generation Data

Figure 14:
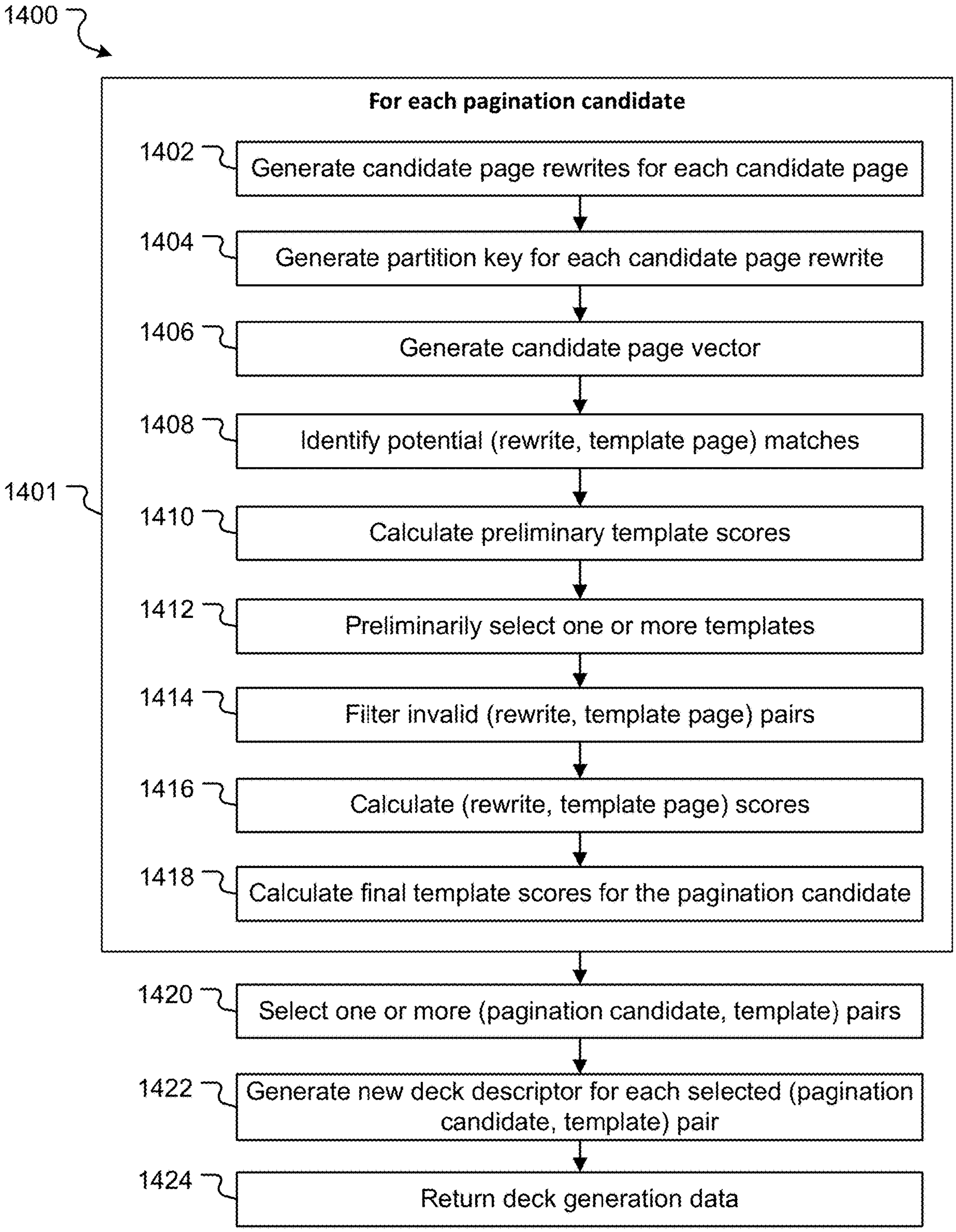
FIG. 14 is a flowchart depicting operations performed to generate deck-format design generation data.

Turning to FIG. 14, an example method 1400 for generating deck generation data will be described.

Method 1400 is described as being performed by template matching application 220 (referred to as application 220 in this section for convenience). The processing described may, however, be performed by one or more alternative applications or modules.

Method 1400 may be performed as part of a document to deck design generation process that is operating to generate a new deck based on a source document. In this case, method 1400 may be initiated by server application 214 as described at 612 above. When initiated at 612 described above, method 1400 takes as input pagination data. Pagination data may, for example, be generated according to method 900 described above (or a similar method). Generally speaking, such pagination data will define one or more pagination candidates. Each pagination candidate will include one or more candidate pages, and each candidate page will be associated with source document content. In the present example, each candidate page includes a set of one or more source objects (each source object being associated with source content defined by the source document).

Method 1400 may also (or alternatively) be performed as part of a deck to deck design generation process. In this case, method 1400 (or a modified version thereof) may be initiated by server application 214 as described at 2810 of method 2800 below. When initiated at 2810, method 1400 takes as input a single pagination candidate: that is, a single set of one or more candidate pages, each candidate page corresponding to a page of a source deck. Each candidate page will include a set of one or more source objects that corresponds to the source content of the original source deck page.

In the present example, method 1400 generates deck generation data that can be used to generate one or more new decks based on the source content of the original source document. Deck generation data is described further below.

Initially, and as generally indicated at 1401, application 220 identifies one or more matching templates for each pagination candidate and calculates a set of final template scores for each (pagination candidate, template) pairing. This involves processing blocks 1402-1418. Where multiple pagination candidates are to be processed, the processing blocks of 1401 may be performed on each pagination candidate in sequence or in parallel.

In order to illustrate the processing performed at 1401, a simplified example will be described alongside the description of processing blocks 1402-1418. The simplified example is based on a pagination candidate that includes three candidate pages—e.g.:

```
//candidate page 1 source objects
[
  {"sourceID": 1, "type": "text", "num_lines": 1},        //analysis item 0.1
],
//candidate page 2 analysis items
[
  {"sourceID": 2, "type": "shape", "aspect ratio": 0.7},//analysis item 1.1
]
//candidate page 3 analysis items
[
  {"sourceID": 3, "type": "text", "num_lines": 1},        //analysis item 2.1
  {"sourceID": 4, "type": "text", "num_lines": 1},        //analysis item 2.2
  {"sourceID": 5, "type": "text", "num_lines": 1}         //analysis item 2.3
]
```

The simplified example also assumes three available templates. Template 1 has a first page with a single text element and a second page with three text elements. Template 2 has a first page with a single text element, a second page with a single shape element, and a third page with a single text element. Template 3 has a single page with a single shape element. Simplified analysis data for such a template is as follows:

```
{
  //template 1
  {
    "templateID": "template1",
    "pages": [
      {"analysisItems": [{"type": "text", "destID": 1, "num_lines": 1}]},     //template 1 page 1
      {
        "analysisItems": [                                                   //template 1 page 2
          {"type": "text", "destID": 1, "num_lines": 1},
          {"type": "text", "destID": 2, "num_lines": 1},
          {"type": "text", "destID": 3, "num_lines": 1},
        ]
      },
    ],
  },
  //template 2
  {
    "templateID": "template2",
    "pages": [
      {"analysisItems": [{"destID": 1, "type": "text", "num_lines": 3}]},    //template 2 page 1
      {"analysisItems": [{"destID": 2, "type": "shape", "aspect_ratio": 2}]},    //template 2 page 2
      {"analysisItems": [{"destID": 3, "type": "text", "num_lines": 1}]},    //template 2 page 3
    ],
  },
  //template 3
  {
    "templateID": "template3",
    "pages": [
      {"analysisItems": [{"destID": 1 "type": "shape", aspect_ratio: 1}]}    //template 3 page 1
    ],
  },
}
```

For these three example templates, simplified page partition keys that include only a count of the number of texts and a count of the number of shapes would be as follows:

| Template | Page | Partition key |
|---|---|---|
| 1 | 1 | [1, 0] // 1 text 0 shapes |
| 1 | 2 | [3, 0] // 3 texts 0 shapes |
| 2 | 1 | [1, 0] // 1 texts 0 shapes |
| 2 | 2 | [0. 1] // 0 text 1 shape |
| 2 | 3 | [1, 0] // 1 texts 0 shapes |
| 3 | 1 | [0, 1] // 0 text 1 shape |

In the present example, application 220 generates a set of one or more candidate page rewrites for each candidate page in the pagination candidate at 1402. Each rewrite of a candidate page generally describes a different way in which the candidate page's source content (as defined by its set of source objects) can be grouped. In the present embodiment, each rewrite of a candidate page includes (or references) a set of one or more source objects.

When generating the one or more rewrites of a candidate page, application 220 will generate what will be referred to as an original rewrite (or an original version) of the candidate page. The original rewrite of a candidate page includes the same set of source objects that the candidate page itself includes.

In certain cases, application 220 may also generate one or more new rewrites of a candidate page. Any new rewrite of a candidate page may include at least one source object that identifies (or corresponds to) two or more of the candidate page's original source objects. A source object such as this may be referred to as a combined source object. If a rewrite includes a combined source object it will also include rewrite mapping data (which indicates the original source objects that map to the combined source object) and rewrite penalty data. The rewrite penalty data can be used when calculating a score that involves the rewrite (discussed below). The rewrite penalty data may be a value that can be directly used which calculating a score, or may be other data concerning the rewrite that can be used to determine a penalty value. As one example, the penalty data may provide information on the number and type of source objects (and/or the attributes of those objects) that have been combined.

In certain implementations, application 220 may be configured to generate a new rewrite by (if possible) generating a combined source object that corresponds to two or more original text type source objects. In particular, application 220 is configured to identify a span of text type source objects that could be assigned to a single text type element when generating a new deck (rather than being assigned to separate text elements). In this context, a span of text type source objects are a set text type source objects that have contiguous reading order values. In the present embodiment, application 220 identifies a candidate text type source object by iterating from the top text hierarchy level down and finding the first text hierarchy level with more than one text-type source object (this text hierarchy level may be referred to as merge_top). That merge_top level and all subsequent text hierarchy levels are then considered for merging into a single text type source object. To do this, application 220 rewrites those several text type source objects as a single combined source object. In doing so, application 220: combines relevant attributes such as num_lines and num_chars based on the original source objects that are being merged; assigns the combined source object a text hierarchy level value that is equal to the merge_top value; and mapping the original source objects to the combined source object to ensure that all original texts are assigned to the same element when generating a new deck/transferring source content to that new deck.

To illustrate rewrites, consider the example candidate pages described above:

When generating the set of rewrites for candidate page 1, an original rewrite of the candidate page is generated to include the original source objects of the candidate page. No other rewrites of candidate page 1 are generated.

When generating the set of rewrites for candidate page 2, a single (original) rewrite is generated.

When generating the set of rewrites for candidate page 3, an original rewrite is generated. In addition, a new rewrite is generated in which the three adjacent text analysis items of the candidate page are combined into (or mapped to) a single combined source object.

An example of a simplified representation of these rewrites is as follows:

```
//candidate page 1 rewrites
[
  // rewrite 1 (e.g. the original rewrite)
  {
    "sourceObjects": [
      {"sourceID": 1, "type": "text", "num_lines": 1},          // source object 1
      ]
  }
]
//candidate page 2 rewrites
[
  // rewrite 1 (e.g. the original rewrite)
  {
    "sourceObjects": [
      {"sourceID": 2, "type": "shape", "aspect_ratio": 0.7},     // source object 1
      ]
  }
]
//candidate page 3 rewrites
[
  // rewrite 1 (e.g. the original rewrite)
  {
    "sourceObjects": [
      {"sourceID": 3, "type": "text", "num_lines": 1},           // source object 1
      {"sourceID": 4, "type": "text", "num_lines": 1},           // source object 2
      {"sourceID": 5, "type": "text", "num_lines": 1}            // source object 3
      ]
  },
  // rewrite 2
  {
    "mappingData": {3: 1, 4: 1, 5: 1},                           // mapping data
    "mappingPenalty": [x],                                     // mapping penalty
    "sourceObjects": [
      {"ID": 1, "type": "text", "num_lines": 3}                  // combined source object 1
      ]
  }
]
```

As can be seen, for the original rewrites no mapping data or mapping penalty is required. For the further rewrite candidate page 3, mapping data and a mapping penalty is provided. The mapping data is a set of (source object ID: combined source object ID) pairs, each pair mapping an original source object of the candidate page to a combined source object. In this example, all three source objects of candidate page 3 are mapped to a single combined source object (with identifier "1"). The mapping penalty provides data that can be used to apply a penalty to the rewrite.

In alternative embodiments, application 220 need not generate any candidate page rewrites (and may instead consider only the original candidate page in further processing).

At 1404, application 220 generates a rewrite partition key for each candidate page rewrite generated at 1402. Rewrite partition keys are generated to allow potential (rewrite, template page) matches to be determined (described below at 1408). To facilitate this, rewrite partition keys are generated to include the same (or at least comparable) attributes as those of the deck page partition keys.

In the present embodiment, therefore, application 220 generates rewrite partition keys that include values that correspond to the deck page partition key values described at 512 of method 500 above—e.g.:

a PK text value;

a PK fills value;

a PK charts value; and a PK tables value.

In the present embodiment, each of these rewrite partition key values is calculated or determined in the same (or a similar) manner to the way its corresponding template page partition key value is calculated or determined (as described above at 512). The exception is that while template page partition key values are generated with reference to certain attributes of a template page's destination objects, rewrite partition key values are generated with reference to certain (corresponding) attributes of a rewrite's source objects (which may include one or more combined source objects).

Continuing with the simple worked example, however, in which partition keys include only a count of the number of texts and a count of the number of fills, the partition keys for the rewrites are as follows:

| Candidate page | Rewrite | Partition key |
|---|---|---|
| 1 | 1 | [1, 0] // 1 text 0 fills |
| 2 | 1 | [0, 1] // 0 texts 1 fill |
| 3 | 1 | [3, 0] // 3 texts 0 fills |
| 3 | 2 | [1, 0] // 1 text 0 fills |

At 1406, application 220 generates a candidate page vector for the candidate page being processed. Candidate page vectors are generated to allow for (rewrite, template) scores to be calculated (as described below at 1416). To facilitate this, candidate page vectors are generated to include the same (or at least comparable) attributes as those of template page vectors. In the present embodiment, a candidate page's vector will be the same for any rewrites of the candidate page. In alternative embodiments, a rewrite vector may need to be generated for each different candidate page rewrite.

In the present embodiment, therefore, application 220 generates candidate page vectors that include values that correspond to the values of the template page vectors described at 514 of method 500 above. In particular, application 220 generates candidate page vectors that include:

a character value for each text hierarchy level 1 to 6;
a line value for each text hierarchy level 1 to 6;
a min fill aspect ratio value;
a max fill aspect ratio value;
a partial fills value;
a complete fills value;
a min tables aspect ratio value;
a max tables aspect ratio value;
a min charts aspect ratio value; and a
max charts aspect ratio value.

In the present embodiment, each of these candidate page vector values is calculated or determined in the same (or a similar) manner as its corresponding template page vector value (as described above at 514). The exception is that while a template page vector is generated with reference to certain attributes of the template page's destination objects (and the content that the template page can accommodate), a candidate page vector is generated with reference to certain (corresponding) attributes of a candidate page's source objects (and, therefore, the source content that needs to be transferred to/accommodated by a template page). Further, in the present example, each candidate page vector value is calculated only with reference to source objects (and, therefore, the source content those objects correspond to) that have a "transfer content" attribute value that indicates source content that is to be transferred.

At 1408, application 220 identifies potential (rewrite, template page) matches. These may be referred to as potential page matches for convenience. In the present embodiment, for each rewrite application 220 identifies which (if any) template pages are a potential match for that rewrite.

In the present embodiment, application 220 determines whether a particular template page is a potential match for a particular rewrite based on the template page partition key and the rewrite partition key. In particular, if all of a rewrite's partition key values match all of a template page's corresponding partition key values, application 220 determines that the rewrite and the template page are a potential match. Otherwise the template page is not a potential match.

As described above, in certain embodiments the partition key fills values of the template page and rewrite page indicate specific numbers of fills. In these embodiments, therefore, a template page will only be a potential match for a rewrite if the number of fills that the shape elements of the template page define is equal to the number of source content fills. In alternative embodiments, the partition key fills values instead take a Boolean (or other value) that only indicates whether the template page includes at least one shape element that can accommodate one or more fills and whether the rewrite's source content includes one or more fills. In this case, if a rewrite defines one or more fills (and has a fills value of true) a template page will match if it also has a fills value of true (and therefore includes at least one shape element that can accommodate at least one fill). Whether the partition key fills values define an actual number of fills or a Boolean impacts how source fills are transferred as is discussed further below.

Application 220 may record potential (rewrite, template page) match data in any appropriate data structure. For illustrative purposes, the below table represents such data for the example template pages and rewrites described above:

| | Rewrite 1 | Rewrite 2 |
|---|---|---|
| Candidate page 1 | template1: (page 1)<br>template2: (page 1, page 3) | NA |
| Candidate page 2 | template2: (page 2)<br>template3: (page 1) | NA |
| Candidate page 3 | template1: (page 2) | template1: (page 1)<br>template2: (page 1, page 3) |

In this example, each internal cell of the table represents a specific rewrite of a specific candidate page and indicates which (if any) template pages match that specific rewrite. From this table it can be seen, for example, that potential template page matches for rewrite 1 of candidate page 1 are: template 1 page 1; template 2 page 1, and template 2 page 3.

At 1410, application 220 calculates a preliminary template score for each template. In the present embodiment, a template's preliminary score is based on the number of candidate pages of the pagination candidate being processed that the template provides at least one potentially matching page for. Application 220 determines that a template page is a potential match for a candidate page if that template page is a potential match for any of that candidate page's rewrites (which in this example has been determined at 1408).

Continuing the above example, the preliminary template scores (and preliminary template ranking) would be as follows:

| | |
|---|---|
| template1: 2 | //template 1 matches two candidate pages: 1 and 3 |
| template2: 3 | //template 2 matches three candidate pages: 1, 2, and 3 |
| template3: 1 | //template 3 matches one candidate page: 2 |

Based on the preliminary template scores application 220 can preliminarily rank the templates for the pagination candidate being processed.

At 1412, application 220 preliminarily selects one or more templates for further analysis. This selection is based on the preliminary template scores calculated at 1410 and a maximum number (k) of templates for which further analysis is to be performed. The maximum number (k) may be a defined maximum number, a number calculated by application 220, or may be a number of results that is provided as an input parameter to method 1400 (e.g. by server application 214). In either case, application 220 preliminary selects the k templates with the best preliminary template scores for further analysis.

Continuing with the above example, if the defined maximum number of templates (k) was 2, then application 220 would select template2 and template1 at 1412 as they have the highest preliminary template scores.

Conceptually, following preliminary selection of templates at 1412, for each template ID, for each source page, a list of (rewrite, template page) pairs has been determined.

At 1414, application 220 filters the (rewrite, template page) pairs to remove certain invalid pairs from further consideration. This filtering is performed to eliminate (rewrite, template page) pairs where the destination objects of the template page do not actually accommodate the source objects of the rewrite. This may occur due to the fact that the (rewrite, template page) pairs are initially identified at 1408 based on partition keys only.

Application 220 may be configured to apply various filtering rules to determine whether a particular (rewrite, template page) is invalid. For example, application 220 may determine invalidity based on whether source and/or destination objects define compatible fills (which may be determined based on the "appropriate for fill role" attributes of destination objects and the "fill role" attributes of source objects). As one example, application 220 may be configured to require that a source fill having a complete "fill role" attribute can only be matched to a destination fill that has a "complete" "appropriate for fill role" attribute. In this case, and by way of example, if a (rewrite, template page) pair identifies a rewrite that includes a fill type source object that has a complete "fill role" attribute, but a template page that only includes a fill-type destination object with a partial "appropriate for fill role" attribute, this pair will be filtered out and not considered further.

At 1416, application 220 calculates a set of (rewrite, template page) scores. These may be referred to as rewrite scores or candidate page scores for ease of reference. In particular, application 220 calculates a rewrite score for each (rewrite, viable template page) pairing. In this context, a viable template page is a template page of a template that:

a) has been preliminarily selected (at 1412); and
b) has been identified as a potential match for the rewrite in question (as determined at 1408).

In the present embodiment, application 220 calculates the rewrite score for a given (rewrite, template page) pair based on the relevant candidate page (or rewrite) vector and template page vector. In the present embodiment, for a particular rewrite and a particular template page, application 220 calculates the rewrite score as follows:

Rewrite score=(vector score*weight)+text size penalty+rewrite penalty

The vector score is the Euclidian distance between the candidate page (or rewrite) vector and the template page vector (the candidate page (or rewrite) and template page vectors both flattened into a single set of values if required). Any appropriate weight may be used, for example a weight of 1.

The text size penalty is a factor that application 220 calculates based on the number of lines. In particular, application 220 aggregates the numLines over the texts assigned to a specific destination, being the log base 2 of the maximum ratio between space required and the space available, as expressed by the numLines attribute. By way of further explanation, for each set of one or more source text objects assigned to a destination text object: the number of estimated lines consumed by those source text objects is summed and that value is then divided by the destination text object's numLines. For each (set of source text objects, destination object) pair, this provides a measure of the extent to which the set of source text objects exceeds the available space of the destination object. In the present embodiment, the text size penalty is concerned with the most egregious violation, so takes the max over the calculated ratios. A log of the maximum value is then used so that the text size penalty due to large ratios has increasingly marginal effect as the ratio increases.

The rewrite penalty is a penalty that is applied if the particular rewrite includes any merged content. In the present embodiment, the penalty is determined based on the rewrite penalty data described above. As noted, the rewrite penalty data may define an actual penalty value (e.g. 0.4 of another value), or may provide data that application 220 uses to calculate a rewrite penalty value.

In the above example, rewrite scores are calculated such that lower scores indicate better results. In other embodiments, rewrite scores may be calculated so that higher scores indicate better results. In either case, the rewrite scores that are calculated provide a mechanism for determining whether one rewrite is preferable to another.

Application 220 may be configured to calculate rewrite scores in alternative ways (and based on alternative data/values). For example, features can be extracted from the source objects, the destination, their combination, or in the context of the transformation performed when rewriting the source, and weights for these features can be learnt from data where the results have been ranked as a ground truth.

At 1418, application 220 calculates a set of final template scores for the pagination candidate. This includes calculating a final template score for each template preliminarily selected for the pagination candidate at 1412.

In the present embodiment, application 220 calculates the final template scores based on the (rewrite, template page) scores calculated at 1416. In particular, for each selected template application 220:

a) calculates a final candidate page score for each candidate page; and
b) sums the final candidate page scores.

When calculating the final candidate page score for a particular template and a particular candidate page:

a) If the particular template does not include any pages that are a potential match for any of the rewrites of the particular candidate page (e.g. based on the potential (rewrite, template page) matches determined at 1408), a default "no-match" score is determined. The no-match score is set to penalise a template if it cannot match any rewrite of a candidate page. The "no match" score may, for example, be −100.
b) Otherwise, the final candidate page score is based on the relevant rewrite scores for the candidate page. In this context, a rewrite score is a relevant rewrite score for a particular candidate page if it is associated with any template page of the particular template or any rewrite of the particular candidate page. In certain embodiments, application 220 may select the optimal relevant rewrite score. In alternative embodiments, application 220 may be configured to use the relevant rewrite scores to determine a distribution of a random selection. For example, the relevant rewrite scores may be processed using a softmax function to produce a distribution from which a single result can be sampled. The temperature of the softmax can be configured based on whether a single best result is desired (temp=0), or otherwise how far from the single-best the distribution is to share probability mass. The rewrite score that is selected also defines the (rewrite, template page) pair that will be included in the deck generation data.

Continuing the above example, and assuming only template1 and template2 have been preliminarily selected at 1412, application 220 would calculate final template scores as follows:

```
scoreTemplate1 :=
  // final candidate page score for candidate page 1
  score({candidatePage: 1, rewrite: 1, templateId: "template1", templatePage: 1)
  // final candidate page score for candidate page 2
  + SCORE_FOR_NO_MATCH
  // final candidate page score for candidate page 3
  + min(
    score({candidatePage: 3, rewrite: 1, templateId: "template1", templatePage: 2),
    score({candidatePage: 3, rewrite: 2, templateId: "template1", templatePage: 1)
  )
scoreTemplate2 :=
  // final candidate page score for candidate page 1
  min(
    score({candidatePage: 1, rewrite: 1, templateId: "template2", templatePage: 1),
    score({candidatePage: 1, rewrite: 1, templateId: "template2", templatePage: 3)
  )
  // final candidate page score for candidate page 2
  + score({candidatePage: 2, rewrite: 1, templateId: "template2", templatePage: 2)
  // final candidate page score for candidate page 3
  + min(
    score({candidatePage: 3, rewrite: 2, templateId: "template2", templatePage: 1),
    score({candidatePage: 3, rewrite: 2, templateId: "template2", templatePage: 3)
    )
```

In this example, candidate page 1 has a single rewrite (rewrite 1).

- Template1 has a single page that matches the rewrite (page 1). Therefore template1's final candidate page score for candidate page 1 is the rewrite score (candidate page 1 rewrite 1, template1 page 1).
- Template2 has two pages that match the rewrite (pages 1 and 3). Therefore template2's final candidate page score for candidate page 1 is the minimum of the (candidate page 1 rewrite 1, template2 page 1) rewrite score and the (candidate page 1 rewrite 1, template2 page 3) rewrite score.

In this example, candidate page 2 has a single rewrite (rewrite 1).

- Template1 has no pages that match the rewrite. Therefore template1's final candidate page score for candidate page 2 is the default 'no-match' score.
- Template2 has a single page m that matches the rewrite (page 2). Therefore template2's final candidate page score for candidate page 1 is the rewrite score (candidate page 2 rewrite 1, template2 page 2).

In this example, candidate page 3 has two rewrites (rewrites 1 and 2).

- Template 1 has one page that matches rewrite 1 of candidate page 3 (page 2) and one page that matches rewrite 2 of candidate page 3 (page 1). Therefore template1's final candidate page score for candidate page 3 is the minimum of the (candidate page 3 rewrite 1, template1 page 2) rewrite score and the (candidate page 3 rewrite 1, template1 page 1) rewrite score.
- Template2 has no pages that match rewrite 1 of candidate page 3, but two pages that match rewrite 2 of candidate page 3 (pages 1 and 3). Therefore template2's final candidate page score for candidate page 3 is the minimum of the (candidate page 3 rewrite 2, template2 page 1) rewrite score and the (candidate page 3 rewrite 2, template2 page 3) rewrite score.

Once a final template score for the or each pagination candidate has been calculated processing proceeds to 1420.

If method 1400 is initiated at 612 (as part of a document to deck generation process), final template scores may be generated for multiple pagination candidates. At 1420, therefore, application 220 has calculated a set of template scores for each pagination candidate. These scores may, for example, be recorded as a set of (pagination candidate identifier, template identifier, final template score) tuples—e.g.:

| Pagination candidate | Template ID | Final template score |
|---|---|---|
| 1 | 0001 | . . . |
| 1 | 0003 | . . . |
| 1 | 0004 | . . . |
| 2 | 0001 | . . . |
| 2 | 0002 | . . . |
| . . . | . . . | . . . |

If method 1400 is initiated at 2810 (as part of a deck to deck generation process), final template scores are generated for a single pagination candidate only (that is, the pagination candidate with candidate pages corresponding to the source deck's original pages).

At 1420, application 220 makes a final selection of one or more (pagination candidate, template) pairs. The final selection is based on the final template scores calculate at 1418.

In certain embodiments, application 220 may be configured to select a single (pagination candidate, template) pair-being the pair associated with the best or equal best final template score. In other embodiments, application 220 is configured to select the top n (pagination candidate, template) pairs. In still further embodiments, application 220 may be configured to use the final template scores to determine a distribution of a random selection. For example, the final template scores may be processed using a softmax function to produce a distribution. From this distribution, a single result can be sampled. The temperature of the softmax can be configured based on whether a single best is desired (temp=0), or otherwise how far from the single-best the distribution is to share probability mass.

In some implementations, application 220 may be configured to only select a single (pagination candidate, template) pair. In alternative implementations, application 220 may select a defined number of (pagination candidate, template) pairs. The defined number may be a predefined number of an input provided by the application calling method 1400. For example, the defined number may be 8. In this case, application 220 computes the defined number (e.g. 8) (pagination candidate, template) pairs for each pagination candidate, concatenates the results, orders the results by score, then truncates at the defined number.

At 1422, application 220 generates a new deck descriptor for each (pagination candidate, template) pair selected at 1420. As described below, a new deck descriptor can be used to generate a new deck.

Generally speaking, the new deck descriptor for a particular (pagination candidate, template) pair includes data that allows a primary template to be identified (which may be referred to as the style template). In addition, for each candidate page of the pagination candidate, the new deck descriptor includes:

- data that allows a specific template page to be identified (which may be referred to as the destination page); and
- content map data that maps source content segments (which in this implementation are defined by the candidate page's source objects) to destination elements of the destination page (which in this implementation are defined by the destination page's destination objects).

As discussed further below, the destination page that is identified for given candidate page may be a page of the primary template, but need not be.

Generating a New Deck Descriptor

Figure 15:
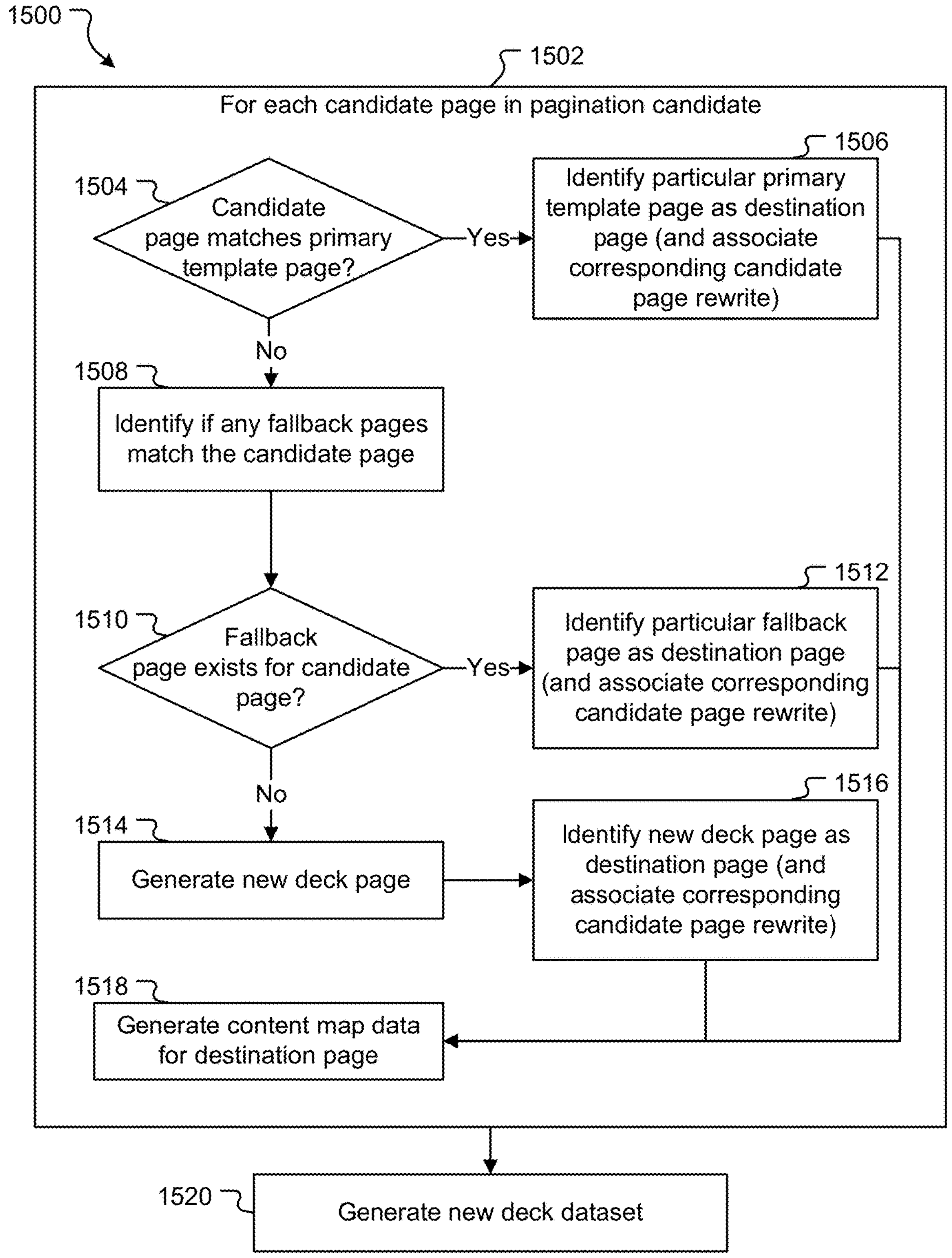
FIG. 15 is a flowchart depicting operations performed to generate a new deck descriptor for a (pagination candidate, template) pair.

Turning to FIG. 15, a method 1500 for generating a new deck descriptor for a particular (pagination candidate, template) pair will be described. In method 1500, the template of the (pagination candidate, template) pair being processed will be referred to as the primary template.

Initially (and as indicated at 1502), application 220 processes each candidate page of the particular pagination candidate. This processing is performed to determine a destination page for the candidate page and to generate content map data that maps the source content segments of the candidate page to the elements of the destination page (which may be referred to as destination elements). Candidate pages may be processed at 1502 in any order (or in parallel).

At 1504, application 220 determines whether the candidate page being processed matches any page of the primary template (i.e. a page the template of the particular (pagination candidate, template) pair being processed). In the present embodiment, application 220 determines that the candidate page being processed matches a page of the primary template at 1506 if one or more rewrites of the candidate page match one or more pages of the primary template. In the present embodiment, this determination may be made with reference to the potential (rewrite, template page) matches identified by application 220 at 1408.

If, at 1504, the candidate page matches a page of the primary template, processing proceeds to 1506. Otherwise, processing proceeds to 1508.

At 1506, application 220 identifies a particular page of the primary template as the destination page for the candidate page. In the present embodiment, application 220 identifies the destination page based on the (rewrite, template page) scores that are calculated at 1416. In particular, application 220 determines the destination page to be the template page that is associated with the optimal (rewrite, template page) score. In the present embodiment, application 220 also associates a particular candidate page rewrite with the destination page (in this case the rewrite associated with the optimal (rewrite, template page) score). This allows the particular rewrite to be easily identified when generating content map data. Processing then proceeds to 1518.

At 1508, the candidate page does not match any page of the primary template. In this case, application 220 determines (over the course of 1508-1516) a destination page for the candidate page that is not a page of the primary template.

At 1508, application 220 identifies potential (rewrite, fallback page) matches. These may be referred to as potential fallback page matches for convenience. Specifically, for each rewrite application 220 identifies which (if any) fallback pages are a potential match for that rewrite. In the present embodiment, application 220 determines whether a particular fallback page is a potential match for a particular rewrite based on the fallback page partition key and the rewrite partition key. Application 220 may make this determination in the same (or a similar) way as determining whether a template page is a potential match for a candidate page rewrite (as described at 1408 above).

At 1510, application 220 determines whether a fallback page exists for the candidate page. A fallback page will exist for the candidate page if at least one rewrite of the candidate page matches at least one fallback page. If a fallback page exists, processing proceeds to 1512. Otherwise processing proceeds to 1514.

At 1512, application 220 identifies a particular fallback page as the destination page for the candidate page. In the present embodiment, application 220 identifies a particular fallback page by initially calculating a score for each (candidate page rewrite, matching fallback page) pair. Application 220 may calculate these scores in the same (or a similar) way to the manner in which (rewrite, template page) scores are calculated (as described above at 1416). Application 220 then selects the fallback page that is associated with the optimal (rewrite, fallback page) score to be the destination page. In the present embodiment, application 220 also associates a particular candidate page rewrite with the destination page (in this case the rewrite associated with the optimal (rewrite, fallback page) score). Processing then proceeds to 1518.

At 1514, no fallback pages have been identified for the candidate page. In this case, application 220 generates a new deck page to be the destination page. The new deck page is generated to accommodate the source content of the candidate page.

Application 220 (or an alternative application) may generate a new deck page in various ways. For example, application 220 may generate the new deck page by generating an element corresponding to each content segment of the candidate page's original rewrite (e.g. an element corresponding to each source object of the candidate page's original rewrite). For a given content segment (as defined by a given source object), application 220 generates an element of the appropriate type—e.g. based on the content-type attribute of the corresponding source object. Each element generated may have default parameters that are set for the element type (e.g. default font properties for a text element). Application 220 may then calculate positions for the new elements. As one example, application 220 may calculate positions so that: each element is horizontally centred on the page; the elements are vertically ordered (e.g. top to bottom) based on reading order (each element's reading order being based on the reading order attribute of the source object that the element corresponds to); and the elements are vertically distributed so that they do not overlap one another. Application 220 may position the elements in alternative ways.

Once a new deck page is generated at 1514, application may save the new deck page as a temporary deck page. The new deck page may be used to generate a new deck in course, but persistent/ongoing storage of the new deck page beyond that is not required.

At 1516, application 220 identifies the new deck page generated at 1514 as the destination page for the candidate page. In the present embodiment, application 220 also associates a particular candidate page rewrite with the destination page (which, in this particular example, is the original rewrite of the candidate page). Processing then proceeds to 1518.

If method 1400 is initiated at 2810 (as part of a deck to deck generation process), alternative processing to 1508, 1510, 1512, 1514, and/or 1516 may be performed in the event that a given candidate page does not match a primary template page at 1504. This difference is due to the fact that in a deck to deck generation process, the source content of the candidate page in question will already include a set of elements with explicit position data (while in a document to deck generation process, the source content document content will not include such data).

By way of example, if a candidate page does not match a primary template page at 1504 in the context of a deck-to-deck generation process, application 220 may retain the original candidate page (or generate a new page with elements based on the elements of the original candidate page). In this case application 220 may also generate an error or warning that causes a message to be displayed to a user that a template page could not be identified for the original deck page that the unmatched candidate page corresponds to.

By way of alternative example, if a candidate page does not match a primary template page at 1504 in the context of a deck-to-deck generation process, application 220 may attempt to identify a fallback page at 1508 (and, if a fallback page is identified, select that fallback page at 1512). If n fallback page is identified, however, application 220 may then retain the original candidate page (or generate a new page with elements based on the elements of the original candidate page). In this case application 220 may also generate an error or warning that causes a message to be displayed to a user that a template page could not be identified for the original deck page that the unmatched candidate page corresponds to.

At 1518, application 220 has identified a destination page (and a particular candidate page rewrite) for the candidate page being processed. Application 220 then generates content map data for the destination page. Generally speaking, the content map data maps each source object of the particular candidate page rewrite (and, therefore, each source object's corresponding source content segment) to a destination object of the destination page (and, therefore, each destination object's corresponding element). Content map data may, for example, be represented as a set of (source object ID, destination object ID) pairs. Two methods for generating content map data are described below with reference to FIG. 21 and FIG. 22.

In some implementations, where a new deck page is generated at 1514 a set of destination objects may be generated for that new deck page so it can be processed at 1518 in the same way as other template pages. In other implementations, however, any new page generated at 1514 may be handled differently (noting that in the present example a new page includes elements that have been specifically created for the source content segments and can be directly mapped to the source content segments).

Once content map data for the destination page has been generated, processing proceeds to 1520. At 1520, application 220 generates the new deck descriptor for the particular (pagination candidate, template) pair. In the present embodiment, application 220 generates the new deck descriptor to include a primary template identifier and a new deck page dataset for each candidate page of the pagination candidate.

The primary template identifier is an identifier of the template of the particular (pagination candidate, template) pair.

The new deck page dataset for a given candidate page of the pagination candidate includes: a candidate page identifier (e.g. the index of the candidate page in pagination candidate's set of candidate pages); a destination page identifier (which identifies the destination page determined for that candidate page at 1506, 1512, or 1516); and the content map data for that candidate page (as generated at 1518).

Different destination page identifiers may be adopted depending on the destination page that has been identified. For example, if the destination page is a page of the primary template (identified at 1506), the destination page identifier may be a single value that identifies the particular page of the primary template (noting the new deck descriptor already includes the primary template identifier). This single value may, for example, be the index of the destination page in the primary template's pages array). Alternatively, if the destination page is a fallback page (identified at 1512), the destination page identifier may be a (template identifier, page identifier) tuple: the template identifier identifying the template that includes the destination page and the page identifier identifying the particular page of that template. Further alternatively, if the destination page is a new deck page (as generated at 1516), the destination page identifier may be value that identifies that single, newly generated page.

Any appropriate data structure (or set of related data structures) may be used for a new deck descriptor. By way of example, each new deck descriptor may be a dictionary such as the following:

```
{
  "primaryTemplateId": "<template identifier>",
  "deckPages": [
    {"candidatePage": "<candidate page identifier>",
    "destinationPage": <page identifier>,
    "contentMap": [. . .]}
    {"candidatePage": "<candidate page identifier>",
    "destinationPage": ("<template identifier>", <page identifier>),
    "contentMap": [. . .]}
  ]
}
```

At 1424, application 220 generates and returns deck generation data. In the present embodiment, the deck generation data is a set (e.g. an array or other set) of the new deck descriptors generated at 1422. Each new deck descriptor corresponds to a (pagination candidate, template) pair selected at 1420 and includes data that can be used to generate a new deck-format design (e.g. as described with reference to FIG. 16 below).

Content Mapping

This section describes two alternative methods (2100 and 2200) for mapping a set of source content segments to a set of destination elements. Method 2100 may be used to map source content segments of any type to destination elements, while method 2200 may be used to map source fills to destination elements in situations where there are more source fills than there are destination elements.

Method 2100 or method 2200 may, for example, be performed at 1518 of method 1500 above in order to generate content map data in respect of a particular candidate page (or candidate page rewrite) and a particular destination template page. In this case, the set of source content segments is defined by a set of source objects that correspond the particular candidate page (or rewrite), and the set of destination elements is defined by a set of destination objects that correspond to a particular template page.

Method 2100 or 2200 may, however, be performed in different contexts in which source content segments and destination elements are alternatively identified and/or defined.

In the present embodiments, method 2100 and method 2200 each generate content map data that includes a set of content map items. Each content map item identifies a source content segment and a destination element. Where source content segments have corresponding source objects and destination elements have corresponding destination objects, each content map item may be a (source object identifier, destination object identifier) pair. Source content segments and destination elements may, however, be identified in other ways—e.g. by array index (or other) values that identify the source content segments and destination elements.

Methods 2100 and 2200 are described as being performed by template match application 220. Methods 2100 and/or 2200 may, however, be performed by alternative applications. As one example, content mapping may be performed client side (e.g. by client application 232).

Figure 21:
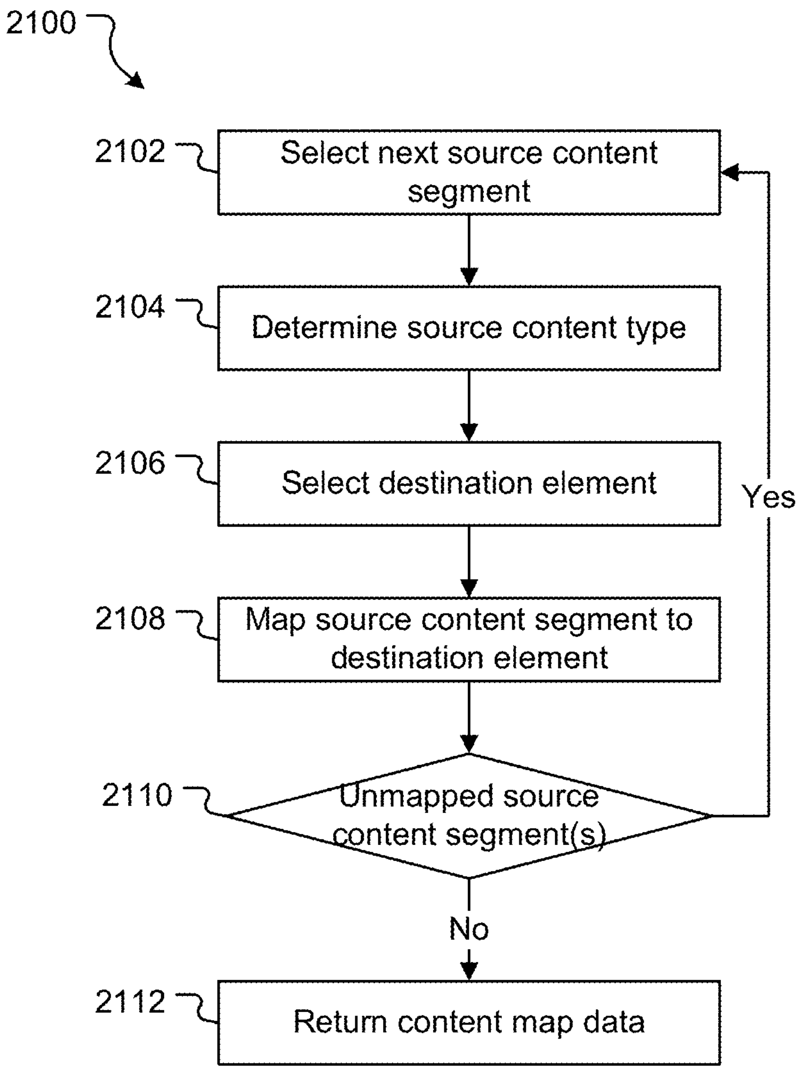
FIG. 21 is a flowchart depicting operations performed to map a set of source content segments to a set of destination elements.

In method 2100 of FIG. 21, application 220 maps the set of source content segments (which may, for example, correspond to a candidate page's source objects) to the set of destination elements (which may, for example, correspond to a destination page's destination objects) based on reading order and content type values.

At 2102, application 220 selects the next source content segment (or the source object corresponding thereto) that has not been mapped to a destination element. Application 220 selects source objects at 2102 in reading order, from earliest in reading order to latest in reading order.

At 2104, application 220 determines the content type of the selected source content segment.

Where the source content segment has a corresponding source object, the reading order and/or content type may be determined based on a reading order and/or type attribute of the corresponding source object. Reading order and content type may, alternatively, be determined based on the source content segment itself (for content type) and the set of source content segments (for reading order). Furthermore, where source content segments are associated with source objects as described above, only source objects with a transfer-content attribute of true are selected at 2102. Source objects with transfer-content attribute of false are ignored.

At 2106, application 220 selects a destination element for the selected source object. Application 220 selects the destination object that has a content type that matches the content type of the source content segment and that is the earliest-in-reading-order element of that content type in the set of destination elements that has not yet had a source content segment mapped to it.

Where the destination element has a corresponding destination object, the reading order and/or content type may be determined based on a reading order and/or type attribute of the corresponding destination object. Reading order and content type may, alternatively, be determined based on the destination element itself (for content type) and the set of destination elements (for reading order). Furthermore, where destination elements are associated with destination objects as described above, only destination objects with a receive-content attribute of true are considered at 2106. Destination elements with receive-content attribute of false are ignored.

At 2108, application 220 maps the selected source content segment to the selected destination element. In the present embodiment, application 220 does so by generating a content map item that includes an identifier of the source content segment (or a corresponding source object) and an identifier of the destination element (or a corresponding destination object). The content map item can then be added to a set of content map items.

At 2110, application 220 determines if there are any unmapped source content segments. If so, processing proceeds to 2102. If not, processing proceeds to 2112.

At 2112, mapping the set of source content segments to the set of destination elements is complete. If required, application 220 may return content map data that includes the set of all content map pairs generated at 2108.

Where method 2100 is performed for a candidate page rewrite (e.g. at 1518), one or more source objects selected at 2102 may be a combined source object (i.e. a source objects that correspond or refer to two or more original source objects). Where a combined source object is selected at 2102, application 220 maps all original source objects of the combined source object to the same (single) destination object.

To illustrate generation of the content map data according to method 2100, consider the candidate page rewrite (which defines a set of source objects that correspond to source content segments) and destination page (which defines a set of destination objects that correspond to destination elements) represented in the tables below:

| Source object index | Candidate page rewrite source objects |
|---|---|
| 0 | "type": "text", "readingOrderIndex": 1, "textHierarchyLevel": 1 |
| 1 | "type": "text", "readingOrderIndex": 2, "textHierarchyLevel": 2 |
| 2 | "type": "text", "readingOrderIndex": 3, "textHierarchyLevel": 2 |
| 3 | "type": "text", "readingOrderIndex": 4, "textHierarchyLevel": 2 |
| 4 | "type": "fill", "readingOrderIndex": 5 |
| 5 | "type": "chart", "readingOrderIndex": 6 |

| Destination object index | Destination page destination objects |
|---|---|
| 0 | "type": "fill", "readingOrderIndex": 1 |
| 1 | "type": "text", "readingOrderIndex": 2, "textHierarchyLevel": 2 |
| 2 | "type": "chart", "readingOrderIndex": 3 |
| 3 | "type": "text", "readingOrderIndex": 4, "textHierarchyLevel": 2 |

-continued

| Destination object index | Destination page destination objects |
|---|---|
| 4 | "type": "text", "readingOrderIndex": 5, "textHierarchyLevel": 1 |

The above tables represent simplified source and destination objects showing type and reading order attribute values only. Further, source objects 2 and 3 are presented in a single row to indicate they are a combined source object in the candidate page rewrite.

In this example, application 220 would:

map source object 0 to destination object 4 (which is the earliest unmapped text-type destination object with text hierarchy level 1);

map source object 1 to destination object 1 (which is the earliest unmapped text-type destination object with text hierarchy level 2);

map source object 2 to destination object 3 (which is the earliest unmapped text-type destination object with text hierarchy level 2);

map source object 3 to destination object 3 (as source objects 2 and 3 are a combined source object);

map source object 4 to destination object 0 (which is the earliest unmapped fill-type destination object); and map source object 5 to destination object 2 (which is the earliest unmapped chart-type destination object).

This mapping may be represented by an array of (source object, destination object) content map items such as:

[(0,4), (1,1), (2,3), (3,3), (4,0), (5,2)]

Method 2100 assumes that each source object has a corresponding destination object that the source object can be mapped to. When method 2100 is performed at 1520, method 2100 will be suitable where partition key fills values for candidate page rewrites and template pages is a numeric value indicating an actual number of source and destination fills.

As noted, however, in alternative embodiments the partition key fills values may instead take a Boolean (or other) value that indicates the presence or absence of source/destination fills but does not indicate the specific number of source/destination fills. In these embodiments, the number of shape-type destination elements of a template page (each shape-type destination element accommodating one or more fills) may be less than the number of fill type source content segments in the candidate page rewrite. If this occurs, method 2100 will not be suitable for mapping fills.

Figure 22:
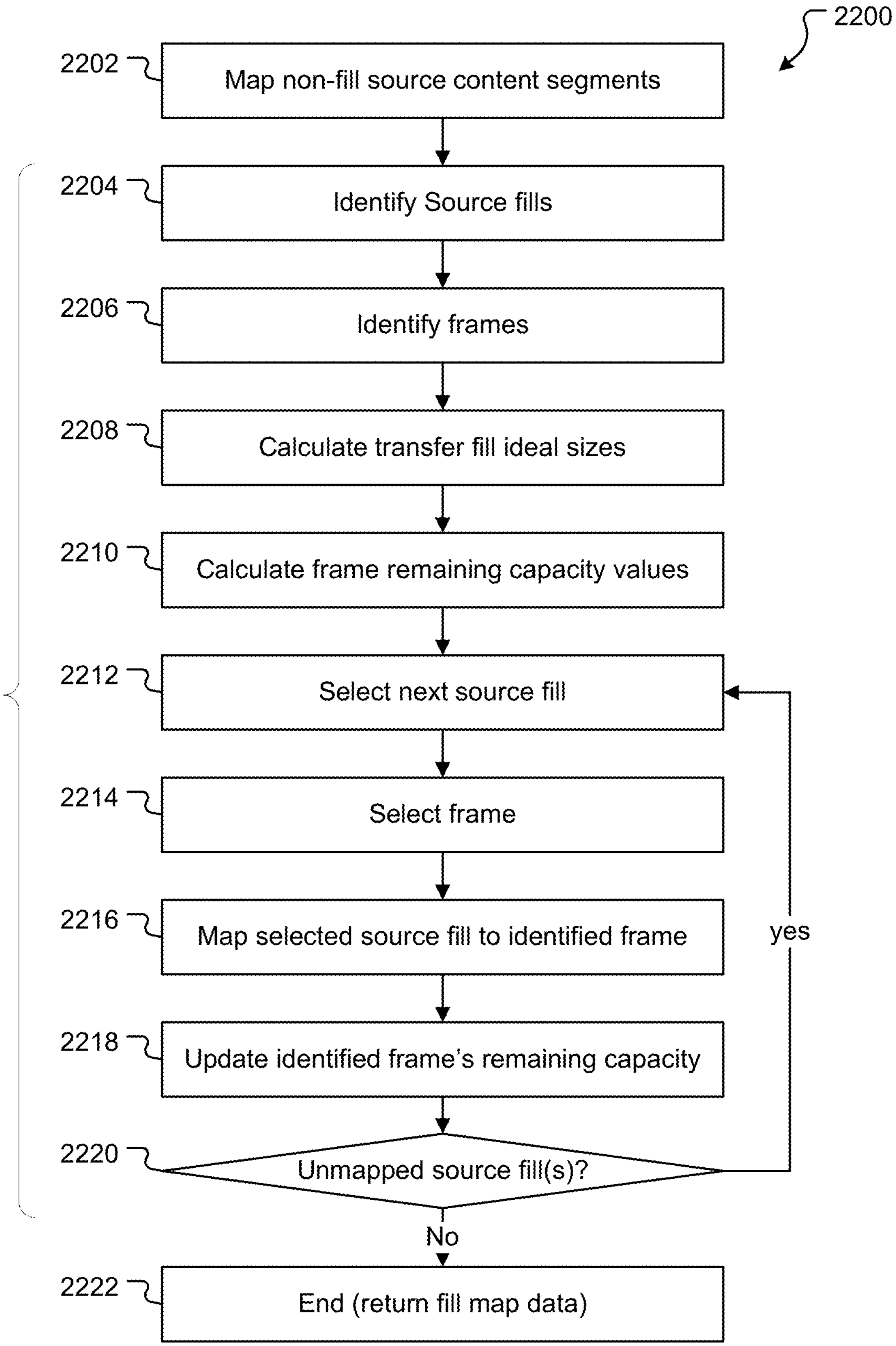
FIG. 22 is a flowchart depicting alternative operations performed to map a set of source content segments to a set of destination elements.

Turning to FIG. 22, an alternative method 2200 for mapping a set of fill type source content segments to a set of destination elements will be described. Method 2200 may be performed in scenarios where the number of source fills that need to be mapped exceeds the number of destination elements that can accommodate fills. For example, when content mapping is performed at 1518 described above, method 2200 may be performed when the primary key fills values are Booleans and a candidate page rewrite's number of fill-type source objects with a transfer content value of true of exceeds the destination page's number of fill-type destination objects with a receive content value of true.

Method 2200 is described with reference to source fills and frames. When method 2200 is performed at 1518, a source fill is a fill of the source design from which content is being transferred (and will have a corresponding fill-type source object) and a frame is a shape-type destination element (which will have a corresponding fill-type destination object).

At 2202, application 220 maps non-fill source content to destination elements. This mapping may be performed based on the reading orders of the non-fill source content segments (or their corresponding source objects) and destination elements (or their corresponding destination objects). For example, application 220 may map non-fill source content according to the operations of method 2100 as described above.

In order to map fill-type source content segments, application 220 performs a fill mapping process 2203 (which includes processing blocks 2204 to 2220).

At 2204, application 220 analyses the set of fill type source objects to identify a set of source fills. The set of source fills may be all fills defined by the set of source content segments or a subset of those fills. For example, where method 2200 is performed at 1518, application 220 will ignore any fills defined by source objects having a transfer content attribute value of false.

At 2206, application 220 identifies a set of one or more frames that the source fills are to be transferred to. In the present example, a frame is a destination element that can accommodate a source fill.

In the context of the present disclosure, a shape-type element defines (or is) a frame. Furthermore, if a shape-type destination element defines multiple separable fills (e.g. a grid of fills), each separable fill (e.g. each cell of that grid) will be considered a frame. Where method 2200 is performed at 1518, application 220 may be configured to determine that each fill-type destination object with a receive-content attribute of true is a frame.

At 2208, application 220 calculates an ideal size for each source fill identified at 2204. A source fill's ideal size is a measure of the proportion of space the source fill would ideally occupy given the available space provided by the frames and the space required by the set of source fills. In the present embodiment, a source fill's ideal size is calculated as:

Ideal size=source fill size*(sum frame sizes/sum source fill sizes)

Where:

Source fill size=the size of the source fill for which the ideal size is being calculated. A source fill's size is calculated as (source fill width*source fill height).

Sum frame sizes=the sum of the frame sizes for all frames identified at 2206. A frame's size is calculated as (frame width*frame height).

Sum source fill sizes=the sum of the source fill sizes for all source fills identified at 2204.

At 2210, application 220 calculates a remaining capacity for each frame identified at 2206. Initially, each frame's remaining capacity is its total capacity, which is calculated as (frame height*frame width). Where a frame corresponds to a shape-type element, the frame capacity is the element width*element height.

At 2212, application 220 selects a next source fill that is to be assigned (or mapped) to a frame. Application 220 selects source fills in order of largest ideal size to smallest. I.e. in the first iteration, application 220 selects the source fill with the largest (or equal largest) ideal size, in the second iteration, application 220 selects the source fill with the next largest (or equal largest) size and so forth.

At 2214, application 220 selects a frame for the selected source fill. Application 220 is configured to select the frame as the frame that has the greatest remaining capacity.

At 2216, application 220 maps the selected source fill to the selected frame. This may be performed in various ways but generally involves associating an identifier of the selected source fill with an identifier of the selected frame. As one example, in the context of the present disclosure, application may map the source object that corresponds to the source fill to the destination object that corresponds to the destination frame. In this case, mapping is performed by creating a (source object identifier, destination object identifier) content map item and adding this to a result set.

At 2218, application 220 updates the selected frame's remaining capacity. In the present embodiment, application 220 does this by subtracting the ideal size of the selected source fill from the current remaining capacity value of the selected frame—e.g.:

Remaining capacity=remaining capacity−selected source fill ideal size.

Updating a frame's remaining capacity may cause the remaining capacity to be less than zero.

At 2220, application 220 determines if any of the source fills identified at 2204 have not yet been mapped to a frame. If so, processing proceeds to 2212 to select the next source fill.

If all source fills have been mapped to a frame, method 2200 is complete (as indicated at 2222). If required, content map data may be returned that includes content map items in respect of any non-fill source content segments (generated at 2202) and content map items in respect of source fills (generated at 2216).

To illustrate method 2200, consider a set of three source fills identified at 2204 and a set of two frames identified at 2206 as follows:

Source fill SF 1: 900×700,

Source fill SF 2: 400×500,

Source fill SF 3: 100×300

Frame F1: 500×500

Frame F2: 700×400

For this example, source fill ideal sizes calculated at 2208 are as follows:

| Source fill | SF height | SF width | SF size | SF Ideal size |
|---|---|---|---|---|
| SF 1 | 900 | 700 | 630000 | 388,255.81 |
| SF 2 | 400 | 500 | 200000 | 123,255.81 |
| SF 3 | 100 | 300 | 30000 | 18,488.37 |

For this example, frame remaining capacity values calculated at 2210 are as follows:

| Frame | Frame height | Frame width | Remaining capacity |
|---|---|---|---|
| F1 | 500 | 500 | 250,000 |
| F2 | 700 | 400 | 280,000 |

In a first iteration, application 220: selects source fill SF1 (having the largest ideal size) at 2212; identifies frame F2 at 2214; maps SF1 to F2 at 2216; and update's F2's remaining capacity at 2218 as follows:

| Frame | Frame height | Frame width | Remaining capacity |
|---|---|---|---|
| F1 | 500 | 500 | 250,000 |
| F2 | 700 | 400 | −108,255.81 |

In the second iteration, application 220: selects source fill SF2 (having the next largest ideal size) at 2212; identifies frame F1 at 2214; maps SF2 to F1 at 2216; and update's F1's remaining capacity at 2218 as follows:

| Frame | Frame height | Frame width | Remaining capacity |
|---|---|---|---|
| F1 | 500 | 500 | 126,744.19 |
| F2 | 700 | 400 | −108,255.81 |

In the third iteration, application 220: selects source fill SF3 at 2212; identifies frame F1 at 2214; maps SF3 to F1 at 2216; and update's F1's remaining capacity at 2218 as follows:

| Frame | Frame height | Frame width | Remaining capacity |
|---|---|---|---|
| F1 | 500 | 500 | 108,255.81 |
| F2 | 700 | 400 | −108,255.81 |

No unmapped source fills remain at 2220, and at 2222 fill map data such as the following is returned (with appropriate identifiers used to identify the source fills and frames):

[(SF1, F2), (SF2, F1), (SF3, F1)]

New Deck-Format Design Generation

Figure 16:
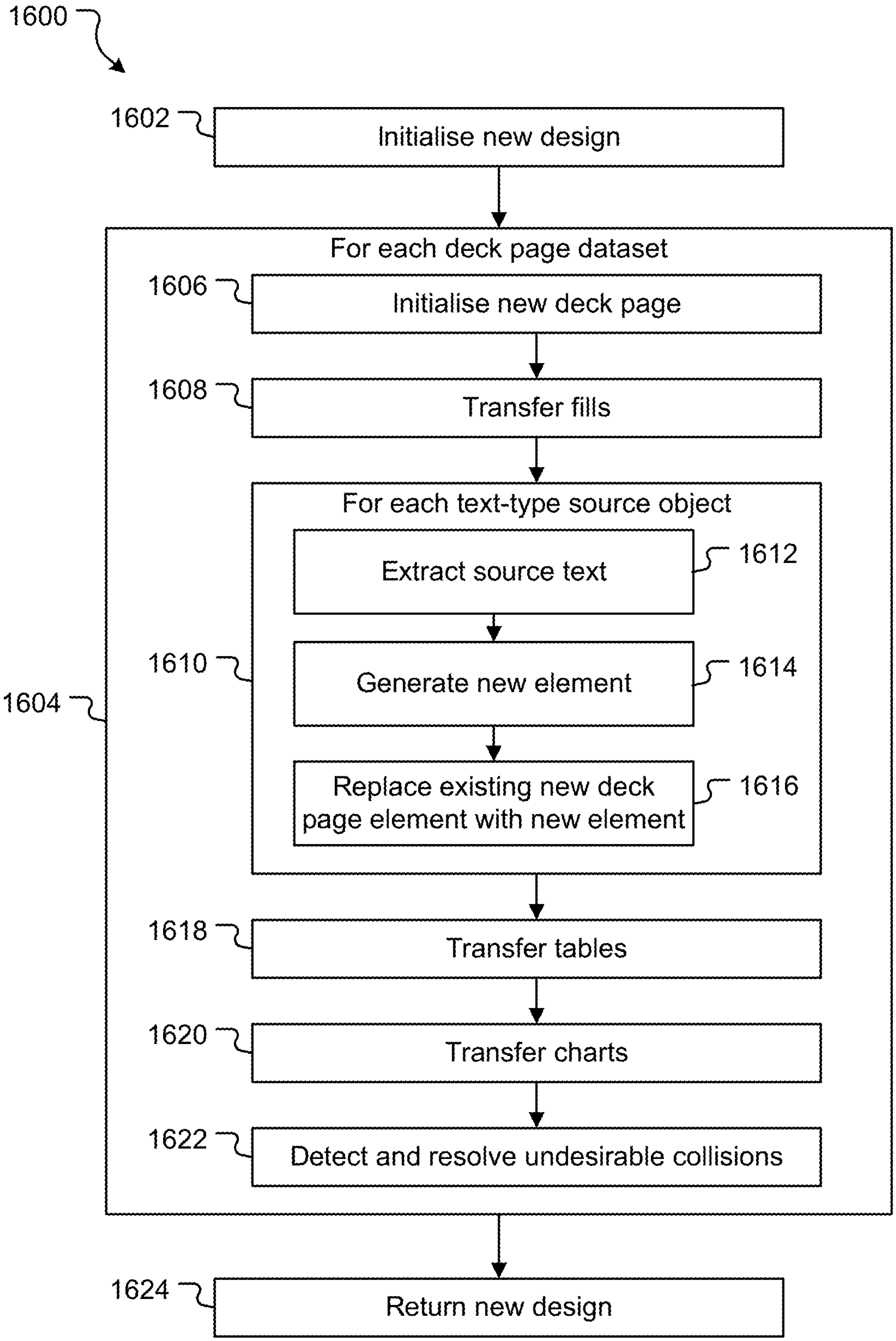
FIG. 16 is a flowchart depicting operations performed to generate a new deck-format design.

Referring to FIG. 16, an example method 1600 for generating a new deck-format design will be described.

Method 1600 may be performed as part of a document to deck generation process (e.g. at 618 of method 600 described above). Method 1600 may also, or alternatively, be performed as part of a deck to deck generation process (e.g. at 2816 of method 2800 described below).

In the present example, method 1600 is described as being performed by client application 232 (referred to as application 232 in this section for convenience). In particular, in the present embodiment method 1600 is performed by the content transfer module 234. The processing described may, however, be performed by one or more alternative applications or modules (running on client system 230 and/or at server environment 210).

In the present embodiment, method 1600 takes as input (or has access to) a new deck descriptor (which is included in deck generation data). As described above, the new deck descriptor includes a primary template identifier and a set of one or more new deck page dataset. Each new deck page dataset includes a candidate page identifier, a destination page identifier and content map data.

If, at 618 of method 600, multiple new deck-format designs are to be generated (each being based on a new deck descriptor), method 1600 may be performed for each new deck descriptor sequentially or in parallel.

Method 1600 is described as being performed with reference to a source design. If method 1600 is being performed as part of method 600 described above, the source design will be a source document (i.e. a document-format design) and each source object defined in the new deck page dataset will identify content segment of that source document. If method 1600 is being performed as part of method 2800 (as discussed further below), the source design will be a source deck (i.e. a deck-format design) and each source object defined in the new deck page dataset will identify an element (or part of an element's content) of that source deck.

At 1602, application 230 initialises a new deck-format design (referred to as the new deck). In the present embodiment, the new deck is initialised based on (and includes relevant data from) the primary template identified by the primary template identifier.

By way of example, and referring to the example deck record format described above, application 230 may initialise the new design to have: a new (automatically generated) deck identifier; dimensions that are the same as those of the primary template; and page data that is initially empty. In some embodiments, the new design may also include an associated template attribute which is populated with data that identifies the primary template on which the new deck is based.

Following 1602, and as generally indicated at 1604, application 230 processes each deck page dataset in the new deck descriptor being processed to generate a corresponding new deck page. The deck page datasets may be processed in any order or in parallel. In the present embodiment, processing a selected deck page dataset to generate a corresponding new deck page involves operations 1606 to 1622.

At 1606, application 230 initialises a new deck page. In the present embodiment, application initialises the new deck page by creating a copy of the destination page that is identified by the destination page identifier of the selected new deck page dataset.

Following initialisation of the new deck page at 1606, application 230 transfers source content to the new deck page initialised at 1606. Generally speaking, the content transfer process uses the content map data to map source objects (and, therefore, the corresponding source content segments) to destination objects (and, therefore, the corresponding destination elements). Each destination element is then edited (or replaced with one or more replacement elements) based on the source content segment(s) that correspond to the destination element.

In the present embodiment, application 230: transfers fill-type source objects (or source fills) at 1608; transfers text-type source objects (or source text) at 1610; transfers table-type source objects (or source tables) at 1618; and transfers chart-type source objects (or source charts) at 1620. The processing described at each of these stages is described below. While the source content transfer processing is described in a particular order, the different types of source content could be transferred in an alternative order.

At 1608, application 230 transfers any source fills (which may correspond to fill-type source objects).

In the present disclosure, two general scenarios exist for transferring fills. In one scenario, the number of source fills matches the number of destination fills. This may be the case, for example, when the partition key fills values for template pages and candidate pages record an actual number of fills (or fill-type source/destination objects). In the other scenario, the number of source fills may be different to the number destination fills. This may be the case, for example, when the partition key fills values for template pages and candidate pages record a Boolean (or other) value that indicates whether one or more fills are present rather than the actual number of fills.

In the present example, where the number of source fills matches the number of destination fills, the content map data will map each source fill to a specific shape-type destination page element—e.g. per content map data that is generated according to method 2100 described above. In this case, application 230 may transfer source fills by processing each fill-type source object in turn. For a selected fill-type source object, application 230 identifies (via the content map data) the relevant fill-type destination object which will, in turn, identify a shape-type element of the design page. Application 230 then updates the content data of the shape-type element that has been identified based on the source fill.

When transferring a source fill to a destination element, if the size and/or aspect ratio of the source fill do not match those of the destination element application 230 may adjust the source fill (or relevant attributes in respect thereof) so it occupies the entire area of the destination element. For example, application 230 may uniformly resize the source fill (i.e. without changing the source fill's aspect ratio) so that its shortest dimension (e.g. height or width) is equal to the corresponding dimension of the destination element and centre the source fill in the destination element.

If the number of source fills does not match the number of destination page fills (and, in particular, if the number of source fills is greater than the number of destination fills), the content map data may map multiple source fills to a single destination fill. Such content map data may be generated according to method 2200 as described above. In this case, application 230 may transfer source fills by processing the content map data to identify: any destination fills that have a single source fill mapped to them; any destination fills that have a no source fill mapped to them; and any destination fills that have multiple source fills mapped to them.

For each destination fill that has a single source fill mapped to it, application 230 may transfer the single source fill to the destination fill as described above—e.g. by identifying the relevant destination element and transferring the single source fill to that element.

For each destination fill that has no source fill mapped to it, application 230 may be configured to identify and delete the relevant destination element. Alternatively, application 230 may be configured to retain the destination element with its original fill or to retain the destination element but replace its original fill with a default fill. The default fill may, for example, be designed to be eye catching (e.g. via use of colours, animations, words, and/or other visual features) so a user can easily identify it as an original template fill that was not replaced.

For each destination fill that has multiple source fills mapped to it, application 230 may perform processing to transfer the multiple source fills to the single destination element. An example method 2300 for doing so is described below with reference to FIG. 23.

At 1610, application 230 transfers text-type source content (which may correspond to text-type source objects). In the present embodiment, this involves processing each text-type source object—or each content map record in respect of such an object-according to processing blocks 1612, 1614, and 1616.

Processing blocks 1612, 1614, and 1616 will be described with reference to source text content and a destination element. The source text content is the text of a text-type source content segment that may have a corresponding source object. The destination element may have a corresponding destination object, and is the element that is mapped to the source content segment by the content map data.

At 1612, application 230 extracts the text-type source text content. In the present embodiment, application 230 extracts the source content by generating a text content object that corresponds to the source content. An example text content object is below (though it will be appreciated that different attributes and/or different formats are possible):

```
TextContent: {
characters: <. . .>,
   readingOrderIndex: <. . .>,
   textHierarchyLevel: <. . .>,
   listLevel: <. . .>,
   listMarkerType: <. . .>,
}
```

In this example, the characters attribute of the text content object defines the actual text characters of the source content segment. The text characters may, for example, be identified based on the source identifier attribute of the source object in question and (unless stored as part of that source object) retrieved from the source design using that identifier.

In certain embodiments, application 230 is configured to trim certain white space characters from source text when extracting it. This may include, for example trimming leading and trailing " " (space) characters from a paragraph of text. E.g. if the source content is text such as "Here. \n", application 230 may trim the leading and trailing space characters to result in extracted characters of "Here.\n".

In the present embodiment, when extracting text characters application 230 is configured to preserve certain predefined inline format attributes of the source text. In particular, application 230 may preserve inline format attributes such as bold, italic, underline (and/or other attributes) which may be used to emphasise particular words or phrases. Application 230 may also preserve other inline formatting such as links.

In the present embodiment, application 230 is also configured to include certain text metadata in the text content object. This may include, for example, metadata defining: what list-level the text is (if any); what list-markers (if any) have been used; what hierarchy level the text is (which, in this example, can be extracted from the source object); and what the reading order index of the text is (which, in this example, can be extracted from the source object).

As described above, in certain circumstances a source object may be a combined source object that maps to two or more original source objects. When extracting text characters from a combined source object, application 230 processes each original source object in turn to extract the relevant text and append it to any text already extracted from previous original source objects. When appending the text from an original source object to text that has already been extracted application 230 may create a new paragraph (or new list item or the like as is relevant)—e.g. by inserting a leading newline character to the text before appending it.

At 1614, application 230 generates a new element.

In the present example, to generate the new element application 230 initially creates a copy of the destination element that the selected source content segment has been mapped to. The copy includes the original destination element's attributes (e.g. content, size, position, rotation, format, etc.).

Application 230 then updates the new element's data. Updating the new element's data includes replacing the element's original content (i.e. the text of the original destination element) with the text of the source content segment being processed.

In the present embodiment, when generating the new text element at 1614 application 230 determines if list attributes of the new element need to be updated and, of so, updates those attributes. For example, if list attributes of the source content segment define a bulleted list but the destination element originally defined basic text (i.e. not a list), the list attributes of the new element are updated to indicate a bulleted list. Conversely, if list attributes of the source content segment define basic text but the destination element list attributes originally defined a bulleted list, the list attributes of the new element are updated to indicate basic text.

In the present embodiment, when generating the new text element at 1614 application 230 also analyses the source content segment and the destination element to determine whether one or more inline/block format collisions exist. In the present context, an inline/block format collision may occur if relevant inline formatting of the source text would be overridden by an original block level format attribute of the new element. If application 230 determines that an inline/block format collision exists it updates the new element to remove the block level format attribute that creates the collision.

To illustrate inline/block format collisions, consider source content text of "I am very happy" (with inline formatting attributes set so the word "very" is in bold) and a destination element for that source content that has a block level attribute set so that all text of the destination element was bold. In this case, application 230 would remove the block level bold attribute from the destination element. If this was not done, then the destination element would display the entire source content text in bold, thus losing the original emphasis of the word "very".

Application 230 may be configured to analyse various inline format attributes when determining whether one or more inline/block level format collisions exist, for example attributes that define one or more of: bold font; italics font; underlined font; strikethrough font; font colour; and/or other font formats.

At 1616, application 230 replaces the relevant element of the new deck page (e.g. the destination element identified by the destination objection of the content map item) with the new element generated at 1614. That is, application 230 deletes the original destination element and inserts in its place the new element. In the context of the example deck-format and destination objects described above, the new deck page will include an array of design element records and the destination object will identify one of those design element records (e.g. by an array index). In this case replacing the destination element of the new deck page includes replacing the design element record at the index indicated by the destination ID of the destination object.

Once all text-type source content segments have been transferred, processing proceeds to 1618.

At 1618, application 230 transfers source tables (which may correspond to table-type source objects).

Application 230 may transfer source tables in various ways. For example, for each source table application 230 may: extract the source table content (e.g. in a similar manner to 1612); generate a new element based on the destination element that the source table is mapped to and the extracted table content (e.g. in a similar manner to 1614); and replace the original destination element with the new element (e.g. in a similar manner to 1616).

In certain implementations, application 230 may be configured to transfer a table in accordance with method 2500 as described below with reference to FIG. 25 (or in accordance with a similar method).

At 1620, application 230 transfers source charts (which may correspond to chart-type source objects).

Application 230 may transfer source charts in various ways. For example, for each source chart application 230 may: extract the source chart content (e.g. in a similar manner to 1612); generate a new element based on the destination element that the source chart is mapped to and the extracted chart content (e.g. in a similar manner to 1614); and replace the original destination element with the new element (e.g. in a similar manner to 1616).

In certain embodiments, application 230 generates a new chart based on the source chart and the destination chart according to method 3100 described below with reference to FIG. 31.

In the examples above, transferring content involves generating new elements that correspond to original elements of the destination page (e.g. at 1614) and then replacing the original elements with those new elements. In alternative embodiments, application 230 may instead edit the relevant elements of the new deck page as required (excepting where a single deck page element may need to be replaced by multiple new elements, for example when multiple source fills map to a single destination fill).

A possible result of transferring text-type source content to the new deck page at 1610 is that one or more undesirable element collisions may be introduced. In particular, transferring source text may result in a text element of the new page occupying a larger area than it originally did (due to there being more source text than the element originally accommodated). In order to address this, application 230 analyses the new deck page to detect and resolve any undesirable collisions at 1622. Generally speaking, this involves detecting what are referred to as undesirable element collisions (where pairs of elements that did not overlap or extend too close to one another in the original template page do so following the content transfer) and undesirable page collisions (where an element extends off or too close to an edge of the page). Such collisions are then resolved by shrinking the text of one or both elements in question.

While detecting and resolving undesirable conflicts is described as being performed once all source content has been transferred this could be performed at any time after text-type source content segments have been transferred.

An example method 1700 for detecting and resolving undesirable collisions is described with reference to FIG. 17.

Following detection and resolution of undesirable collisions, generation of the new deck page is complete. Once all new deck pages have been generated, the deck is returned at 1624.

In certain embodiments, additional operations may be performed on a new deck prior to the deck being returned. For example, in some cases the primary template which is used to generate a new deck may be associated with a colour pallet (e.g. a defined set of colours that are used in the template and are typically complimentary). In this case, the deck generated at 1602 and 1604 may be recoloured using the template colour palette. Such recolouring may, for example, be performed in accordance with a method such as method 500 described in Australian patent application 2021273643, filed on 26 Nov. 2021 and titled "Systems and methods for automatically recolouring a design". In this case, the colour palette associated with the primary template and the deck generate at 1602 and 1604 of the present disclosure may be used as the input colour palette and input design of method 500 of Australian patent application 2021273643.

Element Collision Detection and Resolution

Figure 17:
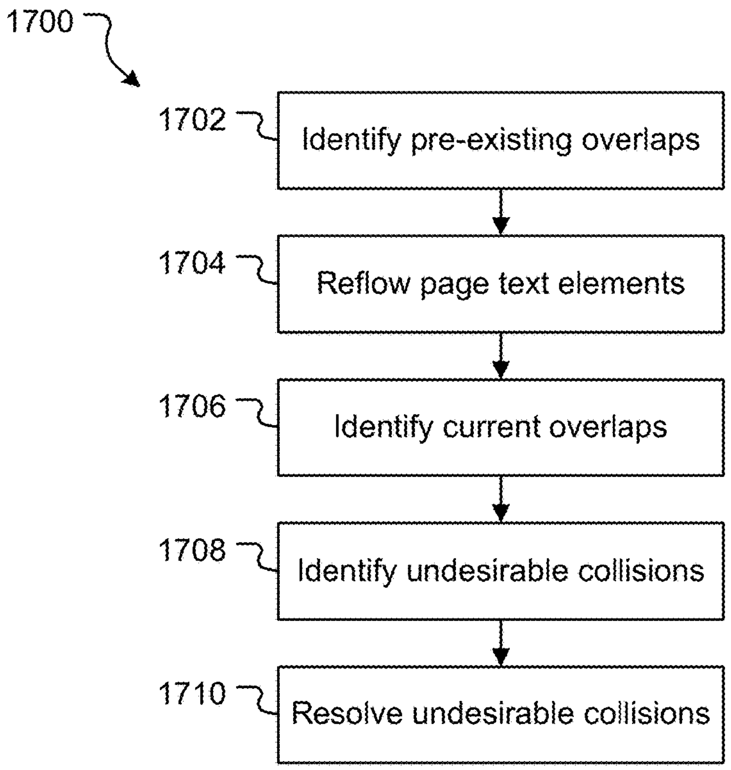
FIG. 17 is a flowchart depicting operations performed to detect and resolve undesirable element collisions.

Turning to FIG. 17, a method 1700 for detecting and resolving undesirable element collisions will be described.

Method 1700 may, for example, be performed at 1622 of method 1600. Method 1700 may, however, be performed in other contexts. For example, method 1700 may be performed following a user (human or programmatic) editing the text of one or more text elements of a designs page in order to determine whether those edits have resulted in any undesirable collisions (and, if so, to automatically resolve those collisions).

At 1702, application 230 identifies any pre-existing overlaps.

When method 1700 is performed at 1622 of method 1600, a pre-existing overlap is an overlap present in the original template page that the new template page corresponds to.

When method 1700 is performed in the context of text edits having being made to a design page, a pre-existing overlap is an overlap that was present in the design page before the text edits being made.

In order to identify pre-existing overlaps, application 230 analyses the page elements with reference to their original sizes and positions. In particular, application 230 analyses original element bounding boxes—that is, the bounding boxes of the page's elements as they were in the original template page on which the new deck page is based. In the present embodiment, in order to identify pre-existing overlaps application 230 analyse the elements of the new deck page following the content transfer performed at 1610 (noting that although content has been transferred no element sizes have yet been altered). In alternative embodiments, application 230 could be configured to identify pre-existing overlaps by analysing the elements of the original deck page on which the new deck page was based.

In the present embodiment, application 230 is configured to identify two general types of overlaps. These are referred to as element overlaps and page overlaps. An element overlap occurs when one element extends into another element (or into a defined element margin around that element). A page overlap occurs when an element extends beyond the edge of the page (or into a defined page margin).

In order to identify pre-existing overlaps, application 230 may process each element of the page in turn (or in parallel). For each element, application 230 determines any element overlaps that the element is involved in and any page overlaps that the element is involved in.

In the present embodiment, in order to determine element overlaps for a selected element application 230 performs a pair-wise analysis of a selected element with each other element on the page. In the present context, application 230 will determine that a selected element (e.g. a first element E1) is involved in an element overlap with another element (e.g. a second element E2) if any one of the following conditions are met:

$$E1\ \min Y <= E2\ \max Y + \text{element margin}$$

$$E1\ \max Y >= E2\ \min Y - \text{element margin}$$

$$E1\ \min X <= E2\ \max X + \text{element margin}$$

$$E1\ \max X >= E2\ \min X - \text{element margin}$$

In this example, application 230 is configured to take into account an element margin when determining element overlaps. Any appropriate element margin value may be used. For example an element margin of 50 pixels may be used. In alternative embodiments application 230 need not take into account an element margin in determining element type collisions.

In the present embodiment, if application 230 determines that an element (e.g. E1) overlaps another element (e.g. E2) it also determines a type of overlap: a contained overlap (indicating that element E1 is entirely contained within element E2) or a partial overlap (indicating element D1 overlaps but is not entirely contained within element E2). Application 230 may determine that a first element E1 is contained entirely within (or coterminous with) a second element (E2) if all of the following conditions are met:

$$E1\ \mathrm{min}Y >= E2\ \mathrm{min}Y$$

$$E1\ \mathrm{max}Y <= E2\ \mathrm{max}Y$$

$$E1\ \mathrm{min}X >= E2\ \mathrm{min}X$$

$$E1\ \mathrm{max}X <= E2\ \mathrm{max}X$$

In order to determine page overlaps for a selected element, application 230 determines whether any edges of the selected element's bounding box extend beyond an edge of the page (or, in the present embodiment, into a page margin). In the present context, application 230 determines page overlaps as follows:

| Element overlaps with | If |
|---|---|
| Top page edge | minY < 0 + page margin |
| Bottom page edge | maxY > page height − page margin |
| Left page edge | minX < 0 + page margin |
| Right page edge | maxX > page width − page margin |

In this example, application 230 is configured to take into account a page margin when determining page overlaps. Any appropriate page margin value may be used. For example a page margin of 100 pixels may be used. Alternatively, the page margin value may be set to the same value as the element margin value. In alternative embodiments application 230 need not take into account a page margin in determining page type overlaps.

In the present embodiment, application 230 records each pre-existing overlap that is identified (if any) in a pre-existing overlaps dataset. A simplified example of such a dataset is described below, however pre-existing overlaps may be recorded in other ways.

```
pre-existingOverlaps: {
  elementOverlaps: {
    shape-E1: [(text-E2, partial)],
    text-E2: [(shape-E1, partial)],
    shape-E3: [(text-E4, partial)],
    text-E4: [(shape-E3, contained)],
    text-E5: [ ]
  }
  pageOverlaps: {
    shape-E1: [ ],
    text-E2: [ ],
    shape-E3: [ ],
    text-E4: [ ],
    shape-E5: [bottomEdge]
  }
}
```

In this example, the pre-existing overlaps dataset includes a set of element overlap records (recording all pre-existing element overlaps identified) and a set of page overlap records (recording all pre-existing page overlaps identified).

Each element overlap record is a key-value pair. The key identifies a particular page element (e.g. by its element array index or an alternative identifier) and, in this example, the element type. The value of a given element overlap records identifies each element (if any) that the key element overlaps (in this example in an array of element identifiers). In this example, for each element that the key element overlaps with, the overlap type is recorded—in particular a value indicating a partial overlap or a contained overlap.

Each page overlap record is also a key-value pair. The key identifies a particular page element and, in this example, the element type. The value of a given page overlap record identifies the page edge(s) that the key element overlaps (in this example an array of page edge identifiers).

Figure 18:
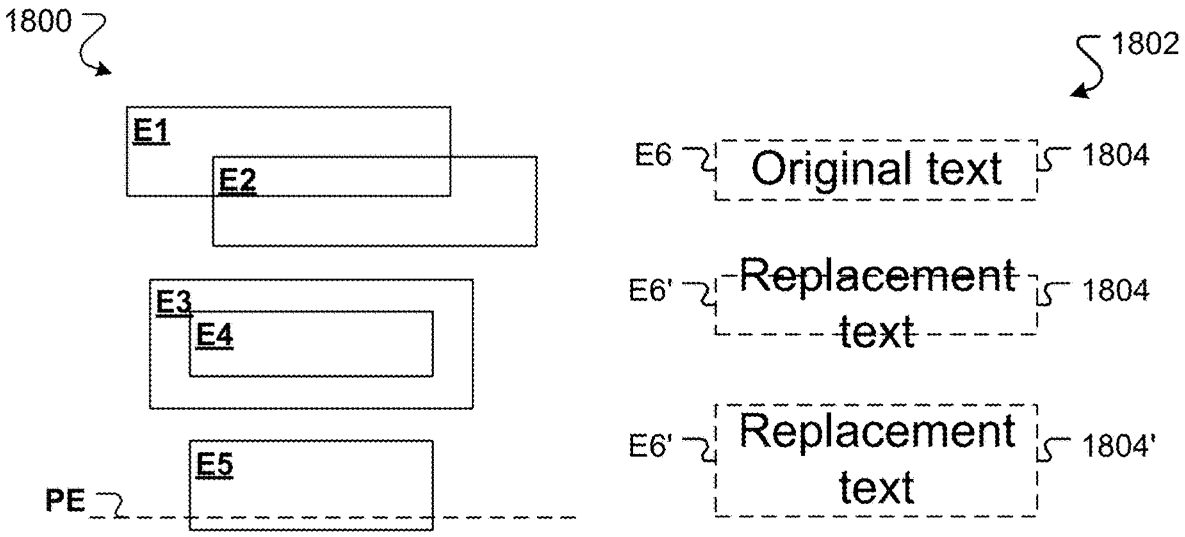
FIG. 18 depicts various element layout examples to illustrate element overlaps and collisions.
Figure 18:
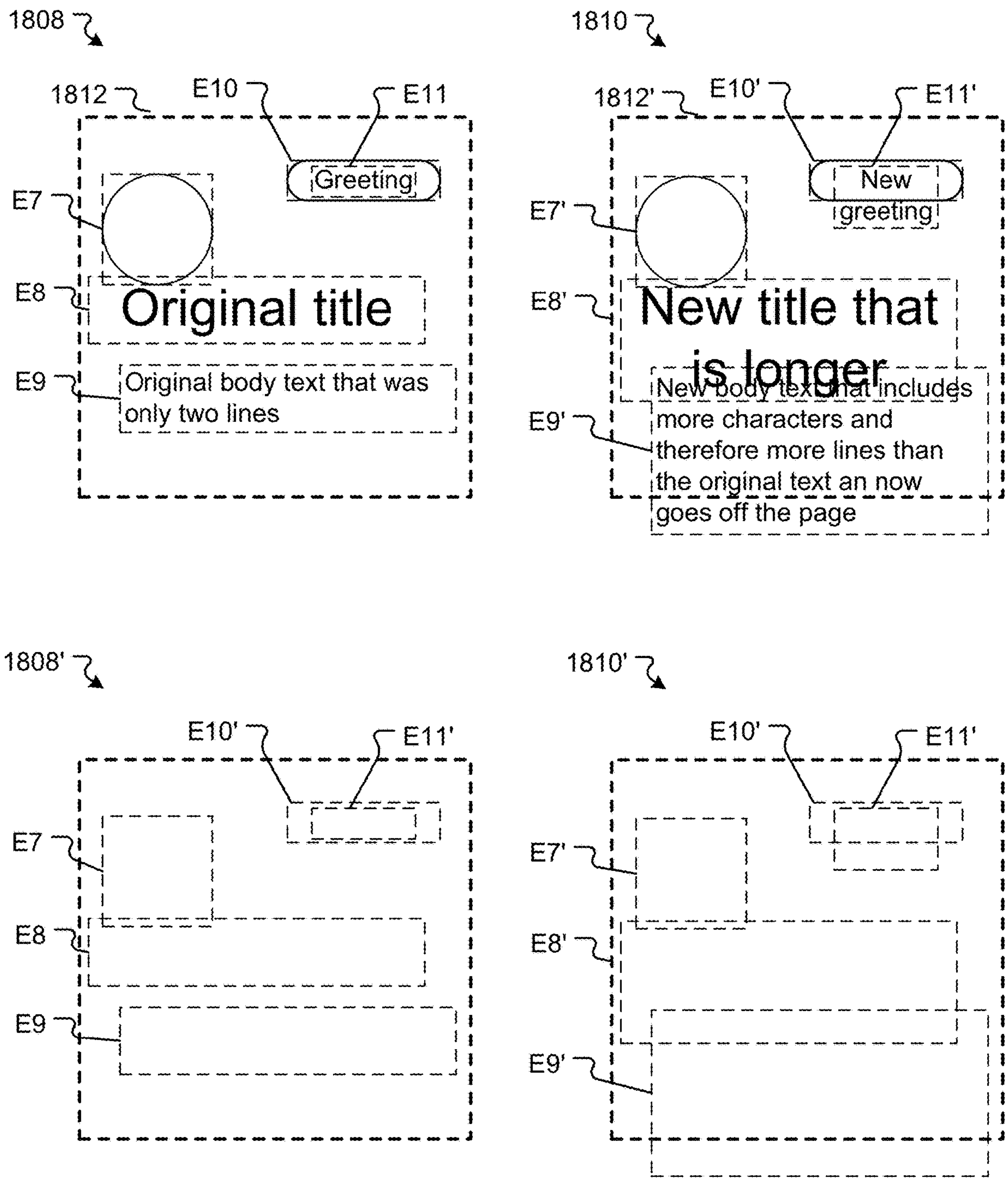
Figure 18:
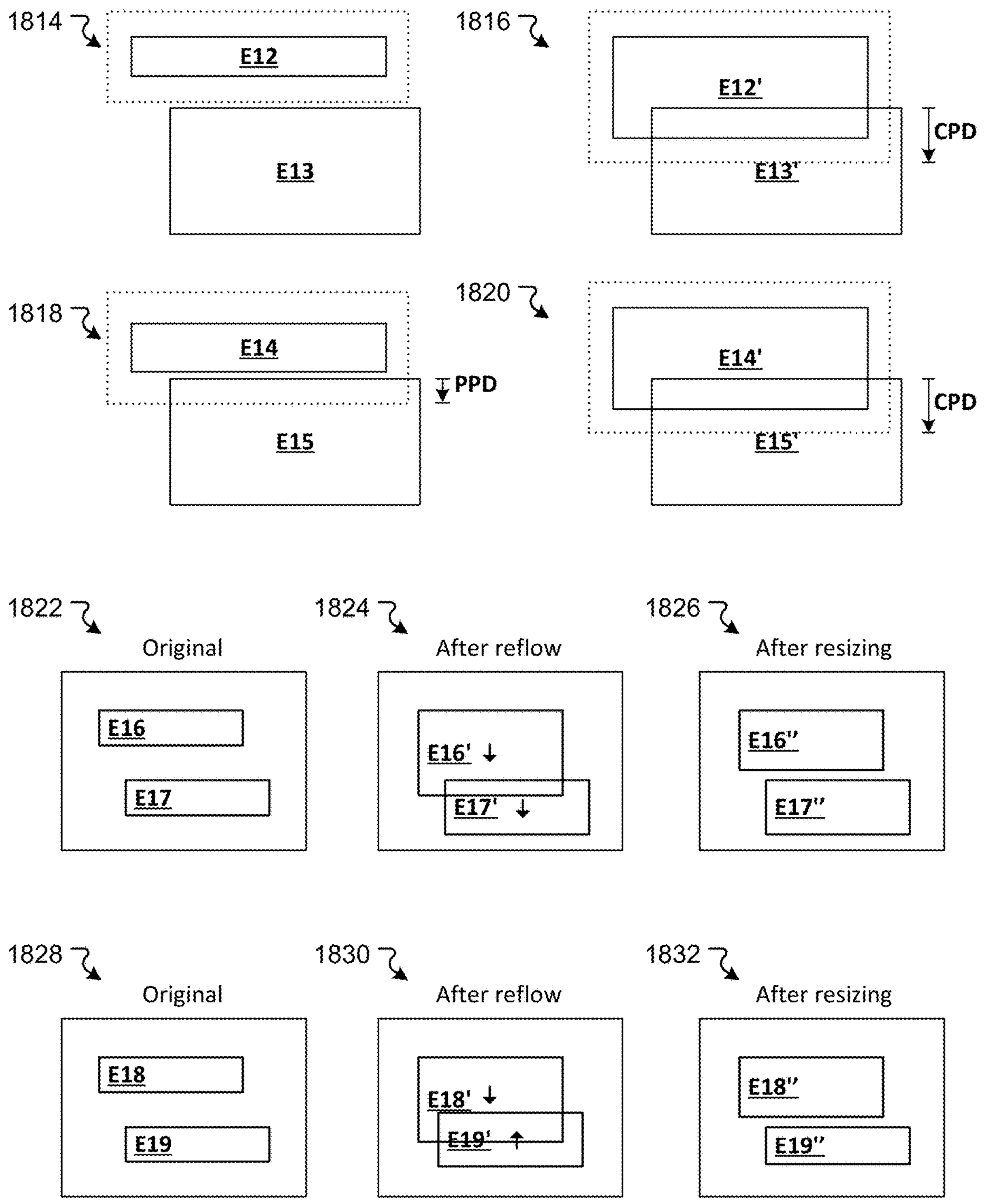

The element and page overlaps of the above table are illustrated in example 1800 of FIG. 18, which depicts: elements E1 and E2 partially overlapping one another; element E4 being contained within element E3; and element E5 extending over the bottom page edge (PE).

At 1704, application 230 performs a reflow operation on the text elements of the new page (i.e. the new text elements as generated/added at 1610). Generally speaking, the reflow operation serves to recalculate the bounding box for each text element on the new page based on its content (as updated during the content transfer performed at 1610).

By way of example, application 230 may calculate a new bounding box for a text element based on the actual text content (following transfer) and the space that content occupies. This, in turn, may be based on the text characters and relevant text format attributes (e.g. font size, font family, list attributes, and/or any other relevant attributes that impact the space that text occupies).

If application 230 calculates a new bounding box for a text element (which may be smaller or larger than the element's original bounding box), application 230 updates the relevant attributes of that element's record (e.g. the size (width and height) attributes).

To illustrate reflowing, consider example 1802 of FIG. 18 which depicts: a text element (E6) before content transfer (i.e. the original element); the new element (E6') that corresponds to element E6 after content transfer but before the reflow process; and the new element E6' after the reflow process. As can be seen, the bounding box 18-4 of original element E6 encompasses the original text. Following the content transfer (and prior to the reflow operation), the text of new element E6 extends beyond the bounding box 1804 (which, prior to reflow, is the original element's bounding box). Following the reflow operation, a new bounding box 1804' has been determined for new element E6' (the new bounding box sized according to the new text).

At 1706, and after the page elements have been reflowed, application 230 processes the updated page elements to identify current overlaps.

In the present embodiment, application 230 identifies current overlaps in the same (or a similar) way as pre-existing overlaps are identified at 1702: the exception being that instead of the analysis being based on the elements' original bounding boxes (e.g. before being resized at 1704) the analysis is based on the elements' updated bounding boxes (e.g. after being resized at 1704).

In the present embodiment, application 230 records current overlaps in a current overlaps dataset that has a format that mirrors the pre-existing overlaps dataset: that is, a set of current element overlap records and a set of current page overlap records.

To illustrate, consider examples 1808 and 1810 of FIG. 18. Example 1808 depicts an original template page 1812 (prior to content transfer) that includes a shape element E7 (with a single circle shape fill), a text element E8 (with text "Original title"), a text element E9 (with text "Original body text that was only two lines), a shape element E10 (with a single rounded corner rectangle fill), and a text element E11 (with text "Greeting"). Element bounding boxes are indicated as dashed line rectangles. Example 1812 depicts a new page 1812' that is based on the template above of example 1808 following content transfer and reflow. New page 1812' includes elements E7', E8', E9', E10'. And E11' that correspond to original elements E7, E8, E9, E10, and E11 of example 1808. Following content transfer: the text of element E7' is "New title that is longer", which has resulted in element E7' overlapping with element E8' (and vice versa); the text of element E9' is "New body text that includes more characters and therefore more lines than the original text an now goes off the page", which has resulted in element E9' overlapping the bottom page edge; and the text of element E11' is "New greeting" which has resulted in element E11' extending out of element E10' (which originally contained element E5'-entirely).

For clarity, examples 1808' and 1810' provide versions of examples 1808 and 1810 respectively in which only bounding boxes are shown (with the example text and fills removed).

Example pre-existing overlap and current overlap datasets corresponding to examples 1808 and 1810 are as follows:

| Pre-existing overlap dataset | Current overlap dataset |
|---|---|
| pre-existingOverlaps: { | currentOverlaps: { |
| elementOverlaps: { | elementOverlaps: { |
| shape-E7: [(text-E8, partial)], | shape-E7: [(text-E8, partial)], |
| text-E8: [(shape-E7, partial)], | text-E8: [(shape-E7, partial), (text-E9, partial)], |
| text-E9: [ ], | text-E9: [(text-E8, partial)], |
| shape-E10: [(text-E11, partial)], | shape-E10: [(text-E11, partial)], |
| text-E11: [(shape-E10, contained)] | text-E11: [(shape-E10, partial)] |
| } | } |
| pageOverlaps: { | pageOverlaps: { |
| shape-E7: [ ], | shape-E7: [ ], |
| text-E8: [ ], | text-E8: [ ], |
| text-E9: [ ], | text-E9: [bottomEdge], |
| shape-E10: [ ], | shape-E10: [ ], |
| text-E11: [ ] | text-E11: [ ] |
| } | } |
| } | } |

At 1708, application 230 identifies undesirable collisions on the page. Generally speaking, an undesirable collision is a collision that has been introduced due to the content transfer performed at 1610 (e.g. a collision that was not present in the original template page but is present in the new template page following content transfer). In the present embodiment, only text elements have the potential to be resized and introduce a collision that was not present in the original page.

Figure 19:
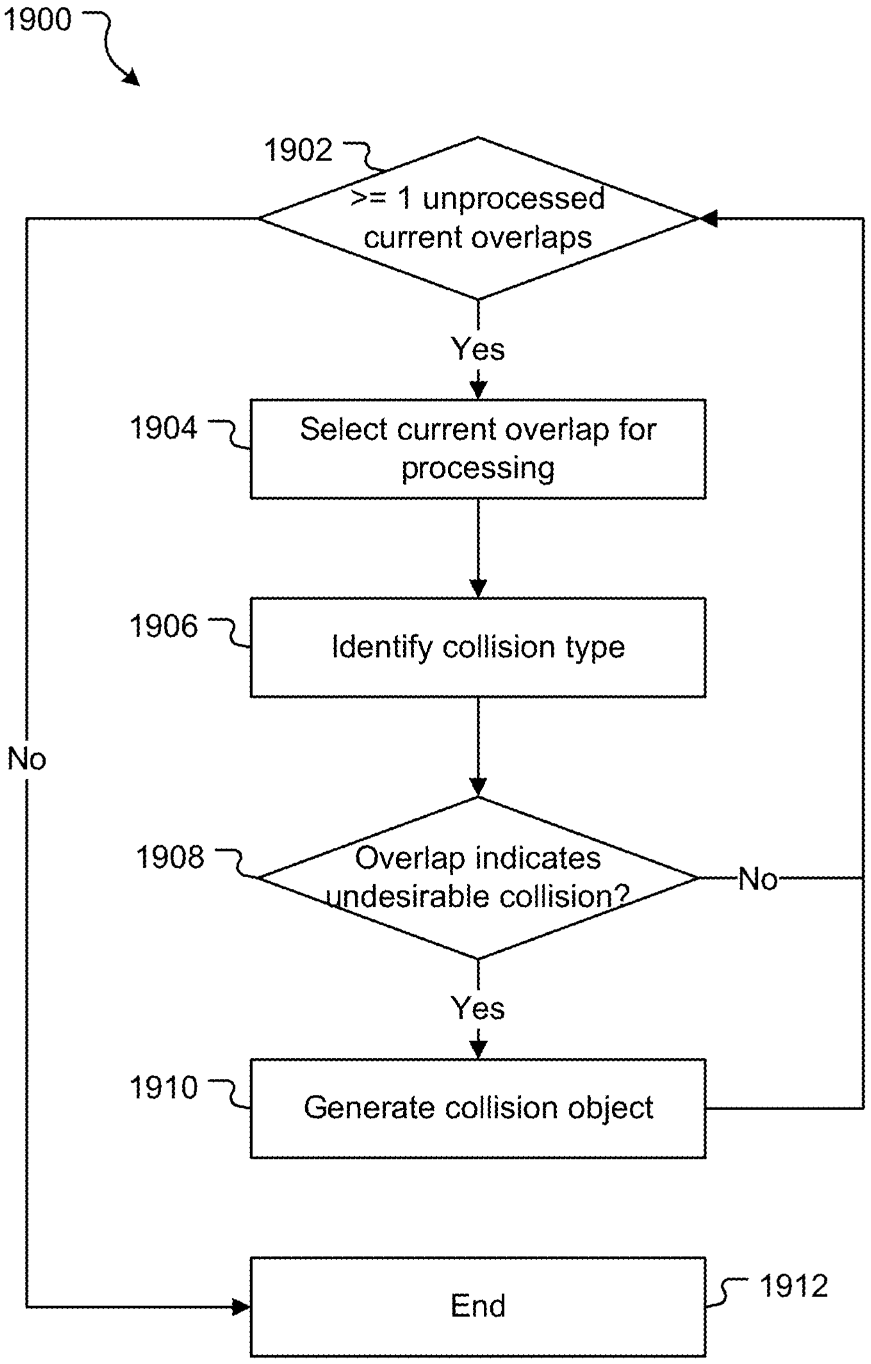
FIG. 19 is a flowchart depicting operations performed identify undesirable collisions.

A method 1900 for identifying undesirable collisions is described below with reference to FIG. 19. Method 1900 returns a set of collision objects. Each collision object in the set identifies an undesirable collision (and the set may be empty if no undesirable collisions are identified).

Figure 20:
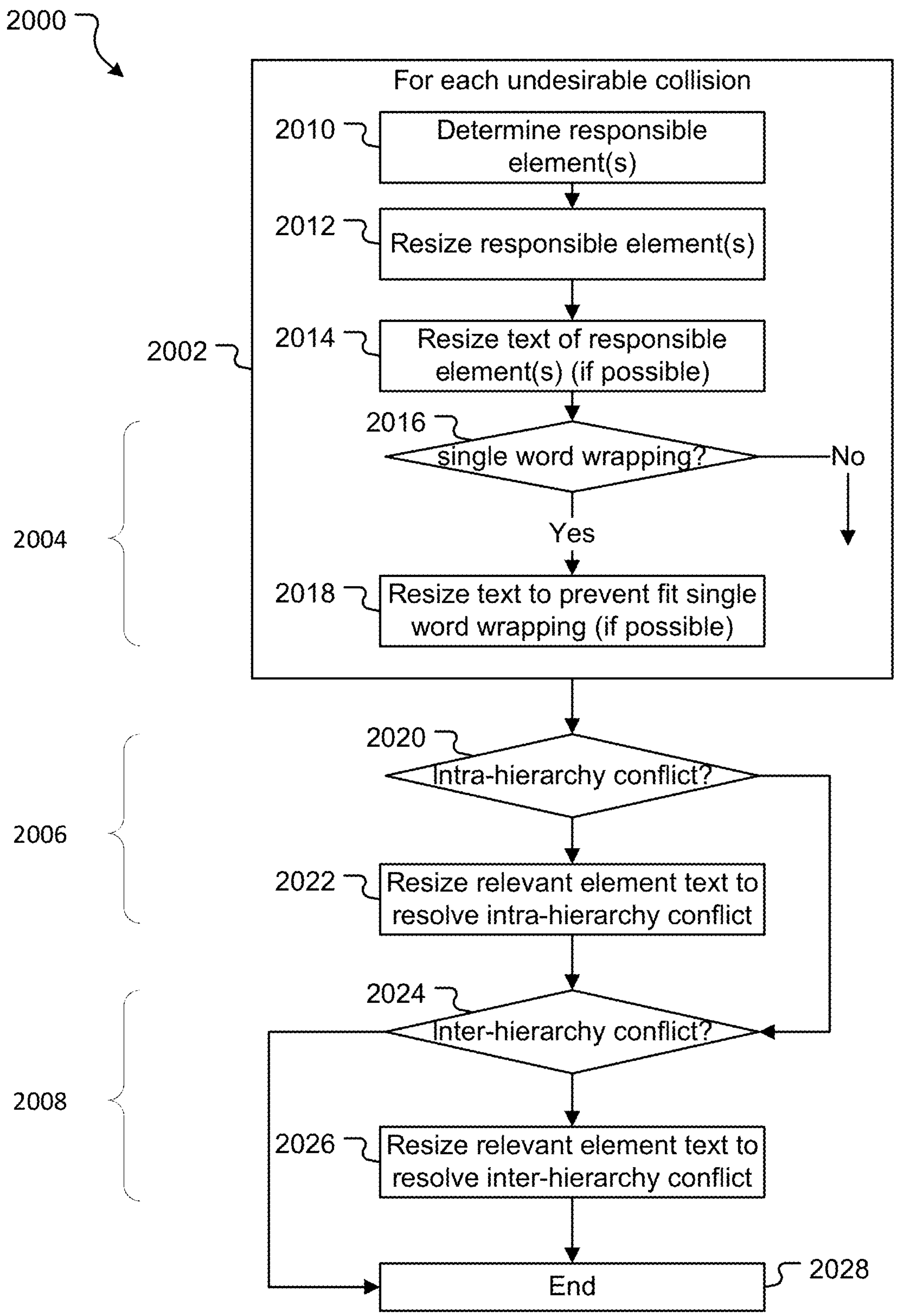
FIG. 20 is a flowchart depicting operations performed to resolve undesirable collisions.

At 1710, application 230 resolves the undesirable collisions identified at 1708. A method 2000 for resolving undesirable collisions is described below with reference to FIG. 20.

In certain embodiments, once undesirable collisions have been resolved at 1710 method 1700 is complete. In other embodiments, application 230 may be configured to re-check for undesirable collisions following 1710 (e.g. by re-performing operation blocks 1706 and 1708) and, if further undesirable collisions are identified, resolve those collisions (e.g. by re-performing operation block 1710). Application 230 may be configured to repeat operation blocks 1706, 1708, and 1710 a predetermined number of times (e.g. 1, 2, or another number of times), or to repeat these operation blocks until no undesirable collisions are identified at 1708.

In the present embodiment, application 230 analyses elements at 1702 to identify pre-existing overlaps. In alternative embodiments, template pages may be analysed to identify pre-existing overlaps at any appropriate time (e.g. when a template page is originally created or the first time a template page is used in to generate a new deck) and the pre-existing overlap data may be stored and associated with the template page. In this case, before performing analysis to identify pre-existing overlaps application 230 may be configured to check if pre-existing overlap data for the template page already exists and, if so, retrieve that from the relevant location rather than re-determining pre-existing overlaps.

While method 1700 is described in the context of generating a new deck page, method 1700 may be performed (or be adapted to be performed) to detect and resolve collisions on any set of two or more design elements where there are original elements (that is, elements with original bounding boxes) and corresponding updated elements (that is, original elements that have been updated or replaced with corresponding elements that may have different bounding boxes).

Identifying Undesirable Collisions

At 1708 of method 1700 application 230 identifies undesirable collisions. A method 1900 for identifying undesirable collisions will be described with reference to FIG. 1900.

Method 1700 involves processing each current overlap that is recorded in the current overlaps dataset. In the present embodiment, application 230 iterates through each overlap that is defined in turn (however overlaps could be processed in any order or in parallel). With the example current overlap data as described above, a given overlap record may define multiple overlaps. For example, the current overlap record "text-E8: [(shape-E7, partial), (text-E9, partial)]" defines two overlaps: E8→E7 and E8→E9.

It is noted that in the present implementation the ordering of an overlap record (and the collision it defines) is relevant. That is, the overlap text-E8: [(text-E9, partial)] (which may be referred to in short hand as E8→E9 or as E8 overlapping E9) is not the same—and is handled separately to—the overlap text-E9: [(text-E8, partial)] (e.g. E9→E8 or E9 overlapping E8).

At 1902, application 230 determines if there are one or more current overlaps that have not yet been processed. If so, processing proceeds to 1904. If all current overlaps have been processed, the identification of undesirable collisions is complete (as indicated at 1912).

At 1904, application 230 selects one of the unprocessed current overlaps for processing.

At 1906, application 230 determines a collision type that the selected current overlap may indicate.

In the present embodiment, application 230 is configured to identify one of three collision types: a partial collision, a container collision, or a page collision. These types of collisions are determines as follow:

| Collision type | Determined if: |
|---|---|
| Partial | The current overlap is a partial element type overlap and there is either: no corresponding element overlap in the pre-existing overlap data; or there is a corresponding pre-element overlap in the pre-existing data and it is also a partial element type overlap |
| Container | The current overlap is a partial element type overlap and there is a corresponding element overlap in the pre-existing data and it is a contained element type overlap, |
| Page | The current overlap is a page type overlap |

To illustrate these collision types, consider the example pre-existing and current overlap datasets that correspond to examples 1808 and 1810 described above, which indicate the following collisions and collision types:

| Collision | Collision type |
|---|---|
| E7→E8 | Partial |
| E8→E7 | Partial |
| E8→E9 | Partial |
| E9→E8 | Partial |
| E10→E11 | Partial |
| E11→E10 | Container |
| E9→bottomEdge | Page |

At 1908, application 230 determines if the selected overlap indicates an undesirable collision. If so processing proceeds to 1910 where application 1910 generates undesirable collision data (in this case a collision object) in respect of the undesirable collision. If application 230 determines that the selected overlap does not define an undesirable collision (e.g. that the overlap is acceptable), processing returns to 1902.

The processing performed at 1908 (to determine whether an overlap is an undesirable collision) and 1910 (to generate a collision object if needed) depends on various factors, including the type of collision the overlap defines, whether the overlap was a pre-existing overlap, and (in some instances) the extent of the overlap.

The collision object generated at 1910 for an undesirable collision depends on the type of the collision (which, in turn, depends on the type of overlap the collision corresponds to).

In the present embodiments, each collision object identifies two objects (either a first and a second element or a first element and a page edge), a penetration direction, and a penetration distance. The penetration direction identifies a direction that the first element penetrates into the second element or over the page edge. The penetration distance indicates how much area needs to be recovered (or, phrased alternatively, how much the element(s) in question need to reduce in size) in order to resolve the collision. The penetration distance may, for example, be calculated in pixels.

The processing performed at 1908 and 1910 for each different collision type (partial, container, and page) will be described in turn.

Undesirable Partial Type Collision

As noted, a current overlap may indicate an undesirable partial collision if the current overlap is a partial element type overlap and there is either: no corresponding element overlap in the pre-existing overlap data; or there is a corresponding pre-element overlap in the pre-existing data and it is also a partial element type overlap For an overlap record that indicates a partial collision, application 230 determines if the overlap indicates an undesirable collision at 1908 as follows.

Initially, application 230 determines if the selected current overlap is an introduced overlap (that is, the overlap was introduced as a result of the content transfer and reflow) or a pre-existing overlap. This is done by comparing the current overlap data with the pre-existing overlap data. If the selected overlap has a corresponding overlap defined in the pre-existing overlap data, application 230 determines that that selected overlap is a pre-existing overlap. If not the current overlap is an introduced overlap.

To illustrate, consider the following example pre-existing overlap data and current overlap data:

<table>
<tr><th>Pre-existing overlap dataset</th><th>Current overlap dataset</th></tr>
<tr><td>pre-existingOverlaps: {<br>  elementOverlaps: {<br>    shape-E7: [(text-E8, partial)],<br>    text-E8: [(shape-E7, partial)],<br>    text-E9: [ ],<br>    . . .<br>  }<br>  . . .<br>  }</td><td>currentOverlaps: {<br>  elementOverlaps: {<br>    shape-E7: [(text-E8, partial)],<br>    text-E8: [(shape-E7, partial), (text-E9, partial)],<br>    text-E9: [(text-E8, partial)],<br>    . . .<br>  }<br>  . . .<br>  }</td></tr>
</table>

In this example, the current E7→E8 overlap is pre-existing while the current E8→E9 and E9→E8 overlaps are introduced.

If the current partial element overlap was pre-existing, application 230 determines that the overlap does not indicate an undesirable collision and processing returns to 1902.

Otherwise, application 230 analyses the partial element overlap further.

In the present embodiment, application 230 takes into account element expansion direction when determining whether a partial element overlap indicates an undesirable collision. In the present examples, a text element's expansion direction is based on a vertical alignment attribute of the element which may take one of three values: top, middle, bottom. A text element that is top aligned has a downward expansion direction: when a new line is added to such an element, the element expands downwards. A text element that is middle aligned has both upward and downward expansion directions: when a new line is added to such an element, the element expands upwards and downwards to accommodate the text. A text element that is bottom aligned has an upward expansion direction: when a new line is added to such an element, the element expands upwards.

By way of example, when determining whether a partial element overlap of text elements E1→E2 indicates an undesirable collision, application 230 determines whether the expansion direction of E1 is towards element E2. If not, application 230 determines that the overlap does not indicate an undesirable collision and processing returns to 1902. If the expansion direction of E1 is toward element E2, the collision is considered further.

To illustrate this, consider example 1816 of FIG. 18 which depicts overlapping elements (or element bounding boxes) E12' and E13'. When considering the partial element overlap record for E12'→E13': if the expansion direction of element E12' was upward (i.e. away from element E13'), application 230 would determine that the overlap does not indicate an undesirable collision; if the expansion direction of element E12' was downward (i.e. towards element E13') or both upward and downward (e.g. due to middle aligned text), application 230 would analyse the overlap further. In contrast, when considering the partial element overlap E13'→E12': if the expansion direction of element E13' was upward (i.e. towards element E12') or both upward and downward, application 230 would analyse the overlap record further; if the expansion direction of element E13' was downward (i.e. away from element E12'), application 230 would determine that the overlap does not indicate an undesirable collision.

If application 230 does not determine that the partial element overlap is acceptable (and does not indicate an undesirable collision) due to being a pre-existing overlap or due to the expansion direction, application 230 calculates a penetration distance for the partial element overlap.

In the present example, application 230 calculates the penetration distance based on a pre-existing penetration distance and a current penetration distance.

The pre-existing penetration distance is the penetration distance calculated based on the elements' original bounding boxes—e.g. the bounding boxes of elements E1 and E2 prior to reflow. The current penetration distance is the penetration distance for those elements following reflow.

In the present embodiment, application 230 calculates the penetration distance for an element E1 that encroaches into an element E2 as the distance that E1 encroaches into E2 plus the predefined element margin.

If the original penetration distance is less than or equal to 0, the final penetration distance is the current penetration distance. If the original penetration distance is greater than 0, the final penetration distance is:

Final penetration distance=current penetration distance−pre-existing penetration distance Taking the pre-existing penetration distance into account when calculating the (final) penetration distance takes into account the possibility that a designer may have deliberately designed a template page to have two elements close together (closer than the defined element margin).

To illustrate the penetration distance calculation, consider examples 1814 and 1816 of FIG. 18. Example 1814 depicts a pair of original element bounding boxes E12 and E13 (e.g. before reflow). In this example the pre-existing penetration distance (PPD) may be calculated as [(E12 maxY+element margin)−E13 minY], which will give a negative value (<=0). Example 1816 then depicts element bounding boxes E12' and E13', which depict element bounding boxes E12 and E13 after reflow. In this example, the current penetration distance (CPD) may be calculated as [(E12' maxY+element margin)−E13' minY]. For examples 1814 and 1816, therefore, the final penetration distance is equal to the current penetration distance.

In contrast, consider examples 1818 and 1820 of FIG. 18. In example 1818, the pre-existing penetration distance (PPD) between elements E14 and E5 is a value greater than zero. Accordingly, for examples 1818 and 1820 the final penetration distance will be calculated as the current penetration distance (CPD) minus the pre-existing penetration distance (PPD).

If the final penetration distance is less than or equal to the pre-existing penetration distance, application 230 determines that the overlap does not indicate an undesirable collision and processing returns to 1902. Otherwise application 230 determines that the overlap does indicate an undesirable collision and processing proceeds to 1910 to generate a collision object. As the collision object corresponds to a partial element overlap it may be referred to as a partial collision object.

In the present embodiment, application 230 generates a partial collision object that includes data identifying:

- a first element, which is the key element identified by the element overlap record (e.g. text-E3);
- a second element, which is the relevant element from the key element's array (e.g. text-E2);
- a penetration direction, which is the direction that the first element penetrates into the second element; and
- a penetration distance, which is the final penetration distance as calculated above.

Undesirable Container Type Collision

As noted, a current overlap may indicate an undesirable container type collision if the current overlap is a partial element type overlap and there is a corresponding element overlap in the pre-existing data and it is a contained element type overlap.

In the present embodiment, application 230 is configured to determine that all container collisions are undesirable at 1908.

Where an undesirable container collision is determined, application 230 generates a container collision object at 1910 that includes data identifying:

- a first element;
- a second element;
- a penetration direction; and
- a penetration distance.

The first element, which may be referred to as the contained element, is the key element identified by the element overlap record (e.g. text-E11 in the above example).

The second element, which may be referred to as the containing element, is the relevant element from the key element's array (e.g. shape-E10 in the above example).

The penetration direction indicates the direction that the contained element extends out of the containing element. For example, in example 1810 a penetration direction of downwards would be recorded.

The penetration distance is calculated as the distance that the contained element has increased/expanded in the penetration direction.

To illustrate, in examples 1808 and 1810 the penetration distance would be E11' maxY−E11 maxY (that is, the contained element's updated bounding box maxY value minus its original bounding box max Y value). In contrast, if E11' extended out of E10' in an upward direction, the penetration distance for the upward penetration would be E11 minY−E11' minY (that is, the contained element's original bounding box minY value minus its updated bounding box minY value).

In certain scenarios, a contained element may extend out of its container in multiple directions. This may occur if the text of the contained element is middle aligned (and the contained element has expanded both upwardly and downwardly). In such a scenario: the penetration direction may be either up or down (or a value indicating both); and the penetration distance is calculated as the value that is the largest of an upward penetration distance (e.g. the distance that the contained element has increased/expanded in the upward direction) and a downward penetration distance (e.g. the distance that the contained element has increased/expanded in the downward direction).

Undesirable Page Type Collisions

As noted, a current overlap may indicate an undesirable page type collision if the current overlap is a page type overlap.

In the present embodiment, application 230 is configured to determine that any current page overlap that involves a text element is an undesirable page collision (regardless of whether a corresponding pre-existing page overlap existed or not).

Where an undesirable page edge collision is determined, application 230 generates a page collision object at 1912 that includes data identifying:

a first element;

a page edge;

a penetration direction; and a penetration distance.

The first element is the element identified by the page overlap record (e.g. text-E3).

The page edge is the page edge identified by the page overlap record (e.g. "bottomEdge").

The penetration direction is the direction that the first element penetrates over the page edge (or into the page margin). For a page edge collision, the direction will always match the page edge in question—e.g. if the page edge is the bottom page edge, the direction will be down. If the top page edge the direction will be up.

Application 230 calculates the penetration distance for a page edge collision based on the page margin discussed above and the extent to which the element extends off the page (or into that margin). By way of example, for an element E1 that has a page overlap with the bottom edge of the page, application 230 may calculate the penetration distance as:

$$\text{Penetration distance}=(E1\ \max Y+\text{page margin})-\text{page height}$$

Alternatively, for an element E1 that has a page overlap with the top edge of the page, application 230 may calculate the penetration distance as:

$$\text{Penetration distance}=|E1\ \min Y-\text{page margin}|$$

It will be appreciated that a selected element may be involved in multiple undesirable collisions. In this case each collision is recorded in a separate collision object.

Resolving Undesirable Collisions

At 1710 of method 17 application 230 resolves any undesirable collisions (referred to as collisions for short) identified at 1708. A method 2000 for resolving collisions is described below with reference to FIG. 20.

In the present example, method 2000 is performed on a set of collision objects, e.g. as generated at 1910 of method 1900. Each collision object describes an undesirable collision between either two elements or an element and a page edge.

By way of overview, method 2000 includes the following general processes: fitting text to elements (where required and possible) (generally indicated by 2002); identifying and (if possible) correcting any single word wrapping from occurring (generally indicated by 2004); identifying and (if possible) correcting any intra-hierarchy conflicts (generally indicated by 2006); and identifying and (if possible) correcting any inter-hierarchy conflicts (generally indicated by 2008).

Each of these processes will be described in turn.

Fitting Text to Elements

At 2002, application processes each collision that has been identified to resize the element(s) responsible for the collision and fit text to the resized element(s). Application may process collisions in any order—e.g. by iterating over the set of collision objects.

At 2010, application determines the element(s) responsible for a selected collision.

For a partial collision, application 230 may determine the responsible element(s) based on the expansion directions of the elements identified in the collision object. To illustrate this, consider example 1816 of FIG. 18 again. In this example, element E1' is in partial collision with element E2', and application 230 may determine the responsible element (s) as follows:

| E1' expansion direction | E2' expansion direction | Responsible element(s) |
|---|---|---|
| Up | Up | E2 |
| Up | Down | [collision will not occur] |
| Up | Up/down | E2 |
| Down | Up | E1, E2 |
| Down | Down | E1 |
| Down | Up/down | E1, E2 |
| Up/down | Up | E1, E2 |
| Up/down | Down | E1 |
| Up/down | Up/down | E1, E2 |

For a container collision, application 230 determines that the contained element is the responsible element (i.e. the element that was originally entirely contained within another element). For example, in example 1810 of FIG. 18, the responsible element for the container collision between E11' and E10' is element E11'.

For a page collision, the responsible element is the element identified in the collision record (i.e. the element that extends off the page or into the page margin).

At 2012, application 230 resizes the or each responsible element identified at 2010. This provides the/each responsible element with a resized bounding box. Application 230 resizes responsible elements based on the penetration distance associated with the collision as described above. In the present embodiment, the penetration distance is included in the collision object.

For a partial collision where a single element is responsible, application 230 resizes the single element based on the entire penetration distance calculated for the collision and the penetration direction. To illustrate this, consider examples 1822, 1824, and 1826 of FIG. 18. Example 1822 depicts a page with two original element bounding boxes E16 and E17. Example 1824 depicts page 1822 following content transfer and reflow, giving resized bounding boxes E16' and E17'. Example 1826 depicts page 1824 following the calculation of new element bounding boxes at 2012. In this example, elements E16 and E17 have top aligned text (and, therefore, a downward expansion direction). Given this, application 230 determines that element E16 is responsible for the collision at 2010 and then resizes element E16 at 2012. In this example, element E16's minY, minX, and maxX remain the same but a new max Y is obtained (new max Y=max Y of E16 following reflow−penetration distance).

With the design element record format described above, application 230 may resize an element as follows:

Examples 1828, 1830, and 1832 of FIG. 18 illustrate an example of a partial collision between two elements E18 and E19 and in which both elements re responsible (E18 expanding downwards and E19 expanding upwards). As can be seen after resizing (E18" and E19" in example 18z32) both elements have reduced in height.

If a responsible element of a collision is a group element, application 230 determines the portion of the penetration distance that belongs to that group element (the group's portion) and then further portions the group's portion between its member elements. Proportioning a group's penetration distance portion between its members may be performed in a similar manner to proportioning the penetration distance between elements that are jointly responsible for a partial collision as described above (e.g. based on expansion direction and how much a given member element has expanded from its original size).

For a container collision or a page edge collision a single element will be responsible. In this case, application 230 resizes the single element at 2012. This is similar to resizing an element that is the solely responsible for a partial collision as described above.

| Element resize direction | Element resized by |
|---|---|
| Up (i.e. reduce element's minY) | height = height − penetration distance |
| Down (i.e. increase element's minY) | minY = minY + penetration distance<br>height = height − penetration distance |
| Left (i.e. reduce element's minX) | width = width − penetration distance |
| Right (i.e. increase element's minX) | minX = minX + penetration distance<br>width = width − penetration distance |

For a partial collision where a both elements are responsible, application 230 resizes both elements at 2012. This is similar to the above, except instead of application 230 resizing one element using the entire penetration distance it portions the penetration distance between the two elements—e.g. so that one element is reduced by a first portion of the penetration distance and the other element is reduced by the a second portion of the penetration distance (the first and second portions adding to give the entire penetration distance).

For example, if a partial collision involving two responsible elements E1 and E2 is determined, and element E1 expanded 100 pixels from its original size and element E2 also expanded 100 pixels from its original size, application 230 would proportion the penetration distance equally (e.g. E1 penetration distance portion=E2 penetration distance portion=penetration distance/2). In contrast, if element E1 expanded by 150 pixels and element E2 expanded by 50 pixels then element E1 would be assigned a larger share of the penetration distance.

Application 230 may, for example, calculate penetration distance (PD) portions for elements E1 and E2 that are both responsible for a partial collision as follow.

$$E1\ PD\ \text{portion}=PD^*(E1\ \text{expansion}/(E1\ \text{expansion}+E2\ \text{expansion}))$$

$$E2\ PD\ \text{portion}=PD^*(E2\ \text{expansion}/(E1\ \text{expansion}+E2\ \text{expansion}))$$

Once the element penetration distance portions have been calculated, application may resize the elements as described above (except each element is resized based in its portion of the penetration distance rather than the entire penetration distance).

Once the responsible element(s) has/have been resized at 2012, application shrinks the text of each responsible element at 116. In particular, for a given responsible element application 230 shrinks the text so it fits within the resized element (e.g. within the resized element's bounding box). Application may perform this operation in various ways. This may be referred to as a first text resizing operation.

By way of example, application 230 may be configured to identify the largest possible font size that the text of the element can be and still fit within the bounding box. Application 230 may identify the largest possible font size by progressively reducing the font size and determining, at each reduced font size, whether the text fits. Alternative approaches are possible.

In certain embodiments, application 230 may be configured to only reduce text size to a defined minimum font size (e.g. 8 point or an alternative minimum). If the text is reduced to the minimum font size and still does not fit within the bounding box, application 230 may leave the text at the minimum font size rather than further shrinking it. In this case application 230 may also generate a text size error (e.g. a message, flag, or other indicator) to indicate that the element in question does not contain its text. The text size error may then be used by application 230 (or another application) to generate an alert to a user to draw the element in question to their attention so they can manually edit the text and/or element (and/or surrounding elements). Such an alert may, for example, involve visually distinguishing the element in a user interface when the design that includes the element is being viewed. An element may be visually distinguished in a variety of ways, e.g. by one or more of: using a particular colour to highlight the element; flashing the element on/off (i.e. displaying then not displaying the element); displaying a graphic or text overlay indicating the element; displaying the element (or a thumbnail of the element) in an exceptions user interface; and/or an alternative mechanism.

Further alternatively, if the minimum font size is reached application 230 may generate a text size error (as described above), but continue to reduce the font size until the text does fit.

Identifying/Resolving Single Word Wrapping

At 2016, application 230 determines if any single-word wrapping exists in the responsible element(s). If so, each responsible element that has single-word wrapping is processed at 2018. If not, processing proceeds to 2020.

In the present embodiment, application 230 is configured to determine that single-word wrapping occurs in an element if any single word in that element is less than a defined number of characters and wraps across multiple lines. In this context, a single word is a continuous sequence of characters that does not include a relevant separator character. A relevant separator character may be a character such as a space, a hyphen, a new line, or any other relevant separator character. The defined number of characters may, for example, be 15 (but any appropriate number may be used, or no defined number of characters may be used).

If application 230 determines that single word wrapping does exist in a responsible element, processing proceeds to 2018. At 2018, application resizes the text to resolve the single-word wrapping that has been identified. This may be referred to as a second text resizing operation. Application 230 may resize text at 2018 in the same (or a similar) manner to the text resizing performed at 2014.

When resizing text at 2018, application 230 may make use of a minimum font size as described above with reference to 2014. If the minimum font size is reached without the single word wrapping being resolved application 230 may generate an error.

Following resolution (or attempted resolution) of the single word wrapping processing proceeds to 2020.

Identifying/Resolving any Intra-Hierarchy Conflicts

At 2020, application 230 identifies whether any text resizing performed at 2014 or 2018 has introduced what will be referred to as an intra-hierarchy conflict. If so, processing proceeds to 2022. Otherwise processing proceeds to 2024.

In the present disclosure, an intra-hierarchy conflict exists if text that is at the same text hierarchy level has different font sizes. Consider, for example, a page with four text elements at text hierarchy level n and for which: the text of elements E1 and E2 have a font size 12, the text of element E3 has a font size of 14, and the text of element E4 has a font size of 10. In this case, an intra-hierarchy conflict exists for text hierarchy level n.

Application 230 may be configured to identify (at 2020) and resolve (at 2022) intra-hierarchy conflicts in various ways.

For example, application 230 may be configured to analyse each text hierarchy level hierarchy included in the page elements in turn. For each text hierarchy level hierarchy application 230 identifies all font sizes used for text at that hierarchy level. If all font sizes for the level are the same, no intra-intra hierarchy conflict exists for that hierarchy level. If not, a conflict does exist. In this case application 230 resolves the conflict at 2020 by determining the smallest font size that is used for the hierarchy level in question and then adjusting all text at that hierarchy level to that smallest font size.

In the above example where an intra-hierarchy conflict exists for text hierarchy level n, therefore, application 230 would set all text at hierarchy level n to be font size 10 (the smallest font size at that level).

Resizing text to resolve an intra-hierarchy conflict at 2022 may be referred to as a third text resizing operation.

Once any intra-hierarchy conflicts have been resolved at 2022 processing proceeds to 2024.

Identifying/Resolving any Inter-Hierarchy Conflicts

At 2024, application 230 identifies whether any text resizing performed at 2014 or 2018 (or 2020) has introduced what will be referred to as an inter-hierarchy conflict. If so, processing proceeds to 2026. If not, collision resolution is complete (as indicated at 2028).

In the present disclosure, an inter-hierarchy conflict exists if the font size of text at a lower text hierarchy level is larger than font size of text at a higher text hierarchy level. For example, in the context of the present disclosure text at hierarchy level 1 (which may, for example, be heading text) would typically be expected to be larger than text at hierarchy level 2 (which may, for example be subheading text). Similarly, text at hierarchy level 2 would typically be expected to be larger than text at hierarchy level 3 (which may, for example be body text).

Application 230 may be configured to identify (at 2024) and resolve (at 2026) inter-hierarchy conflicts in various ways.

For example, application 230 may initially analyse the page elements to generate an ordered set of the text hierarchy level font sizes (e.g. highest hierarchy level to lowest). Application 230 may then work through the ordered set of hierarchy level font sizes (e.g. highest hierarchy level to lowest), comparing the font size of each hierarchy level to the font size of the next lowest hierarchy level. For a given pair of hierarchy levels Ln and Lm (where Ln is higher in the hierarchy than Lm): if the font size associated with Ln is less than or equal to the font size associated with Lm, application 230 determines a new (reduced) font size for hierarchy level Lm that is less than the font size associated with Ln. In this way, any font size change that is made to a particular hierarchy level ends up cascading down to lower text hierarchy levels.

In certain implementations, application 230 may be configured to determine a new font size for a given hierarchy level Lm based on any other hierarchy levels that are lower than Lm. For example, in some instances a limited number of usable font sizes may be available (e.g. if the font size of lower hierarchy levels is already approaching a minimum font size). In this case, application 230 may make relatively small adjustments to the font size of a given hierarchy level Lm (e.g. current font size—1 point, current font size—2 points, or an alternative adjustment). Alternatively, if there are a large number of available font sizes application may make relatively large adjustments to the font size of a given hierarchy level Lm (e.g. current font size-4 point, current font size-6 points, or an alternative adjustment).

By way of example, the following table depicts four text hierarchy levels and font sizes before and after resolving the inter-hierarchy conflict that exists between levels 2 and 3 (due to level 3 having larger font size text than level 2). In this example, the font size of level 3 is reduced to 10 and (in turn) the font size of level 4 is reduced to 8.

| Text hierarchy level | Font size before resolving inter-hierarchy conflict | Font size after resolving inter-hierarchy conflict |
|---|---|---|
| 1 | 22 | 22 |
| 2 | 12 | 12 |

-continued

| Text hierarchy level | Font size before resolving inter-hierarchy conflict | Font size after resolving inter-hierarchy conflict |
|---|---|---|
| 3 | 16 | 10 |
| 4 | 10 | 8 |

Resizing text to resolve an inter-hierarchy conflict at 2026 may be referred to as a fourth text resizing operation.

In certain embodiments, and as described above, application 230 may be configured to only reduce text size to a defined minimum font size (e.g. 8 point or an alternative minimum). In this case, if any inter-hierarchy conflicts cannot be resolved without reducing the font size of one or more text elements beyond the minimum font size application 230 may leave the text at the minimum font size rather than further shrinking it. In this case application 230 may generate a text size error, e.g. as described above. Alternatively, if the minimum font size is reached application 230 may generate a text size error (as described above), but reduce the font size below the minimum font size in order to resolve the inter-hierarchy conflict(s).

Once application 230 has resolved (or attempted to resolve) any inter-hierarchy conflicts at 2026, collision resolution is complete (as indicated at 2028).

While identifying and correcting intra-hierarchy conflicts at 2006 is described in the broader context of method 2000 this processing (or similar processing) may be performed to identify and correct intra-hierarchy conflicts in other contexts. For example, an application may be configured to process any selected text with appropriate attributes (e.g. text hierarchy level and font size attributes) according to the processing descried at 2020 and 2022 (or similar processing) to identify and resolve intra-hierarchy conflicts. The selected text may, for example, be the text of a document-format design (e.g. a set of text items), the text of a deck-format design (e.g. a set of text elements of a deck), the text of a page of a deck-format design (e.g. a set of text elements of a deck page), or text that is otherwise selected by a user or application (e.g. a specific set of text elements or text items selected by a user or application).

While identifying and correcting inter-hierarchy conflicts at 2008 is described in the broader context of method 2000 this processing (or similar processing) may be performed to identify and correct inter-hierarchy conflicts in other contexts. For example, an application may be configured to process any selected text with appropriate attributes (e.g. text hierarchy level and font size attributes) according to the processing descried at 2024 and 2026 (or similar processing) to identify and resolve inter-hierarchy conflicts. The selected text may, for example, be the text of a document-format design, the text of a deck-format design, the text of a page of a deck-format design, or text that is otherwise selected by a user or application.

Figure 23:
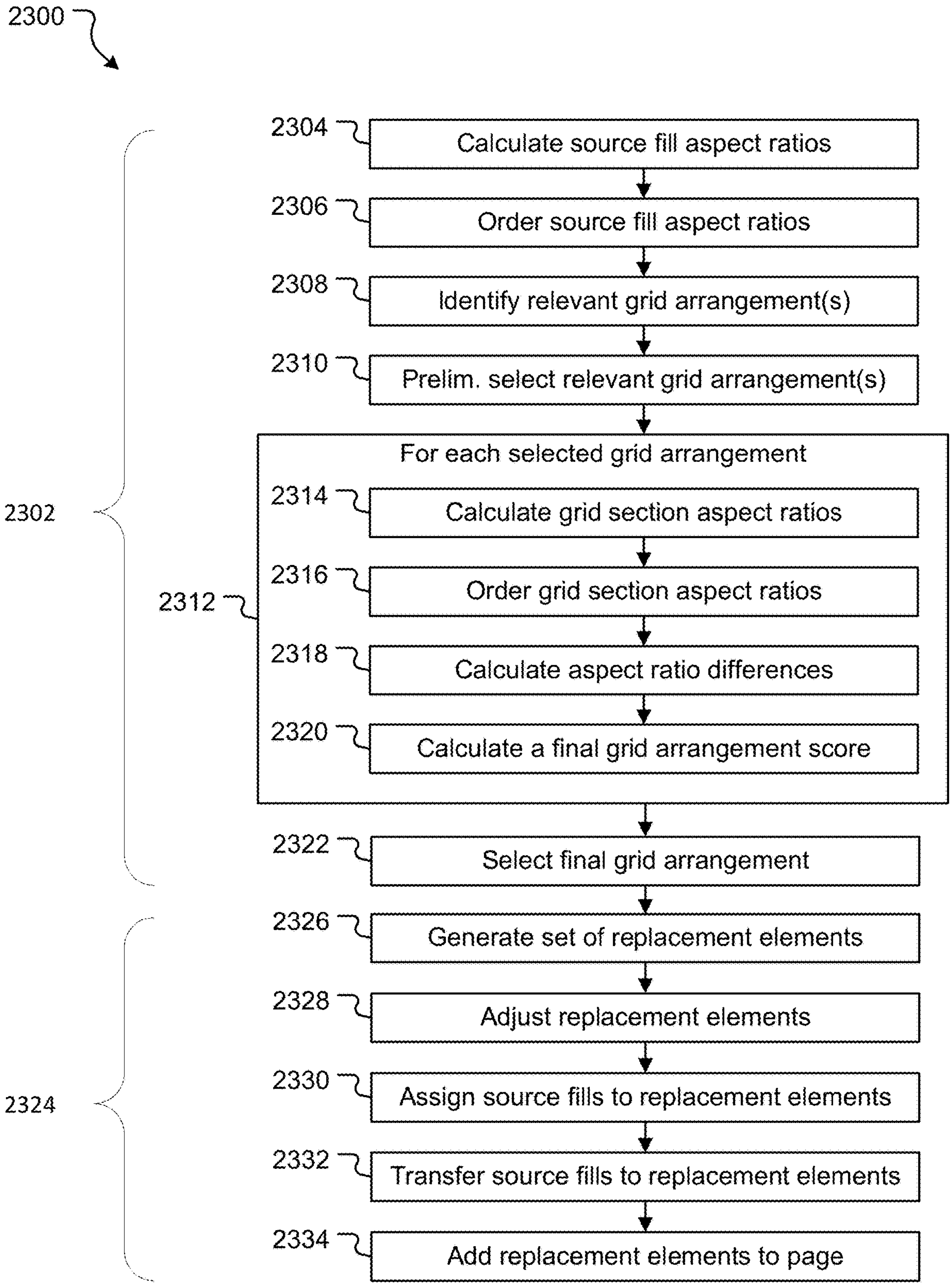
FIG. 23 is a flowchart depicting operations performed to generate a set of design elements based on a set of source fills and a single destination element.

Generating a Set of Design Elements Based on a Set of Source Fills and a Single Destination Element Turning to FIG. 23, a method 2300 for generating a set of design elements based on a set of source fills and a single destination element will be described.

Method 2300 may, for example, be performed at 1608 of method 1600 where multiple source content fills map to a single destination fill (the single destination fill corresponding to a destination element).

Method 2300 may also, or alternatively, be performed in other contexts where multiple source fills need to be mapped to a single destination element. One example of such a context is described below with reference to method 2900.

Method 2300 will be described as being performed by client application 232 (and may, in particular, be performed by content transfer module 234). Method 2300 may, however, be performed by an alternative application that runs on either client system 230 or at server environment 210.

Method 2300 takes as input (or has access to) a set of source fills and a destination element.

In the context of the present disclosure, the destination element is a shape element of a deck-format design page (which may be referred to as the destination page).

When method 2300 is performed at 1608 of method 1600 the set of source fills is the set of two or more source fills that map to a single destination fill and the destination element is the element in respect of the single destination fill those source fills map to. In this case, each source fill corresponds to a source content segment and may have corresponding source object. The destination element may correspond to a single shape-type element of a design, or to a particular component fill of such a shape-type element (which may also be treated as a shape-type element). The destination fill may have a corresponding destination object.

In alternative contexts, the set of source fills may be a set of fills (or images) that have been specifically selected by a user (or application) and the destination element may be a shape-type element that has also been specifically selected.

Method 2300 also has access to what will be referred to as a set of grid arrangements. Generally speaking, each grid arrangement defines a set of grid sections that provide a particular arrangement for a number of fills.

In the present embodiment, a grid arrangement is defined by a grid arrangement dataset. The grid arrangement dataset is a two-dimensional array of length X, with X being the number of sections of the grid arrangement (and, therefore, the number of fills accommodated by the arrangement).

Each element of a grid arrangement represents a rectangular grid section and is defined by grid section data which defines a grid section origin (e.g. a start X and a start Y coordinate) and a grid section size (e.g. a width value and a height value). In the present embodiment, the grid section data for a given grid section is a further array (which may be referred to as a grid section array) of four values: [x, y, width, height], where x:

x=a starting (or origin) X value of the grid section (expressed as percentage of the total width of the grid arrangement, 0<=x<1), y=a starting (or origin) Y value of the grid section (expressed as percentage of the total height of the grid arrangement, 0<=y<1)

width=a width of the grid section (expressed as percentage of the total width of the grid arrangement, 0<width<=1)

height=a height of the grid section (expressed as percentage of the total height of the grid arrangement, 0<height<=1)

Figure 24:
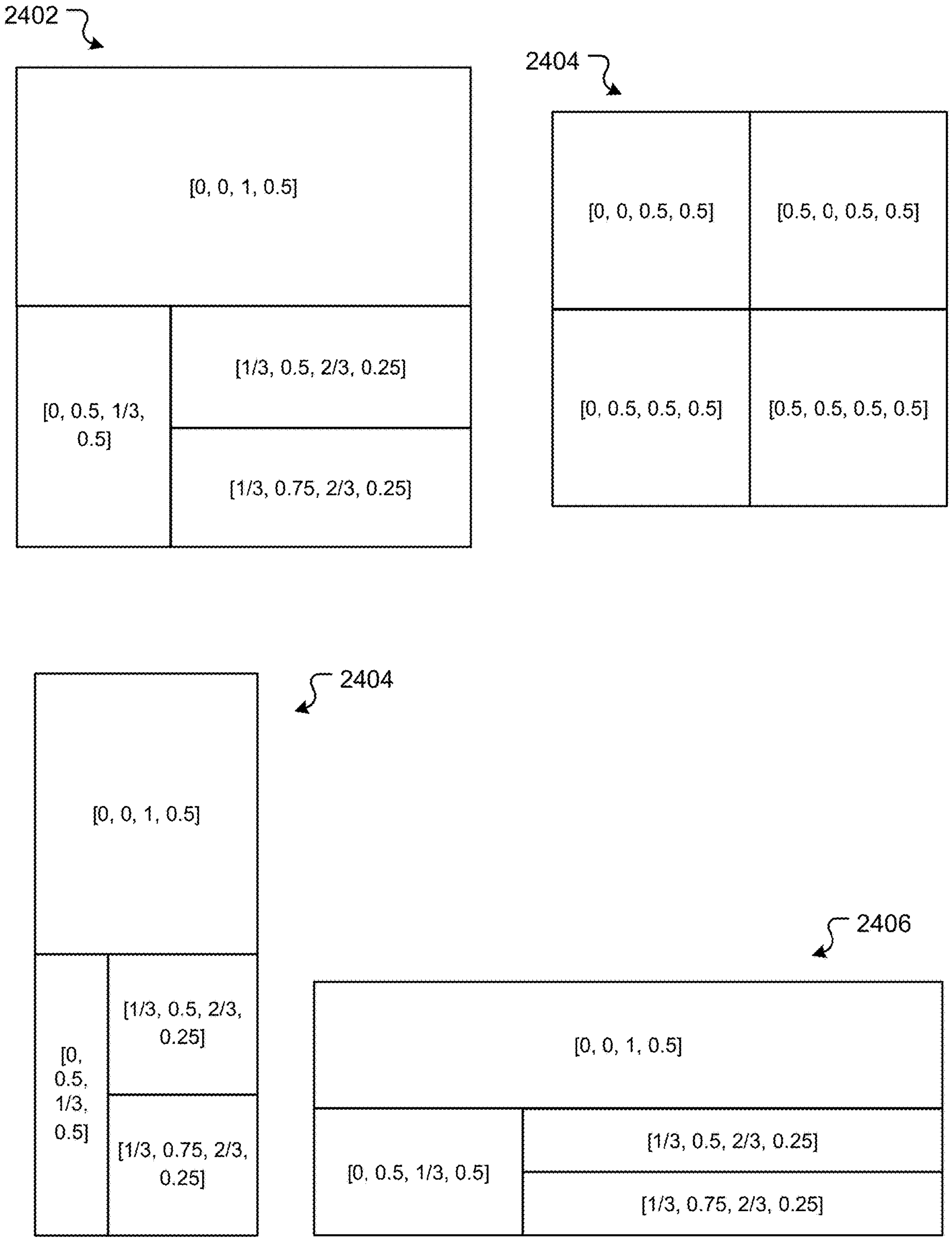
FIG. 24 depicts example grid arrangements.

To illustrate grid arrangements, FIG. 24 depicts two example grids 2402 and 2404. Grid 2402 corresponds to the following grid arrangement:

[0, 0, 1, 0.5], [0, 0.5, ⅓, 0.5], [⅓, 0.5, ⅔, 0.25], [⅓, 0.75, ⅔, 0.25]]

Grid 2404 corresponds to the following grid arrangement:

[0, 0, 0.5, 0.5], [0.5, 0, 0.5, 0.5], [0, 0.5, 0.5, 0.5], [0.5, 0.5, 0.5, 0.5]]

For illustrative purposes, each grid section in FIG. 24 has been annotated with its corresponding grid section array.

As will be appreciated, grid arrangements describing additional and/or alternative grid arrangements and accommodating different numbers of sections are possible At 2302, application 232 selects a grid arrangement for the multiple source fills that are to be transferred. In the present embodiment, application 232 analyses the source fills and the grid arrangements to determine a grid arrangement that will require the least amount of cropping. This is described with reference to processing blocks 2304-2322.

At 2304, application 232 calculates a set of source fill aspect ratios. This includes calculating the aspect ratio of each source fill to be transferred. A source fill's aspect ratio is calculated as its fill width/fill height.

At 2306, application 232 orders the source fill aspect ratios in the set—for example from largest to smallest.

At 2308, application 232 identifies relevant grid arrangements from the set of available grid arrangements. At 2308, a relevant grid arrangement is any grid arrangement that defines a number of grid segments that is equal to the number of source fills to be transferred. With grid arrangement arrays as discussed above, relevant grid arrangements are any that have a length equal to the number of source fills.

At 2310, application 232 preliminarily selects one or more of the relevant grid arrangements identified at 2302. If a single relevant grid arrangement is identified at 2302, application 232 selects that single relevant grid arrangement. In this case application 232 may omit processing 2312 for the single grid arrangement and select it as the final grid arrangement per 2322. If a large set of grid arrangements are maintained, and a large number of relevant grid arrangements are identified, application 232 may be configured to select a subset of relevant grid arrangements at 2310. For example, application 232 may randomly select a defined maximum number of grid arrangements from the relevant grid arrangements at 2310. In other cases, application 232 may preliminarily select all relevant grid arrangements at 2310.

At 2312, application 232 calculates a final grid arrangement score for each grid arrangement selected at 2310 (unless a single relevant grid arrangement has been identified, in which case 2312 is omitted). This is described with reference to processing blocks 2314-2320 which are performed for each selected grid arrangement.

At 2314, application 232 calculates a set of grid section aspect ratios for the selected grid arrangement. This includes calculating the aspect ratio of each grid section defined by the selected grid arrangement. For a given grid section, application 232 calculates the grid section ratio as:

Grid section aspect ratio=grid section width*destination element width/(grid section height*destination element height)

The destination element's width and height are taken into account when calculating a grid section's aspect ratio as the width/height of a given destination element can result in different grid sections and different grid section aspect ratios. To illustrate this, consider examples 2406 and 2408 of FIG. 24, each of which depict the following example grid arrangement:

[[0, 0, 1, 0.5], [0, 0.5, ⅓, 0.5], [⅓, 0.5, ⅔, 0.25], [⅓, 0.75, ⅔, 0.25]]

At 2316, application 232 orders the grid section aspect ratios in the set. The grid section aspect ratios are ordered in the same way as the source fill aspect ratios are ordered at 2306—e.g. largest to smallest. This allows matching (grid section, source fill) pairs to be identified. In this context, matching (grid section, source fill) pairs are based on aspect ratio size—e.g. so the grid section with the largest aspect ratio is matched to the source fill with the largest aspect ratio, the grid section with the second largest aspect ratio is match to the source fill with the second largest aspect ratio and so forth.

At 2318, application 232 calculates an aspect ratio difference for each matching source fill/grid section aspect ratio pair. In the present embodiment, where the source fill and grid segment aspect ratios have been sorted, this can be done based on an index basis. E.g. aspect ratio difference [i]=absolute value (source fill aspect ratio [i]−grid segment aspect ratio [i]).

At 2320, application 232 calculates a final grid arrangement score for the selected grid arrangement. In the present embodiment, the final grid arrangement score is based on the aspect ratio differences calculated for the selected grid arrangement at 2318. In particular, the final grid arrangement score may be the sum of the aspect ratio differences calculated at 2318.

At 2322, once a final grid arrangement score has been calculated for each selected grid arrangement, application 232 selects a final grid arrangement. The final grid arrangement is selected based on the final grid arrangement scores—e.g. the arrangement with the optimal score (which in the present example is the smallest score).

At 2324, application 232 transfers the source fills to the destination element (and destination page). This transfer is based on the grid arrangement selected at 2322 and involves processing blocks 2326 to 2334.

At 2326, application 232 generates a set of deck-format design elements. In particular, application 232 generates a shape-type element corresponding to each grid section of the grid arrangement selected at 2322. This result in generating a number of elements that is equal to the number of source fills. In the present embodiment, each element generated at 2326 is a copy of the original destination element.

At 2328, application 232 adjusts each replacement element's size and position. Application 232 associates each replacement element with a particular section of the selected grid and adjusts the element's size and position data based on the grid section's data.

For a given replacement element with original position and size data of ($X_0$, $Y_0$, $Width_0$, $Height_0$) and a grid section with data of ($X_1$, $Y_1$, $Width_1$, $Height_1$), the replacement element's new size and position data may be calculated as follows:

$$X_{new} = X_0 + (X_1 * \text{Width}_0)$$

$$Y_{new} = Y_1 + (Y_1 * \text{Height}_0)$$

$$\text{Width}_{new} = \text{Width}_0 * \text{Width}_1$$

$$\text{Height}_{new} = \text{Height}_0 * \text{Height}_1$$

If the original element (and, therefore, the replacement element) is associated with a viewbox having original X, Y, Width, and Height values of $vbX_0$, $vbY_0$, $vbWidth_0$, and $vbHeight_0$, the view box for the replacement element can be similarly adjusted based on the grid section's data—e.g.:

$$vbX_{new} = vbX_0 + (vbX_1 * vb\text{Width}_0)$$

$$vbY_{new} = vbY_1 + (vbY_1 * vb\text{Height}_0)$$

-continued $$vbWidth_{new} = vbWidth_0 * vbWidth_1$$

$$vbHeight_{new} = vbHeight_0 * vbHeight_1$$

At 2330, application 232 assigns each source fill to a matching replacement element. At 2330, application 232 identifies matching (source fill, replacement element) pairs based on the aspect ratios of the source fills and replacement elements—e.g. so the replacement element with the largest aspect ratio is matched to the source fill with the largest aspect ratio, the replacement element with the second largest aspect ratio is match to the source fill with the second largest aspect ratio and so forth. By way of example, application 232 may assign source fills to replacement elements as follows. Application may generate an aspect-ratio ordered set of source fills—e.g. by calculating each source fill's aspect ratio and then ordering the source fills based thereon (e.g. largest to smallest). Application 232 may also generate an aspect-ratio ordered set of replacement elements—e.g. by calculating each replacement element's aspect ratio and then ordering the replacement elements based thereon (e.g. largest to smallest). For each index i, application may then assign source fill [i] to replacement element [i].

At 2332, application 232 transfers each source fill to its assigned replacement element. This may involve, for example, updating the replacement element's content data with data that identifies (or is) the source fill.

At 2334, application 232 adds the replacement elements to the destination page. With the example deck-format described above, application 232 may add the replacement elements to the destination page by replacing the original design element record in respect of the destination element with the replacement design element records.

Method 2300 is then complete.

Generating a New Table Based on a Source Table and a Destination Table

Figure 25:
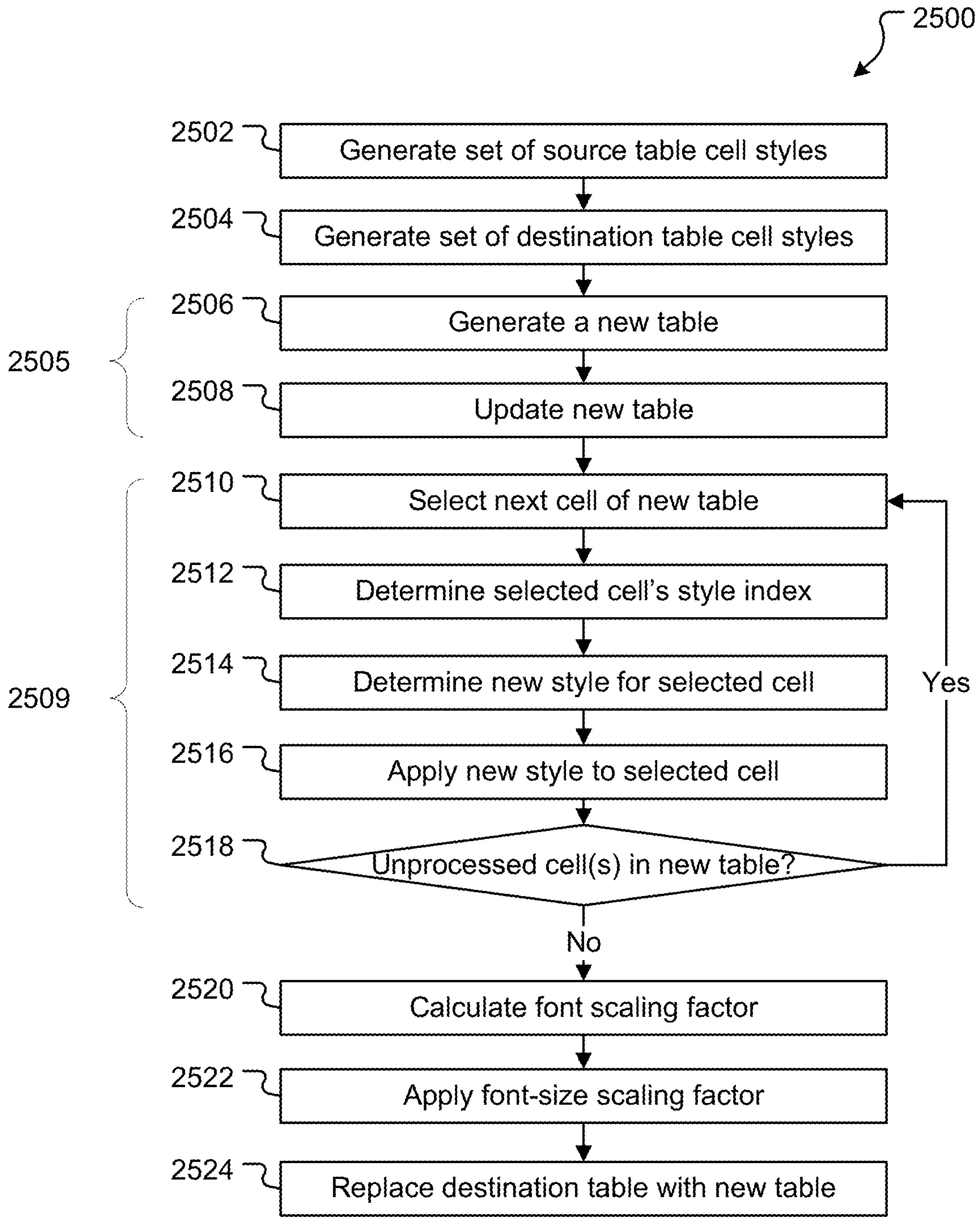
FIG. 25 is a flowchart depicting operations performed to generate a new table based on a source table and a destination table.

Turning to FIG. 25, a method 2500 for generating a new table based on a source table and a destination table will be described.

Method 2500 may, for example, be performed at 1618 of method 1600. In the context of method 1600: the source table is a table-type source content segment (and has a corresponding table-type source object); the destination table is a table defined by a table-type element of a deck-format design page (and has a corresponding table-type destination object); the source table is mapped to the destination table via the content map data. If multiple tables are to be transferred at 1618, method 2500 may be performed for each table.

Figure 30:
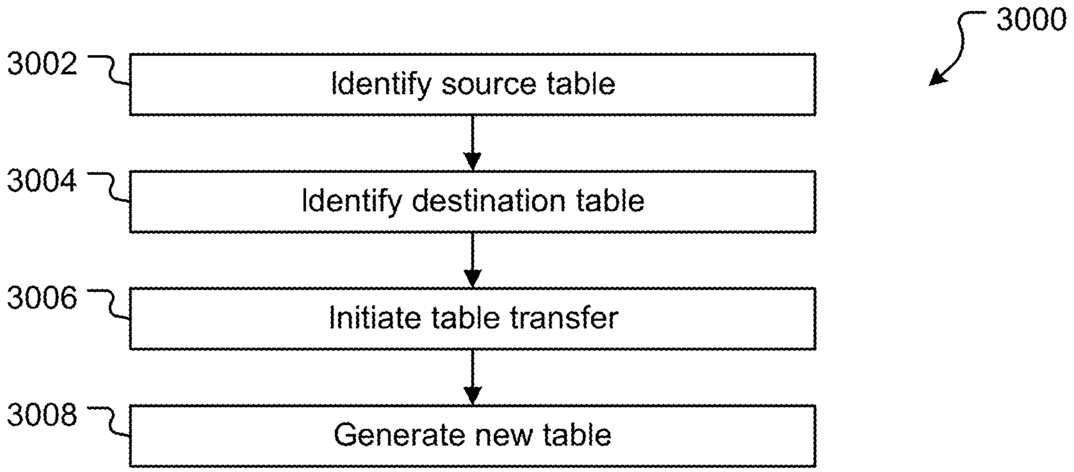
FIG. 30 is a flowchart depicting operations performed to transfer a table.

Method 2500 may, however, also (or alternatively) be used (or be adapted to be used) in any context where a source table is to be transferred to a destination element. One example of such a method is described below with reference to FIG. 30.

Method 2500 will be described as being performed by client application 232 (and may, in particular, be performed by module 234). Method 2300 may, however, be performed by an alternative application that runs on either client system 230 or at server environment 210.

At 2502, application 232 generates a set of source table cell styles. The set of source table cell styles includes cell styles that are defined by cells of the source table. In the present example, the set of source table cell styles is an ordered list of source cell style records, each source cell style record corresponding to a unique cell style defined by the source table.

At 2504, application 232 generates a set of destination table cell styles. The set of destination table cell styles includes cell styles that are defined by cells of the destination table. In the present example, the set of destination table cell styles is an ordered list of destination cell style records, each destination cell style record corresponding to a unique cell style defined by the destination table.

Application 232 may be configured to generate the sets of source and destination cell styles in various ways. An example method for generating a set of cell styles is described below with reference to FIG. 26.

At 2505, application 232 generates a new table. The new table includes the table content of the source table (e.g. the text or other content of the table cells) but other attributes that are taken from the destination table (e.g. size and, if relevant, position). In the present embodiment, application 232 generates the new table at 2505 in accordance with processing blocks 2506 and 2508.

At 2506, application 232 generates a new table.

In certain implementations, application 232 may generate the new table by creating a copy of the destination table. For example, application 234 may create copy of the table-type design element record that defines the destination table (if the destination table is in a deck-format design) or a copy of the table-type document element record that defines the destination table (if the destination table is in a document-format design).

In other implementations, application may generate the new table by creating a copy of the source table.

At 2508, application 232 updates the new table as initially generated at 2506.

Where the new table generated at 2506 is a copy of the destination table, application 232 updates the new table so to copy the source table's cell content to the new table. This includes copying the actual content of the source table cells (not including any table style or formatting or other attributes such as size, position, rotation, etc.) from the source table to the new table. If any table structure data is required (e.g. data defining a number of rows and columns) this may also be copied. Application 232 may copy source table content to the new table by, for example, extracting data from the relevant source table attribute(s) and writing that to the relevant attribute(s) of the new table.

Where the new table generated at 2506 is a copy of the source table, the new table already includes the source content. In this case, application 232 updates the new table at 2508 by copying (or adding) relevant attributes from the destination table. This may include, for example, attributes such as size, position, rotation, and/or other destination table attributes.

Following 2508, the new table includes a set of new table cells. Each new table cell corresponds to a cell of the source table and includes the text content of that source table cell.

At 2509, application 232 updates the cell styles of the new table. This involves processing each cell of the new table to determine and apply a style that was defined by the original destination table and involves processing blocks 2510 to 2518.

At 2510, application 232 selects the next unprocessed cell of the new table (that is, a cell that has not yet had a destination table cell style applied to it). The cells of the new table may be processed in any order.

At 2512, application 232 determines an index of the style record in the source table style list that defines the style of the selected cell. This will be referred to as the selected cell's style index.

At 2514, application 232 determines a new style for the selected cell. The selected cell's new style is the style defined by the style record at the style index of the destination table style list. If the selected cell's style index is an invalid index for the destination table style list, the last style record of the destination table style list is used.

To illustrate, assume a scenario in which the selected cell's style index (as determined at 2512) is i, and the length of the destination table style list is j. If i is less than or equal to j, then the new style for the selected cell is the style defined by the style record at index i of the destination table style list. Conversely, if i is greater than j, then the new style for the selected cell is the style defined by the style record at index j of the destination table style list.

At 2516, application 232 applies the new style determined at 2514 to the selected cell. In the present embodiments, this includes: setting the selected cell's background to the background colour defined by the new style; and setting the selected cell's text attributes to the text attributes defined by the new style.

At 2518, application 232 determines whether there are any cells of the new table that have not yet been processed (e.g. that have not yet had a new style determined for them). If so, processing proceeds to 2710. If all cells of the new table have been processed, processing proceeds to 2520.

At 2520, application 232 determines a font scaling factor. This may be determined in various ways.

In the present embodiment, application 232 is configured to determine the font scaling factor to be the minimum of a defined minimum scaling factor and a calculated scaling factor. The defined min scaling factor may, for example, be 5.

Application 232 may calculate a font scaling factor for the table as a whole—for example a single scaling factor that results in all text of all cells fitting into the cell areas. Alternatively, application 232 may calculate a different font scaling factor for each different cell style—e.g. for a given cell style, a scaling factor that results in all text of all cells that have that style fitting into the cell areas. Alternatively, application 232 may calculate font scaling factors for each cell independently.

To calculate a font scaling factor for a cell (or a set of cells), application 232 may progressively increase (or decrease) the font scaling factor until the cell (or all cells in the set of cells) accommodate the cell text.

At 2522, application 232 applies the font-size scaling factor(s) to the new table cells.

At 2550, application 232 replaces the destination table with the new table.

In the context of the present disclosure, and with the example design formats described above: if the destination table is defined by an element of a deck-format design, replacing the original destination table involves replacing the design element record that defines the destination table with the design element record defining the new table; if the destination table is defined by a document element record of a document-format design, replacing the original destination table involves replacing the document element record that defines the destination table with the document element record defining the new table.

Transfer of the source table is then complete.

Generating a Set of Table Cell Styles

In method 2500, application 232 processes tables to generate sets of cell styles. At 2502 the table is a source table (and the style list generate is a source table style list) and at 2504 the table is a destination table (and the style list generated is a destination table style list).

Figure 26:
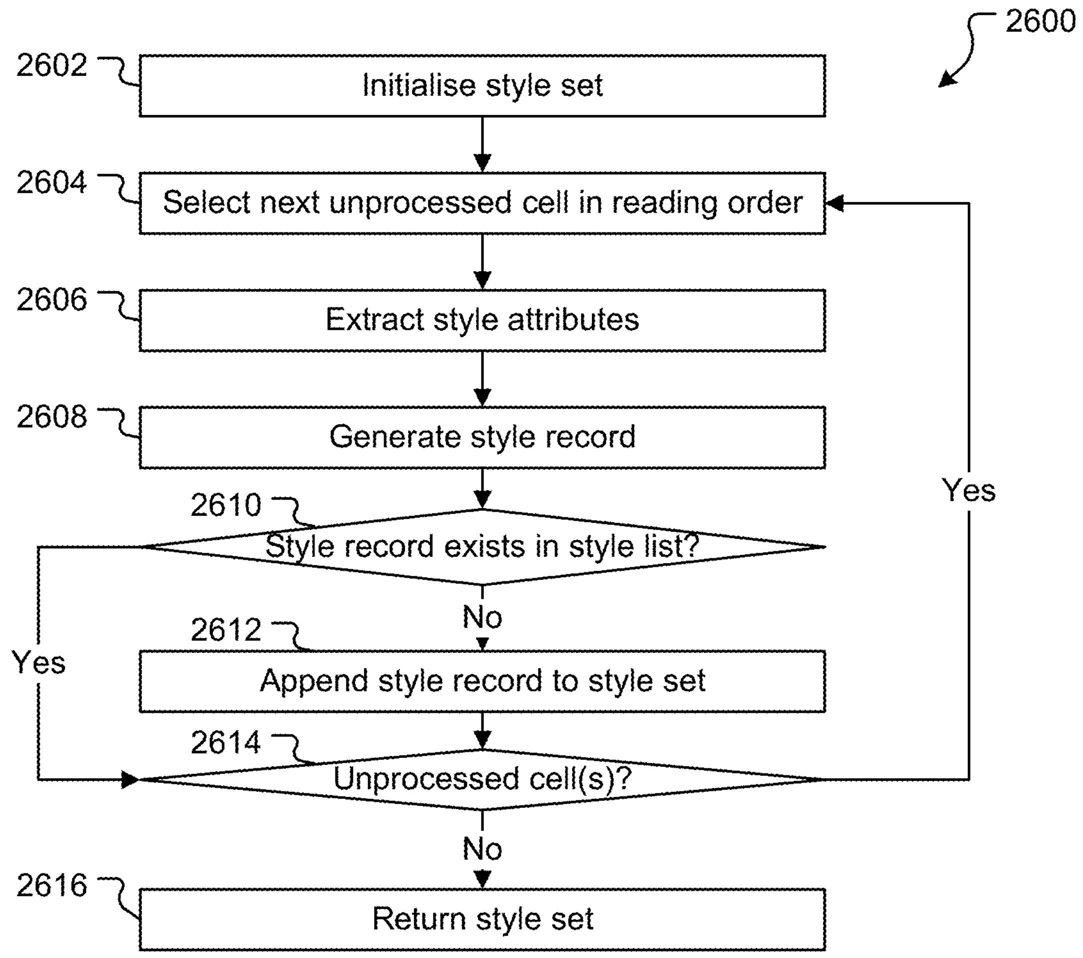
FIG. 26 is a flowchart depicting operations performed to generate a table style list.

A method 2600 for processing an input table (which may be a source table or a destination table) to generate a set of cell styles will be described with reference to FIG. 26. In this embodiment, the set of cell styles generated is an ordered list of cell style records.

At 2602, application 232 initialises an empty set. This will be referred to as the style set. Any appropriate data structure may be used, provided ordering can be achieved (either by virtue of an object's position in the data structure or use of an explicit 'order' attribute of each object). The style set may, for example, be a list or array.

At 2604, application 232 selects the next unprocessed cell of the input table. In the present embodiment, table cells are selected in a reading order. E.g. a first-in-reading-order cell will be initially selected, followed by a second-in-reading-order cell and so forth. For many languages, including English, reading order is left to right, top to bottom. To illustrate this, consider example tables 2700 and 2750 of FIG. 27. In these tables the cell numbers indicate their reading order. E.g. in table 2700 which has two columns and two rows, the left-to-right, top-to-bottom reading order is: cell 1 at (row 1, column 1) (e.g. the top left cell); cell 2 at (row 1, column 2); cell 3 at (row 2, column 1); cell 4 at (row 2, column 2).

At 2606, application 232 extracts style attributes from the selected cell. The style attributes extracted will depend on implementation and what style attributes can be defined for a table cell.

By way of example, the style attributes extracted may include one or more of: cell background colour; cell font family; cell font weight; cell text colour; cell text decoration (e.g. underline); cell font style (e.g. italics); and/or other style attributes.

If the selected cell has text with multiple values for a given style attribute, the most common (or equally most common) value is selected for that attribute. For example, if a cell defines text with five characters in red and 3 in blue, the text colour of red will be selected as the text colour attribute defined by the cell.

At 2608, application 232 generates a style record based on the extracted style attributes.

Application 232 may generate a style record in any appropriate way and in any appropriate format. For example, the style record may be an array with a defined element order—e.g. element index 0=background colour, element index 1=font family, etc.

At 2610, application 232 determines if the style record generated at 2608 exists in the style list. In certain embodiments, application 232 may apply a font size tolerance when determining if the style record generated at 2608 exists in the style list. The font size tolerance may, for example, be 5% (or an alternative tolerance). In this case, if the style record generated at 2608 is the same as a styler record in the style list except the font sizes are different, if the font size of the style record generated at 2608 and the existing style record are within the tolerance of each other (e.g. within 5%), application 232 will determine that the style record generated at 2608 does exist.

If, at 2610, the style record generated at 2608 does not exist in the style list, processing proceeds to 2612.

At 2612, application 232 adds the record generated at 2608 to the style set. In the present embodiment the record is added to the end of (e.g. appended to) the style set. Processing then proceeds to 2614.

If, at 2610, the style record generated at 2608 already exists in the style list, the record generated at 2608 is discarded (i.e. not added to the style list) and processing proceeds to 2614.

At 2614, application 232 determines if there are any unprocessed cells in the table. If so, processing proceeds to 2604.

If, at 2614, all cells have been processed generation of the style list is complete. In this case processing proceeds to 2616 where the style set is returned.

Figure 27:
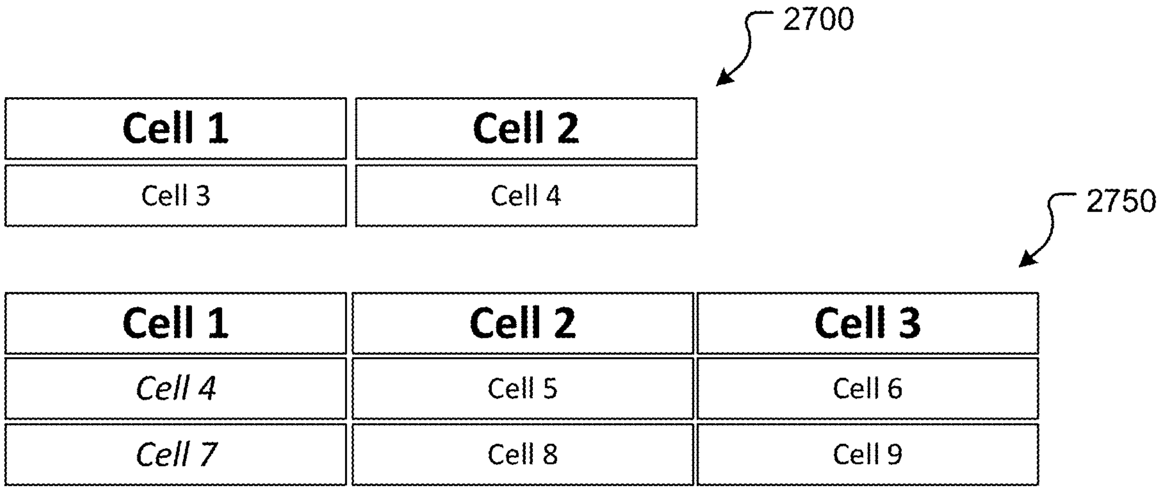
FIG. 27 depicts two example tables.

To illustrate method 2600, consider example tables 2700 and 2750 of FIG. 27.

Consider also a simplified style record that is an array of strings in the following order:

[background colour, font family, bold (true/false), italics (true/false)]

Table 2700 includes four cells with two unique styles: a first style (applied to cells 1 and 2) is indicated by bold Calibri text; a second style (applied to cells 3 and 4) is indicated by normal (non-bold) Calibri text. For a table such as this, and a style record of the following application 232 may generate a style list such as the following:

Style list=[["white", "Calibri", "T", "F"], ["white", "Calibri", "F", "F"]]

Table 2750 includes four cells with three unique styles: a first style (applied to cells 1, 2, and 3) is indicated by bold Calibri text; a second style (applied to cells 4 and 7) is indicated by italic Calibri text; a third style (applied to cells 5, 6, 8, and 9) is indicated by normal (non-bold and non-italic) Calibri text. For a table such as this, application 232 may generate a style list such as the following:

Style list=[["white", "Calibri", "T", "F"], ["white", "Calibri", "F", "T"], ["white", "Calibri", "F", "F"]]

Generating a Deck-Format Design Based on a Deck-Format Design

Figure 28:
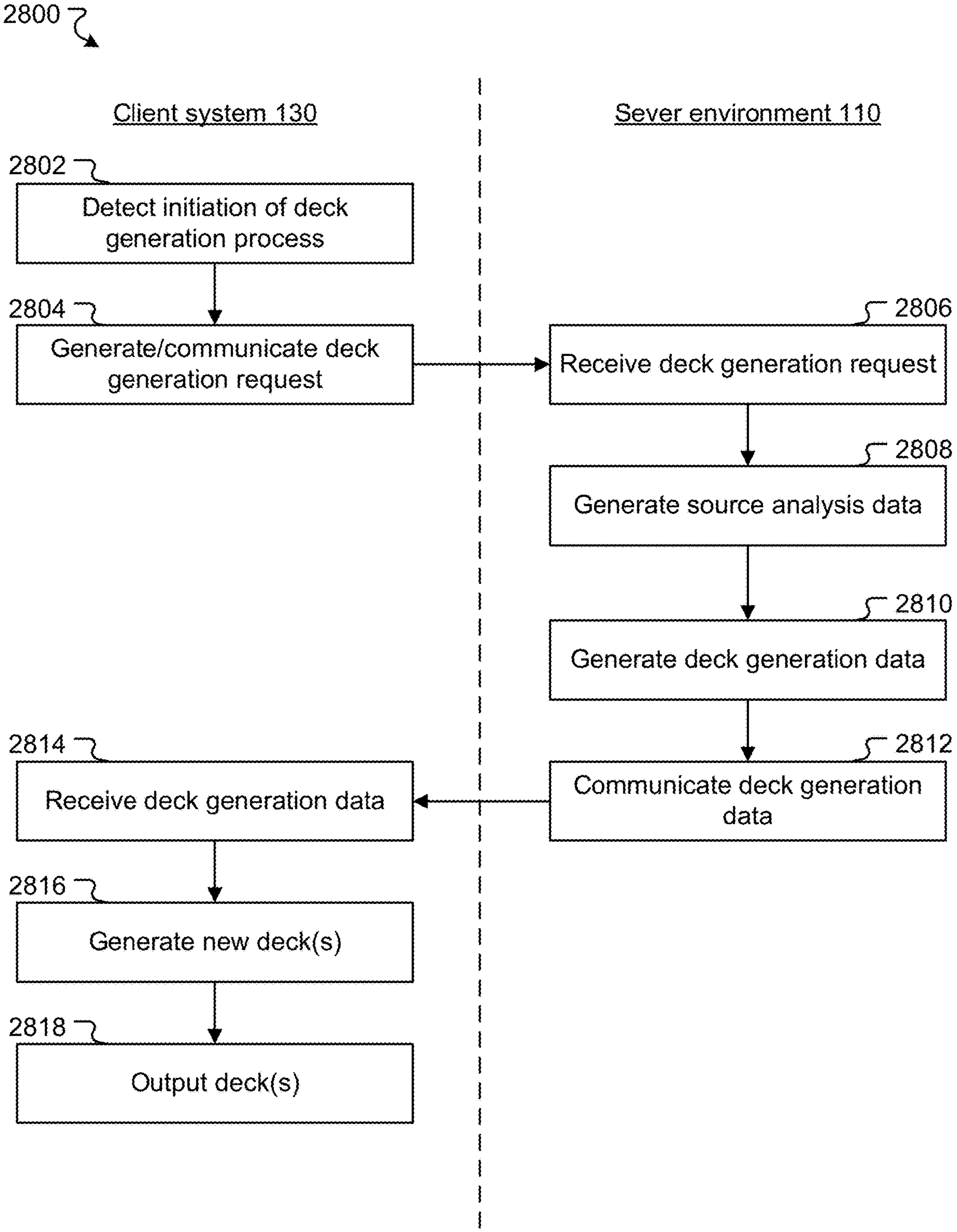
FIG. 28 is a flowchart depicting operations performed to generate a new deck-format design based on a deck-format source design.

Certain embodiments of the present disclosure are directed to generating a deck-format design based on another (source) deck-format design. This may include generating a single deck format design page based on a single (source deck format design page. Referring to FIG. 28, a computer implemented method 2800 for doing so will be described.

In FIG. 28, processing is generally indicated as being performed by (or at) either client system 230 or server environment 210. In this example, the server-side processing is described as being coordinated by server application 214 (which causes other server-side applications to perform various operations). In alternative embodiments, however, the operations of method 2800 could be coordinated and/or performed by alternative applications, or could be performed by a single stand-alone application.

Certain processing blocks of method 2800 are the same (or at least similar) to corresponding processing blocks of method 600 described above (in respect of generating a deck based on a document). Such processing blocks will not be described in detail again.

At 2802, client application 232 detects initiation of a deck to deck generation process. Initiation of the deck to deck generation process is associated with a deck (which will be referred to as the source deck). The source deck includes source content and may, for example, be defined by a deck record as described above.

The deck to deck generation process may be initiated in various ways.

By way of example, the deck to deck generation process may be initiated on detecting user input received at client application 232. This may be user input activating a UI control such as control 422 described above. If the generate deck control 422 is activated while a deck is currently open (and, for example, displayed in preview area 402) or otherwise selected, client application 232 may determine that the open deck is the source deck. Alternatively, on detecting activation of the generate deck control 422 client application 232 may display a search interface that allows a user to search and/or browse for, and then select, a source deck.

At 2804, in response to detecting initiation of the deck to deck generation process, client application 232 generates a deck to deck generation request and communicates this to the server environment 210 (in this example to server application 214). The deck generation request includes data allowing the source deck to be identified—e.g. an identifier of the source deck (which can be used to retrieve the source deck's data) or by providing the deck data itself (e.g. a deck record as described above).

At 2806, server application 214 receives the deck to deck generation request.

At 2808, source analysis data in respect of the source deck is generated. Generally speaking, the source analysis data provides information in respect of the content of the source deck that needs to be transferred to (or included in) any deck that is to be generated.

In the present embodiment, server application 214 passes the source deck (or an identifier thereof) to the design analysis application 216 to generate the source analysis data.

Application 216 may generate the source analysis data for the source deck according to method 500 described with reference to FIG. 5 (or a similar method). In this case, method 500 generates a set of source objects (e.g. at 508).

As the source data will already define one or more discrete deck pages, a pagination process is not required in deck generation method 2800. Accordingly, when generating source analysis data in respect of a deck-format design there is no need to generate content metrics data (per 516 of method 500).

For consistency of terminology, the source data generated at 2808 will be referred to as defining a pagination candidate. In this case the pagination candidate includes a set of one or more candidate pages. Each candidate page corresponds to a (or the singular) page of the source deck, and includes a set of one or more source objects that correspond to the page's elements (or the source content defined by those elements).

At 2810, deck generation data is generated. In the present embodiments, server application 214 passes the source analysis data (which, as noted, may be referred to as a pagination candidate) generated at 2808 (or a reference thereto) to the template matching application 220 to generate the deck generation data.

The deck generation data generated at 2180 may be the same as (or similar to) the deck generation data generated at 612 of method 600. Moreover, the deck generation data may be generated by a method that is the same or similar as method 1400 described above.

At 2812, server application 214 communicates the deck generation data (generated at 2810) to the client system 230 (in this example to client application 232).

At 2814, client application 232 receives the deck generation data.

At 2816, one or more new decks are generated. Each new deck that is generated is based on the deck generation data generated at 2810 (or part thereof) and (in the present embodiments) the source analysis data (generated at 2808) and the content of the source deck itself.

In the present embodiments, a new deck is generated by the content transfer module 234. A new deck may be generated according to method 1600 described above (or a similar method).

At 2818, client application 232 outputs at least one of the one or more decks generated at 2816. Client application 232 may be configured to output a (or multiple) decks as described at 620 of method 600, though may output one or more decks in alternative ways (and/or using alternative user interfaces to UI 700 of FIG. 7).

Method 2800 may be performed in respect of either a multi-page deck-format design or a single page deck-format design.

When method 2800 is performed in respect of a multi-page deck, the processing performed operates to generate one or more new multi-page deck. The new deck includes new pages that correspond to (and include the original content of) the original pages. Each page of the new deck, however, will (unless a matching template page could not be identified at 1504 and/or a fallback page could not be identified at 1508) have different content layouts. Moreover, in many cases the set of new pages for each new deck will all—or at least predominantly—have come from the same deck template and therefore have a common style across them. This provides a user with a convenient way of automatically generating new multi-page decks based on the content of their original multi-page deck. The user can then view the new multi-page decks and select one (or more) for downstream use (either use as is or for further editing).

When method 2800 is performed in respect of a single deck page, the processing performed operates to generate one or more new single deck pages. Once again, unless a matching template page could not be identified at 1504 and/or a fallback page could not be identified at 1508, each new deck page will have a different content layout to the original page. This provides a user with a convenient way of automatically generating new page layouts for the content of their original page. The user can then view the new deck pages and select one (or more) for downstream use (either use as is or for further editing).

Fill Transfer

Methods 2200 and 2300 described above (with reference to FIGS. 22 and 23) include processing for mapping a set of source fills to a set of destination frames (or destination elements). Methods 2200 and 2300 may be performed in various contexts (other than at processing block 1518 of FIG. 15 and processing block 1608 of FIG. 16).

Figure 29:
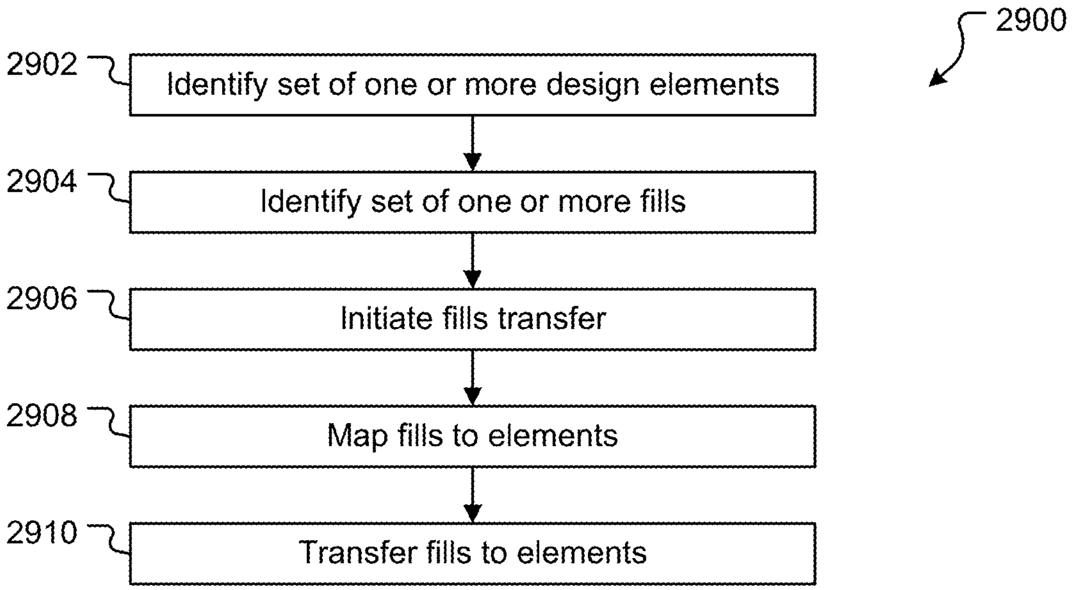
FIG. 29 is a flowchart depicting operations performed to transfer a set of fills.

One example of such an alternative context is described with reference to fill transfer method 2900 of FIG. 29.

Method 2900 is described as being performed by client application 232 (referred to as application 232 in this section for convenience). The processing described may, however, be performed by one or more alternative applications or modules (running on client system 230 and/or at server environment 210).

At 2902, application 232 identifies a set of one or more design elements that can accommodate fills. The one or more design elements may, for example, be shape-type elements. Application 232 may identify the set of one or more design elements based on one or more element selection user inputs. Such user inputs may include, for example, user input(s) selecting element(s) displayed on a page 404A of a user interface such as UI 400.

At 2904, application 232 identifies a set of one or more fills (or images) that are to be transferred to the one or more design elements identified at 2902. Application 232 may identify the set of one or more fills based on one or more fill selection user inputs.

At 2906, application 232 initiates a fills transfer process. Application 232 may initiate the fills transfer process in response to a source fills user input or may automatically initiate the fills transfer process following identification of the design elements and fills.

Application 232 may be configured to detect various fill selection user inputs (at 2904) and source fills user inputs (at 2906).

As one example, the fill selection user input may include a user activating a "select fills" control such as control 424 of UI 400 described above. In response, application 232 may display a fill selection UI that permits further user input to browse/search for and select one or more fills. In this case, the source fills input may, for example, be user input selecting a "source fills" control provided in the fill select UI.

As an alternative example, the fill selection user input may include user input selecting one or more fill previews 412 that are displayed in a preview area such as 411 of UI 400. In this case, the source fills input may be user input selecting a "source fills" UI control (displayed, for example, in region 420 or another UI region) or may be user input that drags the selected preview(s) to one of the selected elements.

At 2908, application 232 maps the set of one or more fills to the set of one or more design elements. Application 232 may map the set of one or more fills to the set of one or more design elements according to the processing described with reference to method 2200 above (or similar processing) and in particular the processing described with reference to processing blocks 2208 to 2222.

In certain embodiments, application 232 may be configured to replace any fills of the design element(s) with the selected fills. In this case, application 232 maps the fill(s) identified at 2904 to the design element(s) identified at 2902. In other embodiments, application 232 may be configured to add the selected fill(s) to any existing fill(s) of the one or more design element(s). In this case, application 232 maps a combined set of fills that includes the fills identified at 2904 and the existing fills of the element(s) identified at 2902 to the design element(s) identified at 2902. In further embodiments, application 232 may provide a user with the option of either replacing or adding to any existing element fills (e.g. via an appropriate UI control).

At 2910, application 232 transfers the set of one or more fills to the set of one or more design elements based on the fill to element mapping performed at 2908. Application 232 may transfer the set of one or more fills to the set of one or more design elements according to method 2300 described above (or a similar method).

Table Transfer

Methods 2500 described above (with reference to FIG. 25) described processing performed to generate a new table based on a source table and a destination table. Method 2500 may be performed in various contexts (other than at processing block 1618 of method 1600). One example of such an alternative context is described with reference to table transfer method 3000 of FIG. 30.

Method 3000 is described as being performed by client application 232 (referred to as application 232 in this section for convenience). The processing described may, however, be performed by one or more alternative applications or modules (running on client system 230 and/or at server environment 210).

At 3002, application 232 identifies a source table. The source table may, for example, be (or be defined by) a table-type design element. Application 232 may identify the source table based on one or more source table selection user inputs. Such user inputs may include, for example, a user input selecting a table-type element displayed on a page 404A of a user interface such as UI 400. By way of further example, a source table selection user input may be user input corresponding to a "copy" command while a table (or table element) is selected (e.g. a keyboard input, activation of a menu or other user interface control, or an alternative input).

At 3004, application 232 identifies a destination table. Application 232 may identify the destination table based on one or more destination table selection user inputs. As one example, the destination table selection user input may include user input selecting a different table that is displayed in a user interface (such as UI 400). The different table may be on the same design page as the source table, on a different design page of the same design that the source table was selected from, or on a page of a different design to the design that the source table was selected from.

At 3006, application 232 initiates a table transfer process. Application 232 may initiate the table transfer process in response to a transfer table user input. A transfer table user input may, for example, be user input selecting a "transfer table" UI control (such as UI control 426 described above). By way of further example, the transfer table user input may be user input corresponding to a "paste" command following selection of a destination table (e.g. a keyboard input, activation of a menu or other user interface control, or an alternative input). Alternatively, application 232 may be configured to automatically initiate the transfer table process following identification of the source table and destination table.

At 3008, application 232 generates a new table based on the source table and the destination table. Application 232 may generate the new table according to method 2500 described above (or a similar method).

Chart Transfer

Figure 31:
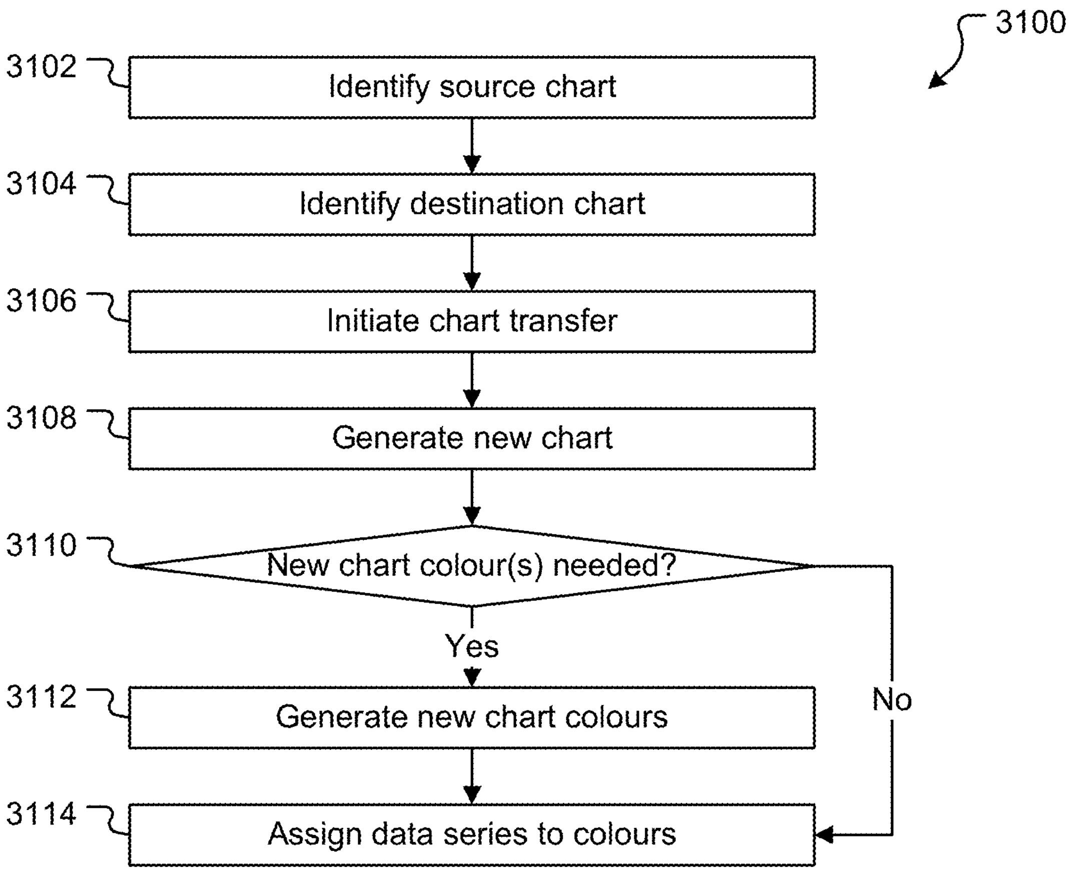
FIG. 31 is a flowchart depicting operations performed to transfer a chart.

Turning to FIG. 31, a method 3100 for generating a new chart based on a source chart and a destination chart will be described. Method 3100 (or certain processing of method 3100) may, for example, be performed at 1620 of method 1600 described above. Method 3100 may, however, be performed in other context where a new chart is to be generated based on a source chart and a destination chart.

Method 3100 is described as being performed by client application 232 (referred to as application 232 in this section for convenience). The processing described may, however, be performed by one or more alternative applications or modules (running on client system 230 and/or at server environment 210).

At 3102, application 232 identifies a source chart. The source chart may, for example, be (or be defined by) a chart-type design element. Application 232 may identify the source chart based on one or more source chart selection user inputs. Such user inputs may include, for example, a user input selecting a chart-type element displayed on a page 404A of a user interface such as UI 400. By way of further example, a source chart selection user input may be user input corresponding to a "copy" command while a chart (or chart element) is selected (e.g. a keyboard input, activation of a menu or other user interface control, or an alternative input).

In the present embodiment, the source chart will include (or be associated with) source chart content data, source chart colour data, and source chart type data. The source chart content data will define one or more data series that the chart displays. The source chart colour data will define one or more colours that are used to display the source chart data series. Typically each data series will be associated with a separate colour, however in some cases two or more different data series may be associated with the same colour. The source chart type data defines a chart type which, in turn, determines how the data series are displayed. Various chart types may be available, for example: a bar chart type; a line chart type; a pie chart type; a scatter plot chat type; and or other chart types.

At 3104, application 232 identifies a destination chart. Application 232 may identify the destination chart based on one or more destination chart selection user inputs. As one example, the destination chart selection user input may be user input selecting a different chart that is displayed in a user interface (such as UI 400). The different chart may be on the same design page as the source chart, on a different design page of the same design that the source chart was selected from, or on a page of a different design to the design that the source chart was selected from.

In the present embodiment, the destination chart will include (or be associated with) destination chart content data (defining one or more data series of the destination chart), destination chart colour data (defining one or more colours that are used to display the data series), and destination chart type data (defining a destination chart type).

At 3106, application 232 initiates a chart transfer process. Application 232 may initiate the chart transfer process in response to a transfer chart user input. A transfer chart user input may, for example, be user input selecting a "transfer chart" UI control (such as UI control 428 described above). By way of further example, the transfer chart user input may be user input corresponding to a "paste" command following selection of a destination chart (e.g. a keyboard input, activation of a menu or other user interface control, or an alternative input). Alternatively, application 232 may be configured to automatically initiate the transfer chart process following identification of the source table and destination table.

Where method 3100 is performed at 1620 of method 1600, the source chart and destination chart are determined based on the content map data (e.g. a content map item that maps a particular source chart to a particular destination chart), and chart transfer is automatically initiated.

At 3108, application 232 generates a new chart.

The new chart includes the source chart content data.

Where the destination chart is defined by a chart-type design element, the new chart may include relevant attributes from that element—for example size, position, rotation attributes that define where the chart is positioned on a design page.

In certain implementations, application 232 may be configured to associate the new chart with the destination chart type. In this case, application 232 is configured to determine whether destination chart type is compatible with the source chart data series. If so, application 232 will associate the new chart with the destination chart type. If not, application 232 will associate the new chart with the source chart type.

In other implementations, application 232 may be configured to associate the new chart with the source chart type.

At 3110, application 232 determines whether one or more new chart colours are required.

If the number of source chart colours is greater than the number of destination chart colours, application 232 determines that one or more new chart colours are required and processing proceeds to 3112.

If the number of source chart colours is less than or equal to the number of destination chart colours, application 232 determines that new chart colours are not required and processing proceeds to 3114.

At 3112, application 232 generates one or more new chart colours.

Application 232 may be configured to generate n new chart colours so that the number of destination chart colours and the number of new chart colours is equal to the number of source chart colours.

Alternatively, application 232 may be configured to generate n new chart colours so that the number of destination chart colours and the number of new chart colours is equal to the number of source chart data series.

In the present embodiments, application 232 generates each new chart colour based on the destination chart colours.

As one example, application 232 may generate each new colour as a variant of a particular destination chart colour. For example, a new chart colour may be generated as a brightness or luminance variant of a destination chart colour.

As another example, application 232 may generate a new chart colour to be a colour that is complementary to a destination chart colours (e.g. selecting a new colour that is opposite a destination chart colour on a colour wheel).

Where multiple new colours are provided, application 232 may generate destination chart colour variants in order—for example: generating a first-in-order new colour as a variant of a first-in-order destination chart colour; generating a second-in-order new colour as a variant of a second-in-order destination chart colour; and so forth. If the number of new colours that needs to be generated exceeds the number of destination chart colours, application 232 may cycle back through the destination chart colours. In this case, application 232 will generate a different variant of a given destination chart colour each time. For example if four new colours are required and there are two destination colours, application 232 may generate: a first variant of the first destination colour; a first variant of the second destination colour; a second variant of the first destination colour; and a second variant of the second destination colour.

Once the one or more new chart colours are generated, processing proceeds to 3114.

At 3114, application 232 assigns each data series of the new chart (which correspond to the source chart data series) to a data series colour. If no new chart colours were required, then each data series as assigned to a destination chart colour. If one or more new chart colours were required, then one or more data series will be assigned to a destination chart colour and one or more data series will be assigned to a new chart colour as generated at 3112.

Application 232 may be configured to assign chart colours in order. For example, application 232 may assign: a first-in-order data series to a first in order destination chart colour (the first in order destination chart colour being the destination chart colour assigned to a first in order destination chart data series); a second-in-order data series to a second-in-order destination chart colour (the second in order destination chart colour being the destination chart colour assigned to a second in order destination chart data series); and so forth. Once all destination chart colours have been assigned to data series, application may then start assigning new chart colours to data series. New chart colours may also be assigned to data series in order (e.g. in the order they were generated).

Application 232 may be configured to generate new chart colours so that the number of destination chart colour and the number of new chart colours is equal to the number of source chart colours.

Once each new chart data series has been assigned to a colour, generation of the new chart is complete. Where the new chart is being included in a design, application 232 may replace a design element that defined the destination chart with an element defining the new chart (or may update the data of the design element that defined the destination chart with the new chart data).

Determining if a Destination Fill can be Replaced by a Partial Fill

Figure 32:
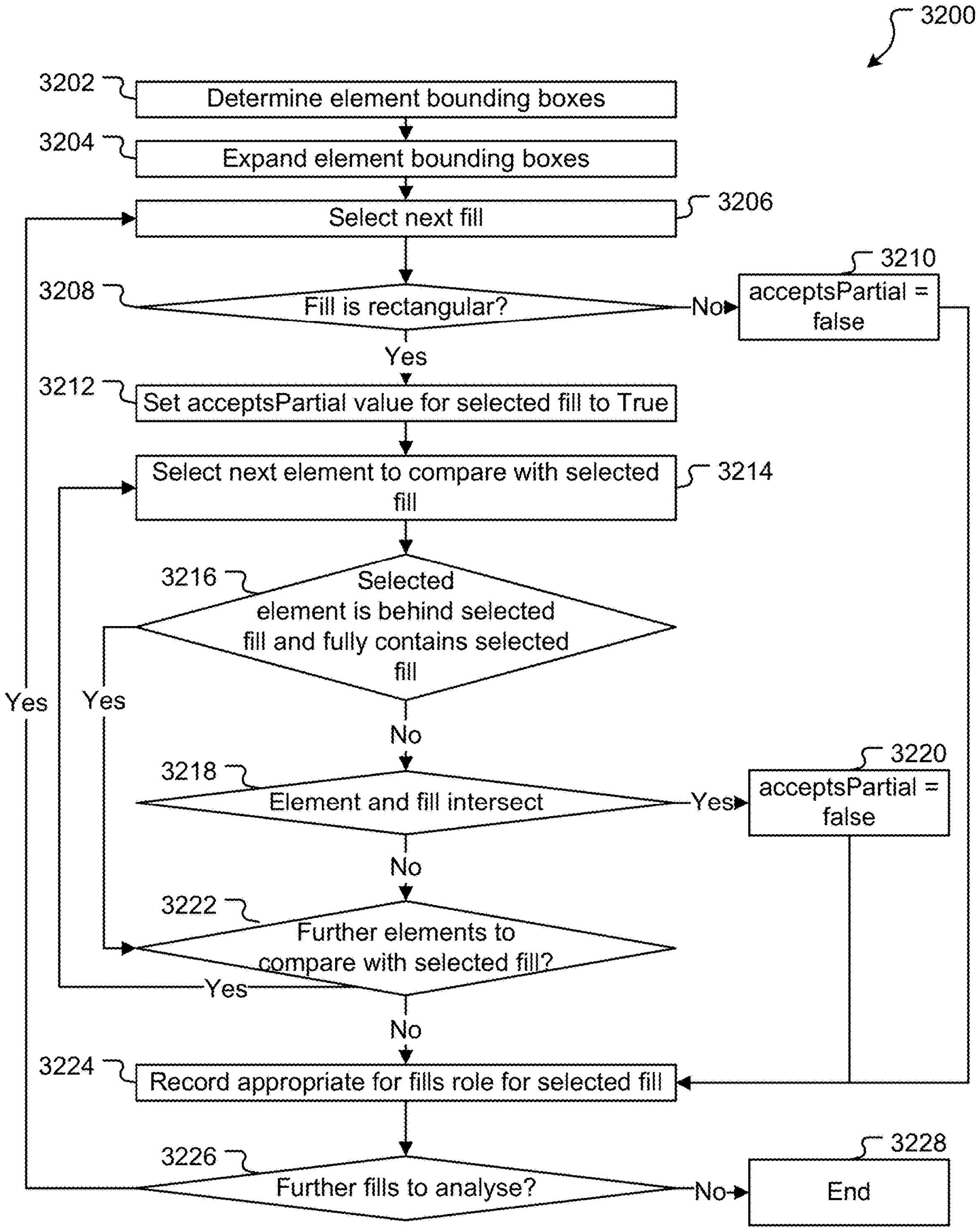
FIG. 32 is a flowchart depicting operations performed to determine a whether a destination fill can be replaced by a partial or complete type source.

Turning to FIG. 32, a method 3200 for determining a whether a destination fill can be replaced by a partial or complete type source fill or not will be described.

As described above, in the context of the present disclosure a partial fill is a fill with one or more transparent regions while a complete fill is a fill with no transparent regions.

In many situations a design (such as s template design) may be designed with a fill positioned on top of (i.e. at a higher depth) one or more other elements. In some cases, an overlying fill such as this may be a partial fill with the designer's intention being that one or more transparencies of the partial fill will expose the underlying element(s) (or parts thereof). In other cases, however, an overlying fill may be a complete fill with the designer's intention being that the overlying fill covers any underlying element(s) (or portions thereof) so they are not visible. Given this, replacing a complete fill with a partial fill may be appropriate in some circumstances but not others. Method 3200 is performed to determine whether a fill of a design (such as a template) should only be replaced by a complete fill or whether it can be replaced by a partial fill.

In the present example, method 3200 determines whether a destination fill that is a complete fill must be replaced by a complete source fill, or whether it could be replaced by a partial source fill or a complete source fill.

Method 3200 may, for example, be performed as part of method 500 described above. In this case method 3200 is performed to determine a value for the appropriate for fill role attribute of a fill type destination object (the destination object corresponding to a shape-type element that defines a fill). Method 3200 may, however, be performed in other contexts.

Method 3200, operates to set an acceptsPartial value for a fill to either true (indicating that a partial fill can be transferred to the destination fill) or false (indicating that only a complete fill can be transferred to the destination fill).

Method 3200 is described as being performed by design analysis application 216 (referred to as application 216 in this section for convenience). The processing described may, however, be performed by one or more alternative applications or modules.

At 3202, application 216 determines (or retrieves) element bounding boxes (which may be referred to as the original element bounding boxes) and depth (e.g. z-index) values for a set of elements. When method 3200 is performed as part of method 500, the set of elements is a set of elements of a template page. When method 3200 is performed in other contexts the set of elements may be an alternative set of elements—e.g. a subset of a deck-format design page's elements that are selected by a user or an application. As described above, each element's original bounding box may be calculated based on by size and position attributes (and may be a set of (minX, minY, maxX, maxY) values). In the example above, each elements z-index (or depth) is determined based on the position of the element in the page's elements array.

At 3204, application 216 calculates expanded element bounding boxes for each element in the set of elements. Application 216 may calculate expanded element bounding boxes in various ways. For example, application 216 may calculate expanded bounding boxes by expanding each element's bounding box by a predefined fixed margin (e.g. of 3 pixels or an alternative number of pixels). Alternatively, application 216 may calculate an element's expanded bounding box by a margin that is relative to (and calculated based on) the element's original bounding box size. For example, application 216 may calculate an element's expanded bounding box based on an expansion factor that is applied to the element's original bounding box. The expansion factor may, for example, be 1.02, 1.05, 1.1 or an alternative expansion factor). Further alternatively, application 216 may calculate an element's expanded bounding box by a margin that is relative to (and calculated based on) the size of the page that the set of elements are part of.

At 3206, application 216 selects a next fill from the set of elements being processed. In the present examples a fill is defined by a shape-type element (and be associated with a fill-type destination object). Application 216 may select fills from the set of elements in any order.

At 3208, application 216 determines if the fill is rectangular (as opposed to being cropped to another shape such as a circle or other non-rectangular path/shape). If the fill is not rectangular, application 216 determines that the selected fill cannot accept partial fills and at 3210 sets acceptsPartial=false. Processing then proceeds to 3224.

If, at 3208, the selected fill is rectangular, processing to 3212. At 3212, application 216 initialises the acceptsPartial value for the selected fill to True.

Over processing blocks 3214 to 3222, application 216 compares the selected fill to one or more of the other elements in the set of elements. For each other element application 216 determines whether certain properties of the element are such that the element makes the selected fill inappropriate for replacement by a partial fill. If application 216 identifies an element that makes the selected fill inappropriate for replacement by a partial fill, no further element need to be considered for the selected fill. If a given element does not make the selected fill inappropriate for replacement by a partial fill, application 216 proceeds to compare the selected fill with other elements in the set of elements (unless all other elements have already been considered). If none of the elements make the selected fill inappropriate for replacement by a partial fill, application 216 determines that the selected fill is appropriate for replacement by a partial fill. This process is described in further detail below.

At 3214, application 216 selects the next element from the set of elements to compare with the selected fill. Elements may be selected in any order (though the element corresponding to the selected fill itself need not be selected).

At 3216, application 216 determines whether the selected element is behind the selected fill and contains the selected fill. This determination is based on the z-index values and expanded bounding boxes (as calculated at 3204) of the selected fill and the selected element. Application 216 will determine that the selected element contains the selected fill if all of its bounding box edges are beyond or the same as the bounding box edges of the selected fill—e.g. if all of the following conditions are met for a selected fill F1 and a selected element E1:

$$F1\ \min Y >= E1\ \min Y$$

$$F1\ \max Y <= E1\ \max Y$$

$$F1\ \min X >= E1\ \min X$$

$$F1\ \max X <= E1\ \max X$$

If, at 3216, application 216 determines that the selected element is behind the selected fill and fully contains the selected fill, application 216 determines that the selected element does not make the selected fill inappropriate for replacement by a partial fill. In this case processing the selected element is complete and processing proceeds to 3222 (with the selected fill's acceptsPartial=true value maintained).

If, at 3216, application 216 determines that the selected element is not behind the selected fill or the selected element does not fully contain the selected fill, processing proceeds to 3218.

At 3218, application 216 determines whether the selected fill and the selected element intersect. Application 216 will determine that the selected fill and the selected element intersect if their expanded bounding boxes overlap (irrespective of the depth or z-index of the selected fill and selected element).

If, at 3218, the selected fill and the selected element do intersect, application 216 determines that the selected fill cannot accept partial fills and at 3220 sets acceptsPartial=false. Processing then proceeds to 3224.

If, at 3218, the selected fill and the selected element do not overlap, application 216 determines that the selected element does not make the selected fill inappropriate for replacement by a partial fill. In this case processing the selected element is complete and processing proceeds to 3222.

At 3222, application 216 determines whether there are further elements to compare the currently selected fill to. If so, processing proceeds to 3214 to select the next element. If not, processing proceeds to 3224.

At 3224, application 216 records the 'appropriate for fill roles' attribute value for the selected fill. In the present example, if the "acceptsPartial" value is true, application 216 records an 'appropriate for fill roles' attribute value that indicates the fill is appropriate for (and can be replaced with) either partial or complete fills. If the "acceptsPartial" value is false, application 216 records an 'appropriate for fill roles' attribute value that indicates the fill is only appropriate for (and can only be replaced with) complete fills. Processing then proceeds to 3226.

At 3226, application 216 determines whether there are further fills analyse. If so, processing proceeds to 3206 to select the next fill. If not, processing is complete (as indicated at 3228).

Determining Text Hierarchy Levels

Figure 33:
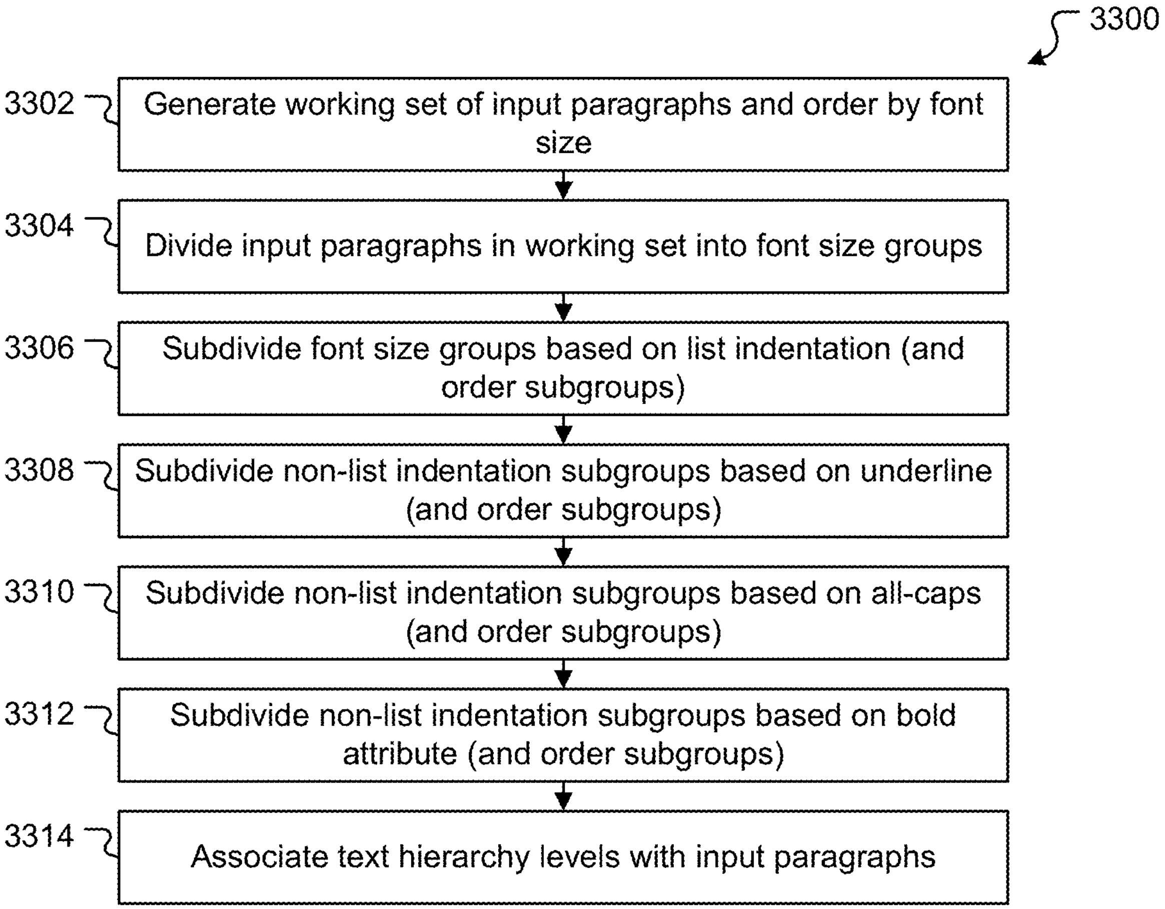
FIG. 33 is a flowchart depicting operations performed to process a set of input paragraphs to determine a set of text hierarchy levels defined by those paragraphs.

Turning to FIG. 33, a method 3300 for processing a set of input paragraphs to determine a set of text hierarchy levels defined by those paragraphs will be described.

Method 3300 may, for example, be performed as part of (or in advance of) method 500 described above. In this case, each text type content segment of the input deck (or each text type analysis object) is an input paragraph.

Method 3300 may, for example, be performed as part of (or in advance of) method 800 described above. In this case, each text type content segment of the source document (or each text type source object) is an input paragraph.

Method 3300 may, however, be performed in other contexts. For example. Method 3300 may be performed to determine a set of text hierarchy levels for any set of input paragraphs that have been selected by a user or application.

Figure 34:
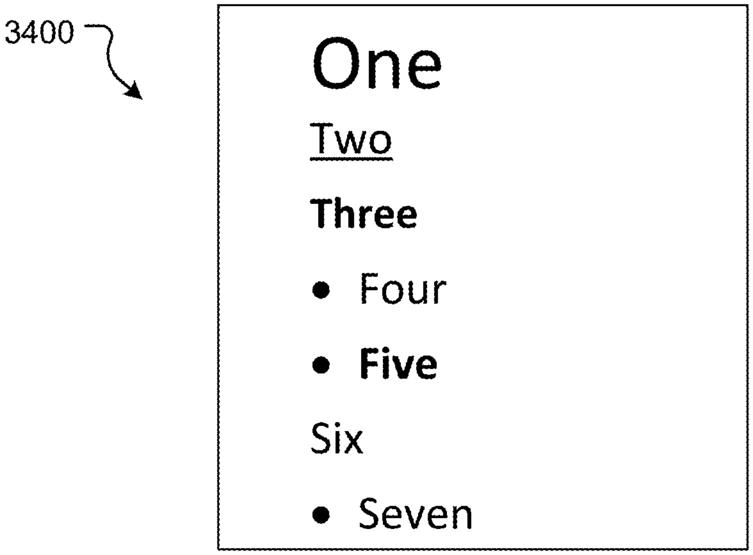
FIG. 34 depicts an example page with input paragraphs having different text formats.

For illustrative purposes, method 3300 will be described with reference to example page 3400 of FIG. 34. Example page 3400 depicts seven input paragraphs which have text formats as follows.

| Input para ID. | Font size | List indent. level | Underline | All caps | Bold |
|---|---|---|---|---|---|
| 1 | 30 | 0 (not list) | N | N | N |
| 2 | 18 | 0 | Y | N | N |
| 3 | 17 | 0 | N | N | Y |
| 4 | 18 | 1 | N | N | N |
| 5 | 18 | 1 | N | N | Y |
| 6 | 18 | 0 | N | N | N |
| 7 | 18 | 1 | N | N | N |

Generally speaking, method 3300 involves generating a working set of input paragraphs (or input paragraph identifiers) and then progressively sub-dividing that working set into subgroups of input paragraphs based on various format attributes that the input paragraphs may be associated with (or the absence of such format attributes). At the end of the method, the subgroups of the working set define the text hierarchy levels (and the order of those subgroups in the working set define the order of the hierarchy levels).

At 3302, application 216 generates a working set of input paragraphs. This may, for example, be an array of paragraph identifiers. Application 216 orders the working set of input paragraphs based on the input paragraph font sizes, from largest font size to smallest font size. In the present embodiment, if a single input paragraph includes multiple font sizes, application 216 determines that the font size for the input paragraph is the font size with the largest number of non-whitespace characters of the input paragraph. If a paragraph includes two or more font sizes that have the same largest number of non-whitespace characters, application 216 may be configured to determine the largest font size with the same largest number of non-whitespace characters to be the paragraph's font size.

To illustrate, the working set corresponding to the input paragraphs of example page 3400 may be as follows (using input paragraph identifiers):

[1,2,4,5,6,7,3]

At 3304, application 216 divides the working set of input paragraphs into font size groups. This may be referred to as a first-in-order subdivision of the working set.

In certain embodiments, each distinct font size determined at 3302 is assigned to its own font size group. To illustrate this embodiment, dividing the working set above would result in the following font size groups:

| Group 1 | Group 2 | Group 3 |
|---|---|---|
| [[1]<br>Font = 30 | [2, 4, 5, 6, 7]<br>Font = 18 | [3]<br>Font = 17 |

In other embodiments, application 232 applies a tolerance when generating font size groups. The tolerance may, for example, be 10%. To illustrate this embodiment, dividing the working set above would result in the following font size groups:

| Group 1 | Group 2 |
|---|---|
| [1]<br>Font = 30 | [2, 4, 5, 6, 7, 3]]<br>Font = 18 & 17 |

The remaining examples are provided in the context of these font size sub-groups (i.e. with a tolerance applied).

At 3306, application 216 subdivides each font size group in the working set based one or more list attributes. This may be referred to as a first-in-order subdivision of the existing groups of the working set. In particular, application 216 subdivides each font size group based on list indentation levels (or the absence of list indentation). A new subgroup is created for each list indentation level encountered. For each font size group that is subdivided, application 216 orders the list indentation level sub-groups from the smallest list indentation level to the largest list indentation level. To illustrate this, subdividing the working set above based on list indentation level provides:

| Group 1 | Group 2.2 | Group 2.2 |
|---|---|---|
| [[1]<br>Font = 30<br>List = none | [2, 6, 3]<br>Font = 18 & 17<br>List = none | [4, 5, 7]]<br>Font = 18 & 17<br>List = 1 |

In this example, group 1 remains unchanged and group 2 has been subdivided into group 2.1 (no list indent) and group 2.2 (list indent level 1).

At 3308, application 216 analyses each group in the working set that is not associated with a list to determine whether subdivision of that group based on an underline format is required. For any group in the working set that is not associated with a list and that includes one or more input paragraphs that are underline paragraphs and one or more input paragraphs that are not underline paragraphs, application 216 divides that group into an underline subgroup (that includes the underline input paragraphs) and a non-underline subgroup (that includes the non-underline input paragraphs). This may be referred to as a second-in-order subdivision of the working set. Application 216 then orders the underline/non-underline subgroups in that order (e.g. underline followed by non-underline). In the present embodiment, application 216 will determine that a paragraph is an underline paragraph only if all non-whitespace characters of that paragraph are underlined characters. If any non-whitespace characters of a paragraph are not underlined characters, application 216 determines that the paragraph is not an underline paragraph.

To illustrate this, subdividing the working set above based on underline provides:

| Group 1 | Group 2.2.1 | Group 2.2.2 | Group 2.2 |
|---|---|---|---|
| [1]<br>Font = 30<br>List = none<br>Underline = no | [2]<br>Font = 18 & 17<br>List = none<br>Underline = yes | [6, 3]<br>Font = 18 & 17<br>List = none<br>Underline = no | [4, 5, 7]]<br>Font = 18 & 17<br>List = 1<br>Underline = no |

In this example, group 1 remains unchanged, group 2.2 has been divided into group 2.2.1 (underline) and 2.2.2 (non-underline), and group 2.2 remains unchanged (as it has list indentation).

At 3310, application 216 analyses each group in the working set that is not associated with a list to determine whether subdivision of that group based on an all-caps format is required. For any group in the working set that is not associated with a list and that includes one or more input paragraphs that are all-caps paragraphs and one or more input paragraphs that are not all-caps paragraphs, application 216 divides that group into an all-caps subgroup (that includes the all-caps input paragraphs) and a non-all-caps subgroup (that includes the non-all-caps input paragraphs). This may be referred to as a third-in-order subdivision of the working set. Application 216 then orders the all-caps/non-all-caps subgroups in that order (e.g. all-caps followed by non-all-caps). In the present embodiment, application 216 will determine that a paragraph is an all-caps paragraph only if all non-whitespace characters of that paragraph are all-caps characters. If any non-whitespace characters of a paragraph are not all-caps characters, application 216 determines that the paragraph is not an all-caps paragraph.

In the present example, none of the input paragraphs include all-caps text so the working set does not change.

At 3312, application 216 analyses each group in the working set that is not associated with a list to determine whether subdivision of that group based on a bold format is required. For any group in the working set that is not associated with a list and that includes one or more input paragraphs that are bold paragraphs and one or more input paragraphs that are not bold paragraphs, application 216 divides that group into a bold subgroup (that includes the bold input paragraphs) and a non-bold subgroup (that includes the non-bold input paragraphs). This may be referred to as a fourth-in-order subdivision of the working set. Application 216 then orders the bold/non-bold subgroups in that order (e.g. bold followed by non-bold). In the present embodiment, application 216 will determine that a paragraph is a bold paragraph only if all non-whitespace characters of that paragraph are bold characters. If any non-whitespace characters of a paragraph are not bold characters, application 216 determines that the paragraph is not a bold paragraph.

To illustrate this, subdividing the working set above based on bold format provides:

| Group 1 | Group 2.2.1 | Group 2.2.2.1 | Group 2.2.2.2 | Group 2.2 |
|---|---|---|---|---|
| [[1] | [2] | [3] | [6] | [4, 5, 7]] |
| Font = 30 | Font = 18 & 17 | Font = 18 & 17 | Font = 18 & 17 | Font = 18 & 17 |
| List = none | List = none | List = none | List = none | List = 1 |
| Underline = no | Underline = yes | Underline = no | Underline = no | Underline = no |
| All-caps = no | All-caps = no | All-caps = no | All-caps = no | All-caps = no |
| Bold = no | Bold = no | Bold = yes | Bold = no | Bold = no |

In this example: group 1 remains unchanged; group 2.2.1 remains unchanged; group 2.2.2 has been divided into group 2.2.2.1 (bold) and 2.2.2.2 (non-bold); and group 2.2 remains unchanged (as it has list indentation).

At 3314, determination of the text hierarchy levels is complete. In particular, each subgroup in the working set defines a different text hierarchy level (and the input paragraphs that belong to that hierarchy level) and the order of the subgroups defines the order of the hierarchy levels (the subgroup at index 0 of the working set being associated with the topmost text hierarchy level). In the above example, therefore, five distinct text hierarchy levels have been identified: text hierarchy level 1 (with input paragraph 1); text hierarchy level 2 (with input paragraph 2); text hierarchy level 3 (with input paragraph 3); text hierarchy level 4 (with input paragraph 6); and text hierarchy level 5 (with input paragraphs 4, 5, and 7).

At 3314 application 216 may return the text hierarchy levels along with the associated input paragraphs and/or associated format attributes. In addition, or alternatively, application 216 may associate each text hierarchy level with its associated input paragraph(s) (and/or with analysis objects corresponding to those paragraphs and/or with design elements corresponding to those paragraphs).

The particular format attributes that are used at each subdivision described above have been identified to generate set of text hierarchy levels that extract core text structure well for both graphic designs (which may, for example, be deck-format designs) and for word processing documents (which may, for example, be document-format designs). In alternative implementations, however, the particular format that is used at each subdivision may be varied.

CLAUSES

Further examples of specific feature combinations taught within the present disclosure are set out in the following sets of numbered clauses.

Clause Set A

Clause a.1. A computer implemented method for generating analysis data in respect of a deck-format design, the method including:

accessing deck-format design data in respect of the deck-format design, the deck-format design data defining a first page of the deck format design, the first page including a set of one or more design elements, each element of the one or more design elements including position data that defines a position at which the element is positioned on the first page and content data defining content that is to be displayed on the first page;

selecting a first design element of the one or more design elements, the content data of the first element defining first content; and generating a first analysis object corresponding to the first element, the first analysis object including a first set of analysis object attributes, the first set of analysis object attributes including:

a first target identifier attribute that identifies the first element;

a first type attribute that identifies a content type of the first content; and a first reading order attribute that identifies a position of the first element in a reading order of the one or more design elements; and associating the first analysis object with the first page.

Clause a.2. The computer implemented method of clause a.1, wherein the first content includes a first separable content item and a second separable content item, and wherein:

the first analysis object corresponds to the first separable content item; and the first target identifier attribute identifies both the first element and the first separable content item.

Clause a.3. The computer implemented method of clause a.2, wherein the method further includes:

generating a second analysis object corresponding to the second separable content item, the second analysis object including a second set of analysis object attributes, the second set of analysis object attributes including a second target identifier attribute that identifies the first element and the second separable content item; and associating the second analysis object with the first page.

Clause a.4. The computer implemented method of clause a.2 or a.3, wherein the first element is a shape type element, the first separable content item is a first fill, and the second separable content item is a second fill.

Clause a.5. The computer implemented method of clause a.2 or a.3, wherein the first element is a text type element, the first separable content item is a first vertically delineated block of text, and the second separable content item is a second vertically delineated block of text.

Clause a.6. The computer implemented method of any one of clauses a.1 to a.5, wherein:

the first element is a text type element and the first content is text content having a text hierarchy level; and the first set of analysis object attributes further includes a text hierarchy level attribute that records the text hierarchy level of the text content.

Clause a.7. The computer implemented method of any one of clauses a.1 to a.6, wherein the first element is a text type element and the first content is text content, the first set of analysis object attributes includes a characters attribute, and the method further includes:

analysing the text content to calculate a characters value, the characters value being based on a number of characters of the text content; and recording the characters value using the characters attribute.

Clause a.8. The computer implemented method of any one of clauses a.1 to a.7, wherein the first element is a text type element and the first content is text content, the first set of analysis object attributes includes a lines attribute, and the method further includes:

analysing the text content to calculate a lines value, the lines value providing a measure of the vertical capacity of the first element; and recording the lines value using the lines attribute.

Clause a.9. The computer implemented method of any one of clauses a.1 to a.8, wherein the deck-format design is a destination design that is to be used as a destination in a design generation process, and wherein the first set of analysis object attributes further includes a receive content attribute, and wherein the method further includes:

analysing the first element to determine if the first element is an element that can receive source content in a content transfer process; and assigning the receive content attribute with a value indicating whether the first element is an element that can receive source content or not.

Clause a.10. The computer implemented method of any one of clauses a.1 to a.9, wherein the deck-format design is a destination design that is to be used as a destination in a design generation process, and wherein the first set of analysis object attributes further includes an appropriate for fill role attribute, and wherein the method further includes:

analysing the first design element to determine if a fill defined by the first design element can be replaced by a partial-type replacement fill that includes one or more transparent regions; and in response to determining that the fill defined by the first design element can be replaced by a partial-type replacement fill, assigning the appropriate for fill role attribute with a value indicating that the fill defined by the first design element can be replaced by a partial-type replacement fill.

Clause a.11. The computer implemented method of clause a.10, wherein analysing the first design element to determine if the fill defined by the first design element can be replaced by a partial-type replacement fill is performed in accordance with the method of any one of clauses p.1 to p.15.

Clause a.12. The computer implemented method of any one of clauses a.1 to a.8, wherein the deck-format design is a source design that is to be used in a design generation process, and wherein the first set of analysis object attributes further includes a transfer content attribute, and wherein the method further includes:

analysing the first element to determine if the first content is source content that is to be transferred in a content transfer process; and assigning the transfer content attribute with a value indicating whether the first content is source content or not.

Clause a.13. The computer implemented method of any one of clauses a.1 to a.18, wherein the design is a source design that is to be used in a design generation process, and wherein the first set of analysis object attributes further includes a fill role attribute, and wherein the method further includes:

analysing the first design element to determine if a fill defined by the first design element is a partial-type fill that includes one or more transparent regions or a complete-type fill that does not include any transparent regions; and in response to determining that the fill defined by the first design element is a partial-type fill, assigning the fill role attribute with a value indicating that the fill defined by the first design element is a partial-type fill.

Clause a.14. The computer implemented method of any one of clauses a.1 to a.13, further including:

generating a partition key in respect of the first page, the partition key including a plurality of partition key values that provide a first measure of the type and amount of content that can be accommodated by the first page; and associating the partition key with the first page.

Clause a.15. The computer implemented method of clause a.14, wherein generating the partition key includes generating a partition key texts value, the partition key texts value indicating a number of text type elements in the set of one or more elements.

Clause a.16. The computer implemented method of clause a.14 or a.15, wherein generating the partition key includes generating a partition key fills value, the partition key fills value indicating a number of fills that the set of one or more elements can accommodate.

Clause a.17. The computer implemented method of any one of clauses a.15 to a.16, wherein generating the partition key includes generating a partition key charts value, the partition key charts value indicating a number of charts that the set of one or more elements can accommodate.

Clause a.18. The computer implemented method of any one of clauses a.14 to a.17, wherein generating the partition key includes generating a partition key tables value, the partition key tables value indicating a number of tables that the set of one or more elements can accommodate.

Clause a.19. The computer implemented method of any one of clauses a.1 to a.18, further including:

generating a page vector in respect of the first page, the page vector including a plurality of page vector values that provide a second measure of the type and amount of content that can be accommodated by the first page; and associating the page vector with the first page.

Clause a.20. The computer implemented method of clause a.19, wherein generating the page vector includes generating a set of one or more page vector characters values, wherein a first page vector characters value is associated with a first text hierarchy level and is based on a number of text characters in the first page that are at the first text hierarchy level.

Clause a.21. The computer implemented method of clause a.19 or a.10, wherein generating the page vector includes generating a set of one or more page vector lines values, wherein a first page vector lines value is associated with a first text hierarchy level and is based on a number of lines of text in the first page that are at the first text hierarchy level.

Clause a.22. The computer implemented method of any one of clauses a.19 to a.21, wherein generating the page vector includes generating one or more page vector values selected from a group including: a fills aspect ratio value that is based on aspect ratios of any fills in the first page; a partial fills value that is based on a number of partial-type fills in the first page; a complete fills value that is based on a number of complete-type fills in the first page; a charts aspect ratio value that is based on aspect ratios of any charts in the first page; a tables aspect ratio value that is based on aspect ratios of any tables in the first page.

Clause a.23. The computer implemented method of any one of clauses a.1 to a.22, further including:

generating a set of content metric values in respect of the first page, the set of content metric values including a plurality of content metric values that provide a third measure of the type and amount of content that can be accommodated by the first page; and associating the set of content metrics with the first page.

Clause a.24. The computer implemented method of clause a.23, wherein generating the set of content metric values includes generating one or more content metric values selected from a group including: a content metric characters value that is based on a number of characters on the first page; a content metric lines value that is based on a number of lines of text on the first page; a content metric fills value that is based on a number of fills on the first page; a content metric tables value that is based on a number of tables on the first page; and a content metric charts value that is based on a number of charts on the first page.

Clause Set B

Clause b.1. A computer implemented method for generating analysis data in respect of a document-format design, the method including:

accessing document-format design data in respect of the document-format design, the document-format design data defining an ordered sequence of one or more content items, each content item of the one or more content items defining content of the document-format design;

selecting a first content item of the one or content items, the content data of the first content item defining first content; and generating a first source object corresponding to the first content item, the first source object including a first set of source object attributes, the first set of source object attributes including:

a first source identifier attribute that identifies the first content item;

a first type attribute that identifies a content type of the first content; and a first reading order attribute that identifies a position of the first content item in a reading order of the one or more content items; and associating the first source object with the document-format design.

Clause b.2. The computer implemented method of clause b.1, wherein the first content includes a first separable content item and a second separable content item, and wherein:

the first source object corresponds to the first separable content item; and the first source identifier attribute identifies both the first content item and the first separable content item.

Clause b.3. The computer implemented method of clause b.2, wherein the method further includes:

generating a second source object corresponding to the second separable content item, the second source object including a second set of source object attributes, the second set of source object attributes including a second source identifier attribute that identifies the first content item and the second separable content item; and associating the second source object with the document-format design.

Clause b.4. The computer implemented method of clause b.2 or b.3, wherein the first content item is a text type content item, the first separable content item is a first vertically delineated block of text, and the second separable content item is a second vertically delineated block of text.

Clause b.5. The computer implemented method of any one of clauses b. 1 to b.4, wherein the first set of source object attributes further includes a transfer content attribute, and wherein the method further includes:

analysing the first content item to determine if the first content is source content that is to be transferred in a content transfer process; and assigning the transfer content attribute with a value indicating whether the first content is source content or not.

Clause b.6. The computer implemented method of any one of clauses b.1 to b.5, wherein:

the first content item is a text type content item and the first content is text content having a text hierarchy level;

the first set of source object attributes further includes a text hierarchy level attribute that records the text hierarchy level of the text content.

Clause b.7. The computer implemented method of any one of clauses b.1 to b.6, wherein the first content item is a text type content item and the first content is text content, the first set of source object attributes includes a characters attribute, and the method further includes:

analysing the text content to calculate a characters value, the characters value being based on a number of characters of the text content; and recording the characters value using the characters attribute.

Clause b.8. The computer implemented method of any one of clauses b.1 to b.7, wherein the first content item is a text type content item and the first content is text content, the first set of source object attributes includes a lines attribute, and the method further includes:

analysing the text content to calculate a lines value, the lines value providing a measure of the vertical distance that the text content may occupy; and recording the lines value using the lines attribute.

Clause b.9. The computer implemented method of clause b.8, further including calculating the lines value by estimating a number of wrapped lines required to accommodate the characters of the text content.

Clause b.10. The computer implemented method of any one of clauses b.1 to b.9, wherein the first content item is not associated with explicit position data that defines a display position of the first content item in the document.

Clause b.11. The computer implemented method of any one of clauses b.1 to b.10, wherein a display position of the first content item is determined based on where a sequence position of the first content item in the ordered sequence of one or more content items.

Clause b.12. The computer implemented method of any one of clauses b.1 to b.11, further including:

generating a set of analysis items, the set of analysis items including an analysis item corresponding to each of the one or more content items;

processing the set of analysis items to determine a first subset of analysis items, the first subset of analysis items defining a candidate page.

Clause b.13. The computer implemented method of clause b.12, further including generating a partition key in respect of the candidate page, the partition key including a plurality of partition key values that provide a first measure of the type and amount of content defined by the first subset of analysis items.

Clause b.14. The computer implemented method of clause b.13, wherein generating the partition key includes generating a partition key texts value, the partition key texts value indicating a number of text type analysis items in the first subset of analysis items.

Clause b.15. The computer implemented method of any one of clauses b.13 or b.14, wherein generating the partition key includes generating a partition key fills value, the partition key fills value indicating a number of fills defined by analysis items in the first subset of analysis items.

Clause b.16. The computer implemented method of any one of clauses b.13 to b.15, wherein generating the partition key includes generating a partition key charts value, the partition key charts value indicating a number of charts defined by analysis items in the first subset of analysis items.

Clause b.17. The computer implemented method of any one of clauses b.13 to b.16, wherein generating the partition key includes generating a partition key tables value, the partition key tables value indicating a number of tables defined by analysis items in the first subset of analysis items.

Clause b.18. The computer implemented method of any one of clauses b.12 to b.17, further including:

generating a page vector in respect of the candidate page, the page vector including a plurality of page vector values that provide a second measure of the type and amount of content defined by the first subset of analysis items.

Clause b.19. The computer implemented method of clause b.18, wherein generating the page vector includes generating a set of one or more page vector characters values, wherein a first page vector characters value is associated with a first text hierarchy level and is based on a number of text characters in the first subset of analysis items that are at the first text hierarchy level.

Clause b.20. The computer implemented method of clause b.18 or b.19, wherein generating the page vector includes generating a set of one or more page vector lines values, wherein a first page vector lines value is associated with a first text hierarchy level and is based on a number of lines of text in the first subset of analysis items that are at the first text hierarchy level.

Clause b.21. The computer implemented method of any one of clauses b.18 to b.20, wherein generating the page vector includes generating one or more page vector values selected from a group including: a fills aspect ratio value that is based on aspect ratios of any fills in the first subset of analysis items; a partial fills value that is based on a number of partial-type fills in the first subset of analysis items; a complete fills value that is based on a number of complete-type fills in the first subset of analysis items; a charts aspect ratio value that is based on aspect ratios of any charts in the first subset of analysis items; a tables aspect ratio value that is based on aspect ratios of any tables in the first subset of analysis items.

Clause b.22. The computer implemented method of any one of clauses b.12 to b.21, further including:

generating a set of content metric values in respect of the candidate page, the set of content metric values including a plurality of content metric values that provide a third measure of the type and amount of content defined by the first subset of analysis items.

Clause b.23. The computer implemented method of clause b.22, wherein generating the set of content metric values includes generating one or more content metric values selected from a group including: a content metric characters value that is based on a number of characters in the first subset of analysis items; a content metric lines value that is based on a number of lines of text in the first subset of analysis items; a content metric fills value that is based on a number of fills in the first subset of analysis items; a content metric tables value that is based on a number of tables in the first subset of analysis items; and a content metric charts value that is based on a number of charts in the first subset of analysis items.

Clause b.24. The computer implemented method of any one of clauses b.12 to b.23, wherein processing the set of analysis items to determine the first subset of analysis items is performed in accordance with a method according to any one of clauses c.1 to c.13.

Clause Set C

Clause c.1. A computer implemented method including:

accessing a set of one or more source objects, wherein:

each source object is associated with a source content segment of a document-format design and a set of source object attributes that include a source identifier attribute that identifies the source content segment; and the set of one or more source objects includes a plurality of text type source objects, wherein each text type source object corresponds to a text type source content segment and wherein the set of source object attributes for each text type source object includes a text hierarchy level attribute that defines a text hierarchy level;

generating a first pagination candidate that includes a first set of one or more candidate pages, the first set of one or more candidate pages including a first candidate page that is associated with a first subset of source objects from the one or more source objects and a second candidate page that is associated with a second subset of source objects from the one or more source objects;

selecting the first candidate page;

splitting the first candidate page by:

determining a first split level, the first split level corresponding to a first text hierarchy level;

determining a third subset of source objects that includes one or more source objects from the first subset of source objects that are selected based on the first split level;

determining a fourth subset of source objects that includes one or more source objects from the first subset of source objects that are different to the one or more source objects in the third subset of source objects and are selected based on the first split level;

generating a third candidate page that is associated with the third subset of source objects;

generating a fourth candidate page that is associated with the fourth subset of source objects; and generating a second pagination candidate that includes a second set of one or more candidate pages, the second set of one or more candidate pages including the third candidate page and the fourth candidate page.

Clause c.2. The computer implemented method of clause c.1, wherein determining the third subset of source objects includes:

adding a first source object from the first subset of source objects to the third subset of source objects;

selecting a second source object from the first subset of source objects, the second source object being a next-in-order source object to the first source object;

determining if the second source object is associated with the first text hierarchy level; and in response to determining that the second source object is not associated with the first text hierarchy level, adding the second source object to the third subset of source objects.

Clause c.3. The computer implemented method of clause c.1, wherein determining the third and fourth subsets of source objects includes:

adding a first source object from the first subset of source objects to the third subset of source objects;

selecting a second source object from the first subset of source objects, the second source object being a next-in-order source object to the first source object;

determining if the second source object is associated with the first text hierarchy level; and in response to determining that the second source object is associated with the first text hierarchy level, adding the second source object to the fourth subset of source objects.

Clause c.4. The computer implemented method of any one of clauses c.1 to c.3, wherein the method further includes:

calculating a first page score for the first candidate page, the first page score providing a measure of how well the source content defined by the first subset of source objects is likely to be accommodated by an available deck-format design page;

calculating a second page score for the second candidate page, the second page score providing a measure of how well the source content defined by the second subset of source objects is likely to be accommodated by an available deck-format design page; and selecting the first candidate page in response to determining that the first page score is a more optimal page score than the second page score.

Clause c.5. The computer implemented method of clause c.4, wherein the first page score is calculated based on a first set of content metrics, the first set of content metrics including one or more content metric values selected from a group including: a content metric characters value that is based on a number of characters defined by the first subset of source objects; a content metric lines value that is based on a number of lines of text defined by the first subset of source objects; a content metric fills value that is based on a number of fills defined by the first subset of source objects; a content metric tables value that is based on a number of tables defined by the first subset of source objects; and a content metric charts value that is based on a number of charts defined by the first subset of source objects.

Clause c.6. The computer implemented method of any one of clauses c.1 to c5, wherein the first split level is determined based on a previous split level that was used to generate the first candidate page.

Clause c.7. The computer implemented method of clause c.6, wherein the first split level is determined to be the text hierarchy level that is associated with at least one source object in the first subset of source objects and is a next-in-order text hierarchy level when compared to the previous split level.

Clause c.8. The computer implemented method of any one of clauses c.1 to c7, wherein the second pagination candidate is generated so that the second set of one or more candidate pages includes the second candidate page.

Clause c.9. The computer implemented method of any one of clauses c.1 to c8, wherein the first set of one or more candidate pages is associated with all source objects in the set of one or more source objects and the second set of one or more candidate pages is associated with all source objects in the set of one or more source objects.

Clause c.10. The computer implemented method of any one of clauses c.1 to c9, further including generating an initial pagination candidate that includes an initial candidate page that is associated with all source objects in the set of one or more source objects, and wherein the first candidate page and the second candidate page are generated by splitting the initial candidate page.

Clause c.11. The computer implemented method of any one of clauses c.1 to c10, further including:
selecting the third candidate page;
splitting the third candidate page by:
determining a second split level, the second split level corresponding to a second text hierarchy level, the second text hierarchy level being a lower hierarchy level than the first text hierarchy level;
determining a fifth subset of source objects that includes one or more source objects from the third subset of source objects that are selected based on the second split level;
determining a sixth subset of source objects that includes one or more source objects from the third subset of source objects that are different to the one or more source objects in the fifth subset of source objects and are selected based on the second split level;
generating a fifth candidate page that is associated with the fifth subset of source objects;
generating a sixth candidate page that is associated with the sixth subset of source objects; and
generating a third pagination candidate that includes a third set of one or more candidate pages, the third set of one or more candidate pages including the fifth candidate page and the sixth candidate page.

Clause c.12. The computer implemented method of clause c.11, wherein the method further includes:
calculating a third page score for the third candidate page, the third page score providing a measure of how well the source content defined by the third subset of source objects is likely to be accommodated by an available deck-format design page;
calculating a fourth page score for the fourth candidate page, the fourth page score providing a measure of how well the source content defined by the fourth subset of source objects is likely to be accommodated by an available deck-format design page; and
selecting the third candidate page in response to determining that the third page score is a more optimal page score than the fourth page score.

Clause c.13. The computer implemented method of clause c.12 or clause c.13, wherein the third pagination candidate is generated so that the third set of one or more candidate pages includes the second candidate page and the fourth candidate page.

Clause c.14. The computer implemented method of any one of clauses c.1 to c.13, wherein the set of one or more source objects is included in analysis data generated according to the method of any one of clauses b.1 to b.23.

Clause c.15. The computer implemented method of any one of clauses c.1 to c.14, further including:
identifying a first deck-format design template that matches the first pagination candidate, the first deck-format design template including a template page corresponding to each candidate page in the first set of one or more candidate pages; and
generating a first new deck-format design based on the first deck-format design template and the first pagination candidate.

Clause c.16. The computer implemented method of any one of clauses c.1 to c.15, further including:
identifying a second deck-format design template that matches the second pagination candidate, the second deck-format design template including a template page corresponding to each candidate page in the second set of one or more candidate pages; and
generating a second new deck-format design based on the second deck-format design template and the second pagination candidate.

Clause Set D

Clause d.1. A computer implemented method including:
accessing a first set of source objects, wherein each source object in the first set of source objects corresponds to source content of a source design and the first set of source objects correspond to a first source page;
generating a first source page partition key, the first source page partition key being in respect of an original version of the first source page and including a plurality of partition key values that provide a first measure of the type and amount of source content of the original version of the first source page; and
identifying a first set of or more template pages, wherein each template page in the first set of one or more template pages is a specific page of a specific template that potentially matches the first source page, and wherein identifying the first set of one or more template pages includes:
comparing the first source page partition key to a first template page partition key that is associated with a first template page; and
determining that the first template page potentially matches the first source page if the first source page partition key matches the first template page partition key.

Clause d.2. The computer implemented method of clause d.1, wherein the first set of template pages includes the first template page and a second template page, and wherein the method further includes:
calculating a first score in respect of the original version of the first source page and the first template page, wherein the first score being calculated based on:
a first source page vector that is associated with the first source page and includes a plurality of page vector values that provide a second measure of the type and amount of source content of the first source page; and
a first template page vector that is associated with the first template page and includes a plurality of page vector values that provide a second measure of the type and amount of content that can be accommodated by the first template page;
calculating a second score in respect of the original version of the first source page and the second template page, the second score being calculated based on the first source page vector and a second template page vector that is associated with the second template page; and selecting the first template page as a final match for the original version of the first source page based on the first score and the second score.

Clause d.3. The computer implemented method of clause d.1 or clause d.2, further including:

generating a first rewrite of the first source page;

generating a second source page partition key, the second source page partition key being in respect of the first rewrite of the first source page and including a plurality of partition key values that provide a first measure of the type and amount of source content defined by the first rewrite of the first source page;

identifying that a third template page is a potential match for the first rewrite of the first source page based on the second source page partition key and a third template page partition key that is associated with the third template page; and including the third template page in the first set of template pages.

Clause d.4. The computer implemented method of clause d.3, wherein generating the first rewrite of the first source page includes combining source content defined by two or more of the source objects together.

Clause d.5. The computer implemented method of any one of clauses d.1 to d.4, wherein the first source page partition key is generated to include a partition key texts value that is based on a number of source objects in the first set of source objects that define text-type source content.

Clause d.6. The computer implemented method of any one of clauses d.1 to d.5, wherein the first source page partition key is generated to include a partition key fills value that is based on a number of fills defined in the first set of source objects.

Clause d.7. The computer implemented method of any one of clauses d.1 to d.6, wherein the first source page partition key is generated to include a partition key charts value that is based on a number of charts defined in the first set of source objects.

Clause d.8. The computer implemented method of any one of clauses d.1 to d.7, wherein the first source page partition key is generated to include a partition key tables value that is based on a number of tables defined in the first set of source objects.

Clause d.9. The computer implemented method of clause d.2 or any one of clauses d.3 to d.8 when dependent on clause d.2, wherein the first source page vector includes a set of one or more characters values, wherein a first characters value is associated with a first text hierarchy level and is based on a number of text characters that are defined in the first set of source objects and that are at the first text hierarchy level.

Clause d.10. The computer implemented method of clause d.2 or any one of clauses d.3 to d.9 when dependent on clause d.2, wherein the first source page vector includes a set of one or more lines values, wherein a first lines value is associated with a first text hierarchy level and is based on a number of lines of text that are defined in the first set of source objects and that are at the first text hierarchy level.

Clause d.11. The computer implemented method of clause d.2 or any one of clauses d.3 to d.10 when dependent on clause d.2, wherein the first source page vector includes one or more values selected from a group including:

a characters value that is based on a number of characters defined in the first set of source objects;

a lines value that is based on a number of lines of text defined by the set of one or more source objects; a fills aspect ratio value that is based on aspect ratios of any fills that are defined in the first set of source objects;

a partial fills value that is based on a number of partial-type fills that are defined in the first set of source objects;

a complete fills value that is based on a number of complete-type fills that are defined in the first set of source objects;

a charts aspect ratio value that is based on aspect ratios of any charts that are defined in the first set of source objects;

a tables aspect ratio value that is based on aspect ratios of any tables that are defined in the first set of source objects.

Clause d.12. The computer implemented method of any one of clauses dl to d.11, wherein each source object in the first set of source objects includes a set of source object attributes, and wherein a first source object of set of source objects is associated with first source content and has a first set of source object attributes that include:

a source identifier attribute that identifies the first source content;

a type attribute that identifies a content type of the first source content; and a reading order attribute that identifies a position of the first source content in a reading order.

Clause d.13. The computer implemented method of clause d.12, wherein the first source content is text type content that is associated with a particular text hierarchy level and the first set of source object attributes includes at least one of: a text hierarchy level attribute that records the particular text hierarchy level; a characters attribute that has a value that is based on a number of characters of the first content; and a lines attribute that has a value that provides a measure of vertical distance that the first content may occupy.

Clause d.14. The computer implemented method of any one of clauses dl to d.13, wherein the first set of source objects is a candidate page generated according to the method of any one of clauses c.1 to c.14.

Clause d.15. The computer implemented method of any one of clauses dl to d.14, further including generating a new deck-format design page based on the first template page and the source content of the source design.

Clause Set E

Clause e.1. A computer implemented method including:

accessing data in respect of a first pagination candidate, wherein:

the first pagination candidate is associated with a first set of candidate pages;

each candidate page in the first set of candidate pages is associated with a set of source objects; and each source object corresponds to source content of a source design;

identifying a set of potentially matching template pages for each candidate page in the first set of candidate pages, wherein identifying the set of potentially matching template pages includes determining that a first template page of a first template potentially matches a first candidate page;

calculating a set of preliminary template scores for the first pagination candidate, wherein calculating the set of preliminary template scores for the first pagination candidate includes calculating a first preliminary template score in respect of the first template based on a number of candidate pages that are associated with the first pagination candidate and that are matched by a page of the first template; and preliminarily selecting one or more templates for the first pagination candidate based on the set of preliminary template scores.

Clause e.2. The computer implemented method of clause e.1, further including:

calculating a set of candidate page scores for the first pagination candidate, wherein each candidate page score is in respect of a particular candidate page of the first pagination candidate and a particular template page of a preliminarily selected template; and calculating a set of final template scores for the first pagination candidate based on the set of candidate page scores calculated for the first pagination candidate, wherein each final template score is in respect of the first pagination candidate and a particular template, and wherein calculating the set of final template scores for the first pagination candidate includes calculating a first final template score that is in respect of the first template and that is based any candidate page scores that are in respect of a page of the first template.

Clause e.3. The computer implemented method of clause e.2, wherein the method further includes generating a first candidate page vector for the first candidate page, the first candidate page vector including a plurality of page vector values that provide a second measure of the type and amount of source content defined by the first candidate page, and wherein:

calculating the set of candidate page scores for the first pagination candidate includes calculating a first candidate page score in respect of the first candidate page and the first template page; and the first candidate page score is based on the first candidate page vector and a first template page vector that is associated with the first template page.

Clause e.4. The computer implemented method of clause e.3, wherein calculating the first candidate page score includes calculating the Euclidean distance between the first candidate page vector and the first template page vector.

Clause e.5. The computer implemented method of clause e.3 or e.4, wherein calculating the first candidate page score includes calculating a text size penalty, and wherein the text size penalty is a measure of the extent to which the first template page accommodates text type source content of the first candidate page.

Clause e.6. The computer implemented method of any one of clauses e.3 to e.5, wherein the first candidate page vector is generated to include a set of one or more characters values, wherein a first characters value is associated with a first text hierarchy level and is based on a number of text characters that are defined by the first candidate page's source content and that are at the first text hierarchy level.

Clause e.7. The computer implemented method of any one of clauses e.3 to e.6, wherein the first candidate page vector is generated to include a set of one or more lines values, wherein a first lines value is associated with a first text hierarchy level and is based on a number of lines of text that are defined by the first candidate page's source content and that are at the first text hierarchy level.

Clause e.8. The computer implemented method of any one of clauses e.3 to e.8, wherein the first candidate page vector is generated to include one or more values selected from a group including: a characters value that is based on a number of characters defined by the first candidate page's source content; a lines value that is based on a number of lines of text defined by the first candidate page's source content; a fills aspect ratio value that is based on aspect ratios of any fills that are defined by the first candidate page's source content; a partial fills value that is based on a number of partial-type fills that are defined by the first candidate page's source content; a complete fills value that is based on a number of complete-type fills that are defined by the first candidate page's source content; a charts aspect ratio value that is based on aspect ratios of any charts that are defined by the first candidate page's source content; a tables aspect ratio value that is based on aspect ratios of any tables that are defined by the first candidate page's source content.

Clause e.9. The computer implemented method of any one of clauses e.2 to e.8, wherein calculating the set of final template scores for the first pagination candidate includes calculating a second final template score associated with a second template, and wherein the method further includes:

selecting the first template as a final match for the first pagination candidate page based on the first final template score and the second final template score.

Clause e.10. The computer implemented method of any one of clauses e.1 to e.9, wherein determining that the first template page potentially matches the first candidate page includes:

generating a first candidate page partition key, the first candidate page partition key including a plurality of partition key values that provide a first measure of the type and amount of the first candidate page's source content;

comparing the first candidate page partition key to a first template page partition key that is associated with the first template page; and determining that the first template page potentially matches the first candidate page if the first candidate page partition key matches the first template page partition key.

Clause e.11. The computer implemented method of clause e.10, wherein the first candidate page partition key is generated to include one or more of: a partition key texts value that indicates a number of source objects in the first candidate page's set of one or more source objects that define text-type source content; a partition key fills value that indicates a number of source objects in the first candidate page's set of one or more source objects that define fill type source content; a partition key charts value that indicates a number of source objects in the first candidate page's set of one or more source objects; a partition key tables value that indicating a number of source objects in the first candidate page's set of one or more source objects the set of one or more source objects that define table type source content.

Clause e.12. The computer implemented method of any one of clauses e.1 to e.11, further including generating a first rewrite of the first candidate page, and wherein:
- identifying the set of potentially matching template pages for the first candidate page includes determining that the first template page of matches the first rewrite of the first candidate page.

Clause e.13. The computer implemented method of clause e.12, wherein generating the first rewrite of the first candidate page includes combining source content defined by two or more of the source objects that are associated with the first candidate page.

Clause e.14. The computer implemented method of any one of clauses e.1 to e.13, further including generating a new deck-format design based on the first pagination candidate and the first template.

Clause e.15. The computer implemented method of clause e.14, wherein generating the new deck-format design includes generating a deck-format design descriptor corresponding to the first pagination candidate, wherein the deck-format design descriptor includes a first new page dataset that corresponds to the first candidate page, and wherein the first new page dataset includes:
- a first destination page identifier that identifies the first template page of the first template; and
- content map data that maps a first object associated with the first candidate page to a first destination object associated with the first template page.

Clause e.16. The computer implemented method of any one of clauses e.1 to e.15, wherein the first pagination candidate is generated according to the method of any one of clauses c.1 to c.14.

Clause Set F

Clause f.1. A computer implemented method including:
- accessing a first set of source objects that relate to a first page of a source design, wherein each source object is associated with a set of source object attributes that include:
  - a source identifier attribute that identifies source content of the source design;
  - a type attribute that identifies a content type of the source content; and
  - a reading order attribute that identifies a position of the source content in a reading order of the source design;
- accessing a first set of destination objects that relate to a first page of a destination design, wherein the destination design is a deck-format design and each destination object is associated with a set of destination object attributes that includes:
  - a destination identifier attribute that identifies a destination element of the destination design;
  - a type attribute that identifies a content type of the destination element; and
  - a reading order attribute that identifies a position of the destination element in a reading order of the destination design;
- generating, based on the first set of source objects and the first set of destination objects, a first content map that maps each source object in the first set of source objects to a destination object in the first set of destination objects.

Clause f.2. The computer implemented method of clause f.1, wherein:
- the first set of source objects includes one or more text-type source objects, each text-type source object having a type attribute that identifies text type content;
- the first set of destination objects includes one or more text-type destination objects, each text-type destination object having a type attribute that identifies text type content; and
- generating the first content map includes:
  - selecting a first source object from the first set of source objects, wherein the first source object is a text-type source object, and the first source object is a first-in-reading-order text-type source object in the first set of source objects that has not already been mapped to a destination object;
  - identifying a first destination object from the first set of destination objects, wherein the first destination object is a text-type destination object, and the first destination object is a first-in-reading-order text-type destination object in the first set of destination objects that has not already been mapped to a source object; and
  - mapping the first source object to the first destination object.

Clause f.3. The computer implemented method of clause f.1, wherein:
- the first set of source objects includes one or more text-type source objects, wherein each text-type source object has a type attribute that identifies text type content, and wherein each text type source object includes a text hierarchy level attribute that identifies a text hierarchy level;
- the first set of destination objects includes one or more text-type destination objects, wherein each text-type destination object has a type attribute that identifies text type content; and
- wherein each text type destination object includes a text hierarchy level attribute that identifies a text hierarchy level; and
- generating the first content map includes:
  - selecting a first source object from the first set of source objects, wherein the first source object is a text-type source object associated with a first text hierarchy level, and the first source object is the first-in-reading-order text-type source object in the first set of source objects that is associated with the first text hierarchy level and that has not been mapped to a destination object;
  - identifying a first destination object from the first set of destination objects, wherein the first destination object is a text-type destination object associated with the first text hierarchy level, and the first destination object is the first-in-reading-order text-type destination object in the first set of destination objects that is associated with the first text hierarchy level and that has not been mapped to a source object; and
  - mapping the first source object to the first destination object.

Clause f.4. The computer implemented method of clause f.3, wherein generating the first content map includes:
- selecting a second source object from the first set of source objects, wherein the second source object is a text-type source object associated with a second text hierarchy level, and the second source object is the first-in-reading-order text-type source object in the first set of source objects that is associated with the second text hierarchy level and that has not been mapped to a destination object;

identifying a second destination object from the first set of destination objects, wherein the second destination object is a text-type destination object associated with the second text hierarchy level, and the second destination object is the first-in-reading-order text-type destination object in the first set of destination objects that is associated with the second text hierarchy level and that has not been mapped to a source object; and mapping the second source object to the second destination object.

Clause f.5. The computer implemented method of any one of clauses f.1 to f.4, wherein:

the first set of source objects includes one or more fill-type source objects, each fill-type source object having a type attribute that identifies fill type content;

the first set of destination objects includes one or more fill-type destination objects, each fill-type destination object having a type attribute that identifies fill type content; and generating the first content map includes:

selecting a third source object from the first set of source objects, wherein the third source object is a fill-type source object, and the third source object is a first-in-reading-order fill-type source object in the first set of source objects that has not already been mapped to a destination object;

identifying a third destination object from the first set of destination objects, wherein the third destination object is a fill-type destination object, and the third destination object is a first-in-reading-order fill-type destination object in the first set of destination objects that has not already been mapped to a source object; and mapping the third source object to the third destination object.

Clause f.6. The computer implemented method of any one of clauses f.1 to f.5, wherein:

the first set of source objects includes one or more chart-type source objects, each chart-type source object having a type attribute that identifies chart type content;

the first set of destination objects includes one or more chart-type destination objects, each chart-type destination object having a type attribute that identifies chart type content; and generating the first content map includes:

selecting a fourth source object from the first set of source objects, wherein the fourth source object is a chart-type source object, and the fourth source object is a first-in-reading-order chart-type source object in the first set of source objects that has not already been mapped to a destination object;

identifying a fourth destination object from the first set of destination objects, wherein the fourth destination object is a chart-type destination object, and the fourth destination object is a first-in-reading-order chart-type destination object in the first set of destination objects that has not already been mapped to a source object; and mapping the fourth source object to the fourth destination object.

Clause f.7. The computer implemented method of any one of clauses f.1 to f.6, wherein:

the first set of source objects includes one or more table-type source objects, each table-type source object having a type attribute that identifies table type content;

the first set of destination objects includes one or more table-type destination objects, each table-type destination object having a type attribute that identifies table type content; and generating the first content map includes:

selecting a fifth source object from the first set of source objects, wherein the fifth source object is a table-type source object, and the fifth source object is a first-in-reading-order table-type source object in the first set of source objects that has not already been mapped to a destination object;

identifying a fifth destination object from the first set of destination objects, wherein the fifth destination object is a table-type destination object, and the fifth destination object is a first-in-reading-order table-type destination object in the first set of destination objects that has not already been mapped to a source object; and mapping the fifth source object to the fifth destination object.

Clause f.8. The computer implemented method of any one of clauses f.2 to f.7, wherein the first source object is a combined source object that is associated with a sixth source object and a seventh source object, and wherein mapping the first source object to the first destination object includes mapping the sixth source object to the first destination object and mapping the seventh source object to the first destination object.

Clause f.9. The computer implemented method of clause f. 1, wherein:

the first set of source objects includes one or more source objects of a first content type, each source object of the first content type having a type attribute that identifies the first content type;

the first set of destination objects includes one or more destination objects of the first content type, each destination object of the first content type having a type attribute that identifies the first content type; and generating the first content map includes:

selecting a first source object from the first set of source objects, wherein the first source object is of the first content type, and the first source object is a first-in-reading-order source object of the first content type in the first set of source objects that has not already been mapped to a destination object;

identifying a first destination object from the first set of destination objects, wherein the first destination object is a destination object of the first content type, and the first destination object is a first-in-reading-order destination object of the first content type in the first set of destination objects that has not already been mapped to a source object; and mapping the first source object to the first destination object.

Clause f.10. The computer implemented method of any one of clauses f.1 to f.9, wherein the source design is a document-format design and the set of source objects includes at least one source object generated according to the method of any one of clauses b.1 to b.11.

Clause f.11. The computer implemented method of any one of clauses f.1 to f. 10, wherein the set of source objects corresponds to a candidate page generated according to the method of any one of clauses c.1 to c.16.

Clause f.12. The computer implemented method of any one of clauses f.1 to f.9, wherein the source design is a deck-format design and the set of source objects is a set of analysis objects that includes at least one analysis object that is generated according to the method of any one of clauses a.1 to a.8 or a.12 to a.13.

Clause f.13. The computer implemented method of any one of clauses f.1 to f. 12, wherein the set of destination objects is a set of analysis objects that includes at least one analysis object that is generated according to the method of any one of clauses a.1 to a.11.

Clause Set G

Clause g.1. A computer implemented method for mapping a set of source fills to a set of destination frames, the method including:

calculating an ideal fill size for each source fill in the set of source fills;

calculating a remaining capacity value for each destination frame in the set of destination frames; and mapping the set of source fills to the set of destination frames, wherein mapping the set of source fills to the set of destination frames includes:

selecting a first source fill, the first source fill being the source fill that has the largest ideal fill size and that has not been mapped to any destination frame;

determining that a first destination frame has a largest remaining capacity value;

and in response to determining that the first destination frame has the largest remaining capacity value;

mapping the first source fill to the first destination frame; and updating the first destination frame's remaining capacity value.

Clause g.2. The computer implemented method of clause g.1, wherein updating the first destination frame's remaining capacity value includes subtracting the ideal fill size of the first source fill from a current remaining capacity value of the first destination frame.

Clause g.3. The computer implemented method of g.1 or g.2, further including calculating the ideal fill size for the first source fill based on a size of the first source fill.

Clause g.4. The computer implemented method of g.1 or g.2, further including calculating the ideal fill size for the first source fill based on a size of the first source fill, a total frame capacity value, and a total source fill size value.

Clause g.5. The computer implemented method of clause g.4, wherein the total frame capacity value is calculated by summing together frame capacity values of each frame in the set of destination frames.

Clause g.6. The computer implemented method of clauses g.4 or g.5, wherein the total source fill size value is calculated by summing together source fill sizes of each source fill in the set of source fills.

Clause g.7. The computer implemented method of any one of clauses g.4 to g.6, wherein the ideal fill size for the first source fill is calculated as the first source fill's size multiplied by (the total frame capacity divided by the total source fill size).

Clause g.8. The computer implemented method of any one of clauses g.1 to g.7, wherein after mapping the first source fill to the first destination frame, mapping the set of source fills to the set of destination frames further includes:

selecting a second source fill, the second source fill being the source fill that has the largest ideal fill size and that has not been mapped to any destination frame;

determining that the first destination frame has the largest remaining capacity value; and in response to determining that the first destination frame has the largest remaining capacity value:

mapping the second source fill to the first destination frame; and updating the first destination frame's remaining capacity value based on the second source fill.

Clause g.9. The computer implemented method of any one of clauses g.1 to g.7, wherein after mapping the first source fill to the first destination frame, mapping the set of source fills to the set of destination frames further includes:

selecting a second source fill, the second source fill being the source fill that has the largest ideal fill size and that has not been mapped to any destination frame;

determining that a second destination frame has the largest remaining capacity value; and in response to determining that the second destination frame has the largest remaining capacity value:

mapping the second source fill to the second destination frame; and updating the second destination frame's remaining capacity value based on the second source fill.

Clause g.10. The computer implemented method of any one of clauses g.1 to g.9, further including automatically processing a document format design to extract the set of source fills from that document format design.

Clause g.11. The computer implemented method of any one of clauses g.1 to g.9, further including automatically processing a page of a deck format design to extract the set of source fills from that page.

Clause g.12. The computer implemented method of any one of clauses g.1 to g.9, further including receiving a first set of one or more user inputs selecting the set of source fills.

Clause g.13. The computer implemented method of any one of clauses g.1 to g.12, wherein each frame in the set of destination frames corresponds to an element of a deck-format design page.

Clause g.14. The computer implemented method of any one of clauses g.1 to g.13, further including automatically processing a page of a deck format design to determine the set of destination frames.

Clause g.15. The computer implemented method of any one of clauses g.1 to g.13, further including receiving a second set of one or more user inputs selecting the set of destination frames.

Clause Set H

Clause h.1. A computer implemented method for generating a set of replacement design elements based on a set of source fills and a destination element, the method including:

selecting a set of grid arrangements, wherein each grid arrangement defines a set of grid sections and wherein each grid section is associated with grid section data defining a grid section size and a grid section origin;

calculating a final grid arrangement score for each grid arrangement, the final grid arrangement score for a selected grid arrangement being a measure of how well the set of grid sections of the selected grid arrangement accommodate the source fills;

selecting a first grid arrangement from the set of grid arrangements based on the final grid arrangement scores; and generating the set of replacement design elements, wherein each replacement design element is based on the destination element and corresponds to a different grid section defined by the first grid arrangement, and wherein generating the set of replacement design elements includes generating a first replacement design element corresponding to a first grid section by;

determining a size and position of the first replacement design element based on the first grid section;

assigning a first source fill to the first replacement design element; and transferring the first source fill to the first replacement design element.

Clause h.2. The computer implemented method of clause h.1, wherein the grid section data of the first grid section defines the first grid section's origin by an origin X value and an origin Y value.

Clause h.3. The computer implemented method of clause h.2, wherein the origin X value is expressed as a proportion of a total width of the first grid arrangement and the origin Y value is expressed as a proportion of a total height of the first grid arrangement.

Clause h.5. The computer implemented method of any one of clauses h.1 to h.4, wherein the grid section data of the first grid section defines the first grid section's size by a grid section width value and a grid section height value.

Clause h.6. The computer implemented method of clause h.5, wherein the grid section width value is expressed as a proportion of a total width of the first grid arrangement and the grid section height value is expressed as a proportion of a total height of the first grid arrangement.

Clause h.7. The computer implemented method of any one of clauses h.1 to h.7, wherein calculating the final grid arrangement score for the first grid arrangement includes:

calculating a set of aspect ratio differences for the first grid arrangement, wherein each aspect ratio difference corresponds to a particular grid section of the first grid arrangement and a matched source fill; and calculating the final grid arrangement score based on the set of aspect ratio differences.

Clause h.8. The computer implemented method of clause h.7, wherein calculating the set of aspect ratio differences for the first grid arrangement includes:

calculating an aspect ratio for each source fill;

calculating an aspect ratio for each grid section of the first grid arrangement;

identifying matching source fill/grid section pairs based on the source fill aspect ratios and the grid section aspect ratios; and calculating an aspect ratio difference for each matching source fill/grid section pair based on the aspect ratio of the pair's source fill and the aspect ratio of the pair's grid section.

Clause h.9. The computer implemented method of clause h.8, wherein the first grid section has a largest grid section aspect ratio and a first source fill has a largest fill aspect ratio, and wherein identifying matching source fill/grid section pairs includes identifying the first grid section and the first fill as a matching source fill/grid section pair.

Clause h.10. The computer implemented method of any one of clauses h.1 to h.9, wherein determining the size and position of the first replacement design element includes determining the size of the first replacement design element based on the first grid section's size and determining the position of the first replacement design element based on the first grid section's origin.

Clause h.11. The computer implemented method of any one of clauses h.1 to h.10, wherein assigning the first source fill to the first replacement design element is based on an aspect ratio of the first source fill and an aspect ratio of the replacement design element.

Clause h.12. The computer implemented method of clause h.11, wherein a first replacement design element has a largest replacement design element aspect ratio and the first fill has a largest fill aspect ratio.

Clause h.13. The computer implemented method of any one of clauses h.1 to h.12, wherein selecting the set of grid arrangements includes identifying and selecting one or more grid arrangements that define a number of grid sections that is equal to a number of source fills in the set of source fills.

Clause h.14. The computer implemented method of any one of clauses h.1 to h.13, wherein the destination element is an element of a deck-format design page, and the method further includes replacing the destination element with the set of replacement design elements.

Clause h.15. The computer implemented method of any one of clauses h.1 to h.14, further including:

receiving a first set of one or more user inputs selecting the set of source fills; and receiving a second set of one or more user inputs selecting the destination element.

Clause h.16. The computer implemented method of any one of clauses h.1 to h.14, wherein the set of source fills and the destination element are automatically determined.

Clause h.17. The computer implemented method of any one of clauses h.1 to h.14, wherein the destination element defines a destination frame and wherein set of source fills is mapped to the destination frame according to a method of any one of clauses g.1 to g.15.

Clause Set I

Clause i.1. A computer implemented method for generating a new table based on a source table and a destination table, the source table including a set of source table cells and the destination table including a set of destination table cells, the method including:

generating a set of source cell styles, wherein each source cell style is a cell style defined by at least one source table cell;

generating a set of destination cell styles, wherein each destination cell style is a cell style defined by at least one destination table cell;

generating the new table, wherein the new table includes a set of new table cells that correspond to the set of source table cells and wherein each new table cell includes cell content of the corresponding source table cell; and restyling the set of new table cells by, for each new table cell:

identifying a destination cell style from the set of destination cell styles; and applying the destination cell style to the new table cell.

Clause i.2. The computer implemented method of clause i.1, further including:

calculating a first font scaling factor, the first font scaling factor corresponding to a first set of new table cells; and adjusting a font size of text content of the first set of new table cells based on the first font scaling factor.

Clause i.3. The computer implemented method of clause i.2, wherein the first font scaling factor is calculated so that text content of each new table cell in the first set of new table cells fits with the new table cell.

Clause i.4. The computer implemented method of clause i.2 or clause i.3, wherein the first set of new table cells includes all new table cells.

Clause i.5. The computer implemented method of clause i.2 or clause i.3, wherein the first set of new table cells includes all new table cells in the set of new table cells that have a same destination cell style applied to them.

Clause i.6. The computer implemented method of any one of clauses i.1 to i.5, wherein generating the set of source cell styles includes:

selecting a first source cell from the set of source table cells, the first source cell being a first-in-reading-order cell of the set of source table cells;

determining a cell style of the first source cell; and adding the cell style of the first source cell to the set of source cell styles.

Clause i.7. The computer implemented method of clause i.6, wherein generating the set of source cell styles further includes:

selecting a second source cell from the set of source table cells, the second source cell being a second-in-reading-order cell of the set of source table cells;

determining a cell style of the second source cell;

determining whether the set of source cell styles includes the cell style of the second source cell; and in response to determining that the set of source cell styles does not include the cell style of the second source cell, adding the cell style of the second source cell to the set of source cell styles.

Clause i.8. The computer implemented method of any one of clauses i.1 to i.7, wherein generating the set of destination cell styles includes:

selecting a first destination cell from the set of destination table cells, the first destination cell being a first-in-reading-order cell of the set of destination cells;

determining a cell style of the first destination cell; and adding the cell style of the first destination cell to the set of destination cell styles.

Clause i.9. The computer implemented method of clause i.8, wherein generating the set of destination cell styles further includes:

selecting a second destination cell from the set of destination table cells, the second destination cell being a second-in-reading-order cell of the set of destination cells;

determining a cell style of the second destination cell;

determining whether the set of destination cell styles includes the cell style of the second destination cell; and in response to determining that the set of destination cell styles does not include the cell style of the second destination cell, adding the cell style of the second destination cell to the set of destination cell styles.

Clause i.10. The computer implemented method of any one of clauses i.1 to i.9, wherein restyling the set of new table cells includes, for a selected new table cell:

identifying a particular source cell style from the set of source cell styles that matches the cell style of the selected new table cell;

identifying a particular destination cell style from the set of destination cell styles, the particular destination cell style being the destination cell style that corresponds to the particular source cell style; and applying the particular destination cell style to the selected new table cell.

Clause i.11. The computer implemented method of any one of clauses i.1 to i.9, wherein:

the set of source cell styles is an ordered set of source cell style records;

the set of destination cell styles is an ordered set of destination cell style records; and restyling the set of new table cells includes, for a selected new table cell:

identifying a particular source cell style record from the set of source cell style records, the particular source cell style record defining a cell style of the selected new table cell and having a first position in the ordered set of source cell style records;

identifying a particular destination cell style record from the set of destination cell style records, the particular destination cell style record being the destination cell style record at the first position in the ordered set of destination cell style records; and applying the cell style defined by the particular destination cell style record to the selected new table cell.

Clause i.12. The computer implemented method of any one of clauses i.1 to i.11, wherein each cell style is defined by a set of one or more cell style attributes selected from a group including: a cell background colour attribute; a cell font family attribute; a cell font weight attribute; a cell text colour attribute; a cell text decoration attribute (e.g. underline); a cell font style (e.g. italics) attribute; and/or other style attributes.

Clause i.13. The computer implemented method of any one of clauses i.1 to i.12, wherein generating the new table includes creating a copy of the source table and updating the copy of the source table based on one or more attributes of the destination table.

Clause i.14. The computer implemented method of clause i.13, wherein updating the copy of the source table includes one or more of: updating a size attribute of the copy based on a size attribute of the destination table; and updating a position attribute of the copy based on a position attribute of the destination table.

Clause i.15. The computer implemented method of any one of clauses i.1 to i.12, wherein generating the new table includes creating a copy of the destination table and updating the copy of the destination table based on cell content of the source table.

Clause i.16. The computer implemented method of any one of clauses i.1 to i.15 wherein the destination table is defined by a destination element of a deck-format design page, and the method further includes replacing the destination element with a new element defining the new table.

Clause i.17. The computer implemented method of any one of clauses i.1 to i.16, further including:

receiving a first set of one or more user inputs selecting the source table; and receiving a second set of one or more user inputs selecting the destination table.

Clause i.18. The computer implemented method of any one of clauses i.1 to i.16, wherein the source table and the destination table are automatically determined.

Clause i.19. The computer implemented method of any one of clauses i.1 to i.16, wherein the source table and the destination table are determined based on a content map generated according to the method of any one of clauses f.1 to f.13

Clause Set J

Clause j.1. A computer implemented method for generating a new chart based on a source chart and a destination chart, the method including:

accessing source chart data in respect of the source chart, wherein the source chart data defines a set of source chart data series and a set of source chart colours, and wherein each source chart data series is associated with a source chart colour;

accessing destination chart data in respect of the destination chart, wherein the destination chart data defines a set of destination chart data series and a set of destination chart colours, and wherein each destination chart data series is associated with a destination chart colour;

determining that the number of source chart colours is greater than the number of destination chart colours;

in response to determining that the number of source chart colours is greater than the number of destination chart colours, generating one or more new chart colours;

generating the new chart to include the set of source chart data series;

associating a first source chart data series with a destination chart colour;

associating a second source chart data series with a new chart colour.

Clause j.2. The computer implemented method of clause j.1, wherein each of the one or more new chart colours is generated based on a destination chart colour.

Clause j.3. The computer implemented method of clause j.2, wherein generating a first new chart colour includes:

selecting a first destination chart colour; and generating the first new chart colour as a variant of the first destination chart colour.

Clause j.4. The computer implemented method of clause j.3, wherein the first new chart colour is generated as a brightness variant of the first destination chart colour.

Clause j.5. The computer implemented method of clause j.3, wherein the first new chart colour is generated as a luminance variant of the first destination chart colour.

Clause j.6. The computer implemented method of any one of clauses j. 1 to j.5, wherein the source chart is associated with a first chart type that defines how the set of source chart data series are displayed and the destination chart is associated with a second chart type that defines how the set of destination chart data series are displayed, and wherein the new chart is associated with the second chart type.

Clause j.7. The computer implemented method of any one of clauses j. 1 to j.5, wherein the source chart is associated with a first chart type that defines how the set of source chart data series are displayed and the destination chart is associated with a second chart type that defines how the set of destination chart data series are displayed, and wherein the new chart is associated with the first chart type.

Clause j.8. The computer implemented method of clause j.6, wherein the first and second chart types are selected from a group including: a bar chart type; a line chart type; a pie chart type; and a scatter plot chat type.

Clause j.9. The computer implemented method of any one of clauses j.1 to j.8, further including:

receiving a first set of one or more user inputs selecting the source chart; and receiving a second set of one or more user inputs selecting the destination chart.

Clause j.10. The computer implemented method of any one of clauses j.1 to j.8, wherein the source chart and the destination chart are automatically determined.

Clause j.11. The computer implemented method of any one of clauses j.1 to j.8, wherein the source chart and the destination chart are determined based on a content map generated according to the method of any one of clauses f.1 to f.13.

Clause Set K

Clause k.1. A computer implemented method including:

accessing data describing a set of original elements, wherein each original element has an original bounding box;

processing the set of original elements to identify a set of pre-existing element overlaps, wherein each pre-existing element overlap identifies a pair of original elements which are determined to be overlapping based on their original bounding boxes;

accessing data describing a set of updated elements, wherein each updated element corresponds to an original element and has an updated bounding box, and wherein the updated bounding box of at least one updated element is different to the original bounding box of the corresponding original element; and identifying a first undesirable collision, wherein identifying the first undesirable collision includes:

determining that a first current element overlap exists, wherein the first current element overlap is in respect of a first updated element and a second updated element and is identified based on a first updated bounding box of the first updated element and a second updated bounding box of the second updated element; and determining that the first current element overlap is an introduced overlap, wherein determining that the first current element overlap is an introduced overlap includes determining that there is no pre-existing overlap in respect of a first original element that corresponds to the first updated element overlapping a second original element that corresponds to the second updated element.

Clause k.2. The computer implemented method of clause k.1, wherein identifying the first undesirable collision further includes:

determining a first expansion direction, wherein the first expansion direction is a direction in which content of the first updated element would expand if additional content was added to the first updated element; and determining that the first expansion direction is a direction from the first updated element to the second updated element.

Clause k.3. The computer implemented method of clause k.2, wherein the first expansion direction is determined based on a text alignment attribute of the first updated element.

Clause k.4. The computer implemented method of any one of clauses k.1 to k.3, wherein identifying the first undesirable collision further includes:

calculating a first pre-existing penetration distance, the first pre-existing penetration distance being based on a distance that a first original bounding box of the first original element plus an element margin penetrates into a second original bounding box of the second original element;

calculating a first current penetration distance, the first current penetration distance being based on a distance that the first updated element's updated bounding box plus the element margin penetrates into the second updated element's updated bounding box; and determining that the first current penetration distance is greater than the first pre-existing penetration distance.

Clause k.5. The computer implemented method of any one of clauses k.1 to k.4, wherein the first updated element is a text type element.

Clause k.6. The computer implemented method of any one of clauses k.1 to k.5, wherein the second updated element is a text type element.

Clause k.7. The computer implemented method of any one of clauses k.1 to k.6, wherein determining that the first current element overlap exists includes determining that the first updated bounding box extends into an element margin around the second updated bounding box.

Clause k.8. The computer implemented method of any one of clauses k.1 to k.7, further including:

determining that the first updated element is solely responsible for the first undesirable collision; and resolving the first undesirable collision by resizing the first updated bounding box.

Clause k.9. The computer implemented method of clause k.8, wherein determining that the first updated element is solely responsible for the first undesirable collision includes:

determining a first expansion direction, wherein the first expansion direction is a direction in which content of the first updated element would expand if additional content was added to the first updated element;

determining a second expansion direction, wherein the second expansion direction is a direction in which content of the second updated element would expand if additional content was added to the second updated element;

determining that the first expansion direction is a direction from the first updated element to the second updated element; and determining that the second expansion direction is not a direction from the second updated element to the first updated element.

Clause k.10. The computer implemented method of clause k.8 or clause k.9, wherein resolving the first undesirable collision includes:

calculating a first penetration distance;

resizing the first updated bounding box based on the first penetration distance; and shrinking content of the first updated element to fit within the resized first updated bounding box.

Clause k.11. The computer implemented method of k.10 when dependent on k.4, wherein the first penetration distance is calculated as the first pre-existing penetration distance subtracted from the first current penetration distance.

Clause k.12. The computer implemented method of any one of clauses k.1 to k.7, further including:

determining that the first updated element and the second updated element are jointly responsible for the first undesirable collision; and resolving the first undesirable collision by resizing the first updated bounding box and resizing the second updated bounding box.

Clause k.13. The computer implemented method of clause k.12, wherein determining that the first updated element and the second update element are jointly responsible for the first undesirable collision includes:

determining a first expansion direction, wherein the first expansion direction is a direction in which content of the first updated element would expand if additional content was added to the first updated element;

determining a second expansion direction, wherein the second expansion direction is a direction in which content of the second updated element would expand if additional content was added to the second updated element;

determining that the first expansion direction is a direction from the first updated element to the second updated element; and determining that the second expansion direction is a direction from the second updated element to the first updated element.

Clause k.14. The computer implemented method of clause k.12 or clause k.13, wherein resolving the first undesirable collision includes:

calculating a first penetration distance;

calculating a first proportion of the first penetration distance and a second proportion of the first penetration distance;

resizing the first updated bounding box based on the first proportion of the first penetration distance;

shrinking content of the first updated element to fit within the resized first updated bounding box;

resizing the second updated bounding box based on the second proportion of the first penetration distance; and shrinking content of the second updated element to fit within the resized second updated bounding box.

Clause k.15. The computer implemented method of clause k.14 when dependent on k.4, wherein the first penetration distance is calculated as the first pre-existing penetration distance subtracted from the first current penetration distance.

Clause k.16. The computer implemented method of clause k.14 or clause k.15 wherein:

the first and second proportions of the first penetration distance are calculated based on a first expansion value and a second expansion value, wherein:

the first expansion value is based on a distance that the first updated bounding box has expanded when compared to a first original bounding box of the first original element; and the second expansion value is based on a distance that the second updated bounding box has expanded when compared to a second original bounding box of the second original element.

Clause k.17. The computer implemented method of any one of clauses k.8 to k.16, wherein resizing the first updated bounding box includes one or both of: reducing a height of the first updated bounding box based on the first penetration distance; and adjusting a vertical position of the first updated bounding box based on the first penetration distance.

Clause k.18. The computer implemented method of any one of clauses k.8 to k.17, wherein the first updated element is a text type element with first text content and shrinking the content of the first updated element includes making a first reduction to a font size of the first text content.

Clause k.19. The computer implemented method of clause k.18, further including:

determining whether any single-word wrapping exists in the first text content; and in response to determining that single-word wrapping exists in the first text content, making a second reduction to the font size of the first text content to eliminate the single-word wrapping.

Clause k.20. The computer implemented method of any one of clauses k.1 to k.20 further including identifying a second undesirable collision according to a method of clause l.1 or clause l.2.

Clause k.21. The computer implemented method of clause k.21, further including resolving the second undesirable collision according to a method of any one of clauses l.3 to l.9.

Clause Set L

Clause l.1. A computer implemented method including:

accessing data describing a set of original elements, wherein each original element has an original bounding box;

processing the set of original elements to identify a set of pre-existing element overlaps, wherein each pre-existing element overlap identifies a pair of original elements which are determined to be overlapping based on their original bounding boxes;

accessing data describing a set of updated elements, wherein each updated element corresponds to an original element and has an updated bounding box, and wherein the updated bounding box of at least one updated element is different to the original bounding box of the corresponding original element; and identifying a second undesirable collision, wherein identifying the second undesirable collision includes:

determining that a second current element overlap exists, wherein the second current element overlap is in respect of a third updated element and a fourth updated element and is identified based on a third updated bounding box of the third updated element overlapping a fourth updated bounding box of the fourth updated element;

determining that the third updated bounding box is not contained entirely within the second updated bounding box; and determining that the second current element overlap has a corresponding a pre-existing overlap, wherein the corresponding pre-existing overlap is in respect of a third original element that corresponds to the third updated element and a fourth original element that corresponds to the fourth updated element, and wherein a third original bounding box of the third original element is contained entirely within a fourth original bounding box of the fourth original element.

Clause l.2. The computer implemented method of clause l.1, wherein the third updated element is a text type element.

Clause l.3. The computer implemented method of clause l.1 or clause l.2, further including resolving the second undesirable collision by:

calculating a second penetration distance;

resizing the third updated bounding box based on the second penetration distance; and shrinking content of the third updated element to fit within the resized third updated bounding box.

Clause l.4. The computer implemented method of clause l.3, wherein the second penetration distance is based on an amount that the third updated bounding box has expanded compared to the third original bounding box Clause l.5. The computer implemented method of clause l.3 or clause l.4, wherein calculating the second penetration distance includes:

determining a second penetration direction, the second penetration direction being a direction that the third updated bounding box extends out of the fourth updated bounding box; and calculating the second penetration distance as the distance that the third updated bounding box has expanded in the second penetration direction when compared to the third original bounding box.

Clause l.6. The computer implemented method of any one of clauses l.3 to l.5, wherein resizing the third updated bounding box includes reducing a height of the third updated bounding box based on the second penetration distance.

Clause l.7. The computer implemented method of any one of clauses l.3 to l.6, wherein resizing the third updated bounding box includes adjusting a vertical position of the third updated bounding box based on the second penetration distance.

Clause l.8. The computer implemented method of any one of clauses l.3 to l.7, wherein the third updated element is a text type element with third text content and shrinking the content of the third updated element includes making a first reduction to a font size of the third text content.

Clause l.9. The computer implemented method of clause l.8, further including:
determining whether any single-word wrapping exists in the third text content; and
in response to determining that single-word wrapping exists in the third text content, making a second reduction to the font size of the third text content to eliminate the single-word wrapping.

Clause l.10. The computer implemented method of any one of clauses l.1 to l.9 further including identifying a first undesirable collision according to a method of any one of clauses k.1 to k.7.

Clause l.11. The computer implemented method of clause l.10, further including resolving the first undesirable collision according to a method of any one of clauses k.8 to k.19.

Clause Set M

Clause m.1. A computer implemented method including:
accessing element data defining a set of elements, each element defining text content and being associated with a text hierarchy level;
analysing the element data to determine that a first intra-hierarchy conflict exists, wherein determining that the first intra-hierarchy exists includes:
identifying a first element that defines first text content and is associated with a first text hierarchy level;
identifying a second element that defines second text content and is associated with the first text hierarchy level; and
determining that a font size of the first text content is different to a font size of the second text content; and
resolving the first intra-hierarchy conflict by reducing the font size of the first text content or the font size of the second text content.

Clause m.2. The computer implemented method of clause m.1, wherein resolving the first intra-hierarchy conflict includes:
determining that the font size of the first text content is larger than the font size of the second text content; and
setting the font size of the first text content to be equal to the font size of the second text content.

Clause m.3. The computer implemented method of clause m.2, further including:
identifying a third element that is associated with the first text hierarchy level and that defines third text content;
determining that a font size of the third text content is different to the font size of the second text content; and
setting the font size of the third text content to be equal to the font size of the second text content.

Clause m.4. The computer implemented method of any one of clauses m.1 to m.3, further including:
analysing the element data to determine that a second intra-hierarchy conflict exists, wherein determining that the second intra-hierarchy exists includes:
identifying a fourth element that defines fourth text content and is associated with a second text hierarchy level;
identifying a fifth element that defines fifth text content and is associated with the second text hierarchy level; and
determining that a font size of the fourth text content is different to a font size of the fifth text content; and
resolving the first intra-hierarchy conflict by reducing the font size of the fourth text content or the font size of the fifth text content.

Clause m.5. The computer implemented method of clause m.4, wherein resolving the second intra-intra hierarchy conflict includes:
determining that the font size of the fourth text content is larger than the font size of the fifth text content; and
setting the font size of the fourth text content to be equal to the font size of the fifth text content.

Clause m.6. The computer implemented method of any one of clauses m.1 to m.5, wherein the method is performed after resolving one or more undesirable element collisions, wherein the one or more undesirable element collisions are resolved according to the method of any one of clauses k.8 to k.20 or any one of clauses l.3 to l.9.

Clause Set N

Clause n.1. A computer implemented method including:
accessing element data defining a set of elements, each element defining text content and being associated with a text hierarchy level;
analysing the element data to determine that a first inter-hierarchy conflict exists with respect to a first text hierarchy level, wherein determining that the first inter-hierarchy conflict exists includes:
identifying a first element that defines first text content and is associated with the first text hierarchy level;
identifying a second element that defines second text content and is associated with a second text hierarchy level, wherein the second text hierarchy level is a lower text hierarchy level than the first text hierarchy level; and
determining that a font size of the second text content is greater than or equal to a font size of the first text content; and
resolving the first inter-hierarchy conflict by setting the font size of the second text content to a first new font size, the first new font size being smaller than the font size of the first text content.

Clause n.2. The computer implemented method of clause n.1, further including:
identifying a third element that defines third text content and is associated with the second text hierarchy level; and
setting the font size of the third text content to the first new font size.

Clause n.3. The computer implemented method of clause n.1 or clause n.2, wherein the first text hierarchy level is a highest text hierarchy level and the second text hierarchy level is a second highest text hierarchy level, and the method further includes:
analysing the element data to determine that a second inter-hierarchy conflict exists with respect to the second text hierarchy level, wherein determining that the second inter-hierarchy conflict exists includes:
identifying a fourth element that defines fourth text content and is associated with a third text hierarchy level, wherein the third text hierarchy level is a lower text hierarchy level than the second text hierarchy level; and determining that a font size of the fourth text content is greater than or equal to the first new font size; and resolving the second inter-hierarchy conflict by setting the font size of the fourth text content to a second new font size, the second new font size being smaller than the first new font size.

Clause n.4. The computer implemented method of any one of clauses n.1 to n.3, wherein the method is performed after resolving one or more undesirable element collisions, wherein the one or more undesirable element collisions are resolved according to the method of any one of clauses k.8 to k.20 or any one of clauses l.3 to l.9.

Clause n.5. The computer implemented method of any one of clauses n.1 to n.4, wherein the method is performed after identifying and resolving one or more intra-hierarchy conflicts, wherein the one or more intra-hierarchy conflicts are resolved according to the method of any one of clauses m.1 to m.5.

Clause Set O

Clause o.1. A computer implemented method including:

accessing a set of input paragraphs, wherein each input paragraph is associated with one or more format attributes, and wherein the one or more format attributes of each input paragraph includes a font size attribute;

generating an ordered set of input paragraph identifiers, wherein each input paragraph identifier identifies an input paragraph of the set of input paragraphs, and wherein the ordered set of input paragraph identifiers is ordered based on the font size attributes associated with each input paragraph; and progressively subdividing the ordered set of input paragraph identifiers into a set of input paragraph subgroups, wherein the progressive subdividing is based on the one or more format attributes of the one or more input paragraphs and on completion each input paragraph subgroup defines a different text hierarchy level.

Clause o.2. The computer implemented method of clause o.1, wherein progressively subdividing the ordered set of input paragraph identifiers includes performing a first-in-order subdivision in which the ordered set of input paragraphs are grouped into subgroups based on font size.

Clause o.3. The computer implemented method of clause o.2, wherein:

progressively subdividing the ordered set of input paragraph identifiers includes performing a second-in-order subdivision; and the second-in-order subdivision includes subdividing the subgroups of input paragraph identifiers that are in the ordered set of input paragraph identifiers following the first-in-order subdivision based on a first format type.

Clause o.4. The computer implemented method of clause o.3, wherein the first format type is list indentation.

Clause o.5. The computer implemented method of clause o.3. or clause o.4, wherein:

progressively subdividing the ordered set of input paragraph identifiers includes performing a third-in-order subdivision; and the third-in-order subdivision includes subdividing the subgroups of input paragraph identifiers that are in the ordered set of input paragraph identifiers following the second-in-order subdivision based on a second format type.

Clause o.6. The computer implemented method of clause o.5, wherein the second format type is underline.

Clause o.7. The computer implemented method of clause o.5 or clause o.6, wherein:

progressively subdividing the ordered set of input paragraph identifiers includes performing a fourth-in-order subdivision; and the fourth-in-order subdivision includes subdividing the subgroups of input paragraph identifiers that are in the ordered set of input paragraph identifiers following the third-in-order subdivision based on a third format type.

Clause o.8. The computer implemented method of clause o.7, wherein the third format type is all-caps.

Clause o.9. The computer implemented method of clause o.7 or clause o.8, wherein:

progressively subdividing the ordered set of input paragraph identifiers includes performing a fifth-in-order subdivision; and the fifth-in-order subdivision includes subdividing the subgroups of input paragraph identifiers that are in the ordered set of input paragraph identifiers following the fourth-in-order subdivision based on a fourth format type.

Clause o.10. The computer implemented method of clause o.9, wherein the fourth format type is bold.

Clause Set P

Clause p.1. A computer implemented method including:

accessing data defining a set of design elements, wherein the set of design elements includes a first element defining a first fill and one or more other elements; and analysing the first element to determine if the first fill is suitable for replacement by a second fill that has one or more transparent regions by:

selecting a second element from the one of more other elements for analysis; and analysing the second element to determine whether the second element makes the first fill unsuitable for replacement by the second fill, wherein:

in response to determining that the second element makes the first fill unsuitable for replacement by the second fill, returning a value that indicates that the first fill is unsuitable for replacement by the second fill; and in response to determining that the second element does not make the first fill unsuitable for replacement by the second fill:

determining whether the one or more other elements includes a third element that has not been selected for analysis; and in response to determining that the one or more other elements includes the third element, selecting the third element for analysis and analysing the third element to determine whether the third element makes the first fill unsuitable for replacement by the second fill.

Clause p.2. The computer implemented method of clause p.1, wherein in response to determining that the one or more other elements does not include the third element, returning a value that indicates that the first fill is suitable for replacement by the second fill.

Clause p.3. The computer implemented method of clause p.1 or clause p.2, wherein analysing the second element includes:

determining whether the second element is behind the first element and contains the first element.

Clause p.4. The computer implemented method of clause p.3, wherein determining whether the second element is behind the first element is based on a first depth value that defines a depth of the first element and a second depth value that defines a depth of the second element.

Clause p.5. The computer implemented method of clause p.3 or clause p.4, wherein determining whether the second element contains the first element is based on a first bounding box of the first element and a second bounding box of the second element.

Clause p.6. The computer implemented method of any one of clauses p.3 to p.5, wherein in response to determining that the second element is behind the first element and contains the first element, analysing the second element further includes:

determining that the second element does not make the first fill unsuitable for replacement by the second fill.

Clause p.7. The computer implemented method of any one of clauses p.3 to p.5, wherein in response to determining that the second element is not behind the first element or does not contain the first element, analysing the second element further includes:

determining whether the first element and the second element intersect.

Clause p.8. The computer implemented method of clause p.7 when dependent on clause p.5, wherein determining whether the first element and the second element intersect is based on the first bounding box of the first element and the second bounding box of the second element.

Clause p.9. The computer implemented method of clause p.7 or clause p.8, wherein in response to determining that the first element and the second element intersect, analysing the second element further includes:

determining that the second element makes the first fill unsuitable for replacement by the second fill.

Clause p.10. The computer implemented method of clause p.7 or clause p.8, wherein in response to determining that the first element and the second element do not intersect, analysing the second element further includes:

determining that the second element does not make the first fill unsuitable for replacement by the second fill.

Clause p.11. The computer implemented method of clause p.5 or clause p.8, wherein the first bounding box is an original bounding box of the first element and the second bounding box is an original bounding box of the second element.

Clause p.12. The computer implemented method of clause p.5 or clause p.8, wherein the first bounding box is a modified bounding box of the first element and the second bounding box is a modified bounding box of the second element.

Clause p.13. The computer implemented method of clause p.12, further including:

calculating the first bounding box by expanding an original bounding box of the first element by a fixed margin; and calculating the second bounding box by expanding an original bounding box of the second element by the fixed margin.

Clause p.14. The computer implemented method of clause p.12, further including:

calculating the first bounding box by expanding an original bounding box of the first element by an expansion factor; and calculating the second bounding box by expanding an original bounding box of the second element by the expansion factor.

Clause p.15. The computer implemented method of any one of clauses p.1 to p.14, further including:

analysing a fourth element that defines a third fill to determine if the third fill is suitable for replacement by a fourth fill that has one or more transparent regions by:

determining whether the third fill is a rectangular fill; and in response to determining that the third fill is the rectangular fill, determining that the third fill unsuitable for replacement by the fourth fill and returning a value that indicates that the third fill is unsuitable for replacement by the fourth fill.

Clause Set Q

Clause q.1. A computer implemented method for generating a new deck format design based on a source design, the method including:

processing the source design to generate source design analysis data, the source design analysis data defining a first candidate page, the first candidate page associated with a first set of source objects, each source object corresponding to source content of the source design;

analysing a first template to determine if the first template design matches the source design, wherein the first template is a deck format design that includes a first template page, and wherein analysing the first template design is based on the source design analysis data and first template design analysis data, the first template design analysis data defining a first set of destination objects, each destination object in the first set of destination objects corresponding to an element of the first template page;

determining that the first template matches the source design;

generating a first new deck descriptor, the first new deck descriptor being in respect of the first template and including first content map data, the first content map data mapping a first source object from the set of source objects to a first destination object from the first set of destination objects; and generating the new deck format design based on the source design and the first new deck descriptor.

Clause q.2. The computer implemented method of clause q.1, wherein determining that the first template matches the source design includes determining that the first template page matches the first candidate page.

Clause q.3. The computer implemented method of clause q.1 or q.2, wherein:

the source design analysis data defines a plurality of candidate pages;

the first template includes a plurality of template pages; and determining that the first template matches the source design includes determining that two or more template pages match two or more candidate pages.

Clause q.4. The computer implemented method of clause q.2 or clause q.3, wherein:

the method further includes generating a first partition key, the first partition key corresponding to the first candidate page and including a plurality of partition key values that provide a first measure of the type and amount of source content defined by the first set of source objects; and determining that the first template page matches the first candidate page is based on a comparison of the first partition key and a second partition key, the second partition key corresponding to the first template page.

Clause q.5. The computer implemented method of clause q.4, wherein generating the first partition key includes generating one or more first partition key values selected from a group including:

a partition key texts value that indicates a number of text type source objects in the set of one or more source objects, each text type source object corresponding to a text type source content segment of the source design;

a partition key fills value that indicates a number of fill type source objects in the set of one or more source objects, each fill type source object corresponding to a fill of the source design;

a partition key charts value that indicates a number of chart type source objects in the set of one or more source objects, each chart type source object corresponding to a chart of the source design; and a partition key tables value that indicates a number of table type source objects in the set of one or more source objects, each table type source object corresponding to a table of the source design.

Clause q.6. The computer implemented method of any one of clauses q.2 to q.5, wherein:

the method further includes generating a first page vector, the first page vector corresponding to the first candidate page and including a plurality of page vector values that provide a second measure of the type and amount of source content defined by the first set of source objects; and determining that the first template page matches the first candidate page is based on a comparison of the first page vector and a second page vector, the second page vector corresponding to the first template page.

Clause q.7. The computer implemented method of clause q.6, wherein generating the first page vector includes generating a set of one or more page vector characters values, wherein a first page vector characters value is associated with a first text hierarchy level and is based on a number of characters that are defined by source objects in the first set of source objects that are text-type source objects and that are associated with the first text hierarchy level.

Clause q.8. The computer implemented method of clause q.6 or q.7, wherein generating the first page vector includes generating a set of one or more page vector lines values, wherein a first page vector lines value is associated with a first text hierarchy level and is based on a number of lines of text that are defined by source objects in the first set of source objects that are text-type source objects and that are associated with the first text hierarchy level.

Clause q.9. The computer implemented method of any one of clauses q.6 to q.8, wherein generating the first page vector includes generating one or more page vector values selected from a group including:

a fills aspect ratio value that is based on aspect ratios of any fill type source objects in the set of one or more source objects, each fill type source object corresponding to a fill of the source design;

a charts aspect ratio value that is based on aspect ratios defined by any chart type source objects in the set of one or more source objects, each chart type source object corresponding to a chart of the source design; and a tables aspect ratio value that is based on aspect ratios defined by any table type source objects in the set of one or more source objects, each table type source object corresponding to a table of the source design.

Clause q.10. The computer implemented method of any one of clauses q.1 to q.9, wherein processing the source design to generate the source design analysis data includes generating a first source object corresponding to first source content of the first candidate page, and wherein the first source object is associated with a first set of source object attributes that include:

a source identifier attribute that identifies the first source content;

a type attribute that identifies a content type of the first source content; and a reading order attribute that identifies a position of the first source content in a reading order of the first candidate page.

Clause q.11. The computer implemented method of clause q.10, wherein the first set of source object attributes further includes one or more of:

a transfer content attribute that indicates whether the first source content is to be transferred to the new deck format design or not;

a text hierarchy level attribute that indicates a text hierarchy level of the first content if the first content is text type content;

a characters attribute that is based on a number of characters of the first content if the first content is text type content; and a lines attribute that is based on a vertical distance that the first content occupies if the first content is text type content.

Clause q.12. The computer implemented method of any one of clauses q.1 to q.11, further including generating a first rewrite of the first candidate page, and wherein determining that the first template matches the source design includes determining that the first template page matches the first rewrite of the first candidate page.

Clause q.13. The computer implemented method of clause q.12, wherein generating the first rewrite of the first source page includes combining the source content defined by two or more of the source objects together.

Clause q.14. The computer implemented method of any one of clauses q.1 to q.13, wherein:

the first content map data is generated according to the method of any one of clauses f.1 to f.13

Clause q.15. The computer implemented method of any one of clauses q.1 to q.14, wherein:

the first content map data maps a first source object from the set of source objects and a second source object from the set of source objects to a first destination object from the first set of destination objects;

the first source object and the second source object are fill type source objects that define first and second source fills respectively;

the first destination object is a fill type destination object that corresponds to a shape type destination element; and generating the new deck format design includes transferring the first and second source fills to the shape type destination element according to the method of any one of clauses h.1 to h.14.

Clause q.16. The computer implemented method of any one of clauses q.1 to q.16, wherein:

the first content map data maps a third source object from the set of source objects to a second destination object from the first set of destination objects;

the third source object is a table type source object that corresponds to a source table;

the second destination object is a table type destination object that corresponds to a table type destination element; and generating the new deck format design includes transferring the source table to the table type destination element according to the method of any one of clauses i.1 to i.16.

Clause q.17. The computer implemented method of any one of clauses q.1 to q.16, wherein:

the first content map data maps a fourth source object from the set of source objects to a third destination object from the first set of destination objects;

the fourth source object is a chart type source object that corresponds to a source chart;

the third destination object is a chart type destination object that corresponds to a chart type destination element; and generating the new deck format design includes transferring the source chart to the chart type destination element according to the method of any one of clauses j.1 to j.8.

clause q.18. The computer implemented method of any one of clauses q.1 to q.17, wherein the source design is a document-format design and analysing the source design to generate source design analysis data is performed in accordance with the method of any one of clauses b.1 to b.11.

clause q.19. The computer implemented method of clause q.18, wherein the first candidate page is generated according the method of any one of clauses c.1 to c.13.

clause q.20. The computer implemented method of any one of clauses q.1 to q.19, wherein the source design is a deck format design, and analysing the source design to generate source design analysis data is performed in accordance with the method of any one of clauses a.1 to a.8 or any one of clauses a.23 to a.24.

clause q.21. The computer implemented method of any one of clauses q.1 to q.20, wherein the first template design is a deck format design, and the method further includes generating the first and first template design analysis data in accordance with the method of any one of clauses a.1 to a.11 or any one of clauses a.14 to a.24.

Clause Set r

Clause r.1. A computer processing system including:

one or more processing units; and one or more non-transitory computer-readable storage media storing instructions, which when executed by the one or more processing units, cause the one or more processing units to perform a method according to: any one of clauses a.1 to a.24; any one of clauses b.1 to b.24; any one of clauses c.1 to c.16; any one of clauses d.1 to d.15; any one of clauses e.1 to e.16; any one of clauses f.1 to f.13; any one of clauses g.1 to g.15; any one of clauses h.1 to g.17; any one of clauses i.1 to i.19; any one of clauses j.1 to j.11; any one of clauses k.1 to k.21; any one of clauses l.1 to l.11; any one of clauses m.1 to m.6; any one of clauses n.1 to n.5; any one of clauses o.1 to o.10; any one of clauses p.1 to p.15; and/or any one of clauses q.1 to q.21.

Clause r.2. One or more non-transitory storage media storing instructions executable by one or more processing units to cause the one or more processing units to perform a method according to: any one of clauses a.1 to a.24; any one of clauses b.1 to b.24; any one of clauses c.1 to c.16; any one of clauses d.1 to d.15; any one of clauses e.1 to e.16; any one of clauses f.1 to f.13; any one of clauses g.1 to g.15; any one of clauses h.1 to g.17; any one of clauses i.1 to i.19; any one of clauses j.1 to j.11; any one of clauses k.1 to k.21; any one of clauses l.1 to l.11; any one of clauses m.1 to m.6; any one of clauses n.1 to n.5; any one of clauses o.1 to o.10; any one of clauses p.1 to p.15; and/or any one of clauses q.1 to q.21.

In the embodiments described above, processing is described as being performed by specific applications or modules. Variations are possible, and generally speaking an operation that is described as being performed by one particular application or module could be performed by an alternative application or module.

The flowcharts illustrated in the figures and described above define processing blocks operations in particular orders to explain various features. In some cases the processing described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications than that described.

In the above description, certain operations and features are explicitly described as being optional. This should not be interpreted as indicating that if an operation or feature is not explicitly described as being optional it should be considered essential. Even if an operation or feature is not explicitly described as being optional it may still be optional.

The present disclosure provides various user interface examples. It will be appreciated that alternative user interfaces are possible. Such alternative user interfaces may provide the same or similar user interface features to those described and/or illustrated in different ways, provide additional user interface features to those described and/or illustrated, or omit certain user interface features that have been described and/or illustrated.

In some instances the present disclosure and/or claims use the terms “first,” “second,” etc. to identify and distinguish between features. When used in this way, these terms are not used in an ordinal sense and are not intended to imply any particular order. For example, a first feature could equally be referred to a second feature without departing from the scope of the described examples. Furthermore, when used to differentiate features, a second feature could exist without a first feature or a second feature could occur or be ordered before a first feature.

Unless otherwise stated, the terms “include” and “comprise” (and variations thereof such as “including”, “includes”, “comprising”, “comprises”, “comprised” and the like) are used inclusively and do not exclude further features, components, integers, steps, or elements.

It will be understood that the embodiments disclosed and defined in this specification extend to alternative combinations of two or more of the individual features mentioned in or evident from the text, drawings, or clauses. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

The invention claimed is:

1. A computer implemented method for generating a new deck format design, the method including:

accessing, by one or more processing units, source design data defining a document format source design, wherein the source design data includes an ordered sequence of source design elements and each source design element defines one or more source design content segments;

processing, by the one or more processing units, the source design data to generate source design analysis data, wherein the source design analysis data includes a complete set of source objects and wherein each source object in the complete set of source objects corresponds to a source design content segment;

processing, by the one or more processing units, the source design analysis data to automatically identify a first set of source objects that correspond to a first candidate page, wherein the first set of source objects includes a plurality of source objects from the complete set of source objects;

generating, by the one or more processing units, a first partition key, wherein the first partition key corresponds to the first candidate page and includes a plurality of partition key values that provide a first measure of the type and amount of source content defined by the first set of source objects;

analysing, by the one or more processing units, a first template design to automatically determine that the first template design matches the source design, wherein:

the first template design is a deck format design that includes a first template page;

the first template design is associated with first template design analysis data defining a first set of destination objects, each destination object in the first set of destination objects corresponding to an element of the first template page;

the first template page is associated with a second partition key; and automatically determining that the first template design matches the source design is based on a comparison of the first partition key and the second partition key and includes processing, by the one or more processing units, the source design analysis data and first template design analysis data to automatically determine that the source design analysis data is a match for the first template design analysis data;

in response to determining that the first template design matches the source design, automatically generating, by the one or more processing units, a first new deck descriptor based on the first template design, wherein the first new deck descriptor includes first content map data that maps a first source object from the set of source objects to a first destination object from the first set of destination objects; and automatically generating, by the one or more processing units, the new deck format design based on the source design and the first new deck descriptor.

2. The computer implemented method of claim 1, wherein:

the first template design includes a second template page;

the method further includes processing, by the one or more processing units, the source design analysis data to automatically identify a second set of source objects that correspond to a second candidate page, wherein the second set of source objects includes a plurality of source objects from the complete set of source objects; and automatically determining that the first template design matches the source design includes automatically determining that the first template page matches the first candidate page and automatically determining that the second template page matches the second candidate page.

3. The computer implemented method of claim 1, wherein generating the first partition key includes generating one or more first partition key values selected from a group including:

a partition key texts value that indicates a number of text type source objects in the set of one or more source objects, each text type source object corresponding to a text type source content segment of the source design;

a partition key fills value that indicates a number of fill type source objects in the set of one or more source objects, each fill type source object corresponding to a fill of the source design;

a partition key charts value that indicates a number of chart type source objects in the set of one or more source objects, each chart type source object corresponding to a chart of the source design; and a partition key tables value that indicates a number of table type source objects in the set of one or more source objects, each table type source object corresponding to a table of the source design.

4. The computer implemented method of claim 1, wherein processing the source design to generate the source design analysis data includes generating a first source object corresponding to first source content of the first candidate page, and wherein the first source object is associated with a first set of source object attributes that include one or more of:

a source identifier attribute that identifies the first source content;

a type attribute that identifies a content type of the first source content;

a reading order attribute that identifies a position of the first source content in a reading order of the first candidate page;

a transfer content attribute that indicates whether the first source content is to be transferred to the new deck format design or not;

a text hierarchy level attribute that indicates a text hierarchy level of the first content if the first content is text type content;

a characters attribute that is based on a number of characters of the first content if the first content is text type content; and a lines attribute that is based on a vertical distance that the first content occupies if the first content is text type content.

5. The computer implemented method of claim 1, wherein the first set of source objects does not include all source objects from the complete set of source objects.

6. The computer implemented method of claim 1, wherein automatically determining that the first template design matches the source design includes processing, by the one or more processing units, the source design analysis data and first template design analysis data to automatically determine that types and amounts of source content defined by the first set of source objects match types and numbers of destination objects defined by the first template design analysis data.

7. The computer implemented method of claim 1, further including generating, by the one or more processing units, a first rewrite of the first candidate page, and wherein automatically determining that the first template design matches the source design includes determining that the first template page matches the first rewrite of the first candidate page.

8. The computer implemented method of claim 7, wherein generating the first rewrite of the first source page includes combining the source content defined by two or more of the source objects together.

9. The computer implemented method of claim 1, wherein automatically determining that the first template design matches the source design includes determining that the first template page matches the first candidate page.

10. The computer implemented method of claim 9, wherein:

the method further includes generating, by the one or more processing units, a first page vector, the first page vector corresponding to the first candidate page and including a plurality of page vector values that provide a second measure of the type and amount of source content defined by the first set of source objects; and determining that the first template page matches the first candidate page is based on a comparison of the first page vector and a second page vector, the second page vector corresponding to the first template page.

11. The computer implemented method of claim 10, wherein generating the first page vector includes generating one or more page vector values selected from a group including:

a first page vector characters value that is associated with a first text hierarchy level and is based on a number of characters that are defined by source objects in the first set of source objects that are text-type source objects and that are associated with the first text hierarchy level;

a first page vector lines value that is associated with a first text hierarchy level and is based on a number of lines of text that are defined by source objects in the first set of source objects that are text-type source objects and that are associated with the first text hierarchy level;

a fills aspect ratio value that is based on aspect ratios of any fill type source objects in the set of one or more source objects, each fill type source object corresponding to a fill of the source design;

a charts aspect ratio value that is based on aspect ratios defined by any chart type source objects in the set of one or more source objects, each chart type source object corresponding to a chart of the source design; and a tables aspect ratio value that is based on aspect ratios defined by any table type source objects in the set of one or more source objects, each table type source object corresponding to a table of the source design.

12. A computer processing system including:

one or more processing units; and one or more non-transitory computer-readable storage media storing instructions, which when executed by the one or more processing units, cause the one or more processing units to perform a method for generating a new deck format design, the method including:

accessing source design data defining a document format source design, wherein the source design data includes an ordered sequence of source design elements and each source design element defines one or more source design content segments;

processing the source design data to generate source design analysis data, wherein the source design analysis data includes a complete set of source objects and wherein each source object in the complete set of source objects corresponds to a source design content segment;

processing the source design analysis data to automatically identify a first set of source objects that correspond to a first candidate page, wherein the first set of source objects includes a plurality of source objects from the complete set of source objects;

generating a first partition key, wherein the first partition key corresponds to the first candidate page and includes a plurality of partition key values that provide a first measure of the type and amount of source content defined by the first set of source objects;

analysing a first template design to automatically determine that the first template design matches the source design, wherein:

the first template design is a deck format design that includes a first template page;

the first template design is associated with first template design analysis data defining a first set of destination objects, each destination object in the first set of destination objects corresponding to an element of the first template page;

the first template page is associated with a second partition key; and automatically determining that the first template design matches the source design is based on a comparison of the first partition key and the second partition key and includes processing the source design analysis data and first template design analysis data to automatically determine that the source design analysis data is a match for the first template design analysis data;

in response to determining that the first template design matches the source design, automatically generating a first new deck descriptor based on the first template design, wherein the first new deck descriptor includes first content map data that maps a first source object from the set of source objects to a first destination object from the first set of destination objects; and automatically generating the new deck format design based on the source design and the first new deck descriptor.

13. The computer processing system of claim 12, wherein:

the first template design includes a second template page;

the method further includes processing the source design analysis data to automatically identify a second set of source objects that correspond to a second candidate page, wherein the second set of source objects includes a plurality of source objects from the complete set of source objects; and automatically determining that the first template design matches the source design includes automatically determining that the first template page matches the first candidate page and automatically determining that the second template page matches the second candidate page.

14. The computer processing system of claim 12, wherein automatically determining that the first template design matches the source design includes processing, by the one or more processing units, the source design analysis data and first template design analysis data to automatically determine that types and amounts of source content defined by the first set of source objects match types and numbers of destination objects defined by the first template design analysis data.

15. The computer processing system of claim 12, wherein automatically determining that the first template design matches the source design includes determining that the first template page matches the first candidate page.

16. The computer processing system of claim 15, wherein generating the first partition key includes generating one or more first partition key values selected from a group including:

a partition key texts value that indicates a number of text type source objects in the set of one or more source objects, each text type source object corresponding to a text type source content segment of the source design;

a partition key fills value that indicates a number of fill type source objects in the set of one or more source objects, each fill type source object corresponding to a fill of the source design;

a partition key charts value that indicates a number of chart type source objects in the set of one or more source objects, each chart type source object corresponding to a chart of the source design; and a partition key tables value that indicates a number of table type source objects in the set of one or more source objects, each table type source object corresponding to a table of the source design.

17. The computer processing system of claim 15, wherein:

the method further includes generating a first page vector, the first page vector corresponding to the first candidate page and including a plurality of page vector values that provide a second measure of the type and amount of source content defined by the first set of source objects; and determining that the first template page matches the first candidate page is based on a comparison of the first page vector and a second page vector, the second page vector corresponding to the first template page.

18. One or more non-transitory storage media storing instructions executable by one or more processing units to cause the one or more processing units to perform a method for generating a new deck format design, the method including:

accessing source design data defining a document format source design, wherein the source design data includes an ordered sequence of source design elements and each source design element defines one or more source design content segments;

processing the source design data to generate source design analysis data, wherein the source design analysis data includes a complete set of source objects and wherein each source object in the complete set of source objects corresponds to a source design content segment;

processing the source design analysis data to automatically identify a first set of source objects that correspond to a first candidate page, wherein the first set of source objects includes a plurality of source objects from the complete set of source objects;

generating a first partition key, wherein the first partition key corresponds to the first candidate page and includes a plurality of partition key values that provide a first measure of the type and amount of source content defined by the first set of source objects;

analysing a first template design to automatically determine that the first template design matches the source design, wherein:

the first template design is a deck format design that includes a first template page;

the first template design is associated with first template design analysis data defining a first set of destination objects, each destination object in the first set of destination objects corresponding to an element of the first template page;

the first template page is associated with a second partition key; and automatically determining that the first template design matches the source design is based on a comparison of the first partition key and the second partition key and includes processing the source design analysis data and first template design analysis data to automatically determine that the source design analysis data is a match for the first template design analysis data;

in response to determining that the first template design matches the source design, automatically generating a first new deck descriptor based on the first template design, wherein the first new deck descriptor includes first content map data that maps a first source object from the set of source objects to a first destination object from the first set of destination objects; and automatically generating the new deck format design based on the source design and the first new deck descriptor.

19. The one or more non-transitory storage media of claim 18, wherein automatically determining that the first template design matches the source design includes processing, by the one or more processing units, the source design analysis data and first template design analysis data to automatically determine that types and amounts of source content defined by the first set of source objects match types and numbers of destination objects defined by the first template design analysis data.

* * * * *